(12) United States Patent
Lydick

(10) Patent No.: US 11,997,237 B1
(45) Date of Patent: May 28, 2024

(54) COMPUTER IMPLEMENTED METHOD TO PERFORM SCROLL INDEXING AND RE-POSITIONING THE SCROLL TO SEARCH FOR A DESIRED FEATURE AT A DESIRED LOCATION

(71) Applicant: Daniel Lydick, Washington, KS (US)

(72) Inventor: Daniel Lydick, Washington, KS (US)

( * ) Notice: Subject to any disclaimer, the term of this patent is extended or adjusted under 35 U.S.C. 154(b) by 269 days.

(21) Appl. No.: 17/378,236

(22) Filed: Jul. 16, 2021

Related U.S. Application Data

(63) Continuation-in-part of application No. 14/883,737, filed on Oct. 15, 2015, now abandoned.

(60) Provisional application No. 62/064,744, filed on Oct. 16, 2014.

(51) Int. Cl.
| | | |
|---|---|---|
| *G06V 30/414* | (2022.01) | |
| *G06T 1/00* | (2006.01) | |
| *H04N 1/00* | (2006.01) | |
| *H04N 9/31* | (2006.01) | |

(52) U.S. Cl.
CPC ....... *H04N 1/00816* (2013.01); *G06T 1/0007* (2013.01); *G06V 30/414* (2022.01); *H04N 1/00005* (2013.01); *H04N 1/00034* (2013.01); *H04N 1/00822* (2013.01); *H04N 1/00824* (2013.01); *H04N 1/00827* (2013.01); *H04N 9/3194* (2013.01)

(58) Field of Classification Search
CPC ........... H04N 1/00816; H04N 1/00005; H04N 1/00034; H04N 1/00822; H04N 1/00824; H04N 1/00827; H04N 9/3194; A47G 33/00; A47G 33/008; B42D 1/008; B42D 19/005; G09F 2011/0009; G09F 2011/0063; G06T 1/0007; G06V 30/414
USPC .................. 358/538, 462, 488, 453; 382/306
See application file for complete search history.

(56) References Cited

U.S. PATENT DOCUMENTS

| | | | |
|---|---|---|---|
| 1,069,092 A | 7/1913 | Wise | |
| 4,696,491 A | 9/1987 | Stenger | |
| 4,978,143 A | 12/1990 | Ericson | |
| 5,871,238 A | 2/1999 | Furniss | |
| 7,236,144 B2 | 6/2007 | Ari | |
| 8,737,464 B1 | 5/2014 | Zhang et al. | |
| 2002/0116410 A1* | 8/2002 | Tesler | .................... B42D 15/00 715/268 |
| 2004/0257301 A1* | 12/2004 | Ari | ........................ B42D 19/005 345/30 |
| 2006/0281058 A1 | 12/2006 | Mangoaela | |
| 2007/0195514 A1 | 8/2007 | Katz et al. | |
| 2008/0148969 A1 | 6/2008 | Tesler | |
| 2010/0115400 A1 | 5/2010 | Yamanakajima | |
| 2011/0101969 A1 | 5/2011 | Gualtieri et al. | |

FOREIGN PATENT DOCUMENTS

WO WO-2021150152 A1 * 7/2021 ............. A47G 33/00

\* cited by examiner

*Primary Examiner* — Chad Dickerson
(74) *Attorney, Agent, or Firm* — Lieberman & Brandsdorfer, LLC

(57) ABSTRACT

Embodiments include a method, computer-implemented method, and apparatus to provide local soft-copy access, local hard-copy access, remote or web-based access to information, text, and content articulated in a scroll. Indices are created and then utilized to locate and access text within the scroll. In addition, rulers are employed with the indices to locate indicia within the scroll, including accommodating scrolls of different archetypes.

16 Claims, 93 Drawing Sheets

```
Precise Indicia Calculator
----------------------------

Height:    50 Lines per column      802

Slot size: 2.0 percent per line     804
    820         822          824
line =  1   exact =  0   inexact =  1
line =  2   exact =  2   inexact =  3
line =  3   exact =  4   inexact =  5
line =  4   exact =  6   inexact =  7
line =  5   exact =  8   inexact =  9
line =  6   exact = 10   inexact = 11
line =  7   exact = 12   inexact = 13
line =  8   exact = 14   inexact = 15
line =  9   exact = 16   inexact = 17
line = 10   exact = 18   inexact = 19
line = 11   exact = 20   inexact = 21
line = 12   exact = 22   inexact = 23
line = 13   exact = 24   inexact = 25
line = 14   exact = 26   inexact = 27
line = 15   exact = 28   inexact = 29
line = 16   exact = 30   inexact = 31
line = 17   exact = 32   inexact = 33
line = 18   exact = 34   inexact = 35
line = 19   exact = 36   inexact = 37
    830         832          834
line = 20   exact = 38   inexact = 39
line = 21   exact = 40   inexact = 41
line = 22   exact = 42   inexact = 43
line = 23   exact = 44   inexact = 45
line = 24   exact = 46   inexact = 47
line = 25   exact = 48   inexact = 49
line = 26   exact = 50   inexact = 51
line = 27   exact = 52   inexact = 53
line = 28   exact = 54   inexact = 55
line = 29   exact = 56   inexact = 57
line = 30   exact = 58   inexact = 59
line = 31   exact = 60   inexact = 61
line = 32   exact = 62   inexact = 63
line = 33   exact = 64   inexact = 65
line = 34   exact = 66   inexact = 67
line = 35   exact = 68   inexact = 69
line = 36   exact = 70   inexact = 71
line = 37   exact = 72   inexact = 73
line = 38   exact = 74   inexact = 75
line = 39   exact = 76   inexact = 77
line = 40   exact = 78   inexact = 79
line = 41   exact = 80   inexact = 81
line = 42   exact = 82   inexact = 83
line = 43   exact = 84   inexact = 85
line = 44   exact = 86   inexact = 87
line = 45   exact = 88   inexact = 89
line = 46   exact = 90   inexact = 91
line = 47   exact = 92   inexact = 93
line = 48   exact = 94   inexact = 95
line = 49   exact = 96   inexact = 97
line = 50   exact = 98   inexact = 99
```

```
Precise Indicia Calculator
--------------------------

Height:     51 Lines per column              902

Slot size:  1.9607843137254901 percent per line  904
```

|  920      |   922       |   924         |
|-----------|-------------|---------------|
| line = 1  | exact = 0   | inexact = 1   |
| line = 2  | exact = 2   | inexact = 3   |
| line = 3  | exact = 4   | inexact = 5   |
| line = 4  | exact = 6   | inexact = 7   |
| line = 5  | exact = 8   | inexact = 9   |
| line = 6  | exact = 10  | inexact = 11  |
| line = 7  | exact = 12  | inexact = 13  |
| line = 8  | exact = 14  | inexact = 15  |
| line = 9  | exact = 16  | inexact = 17  |
| line = 10 | exact = 18  | inexact = 19  |
| line = 11 | exact = 20  | inexact = 21  |
| line = 12 | exact = 22  | inexact = 23  |

|  930       |   932        |   934           |                                      |
|------------|--------------|-----------------|--------------------------------------|
| line = 13  | exact = 24   | inexact = 24 +  | ← No inexact percentages on some lines |
| line = 14  | exact = 25   | inexact = 26    |   with 51 or more lines per column   |
| line = 15  | exact = 27   | inexact = 28    |                                      |
| line = 16  | exact = 29   | inexact = 30    |                                      |
| line = 17  | exact = 31   | inexact = 32    |                                      |
| line = 18  | exact = 33   | inexact = 34    |                                      |
| line = 19  | exact = 35   | inexact = 36    |                                      |
| line = 20  | exact = 37   | inexact = 38    |                                      |
| line = 21  | exact = 39   | inexact = 40    |                                      |
| line = 22  | exact = 41   | inexact = 42    |                                      |
| line = 23  | exact = 43   | inexact = 44    |                                      |
| line = 24  | exact = 45   | inexact = 46    |                                      |
| line = 25  | exact = 47   | inexact = 48    |                                      |
| line = 26  | exact = 49   | inexact = 50    |                                      |
| line = 27  | exact = 51   | inexact = 52    |                                      |
| line = 28  | exact = 53   | inexact = 54    |                                      |
| line = 29  | exact = 55   | inexact = 56    |                                      |
| line = 30  | exact = 57   | inexact = 58    |                                      |
| line = 31  | exact = 59   | inexact = 60    |                                      |
| line = 32  | exact = 61   | inexact = 62    |                                      |
| line = 33  | exact = 63   | inexact = 64    |                                      |
| line = 34  | exact = 65   | inexact = 66    |                                      |
| line = 35  | exact = 67   | inexact = 68    |                                      |
| line = 36  | exact = 69   | inexact = 70    |                                      |
| line = 37  | exact = 71   | inexact = 72    |                                      |
| line = 38  | exact = 73   | inexact = 74    |                                      |

|  940       |   942        |   944           |                                        |
|------------|--------------|-----------------|----------------------------------------|
| line = 39  | exact = 75   | inexact = 75 +  | ← No inexact percentages are possible  |
| line = 40  | exact = 76   | inexact = 77    |   since exact percentage 76 starts next line |
| line = 41  | exact = 78   | inexact = 79    |                                        |
| line = 42  | exact = 80   | inexact = 81    |                                        |
| line = 43  | exact = 82   | inexact = 83    |                                        |
| line = 44  | exact = 84   | inexact = 85    |                                        |
| line = 45  | exact = 86   | inexact = 87    |                                        |
| line = 46  | exact = 88   | inexact = 89    |                                        |
| line = 47  | exact = 90   | inexact = 91    |                                        |
| line = 48  | exact = 92   | inexact = 93    |                                        |
| line = 49  | exact = 94   | inexact = 95    |                                        |
| line = 50  | exact = 96   | inexact = 97    |                                        |
| line = 51  | exact = 98   | inexact = 99    |                                        |

2114: The balance of the fields comprise the internal numbering fields set. The first four of its fields are optional. The first field contains a constant non-alphanumeric string indicating the field set delimiter. (If using the same numbering system in the preceding and following fields, this field is mandatory and acts as a divider between them.) The second field contains a variable string indicating the section break type. This field should be an alphabetic field—numerics are not recommended. The third field and contains a non-alphanumeric string indicating the non-conforming scroll column-level section sub-serial number delimiter. (It is mandatory if the second field could use numerics for representation and the fourth fields uses numerics of the same representation style) The fourth field contains the non-conforming scroll column-level section sub-serial number. These are the first four optional fields of the internal numbering field set.

2116: (From this point onward, all fields are mandatory.) The fifth field of the internal numbering field set is the column-level section serial number delimiter, a constant non-alphanumeric string. The sixth field contains a column-level section serial number. If that number is zero (0), then this is not actually a section break but a continuation from the previous column. The first actual section break will be then numbered as one (1).

2118: The seventh field is the document-level column serial number delimiter, a constant non-alphanumeric string. When the first word of the section break is also the first word of the column, an "anchored modifier" character string is employed here (suggested after the manner of *FLOW CHART 1300*.). The eighth field is start of the document-level column serial number field. The eighth field of the internal numbering field set is the column number in the scroll, the document-level column serial number field. It was originally determined by the method described in *FLOW CHART 500*.

2120: The ninth and final field of the internal numbering field set is a constant string indicating that the entire foregoing expression is a scroll section index number generated by the method described in *FLOW CHART 2500*.

2122: Record composite result as
INITIAL_DOCUMENT_SECTION_INDEX_NUMBER:

- Document Name Constant Starting Delimiter
- Document-level Global Section Serial Number
- Document-level Major Section Name (if present in scroll archetype)
- Document-level Major Section Serial Number (if present in scroll archetype)
- Document-level Minor Section Name (if present in scroll archetype)
- Document-level Minor Section Serial Number (if present in scroll archetype)
- Field Set Delimiter (optional)
- Section Break Type (optional)
- Column-level Section Serial Number Delimiter (optional)
- Column-level Section Serial Number
- Non-conforming Scroll Column-level Section Sub-serial Number Delimiter (opt.)
- Non-conforming Scroll Column-level Section Sub-serial Number (optional)
- Document-level Column Serial Number Delimiter
- Document-level Column Serial Number
- Expression Type Constant Ending Delimiter ( END )

Figure 21 (continued)

First, you must know the column number:

FIGURE 5, Identifying Column Number
Count from present column back to column 1 OR from column 1 forward to present column to identify its column number, expressed herein as CCC. (Used *extensively* and *without attribution* throughout this process.)

FIGURE 11, Absolute Indexing Mask
- [illegible]
- [illegible]
- [illegible]

Choose ONE

FIGURE 12, Compressible Indexing Mask
- [illegible]
- [illegible]
- [illegible]

With the column number, _EITHER_ a previously constructed index may be searched alphabetically and/or numerically...

FIGURE 1, Initial Feature Index Number
- Open scroll, locate prominent feature in open location
- Locate this same feature in alphabetic index
- Identify feature index number: CCC.PP[M]
  - CCC: Column number
  - PP: Column heuristic as percentage of column height
  - M: Modifier, if any (optional, depending on item specifics)

FIGURE 3, Column Feature Search (Numeric)
- Open scroll to known location
- Identify its feature index number as CCC.PP[M]
- Locate next indexed feature
- Identify its feature index number as CCC.PP[M]
- Repeat: Locate/identify, locate/identify, for as many features as are of interest.

... _OR_, placing the percentage ruler against the scroll, the column heuristic PP shows where the feature is on the column:

FIGURE 2, Alphabetic Feature Search
- Using result of FIGURE 1, the initial feature index number, search alphabetic index for a desired feature at some other location in the scroll
- Identify its feature index number as CCC.PP[M]
- Identify the action required to move the scroll to the desired position by calculating the difference between index numbers of the initial and desired features
- Move the scroll to the desired position

FIGURE 6, PERCENTAGE ESTIMATOR

(M does not apply here)

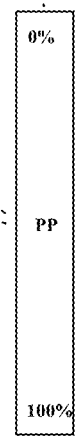

FIGURE 7, Precise Indicia Calculator
Example embodiment of FIGURE 8 is used throughout this diagram (PP, geometry being for 50 lines per column)

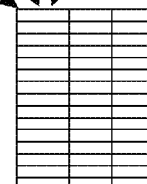

FIGURE 4, Alphabetic+Column Feature Search
- Use method of FIGURE 2 to locate desired starting feature in the scroll
- Use method of FIGURE 3 to locate and identify as many features as are of interest.

§ A. Navigating a Scroll with its Feature Index

Two ways of determining the column heuristic:

The measured fractional distance of a location relative to the height of the column of the scroll.

FIGURE 6, PERCENTAGE ESTIMATOR

*Creates an APPROXIMATION*

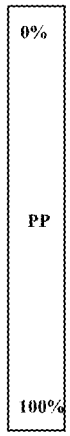

... as compared to the calculated distance as a function of number of lines per column of text.

FIGURE 10, LINE COUNTER
(example embodiment, 50 lines/column)

...where each line number in a table *represents a PRECISE* fractional portion of the column height.

FIGURE 7, Precise Indicia Calculator.
Embodiment examples: FIG. 8, FIG. 9

STANDARD MODE INDEXING

PRECISE MODE INDEXING

| FIGURE 5, Identifying Column Number |
|---|
| Count from present column back to column 1 OR from column 1 forward to present column to identify its column number, expressed herein as CCC. (Used *extensively* and *without attribution* throughout this process.) |

| Line Num | Exact % | Inexact % |
|---|---|---|
| 1 | 0 | 1 |
| 2 | 2 | 3 |
| 3 | 4 | 5 |
| ... | ... | ... |
| 50 | 98 | 99 |

Two column heuristic modes for PP, standard mode and precise mode.

BOTH need a column number CCC for complete index number.

§ B. Standard Mode vs. Precise Mode Indexing

Figure 42 (continued)

The measured fractional distance of a location relative to the height of the column of the scroll...

FIGURE 6, PERCENTAGE ESTIMATOR

Creates an *APPROXIMATION*

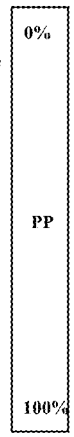

... as compared to the calculated distance as a function of number of lines per column of text.

FIGURE 10, LINE COUNTER
(example embodiment, 50 lines/column)

...where each line number in a table *represents a PRECISE* fractional portion of the column height.

FIGURE 7, Precise Indicia Calculator.
Embodiment examples: FIG. 8, FIG. 9

STANDARD MODE INDEXING          PRECISE MODE INDEXING

FIGURE 5, Identifying Column Number
Count from present column back to column 1 OR from column 1 forward to present column to identify its column number, expressed herein as CCC. (Used *extensively* and *without attribution* throughout this process.)

FIGURE 11, Absolute Indexing Mode

- Identify column number (CCC)
- Select standard or precise indexing mode
- Generate column heuristic (PP)

§ C. Absolute Indexing Mode

Figure 42 (continued)

§ D. Compressible Indexing Mode

| Standard Mode ≈ Precise Mode | | FIGURE 11, Absolute Indexing Mode (PP) | | | Compression Region (1/20th of line count) | (OR) FIGURE 12, Compressible Indexing Mode (PP) | | |
|---|---|---|---|---|---|---|---|---|
| FIGURE 6, Percentage Estimator: (Standard) | (OR) FIGURE 10, Line Counter: (Precise) | Line Num | Exact % | Inexact % | | Line Num | Exact % | Inexact % |
| | | 50 | 98 | 99 | (previous column) | 50 | Prev. col. Lower C.R. | |
| 0% | 1 | 1 | 0 | 1 | Upper C.R. | 1 | Somewhat variable, 96-99, 0-4 | |
| | | 2 | 2 | 3 | | 2 | | |
| | | 3 | 4 | 5 | | 3 | | |
| | | 4 | 6 | 7 | | 4 | 6 | 7 |
| | | 5 | 8 | 9 | | 5 | 8 | 9 |
| | | 6 | 10 | 11 | | 6 | 10 | 11 |
| | | 7 | 12 | 13 | Typically | 7 | 12 | 13 |
| | | 8 | 14 | 15 | | 8 | 14 | 15 |
| | | 9 | 16 | 17 | | 9 | 16 | 17 |
| | | 10 | 18 | 19 | non-compressed | 10 | 18 | 19 |
| | | ... | ... | ... | | ... | ... | ... |
| (PP) | | *This table is extracted from FIGURE 8, an embodiment of the method of FIGURE 7* | | | column heuristic | Use with FIGURE 13, Calculate Modifier (M) (N/A to absolute indexing) | | |
| | | | | | | Use with FIGURE 14, Localization (LOC, includes adjustments to PP, M, some CCC) (N/A to absolute indexing) | | |
| | | ... | ... | ... | numbers | ... | ... | ... |
| | | 41 | 80 | 81 | | 41 | 80 | 81 |
| | | 42 | 82 | 84 | (except | 42 | 82 | 84 |
| | | 43 | 84 | 85 | occasional | 43 | 84 | 85 |
| | | 44 | 86 | 87 | modifiers, cf. | 44 | 86 | 87 |
| | | 45 | 88 | 89 | FIGURE 13, and | 45 | 88 | 89 |
| | | 46 | 90 | 91 | localization. | 46 | 90 | 91 |
| | | 47 | 92 | 93 | scenarios, cf. | 47 | 92 | 93 |
| | | 48 | 94 | 95 | FIGURE 14) | 48 | 94 | |
| | | 49 | 96 | 97 | Lower C.R. | 49 | Somewhat Variable, 95-99 | |
| 100% | 50 | 50 | 98 | 99 | | 50 | | |
| Fig. 5 (CCC) | | 1 | 0 | 1 | (next column) | 1 | Next col. Upper C.R. | |
| | | Use w/ FIG. 5 (CCC) | | | | Use w/ FIG. 5 (CCC) | | |

Two indexing modes, absolute indexing mode and compressible indexing mode.
(Example is 50 lines per column from FIGURE 8, which implements FIGURE 7, precise mode)
(Could also show example using FIGURE 6 for standard mode with absolute mode only)

§ E. Summary of Indexing Modes

Figure 42 (continued)

Three parts of a word index number:

(a) The column number...

(b) ... plus the line number in the column of text...

FIGURE 10, LINE COUNTER
(example embodiment, 50 lines/column)

FIGURE 5, Identifying Column Number
Count from present column back to column 1 OR from column 1 forward to present column to identify its column number, expressed herein as CCC. (Used *extensively* and *without attribution* throughout this process.)

...where each line number in a table *represents a PRECISE* fractional portion of the column height.

*NOT USED:*
FIGURE 7, Precise Indicia Calculator

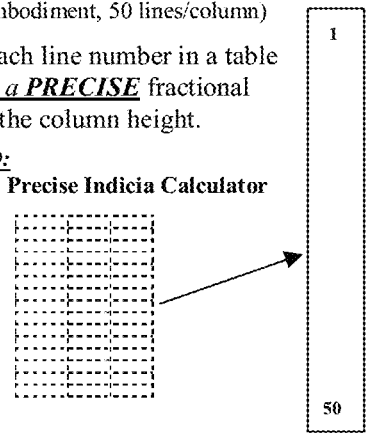

PRECISE MODE INDEXING

(c) ... plus the word number on the line.

FIGURE 15, Absolute/Compressible Word Index Number
The three components include:           CCC.LL.WW
- Column number CCC in the scroll   *(In this context, "compressible" means ONLY*
- Line number LL on the column      *page overflow, thus column X line 2 word 5 (abs)*
- Word number WW on the line        *is equally, column X-1 line 52 word 5 (compr.)*

§ F. Absolute and Compressible Word Index

Figure 42   (continued)

Three parts of a combined index number:

(a) The column number...

FIGURE 5, Identifying Column Number
Count from present column back to column 1 OR from column 1 forward to present column to identify its column number, expressed herein as CCC. (Used *extensively* and *without attribution* throughout this process.)

NOTE: The absol/cmbnd feature index number shares the column number part with the word index number to construct this combined index number.

(b) ... plus the absolute or compressible index number (stripped of M + LOC)...

FIGURE 12, Compressible Indexing Mode
- Generate an absolute index number (PP)
- These fields DO NOT PARTICIPATE here:
    - Calculate modifier (M)
    - Localization (CCC, PP, M)

FIGURE 2, Alphabetic Feature Search
- Using result of FIGURE 1, the initial feature index number, search alphabetic index for a desired feature at some other location in the scroll
- Identify its feature index number as CC.PP[M]
- Identify the action required to move the scroll to the desired position by calculating the difference between index numbers of the initial and desired features
- Move the scroll to the desired position (c) ... plus the word index number

FIGURE 15, Absolute/Compressible Word Index Number
The three components include: CCC.LL.WW
- Column number CCC in the scroll
- Line number LL on the column (L)
- Word number WW on the line (W)

FIGURE 16, Combined Index Number
The three components include: WW.LL.CCC.PP or PP.CCC.LL.WW
- Column number in the scroll (CCC)
- Absolute or compressible feature index number (PP)
- Absolute or compressible word index number (LL WW)

§ G. Combined Index Number

Figure 42 (continued)

Build Tables by Examining Scrolls and Using Indexing Methods:

FIGURE 11, Absolute Indexing Mode
- Identify column number (CCC)
- Select standard or precise indexing mode
- Generate column heuristic (PP)

FIGURE 12, Compressible Indexing Mode
- Generate an absolute index number (PP)
- Calculate modifier (M)
- Perform any appropriate localization (CCC, PP, M)

FIGURE 17, Absolute Feature Index Table
- Obtain representative copy as archetype scroll
- As appropriate, obtain a variety of other scrolls
- Generate table using archetype scroll
- Augment table with other scrolls

FIGURE 18, Compressible Feature Index Table
- Obtain representative copy as archetype scroll
- As appropriate, obtain a variety of other scrolls
- Generate table using archetype scroll
- Augment table with other scrolls

FIGURE 15, Absolute Word Index Number
The three components include:
- Column number in the scroll
- Line number on the column (L)
- Word number on the line (W)

FIGURE 16, Absolute Combined Index Number
The three components include:
- Column number in the scroll (CCC)
- Absolute or compressible feature index number (PP)
- Absolute or compressible word index number (LW)

FIGURE 19, Absolute Word Index Table
- Obtain representative copy as archetype scroll
- As appropriate, obtain a variety of other scrolls
- Generate table using archetype scroll
- Augment table with other scrolls

FIGURE 20, Absolute Combined Index Table
- Obtain representative copy as archetype scroll
- As appropriate, obtain a variety of other scrolls
- Generate table using archetype scroll
- Augment table with other scrolls

FIGURE 15, Compressible Word Index Number
The three components include:
- Column number in the scroll
- Line number on the column (L)
- Word number on the line (W)

FIGURE 16, Compressible Combined Index Number
The three components include:
- Column number in the scroll (CCC)
- Absolute or compressible feature index number (PP)
- Absolute or compressible word index number (LW)

FIGURE 19, Compressible Word Index Table
- Obtain representative copy as archetype scroll
- As appropriate, obtain a variety of other scrolls
- Generate table using archetype scroll
- Augment table with other scrolls

FIGURE 20, Compressible Combined Index Table
- Obtain representative copy as archetype scroll
- As appropriate, obtain a variety of other scrolls
- Generate table using archetype scroll

§ H. Build All Feature Index Tables

Figure 42 (continued)

First, you must know the column number:

FIGURE 5, Identifying Column Number
Count from present column back to column 1 OR from column 1 forward to present column to identify its column number, expressed herein as CCC. (Used *extensively* and *without attribution* throughout this process.) For section index table, expressed as SN.

With the column number, a previously constructed index may be searched alphabetically and/or numerically.

FIGURE 21, Initial Section Index Number
- Open scroll, locate a section break in open location
- Locate this same section in alphabetic index
- Identify section index number:

S GS[MN MS[mn ms]][FSd][B][[csd]css][CSd]CS SD SN E

S: Document Name Constant Starting Delimiter
GS: Document-level Global Section Serial Number
MN: Document-level Major Section Name (if appl.)
MS: Document-level Major Sect. Serial Num(if appl)
mn: Document-level Minor Section Name (if appl.)
ms: Document-level Minor Sect. Serial Num(if appl)
FSd: Field Set Delimiter (Optional)
B: Section Break Type (optional)
csd: Non-conforming Scroll Column-level Section Sub-Serial Number Delimiter (optional)
css: Non-conforming Scroll Column-level Section Sub-Serial Number (optional)
CSd: Column-level Section Serial Number Delimiter
CS: Column-level Section Serial Number
SD: Document-level Column Serial Num Delimiter
SN: Document-level Column Serial Number
E: Expression Type Constant Ending Delimiter External field set: S GS[MN MS[mn ms]

Internal field set: [FSd][B][[csd]css][CSd]CS SD SN E

FIGURE 25, Section Index Table
- Open archetype scroll to beginning of text
- Identify and record each feature index number as
  S GS[MN MS[mn ms]][FSd][B][[csd]css][CSd]CS SD SN E
- Repeat: Locate/identify/record for all sections.
- Open additional scroll(s) to beginning of text(if appl)
- Identify and record each feature index number as
  S GS [MN MS [mn ms]][B] [[csd] css]CS CD SN E
- Repeat: Locate/identify/record for all sections.
- Repeat for all additional scrolls.

FIGURE 22, Alphabetic Section Search
- Using result of FIGURE 21, the initial feature index number, search alphabetic index for a desired feature at some other location in the scroll
- Identify its feature index number as
  S GS[MN MS[mn ms]][FSd][B] [[csd]css][CSd]CS SD SN E
- Identify the action required to move the scroll to the desired position by calculating the difference between index numbers of the initial and desired features
- Move the scroll to the desired position

FIGURE 23, Column Section Search (Numeric)
- Open scroll to known location
- Identify its section index number as S GS ... SN E
- Locate next indexed feature
- Identify its feature index number as S GS .. SN E
- Repeat: Locate/identify, locate/identify, for as many features as are of interest.

FIGURE 24, Alphabetic+Column Section Search
- Use method of FIGURE 22 to locate desired starting section in the scroll
- Use method of FIGURE 23 to locate and identify as many sections as are of interest.

§ I. Navigating a Scroll with its Section Index

Figure 42 (continued)

§ J. Section Index Table

FIGURE 5, Identifying Column Number
Count from present column back to column 1 OR from column 1 forward to present column to identify its column number, expressed herein as CCC. (Used *extensively* and *without attribution* throughout this process.)

↑

FIGURE 11, Absolute Indexing Mode

- Identify column number (CCC)
- Select standard or precise indexing mode
- Generate column heuristic (PP)

↑

FIGURE 36, Feature Equivalence Index

- Identify the feature index number of this feature as found in the archetype scroll using FIGURE 11
- Calculate the feature equivalence index number using the equivalence number scaling equation § K. Feature Equivalence Index

Figure 42 (continued)

FIGURE 5, Identifying Column Number
Count from present column back to column 1 OR from column 1 forward to present column to identify its column number, expressed herein as CCC. (Used *extensively* and *without attribution* throughout this process.)

The measured fractional distance of a location relative to the height of the column of the scroll.

FIGURE 6, PERCENTAGE ESTIMATOR

*Creates an* *APPROXIMATION*

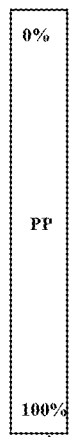

0%

PP

100%

STANDARD MODE INDEXING

FIGURE 11, Absolute Indexing Mode

- Identify column number (CCC)
- Select standard or precise indexing mode
- Generate column heuristic (PP)

FIGURE 37, Inverse Feature Equivalence Index
- Identify total number of columns in the archetype scroll using FIGURE 5
- Identify the feature equivalence index number of this feature as found in the archetype scroll using FIGURE 11
- Calculate the related feature index number using the inverse equivalence scaling equation § L. Inverse Feature Equivalence Index

Figure 42 (continued)

§ M. Section Equivalence Index

FIGURE 5, Identifying Column Number
Count from present column back to column 1 OR from column 1 forward to present column to identify its column number, expressed herein as CCC. (Used *extensively* and *without attribution* throughout this process.)

The measured fractional distance of a location relative to the height of the column of the scroll.

FIGURE 6, PERCENTAGE ESTIMATOR

*Creates an APPROXIMATION*

0%
PP
100%

STANDARD MODE INDEXING

FIGURE 11, Absolute Indexing Mode

- Identify column number (CCC)
- Select standard or precise indexing mode
- Generate column heuristic (PP)

FIGURE 37, Feature Equivalence Index
- Identify total number of columns in the archetype scroll using FIGURE 5
- Identify the feature index number of this feature as found in the archetype scroll using FIGURE 11
- Calculate the related feature index number using the inverse equivalence scaling equation

FIGURE 39, Section Inverse Equivalence Index

- Identify feature equivalence index number of desired feature of this non-conforming scroll using FIGURE 37.
- Create or update section index for this feature if necessary.
- Use result as section inverse equivalence index number § N. Inverse Section Equivalence Index

Figure 42 (continued)

COMPUTER IMPLEMENTED METHOD TO PERFORM SCROLL INDEXING AND RE-POSITIONING THE SCROLL TO SEARCH FOR A DESIRED FEATURE AT A DESIRED LOCATION

CROSS REFERENCE TO RELATED APPLICATION(S)

This application is a continuation-in-part of U.S. patent application Ser. No. 14/883,737 filed Oct. 15, 2015, which claims the benefit of priority of U.S. Provisional Application Ser. No. 62/064,744, filed Oct. 16, 2014, and titled "Scroll Index and Search", the complete disclosures of which are incorporated herein by reference.

BACKGROUND

The invention relates to reviewing text and indicia embedded in a scroll. More specifically, the invention relates to creating databases and indices and an operatively coupled apparatus having one or more associated mechanisms for improving access to and location of data reflected in the scroll.

Ancient texts were written by hand on scrolls of parchment. Many ancient texts are written and preserved in their original scrolls and often times are reproduced into books. The scrolls are organized in columns and often times have spacing between paragraphs, sections, phrases, sentences, or perhaps verses. Modern replication of the scrolls often includes chapter or paragraph numbers and sentence or verse numbers. However, the original scrolls and their replications do not include any of these modern designations. Specifically, the modern replication of scrolls does not include column numbers or line numbers within the scroll.

The books of the Old Testament are examples of ancient scrolls. Replication of these Old Testament books by handwriting is limited to replication of the indicia within the scroll. Such replication does not include any position indicia, such as column position, paragraph, section, and/or verse numbers. Challenges arise with respect to finding specific divisions within such a scroll. Specifically, a sequential reading of the scroll merely requires ending one reading session with one section, and the starting a subsequent reading session with the next section. Accordingly, with sequential reading, the reader merely needs to track the end of the prior session.

However, not all readings are sequential readings. And even with sequential readings, the scroll may have been repositioned between adjacent readings, thereby requiring the reader to find that starting position within the scroll before the subsequent reading session. Furthermore, in one scenario there may be multiple readers of the text for a single session. In a situation where a second reader may be the reader for the next reading, the second reader may be required to find the starting position of that subsequent reading without benefit of the previous reader. Accordingly, find a specific verse within a non-indexed scroll is challenging.

SUMMARY

The overall concept employed by the apparatus, method, and computer-implemented method is divided into three major parts. The common element between them is the column number within the scroll. The unique parts then express different ways to view the information, text, and content articulated in the scroll. These parts include: a feature index comprised of the column number from a scroll archetype and a number that refers to a position within that column; a section index comprised of the column number from a scroll archetype and multiple other numbers that describe where a section break fits into that column and into the sequence of section breaks both on that column, on nearby columns, and throughout the scroll; and an equivalence index for both of the above that scales the position within the scroll archetype to that of a non-standard scroll or one from a different archetype. Similar to the feature index mechanism, both of these equivalence mechanisms have both a column number for such a non-standard scroll and an intra-column number that refers to a position within that column.

These mechanisms interact in specific ways. Between them all, they comprise a thorough and complete method to describe all indexable indicia within a scroll without employing artificial or external annotations such as chapter or paragraph numbers. More specifically, it describes these indicia using the content of the scroll itself, thus forming a native, intrinsic reference system for the indexable indicia of the scroll.

In one aspect, a computer-implemented method is provided for navigation of a scroll. An apparatus is configured to receive the scroll having one or more columns of indicia without affixed position indicia. The apparatus manages the position of the scroll and is configured with one or more sensors. The one or more sensors acquire data to evaluate the indicia on the scroll and identify an initial open position of the scroll with respect to the placement of the scroll in the apparatus. A desired location in the scroll containing a desired feature is identified, and a controller operatively coupled to the apparatus ascertains the desired scroll location from the current location. The controller leverages a feature index number or a section index number to identify a designated column and calculates a column displacement. The apparatus selectively re-positions the scroll from the initial opened position to the desired scroll location based on the calculated column displacement.

In another aspect, an apparatus is provided for navigation of a scroll. The apparatus comprising a first and second scroll mover assembly, a frame, and a controller. The first scroll mover assembly comprises a first roller guide configured to receive a distal first scroll roller handle and a first scroll rotator configured to receive a proximal first scroll roller handle. The second scroll mover assembly comprises a second roller guide configured to receive a distal second scroll roller handle and a second scroll rotator configured to receive a proximal second scroll roller handle. The frame is operatively coupled to the first and second scroll mover assemblies and comprises one or more selectively mounted video sensors and video projectors. The controller is operatively connected to the first and second scroll mover assemblies and the frame. The controller is configured to receive input signals from the video sensors and produce output control signals to the first and second scroll mover assemblies to position the scroll. The video projectors illuminate a section of the positioned scroll.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 8 depicts an example embodiment of the process illustrated in FIG. 7 as a tabular representation of the precise values for numbering indicia in a column of text when measurement of indicia uses either "absolute" numbering or the revised form of "compressed" numbering.

FIG. 9 depicts in tabular form another example embodiment of the process illustrated in FIG. 7. It shows a table with "revise upward inexact modifier" designations, which occurs inherently on all configurations of 51 or more lines of indicia per column.

DETAILED DESCRIPTION

Figure 1:
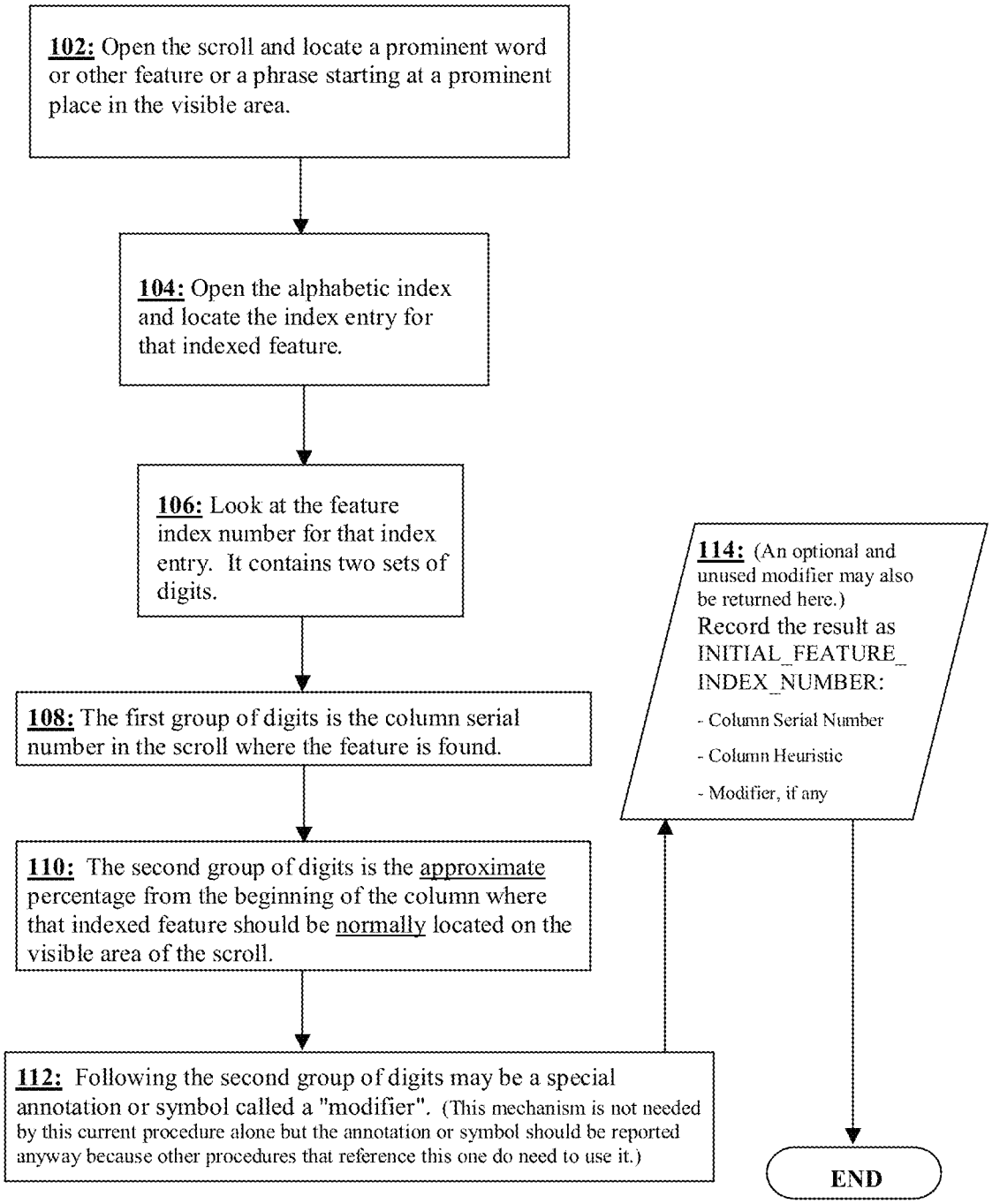
FIG. 1 depicts a flow chart illustrating a process for ascertaining a current or initial position within the scroll using any indexed alphabetic feature of the text in the scroll.

As mentioned in the abstract, there are three distinct parts to this invention, a feature index, a section index, and an equivalence index of each. This detailed description is organized into three parts following the present overall detailed description and each of these three detailed description sections will describe one of these parts. A fourth part contains the balance of the detailed description.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "in a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

The scroll index helps find the starting place of a select portion of indicia from any place in the scroll. Prior to reading from the scroll, there are four inquiries, including the following: the current position of the scroll; how many columns of text does the scroll need to be rolled for re-positioning; the direction in which the scroll needs to be turned for the re-positioning; and approximately how far into the column the desired reading is located. In one embodiment, the inquiries are conducted in the order described herein.

The scroll is accompanied with an index to the indicia present in the scroll. The first few words of select sentences or verses are organized in the index. In one embodiment, the index is sorted alphabetically. Each entry in the index has a numeric identifier that functions as a reference to the location in the scroll where the verse is located. In one embodiment, the reference includes a column number in which the indicium is located, and a column heuristic estimating a percentage position of the indicium within the column. In one embodiment, a scroll may be reproduced by handwriting, and as such, the column heuristic is not exact, as each replication of the scroll may slightly differ.

The numeric identifier is also referred to herein as a feature index number. In one embodiment, this number includes five digits. The first group of digits represents the column number where select text is found. In one embodiment, the column number contains three digits and is zero filled. The column heuristic represents the approximate distance from the beginning of the column in percent of the whole length of the column where the text is found. In one embodiment, this column heuristic is a two-digit percentage number that is zero filled. Similarly, in one embodiment, the approximate distance is measured from the top of the column.

In addition to the numeric identifier, a scroll word index is provided to define an exact positioning of each indexed word in the scroll. In one embodiment, not all words in the scroll are indexed. The word index number, also referred to herein as the word position, is constructed from the column number in the scroll feature index number. In one embodiment, the word index may be applied to a single word or even a single letter in a word but with granularity of the containing word for that letter. In one embodiment, it may be applied to a special non-word entry of some type. In one embodiment, it may be applied to an indexed phrase. When applied to a single word, it applies to that word alone. When applied to an indexed phrase, it indicates the position of the first word of the phrase. When applied to a special entry, this number is applied to a certain word, nearby non-word item, or an unwritten condition related to that word or item, such as a scholarly comment on that word, item, or position in the scroll. This index mechanism shares a column number with the feature index number. More specifically, the word index number is constructed from the column number alone of the feature index number without the column heuristic. A complete word index number includes the word on the line, the line number, and the column number. In one embodiment, the feature index number and the word index number may be combined. Here the column number is represented in the column feature index number, and the word position is provided with the word index, but the column heuristic part of the feature index number is also provided, forming a composite result called the combined index number. Details of the word index are described below in reference to FIG. 15. Details of the composite mechanism are described below in reference to FIG. 16.

In addition to the scroll word index and scroll composite index mechanisms, a scroll section index mechanism is employed. When an index table of such index numbers is created, this mechanism has the look and feel of a feature index table with an additional unique index number. In one embodiment, an index table of such items appears similar to a feature index table of the same items but with an additional column containing this unique index number. In an embodiment, this unique index number may appear as a cross-index number within a feature index table. More specifically, the section index provides an exact correspondence between identified paragraph breaks, column breaks, and other types of section layouts. The section index considers partial paragraphs that overflow from the previous column of the scroll, as well as entire paragraphs written entirely within a single column. Different and unique indices are assigned to each natural or scholar-defined section break, paragraph break, column breaks, start of document, end of document, etc. In one embodiment, various special exceptions may also apply.

The purpose of the section index mechanism is threefold: firstly, it fully enumerates and describes natural and traditional section marks as itemized and recorded; secondly, it records each section division of the scroll for use in modern printed publications so that one standard mechanism may be employed to range through the scroll text by using a built-in mechanism of existing section structure instead of creating artificial chapter or paragraph numbers and perhaps sentence or verse numbers; thirdly, it is employed for use in expository speaking and writing. The section index number is composed of a plurality of components. Selecting one component of the section index number over another crafts an association between one verse and another with an intrinsic limitation of scope within the document. Selecting multiple closely related components has a similar effect. Details of the section index are shown and described in FIG. 21 through FIG. 24 for section index use, and FIG. 25 through FIG. 35 for the section index mechanism.

Figure 36:
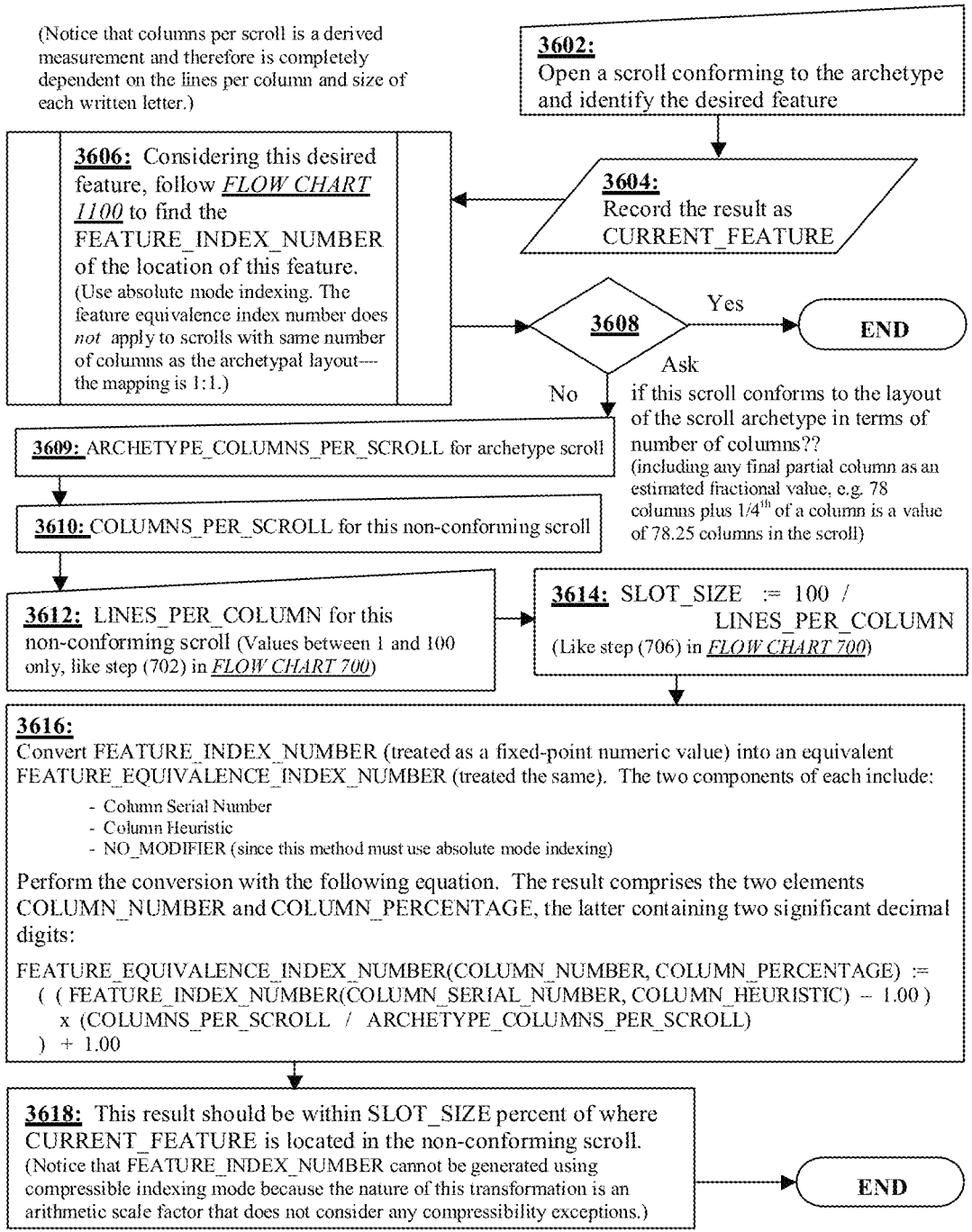
FIG. 36 depicts a flow chart for converting a feature index number from the format of a standard scroll archetype to an equivalent feature index number for a scroll of another archetype or any non-standard scroll.
Figure 37:
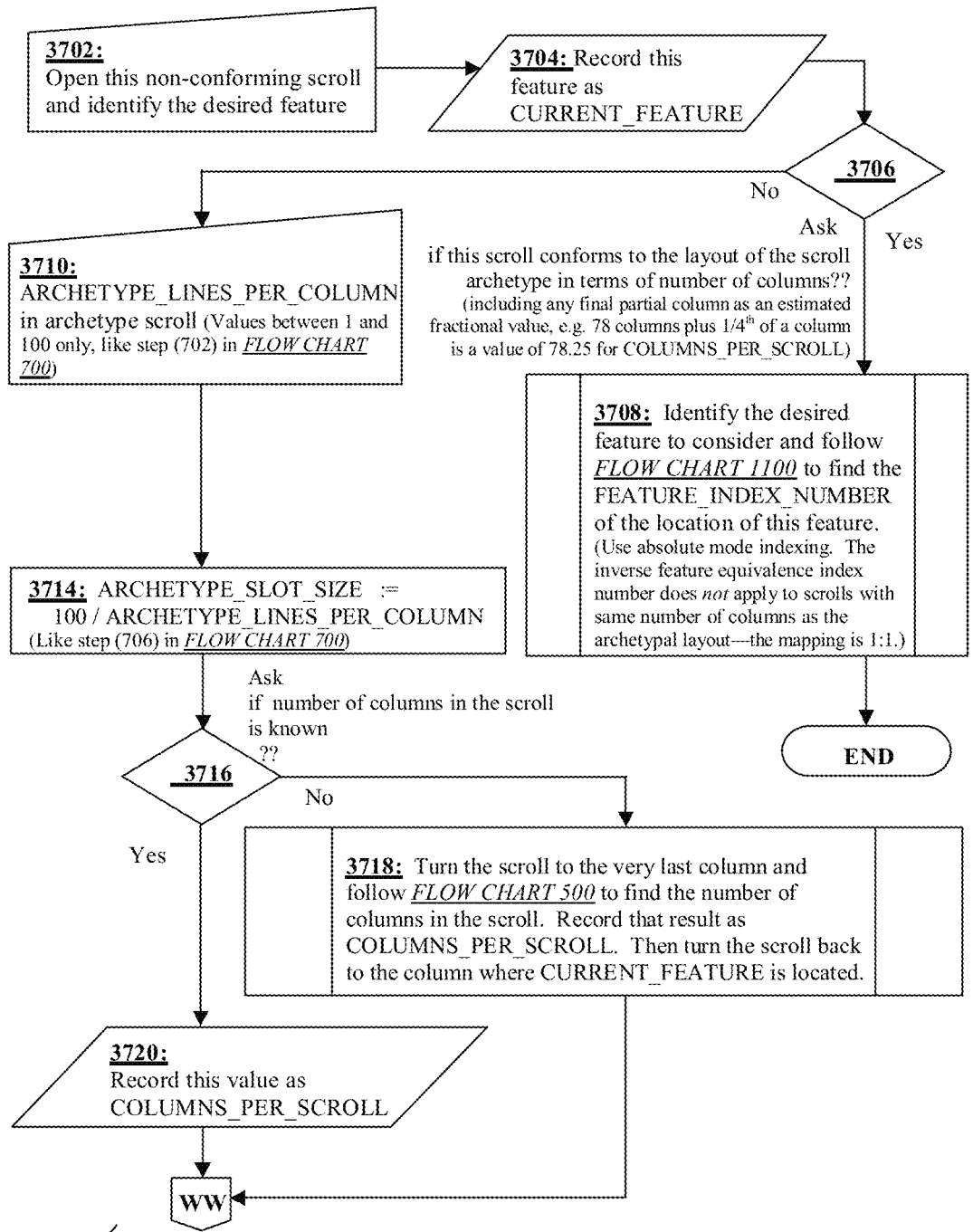
FIG. 37 depicts a flow chart for converting a feature equivalence index number of any scroll from a different archetype or any non-standard scroll into an analogous feature index number for a standard archetype scroll.
Figure 37:
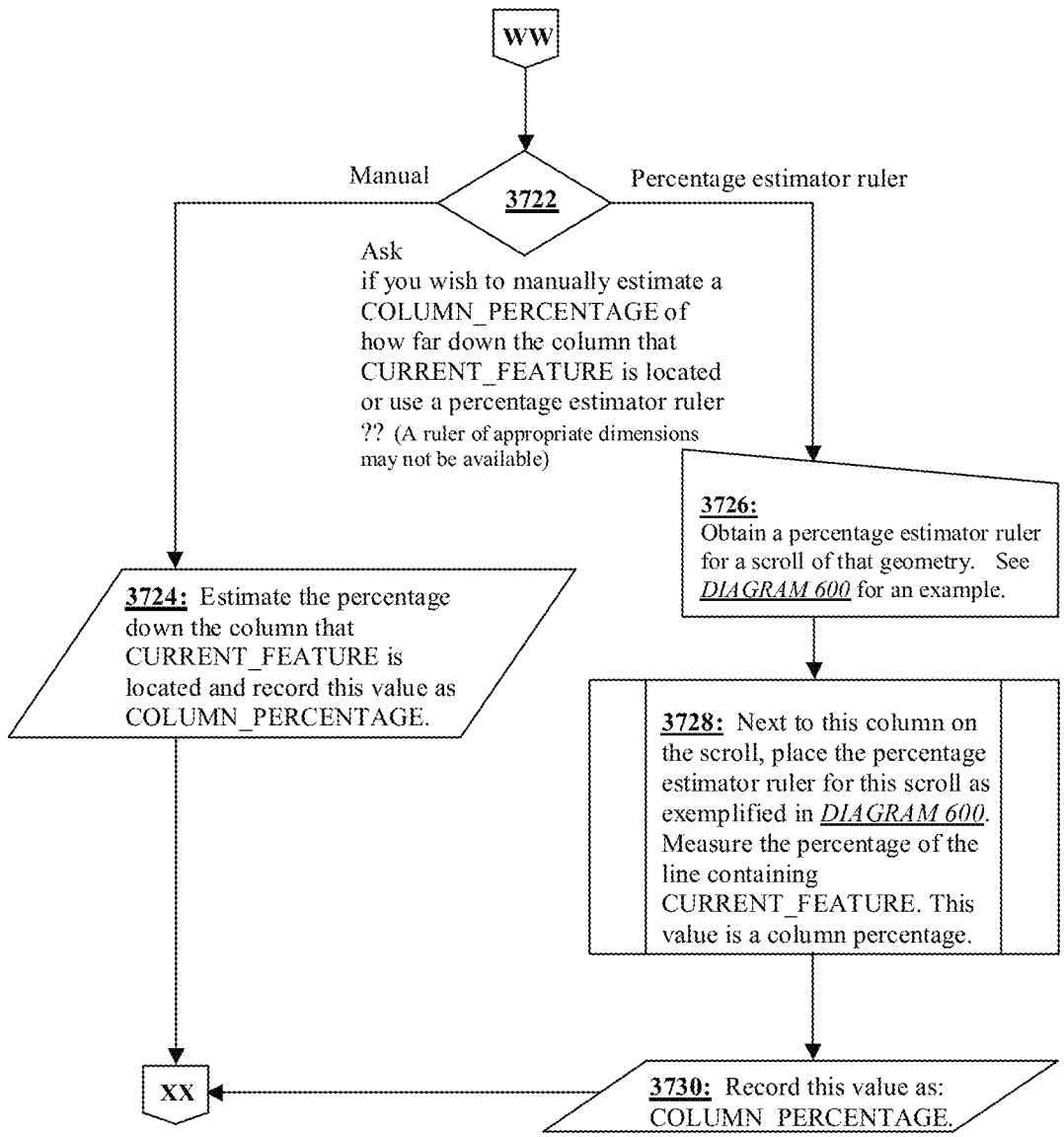
Figure 37:
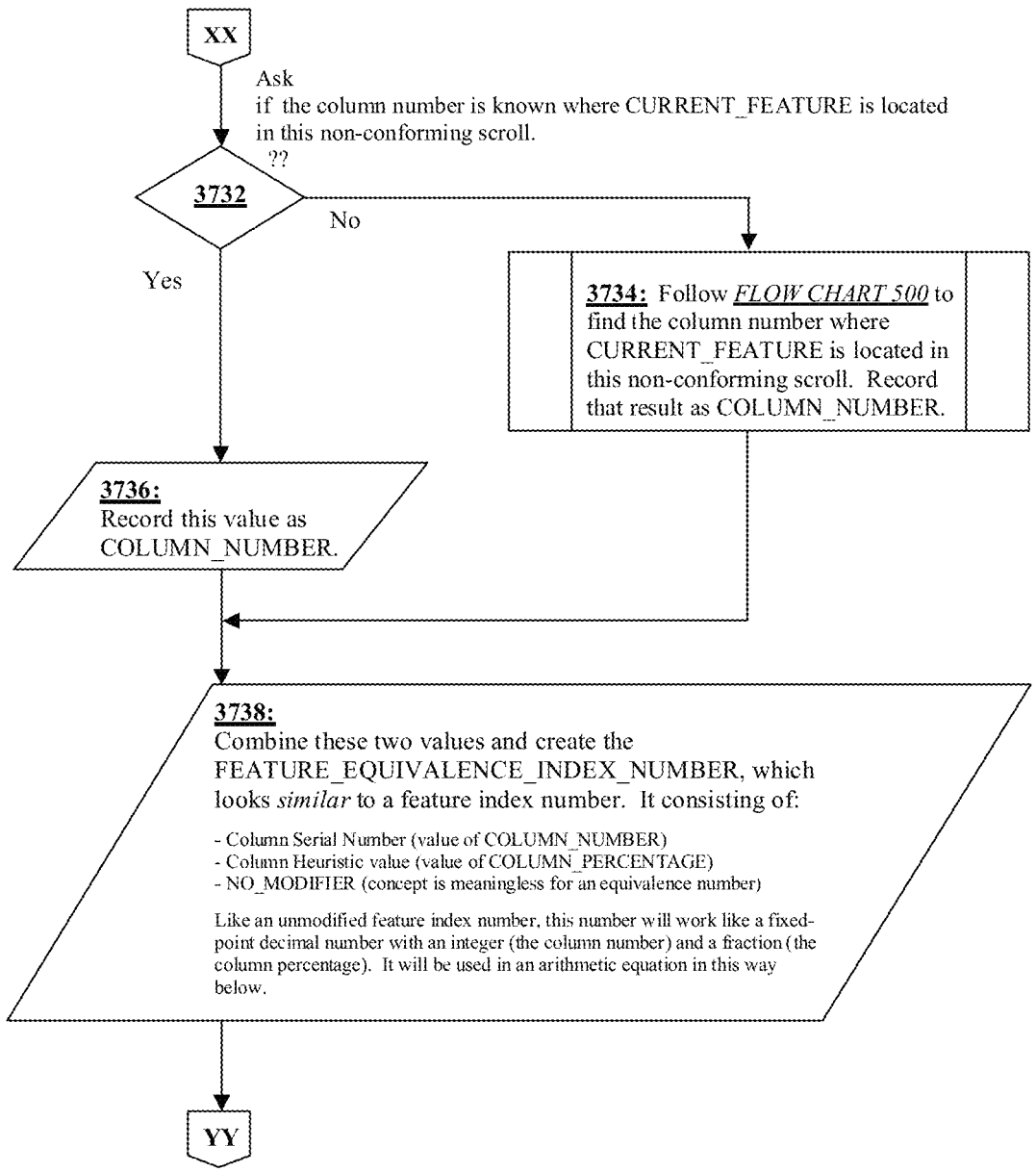
Figure 37:
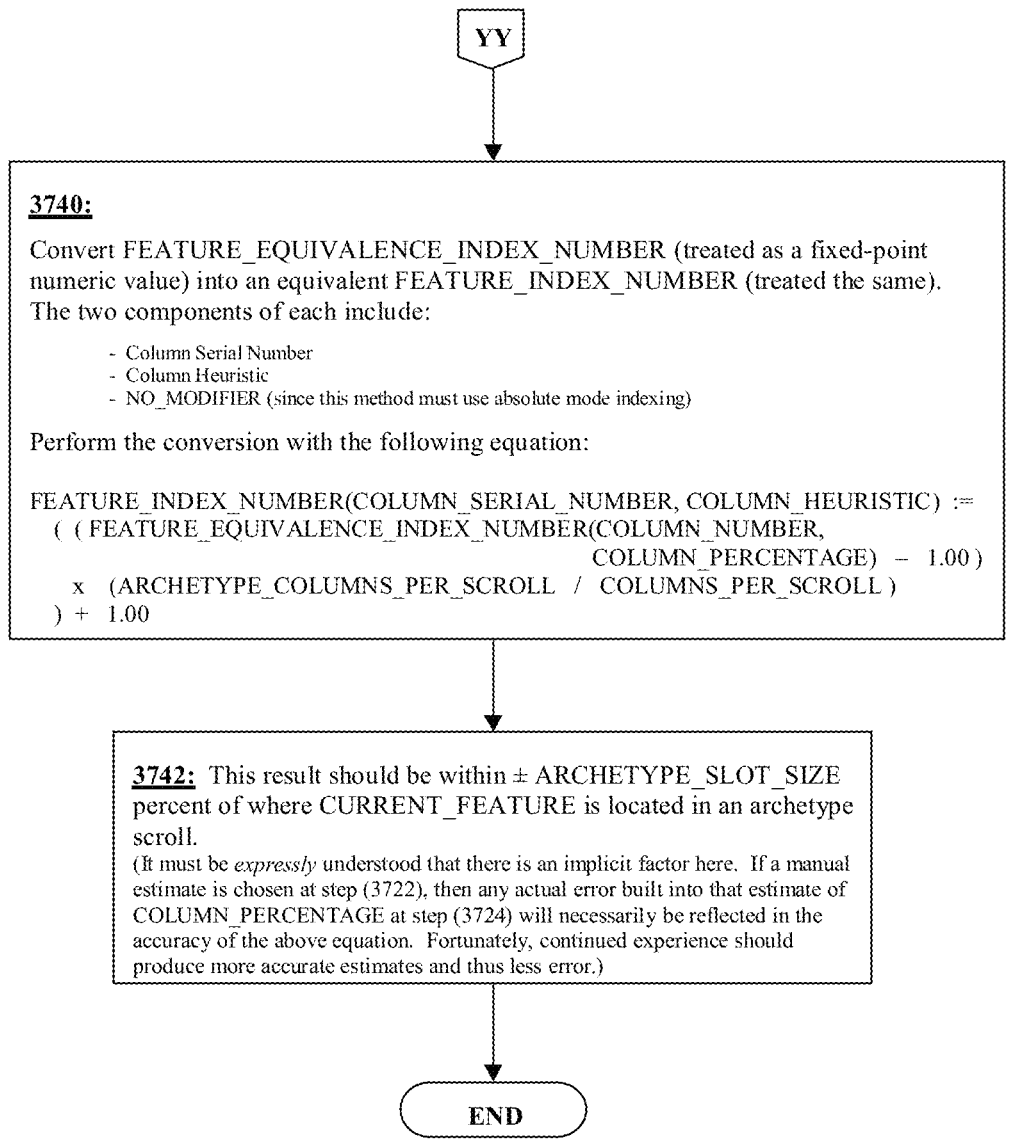

A feature equivalence index mechanism is shown and described in detail in FIG. 36 through FIG. 37.

Figure 38:
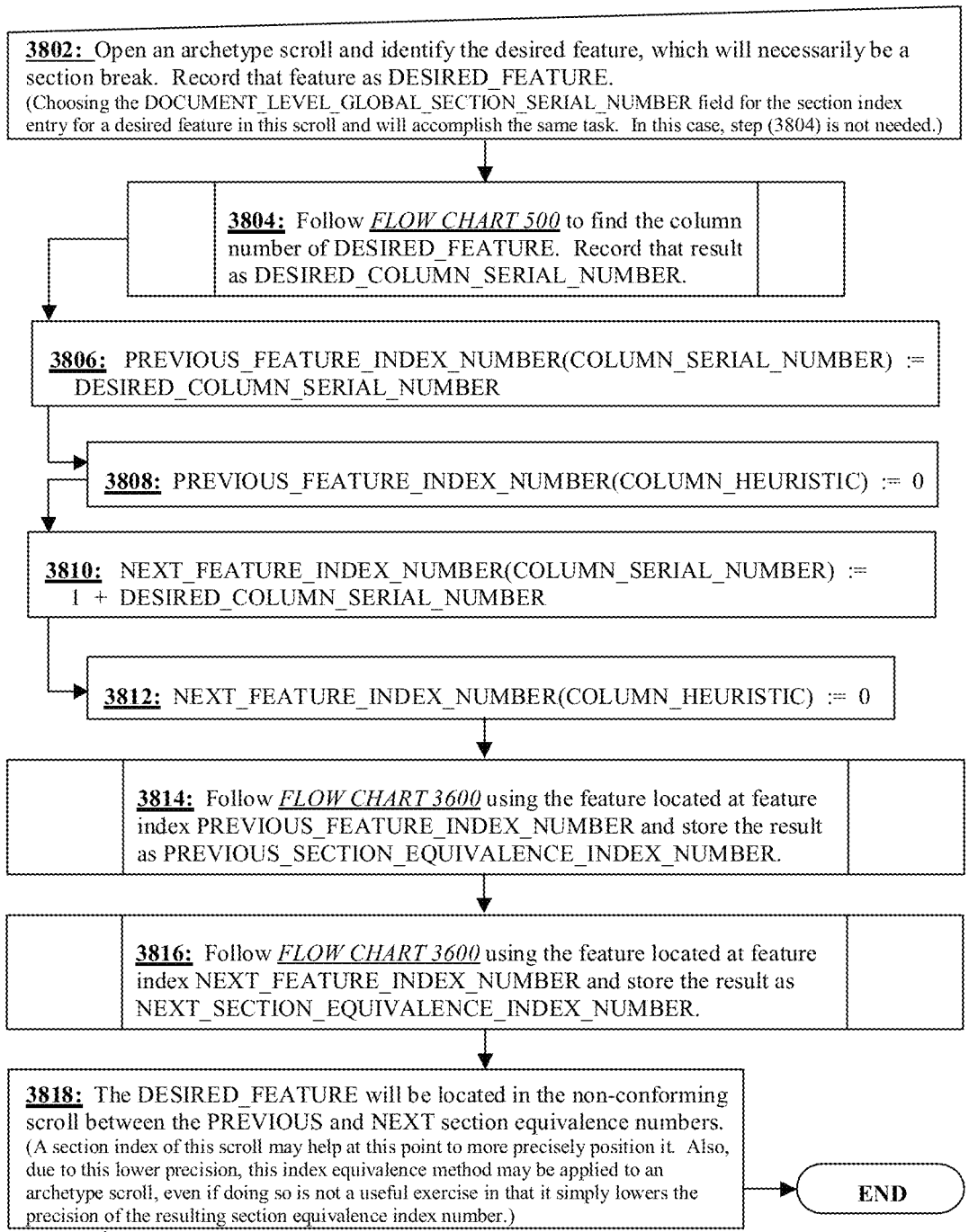
FIG. 38 is a flow chart for converting a section index number from a format of a standard scroll archetype to an equivalent section index number for a scroll of another archetype or any non-standard scroll.
Figure 39:
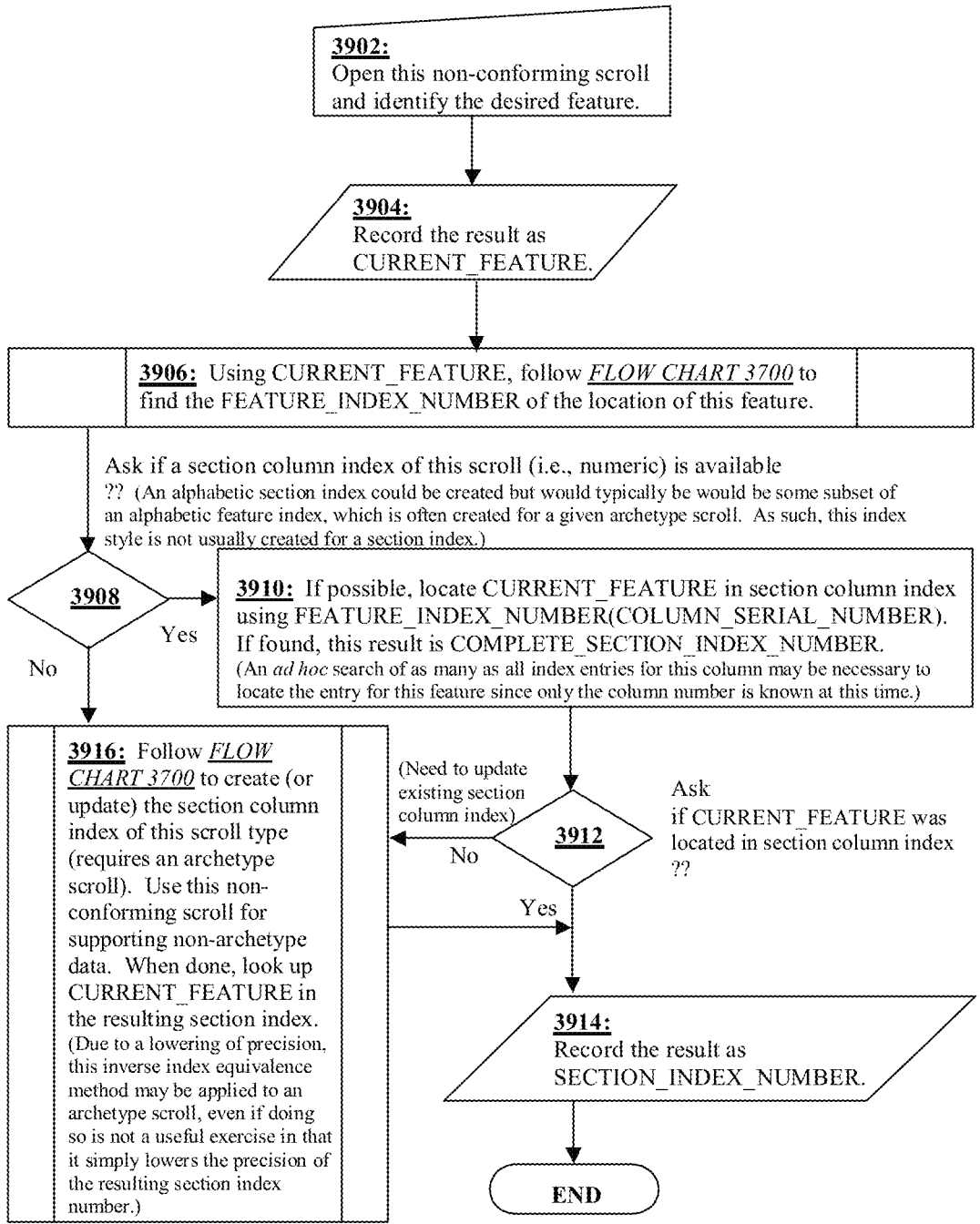
FIG. 39 is a flow chart for converting a section equivalence index number of any scroll from a different archetype or any non-standard scroll into a feature index number for a standard archetype scroll.

A section equivalence index mechanism is shown and described in detail in FIG. 38 and FIG. 39.

Feature Index Part

FIG. 1 through FIG. 4 depict flow charts that explain how to use indexes containing tables of indicia and the feature index number associated with each one. The feature index numbers in these indexes may be standard mode feature index numbers or precise mode feature index numbers. Index entries containing these feature index numbers may also include a cross-index number to a section index number (see FIG. 21). Referring to FIG. 1, a flow chart (100) is providing illustrating a process for ascertaining a current or initial position within the scroll using any indexed alphabetic features in the scroll. It is structurally similar to FIG. 21, which does the same thing for section breaks. As shown in FIG. 1, the scroll is opened and a prominent word, phrase, or other indicium is located (102). In one embodiment, the prominence of the word, phrase or indicium is critical so that the position in the scroll is noticeable. The existing alphabetic feature index is consulted, and an index entry for the word, phrase, or similar indicium located at step (102) is ascertained (104). As noted herein, each entry in the index includes position data of the indicium within the scroll. The entry in the alphabetic feature index includes numerical position data both with respect to a column identifier and a column heuristic (106). In one embodiment, the first group of digits of the identifier is the column serial number in the scroll where the identified feature is found (108), and the second group of digits of the identifier represents the approximate relative distance between the beginning and the end of the column where that indexed feature should typically be located on the visible area of the scroll (110), also referred to herein as a column heuristic. In one embodiment, this may be structured or represented as a percentage from the beginning of the column. Following step (110), the results of the search are recorded (114) as an initial feature index number, including the column serial number and the column heuristic. In one embodiment, any so-called "modifier" that might be present is also recorded. Details of the modifier are shown and described in FIG. 13. Accordingly, the aggregate of the column serial number, the column heuristic comprise a complete identifier, also referred to as a complete feature index number. The optional modifier also participates in this aggregate where applicable.

The two-field version of the feature index number shown and described in FIG. 1 is called "standard mode" indexing. There is also a "precise mode" of indexing shown and described in FIG. 7 through FIG. 14. The precise mode adds a third and optional variable referred to as a "modifier", which is employed under certain circumstances. Feature index numbers in the precise mode have within them two possible representations, also referred to as two sub-modes. These precise sub-modes are called "absolute indexing mode" and "compressible indexing mode". The absolute mode reports the raw data exactly as it is written in the scroll. The compressible mode performs revisions to that absolute mode feature index number, as described in detail in FIG. 12, which may or may not include index modifiers, as described in detail in FIG. 13. In order to avoid confusing these terms with the two similar terms "standard mode" and "precise mode", the absolute sub-mode indexing of features and compressible sub-mode indexing of features will usually be known simply as "absolute feature indexing" and "compressible feature indexing", respectively, that is, without using the word "mode" in these and related terms. Furthermore, the compressible indexing mode may further revise a feature index number using a localization heuristic that depends on the proximity and density of nearby indicia and judgment of an evaluator, as described in detailed in FIG. 14. The absolute indexing may never revise the feature index number, nor may it employ index modifiers if the scroll uses 50 lines or fewer per column. Compressible indexing has neither constraint, and may both adjust the feature index number and apply modifiers as necessary.

All scrolls with 51 lines per column or more will always have one or more lines where an "inexact" index number cannot be represented on some particular line. Such a number must still be able to be represented in absolute indexing mode. Therefore, a "revise upward inexact modifier" is employed to represent an otherwise unrepresentable inexact index number. This designation is distinct and separate from the similar mechanism referred to herein as "revise upward absolute modifier" and its mechanism used in representing absolute feature index numbers in FIG. 11. Similarly, this designation is also distinct and separate from the similar mechanism "revise upward modifier" and its mechanism used in compressible feature index numbers in FIG. 12.

Although these sub-modes of precise mode find embodiments in alphabetic feature indexes and column feature indexes, when standard mode is employed, its values for the column heuristic are necessarily approximations and are directly borrowed from the precise mode. These two sub-modes are described and used in FIG. 11 through FIG. 16. Any particular scroll will normally only be indexed with either absolute indexing or with compressible indexing. The mode employed depends on the archetype of the scroll; the rules of which were implicitly set prior to index creation by the school of scribes who wrote that scroll as being normative for all conforming instances of such a scroll. In one embodiment, the alphabetic feature index will not use both absolute and compressible indexing. Accordingly, an alphabetic feature index of the scroll and its corresponding column feature index may use either absolute or compressible indexing.

Figure 2:
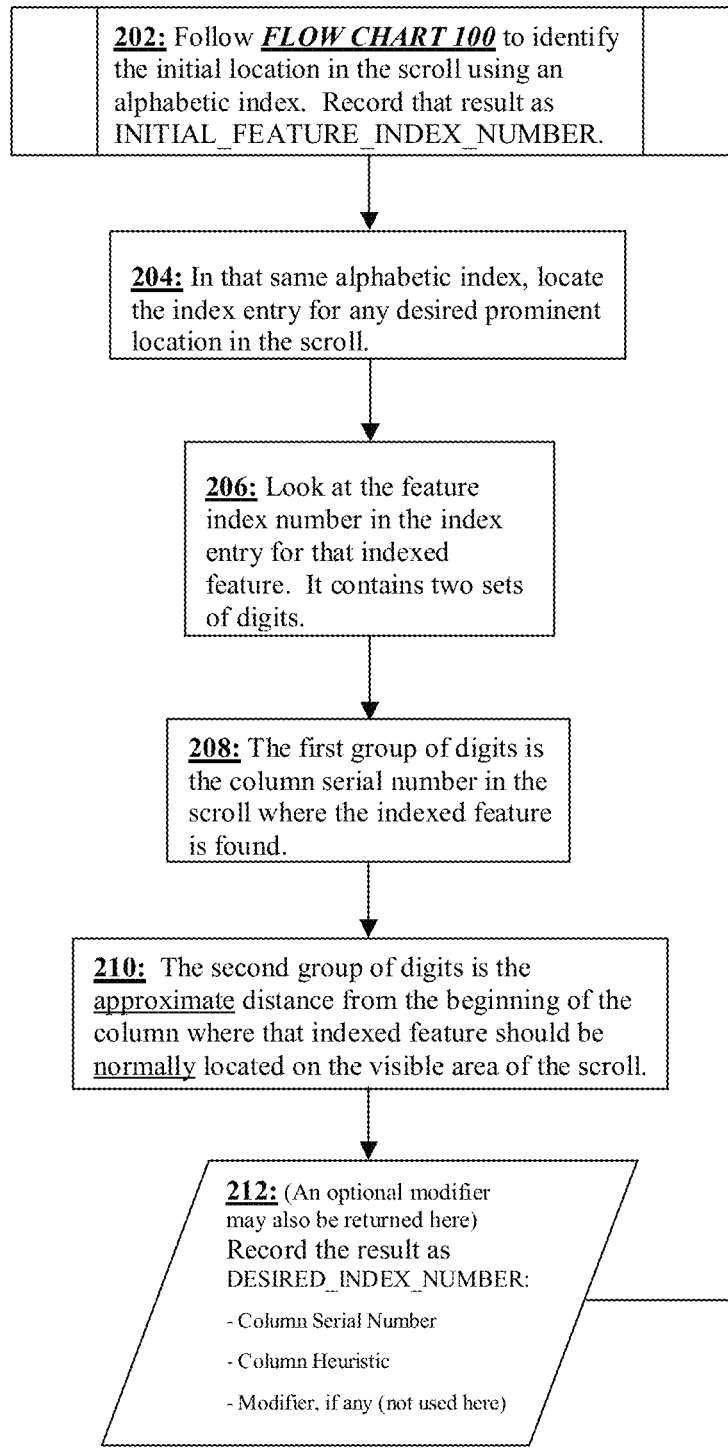
FIG. 2 depicts a flow chart illustrating a process of locating any desired scroll location from any current location using alphabetic features of the text in the scroll.
Figure 2:
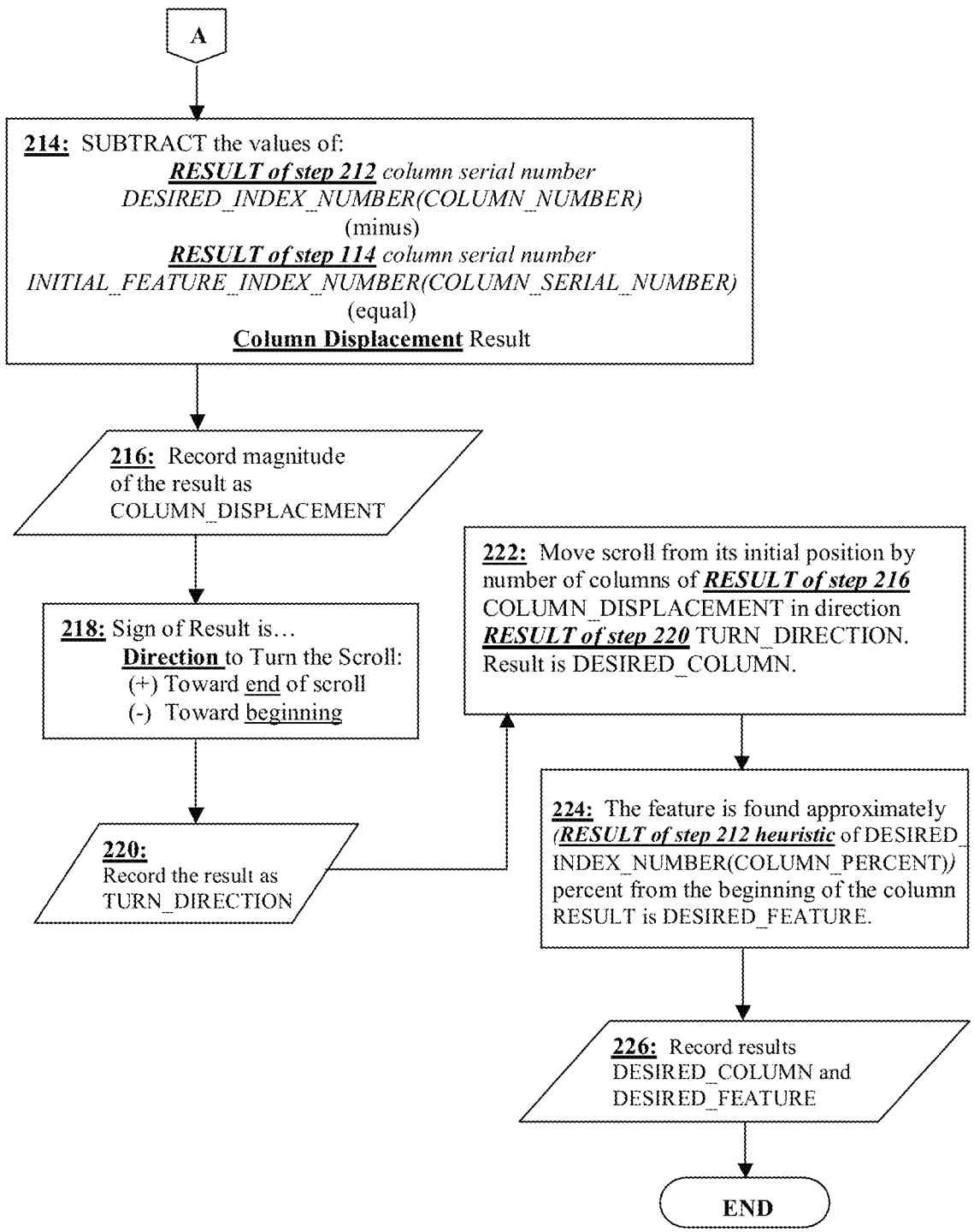

As shown in FIG. 1, the existing alphabetic feature index returns an identifier for each indexed phrase in the scroll. In one embodiment, the phrases are organized alphabetically within the index. Referring to FIG. 2, a flow chart (200) is provided illustrating the process of locating any desired scroll location from any current location using alphabetic features of the text. It is structurally similar to FIG. 22, which does the same thing for section breaks. As shown, the first part of the process in FIG. 2 is to follow the method shown and described in FIG. 1 to identify the initial location in the scroll using the existing alphabetic index and recording the result (202). In one embodiment, the initial location is recorded as an initial feature index number. Using the same alphabetic feature index, the index entry for any desired prominent location in the scroll is located (204). The feature index number in the entry is viewed for that indexed feature (206). In one embodiment, the entry contains two sets of digits. The first group of digits is the column serial number in the scroll where the indexed feature is found (208). The second group of digits is the approximate distance from the beginning of the column where that indexed feature should be normally located on the visible area of the scroll (210). This approximation is known as "standard mode indexing". Following steps (208) and (210), both the column serial number and the column heuristic are recorded as a desired feature index number (212). In one embodiment, an index modifier may be returned as part of the feature index. Accordingly, the index identifies the location of each indexed feature within the scroll via a numerical identifier containing two parts.

The results as obtained by the index are then manipulated to ascertain a desired location in the scroll from a current location. Specifically, a column displacement is calculated (214) as column displacement (216). In one embodiment, the column displacement is the difference between the column serial number of the desired index number as recorded at step (212) and the column serial number of the initial feature index number as recorded at step (114). The displacement is the absolute value of the difference combined with the arithmetic sign of that difference. This sign determines the direction that the scroll must be turned to arrive at the desired column location. Specifically, a positive sign associated with the difference requires that the scroll to be turned in a first direction, and a negative sign associated with the difference requires that the scroll be turned in an opposite second direction (218). The direction of the turn, also referred to herein as the turn direction, is recorded (220). In one embodiment, the first direction is associated with the conclusion of the scroll and the second direction is associated with the beginning of the scroll. The scroll is moved from its initial position (222) by the column displacement assessed at step (214), and recorded as column displacement (216). It is moved or turned in the direction assessed at step (218) and recorded as the turn direction at step (220). Once the scroll has been turned to the designated column at (222), being the desired column, the feature is found based on the column heuristic (224), i.e., an approximate percentage from the beginning of the column in one embodiment, also referred to herein as the desired feature. Following step (224), the values of the desired column number and the desired feature are recorded (226). Accordingly, as shown herein, any desired scroll location may be ascertained from any current location.

Figure 3:
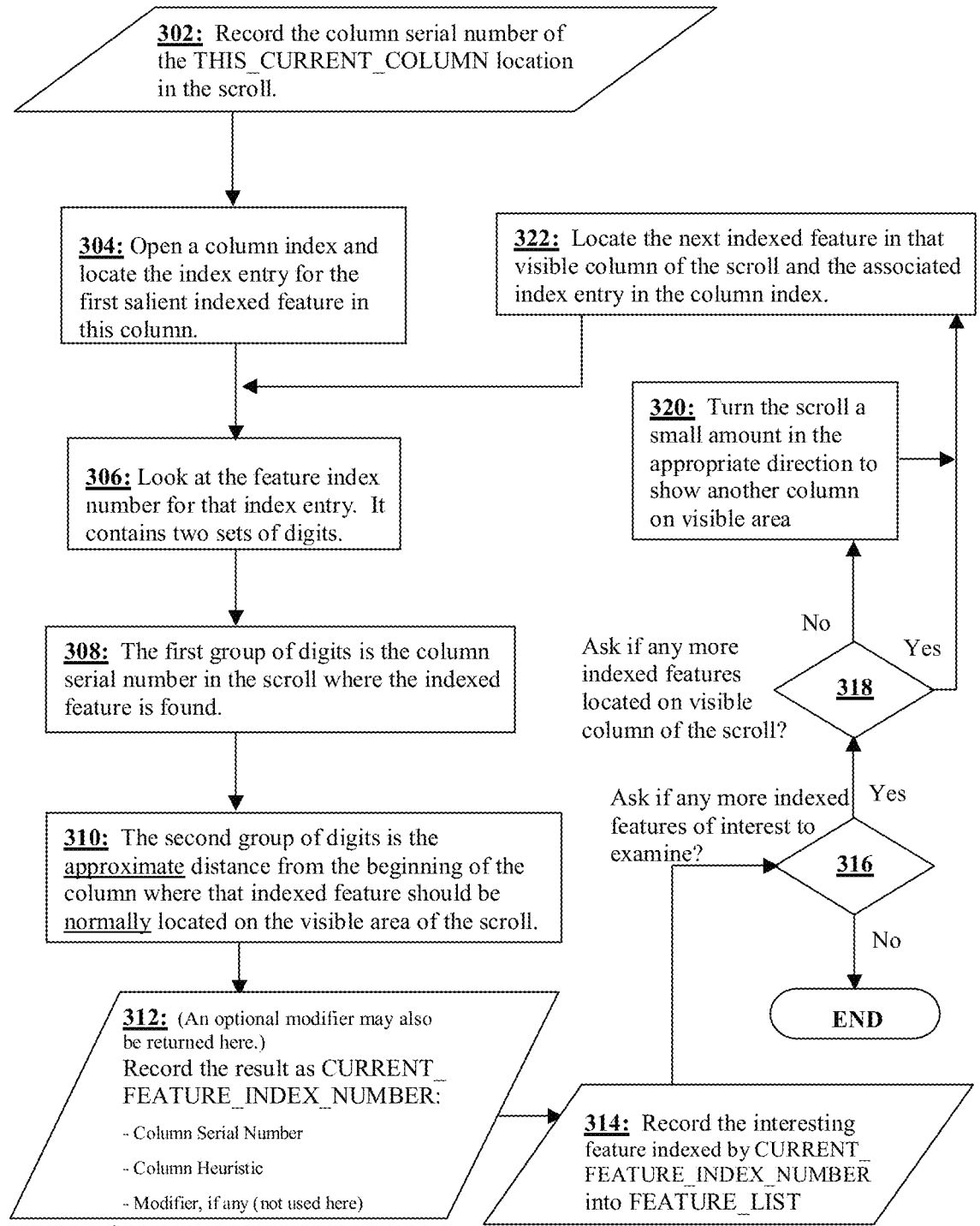
FIG. 3 depicts a flow chart illustrating a process for examining features of a scroll using the feature index numbers of indexed features in the scroll.

Referring to FIG. 3, a flow chart (300) is provided illustrating a process for examining features of a scroll using the feature index numbers of indexed features in the scroll. It is structurally similar to FIG. 23, which does the same thing for section breaks. As shown in FIG. 3, with knowledge of the column serial number of the current location in the scroll, that number is recorded as the current column (302). Thereafter, the index entry for the first salient indexed feature in that column is located in an existing column feature index (304). The feature index number for that entry is reviewed (306), i.e. it contains two sets of digits in one embodiment. The first group of digits is the column serial number in the scroll where the indexed feature is found (308). The second group of digits is the approximate distance from the beginning of the column where that indexed feature should be normally located on the visible area of the scroll (310). In one embodiment, the location identified in step (310) is based on a normative variance found in a hand-written scroll or document. Both the column serial number and the column heuristic are recorded as the current feature index number (312), including the column serial number, the column heuristic, and the modifier (if any). The indexed feature is then recorded by the current feature index number into a feature list (314).

Following the recordation at step (314), it is then determined if there are any more indexed features of interest to be examined (316). A negative response to the determination at step (316) concludes the examination process. However, a positive response to the determination at step (316) is followed by a subsequent determination to ascertain if there are any more indexed features are located on that visible column of the scroll (318). A positive response to the determination at step (318) is followed by locating the next indexed feature in that column of the scroll and the associated index entry in the existing column feature index (322). Following the recording of the feature at step (322), the process returns to step (306). However, if at step (318) it is determined that there are no more indexed features visible in the scroll, the scroll is turned in the appropriate direction to show at least one more column on visible area (320), and then proceeds to step (322) to locate the next feature. Accordingly, as shown herein the indicia of a scroll are examined using the feature index numbers, which in one embodiment is represented as one indexed number per indexed feature.

Figure 4:
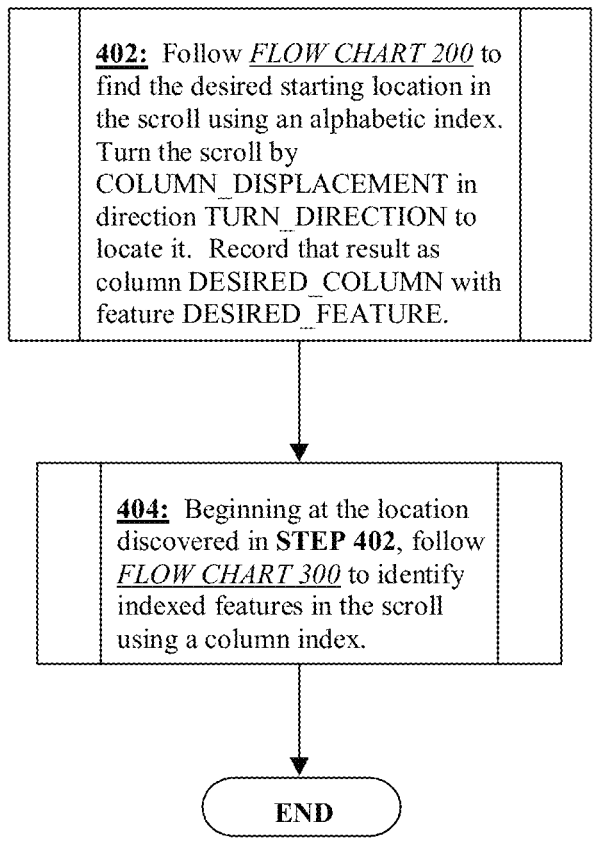
FIG. 4 depicts a flow chart illustrating a process for locating indexed features at any desired scroll location while starting from any current location in the scroll and using a combination of alphabetic features and feature index numbers for this purpose.

The processes shown and described in FIG. 2 and FIG. 3 may be combined. Referring to FIG. 4, a flow chart (400) is provided illustrating a process for locating indexed features at any desired scroll location while starting from any current location in the scroll and using a combination of alphabetic features and feature index numbers for this purpose. It is structurally similar to FIG. 24, which does the same thing for section breaks. As shown in FIG. 4, the current position of the scroll is unknown in this method and the desired position is a range of positions starting at a different location. The process shown in FIG. 2 is followed to find the desired starting location in the scroll using the existing alphabetic feature index (402). The net result from step (226) is to identify the desired column. Once identified, step (404) is followed using the process shown in FIG. 3 to identify indexed features in the scroll using an existing column feature index. Accordingly, the scroll may be examined by combining the processes shown and described in FIG. 2 and FIG. 3.

Figure 5:
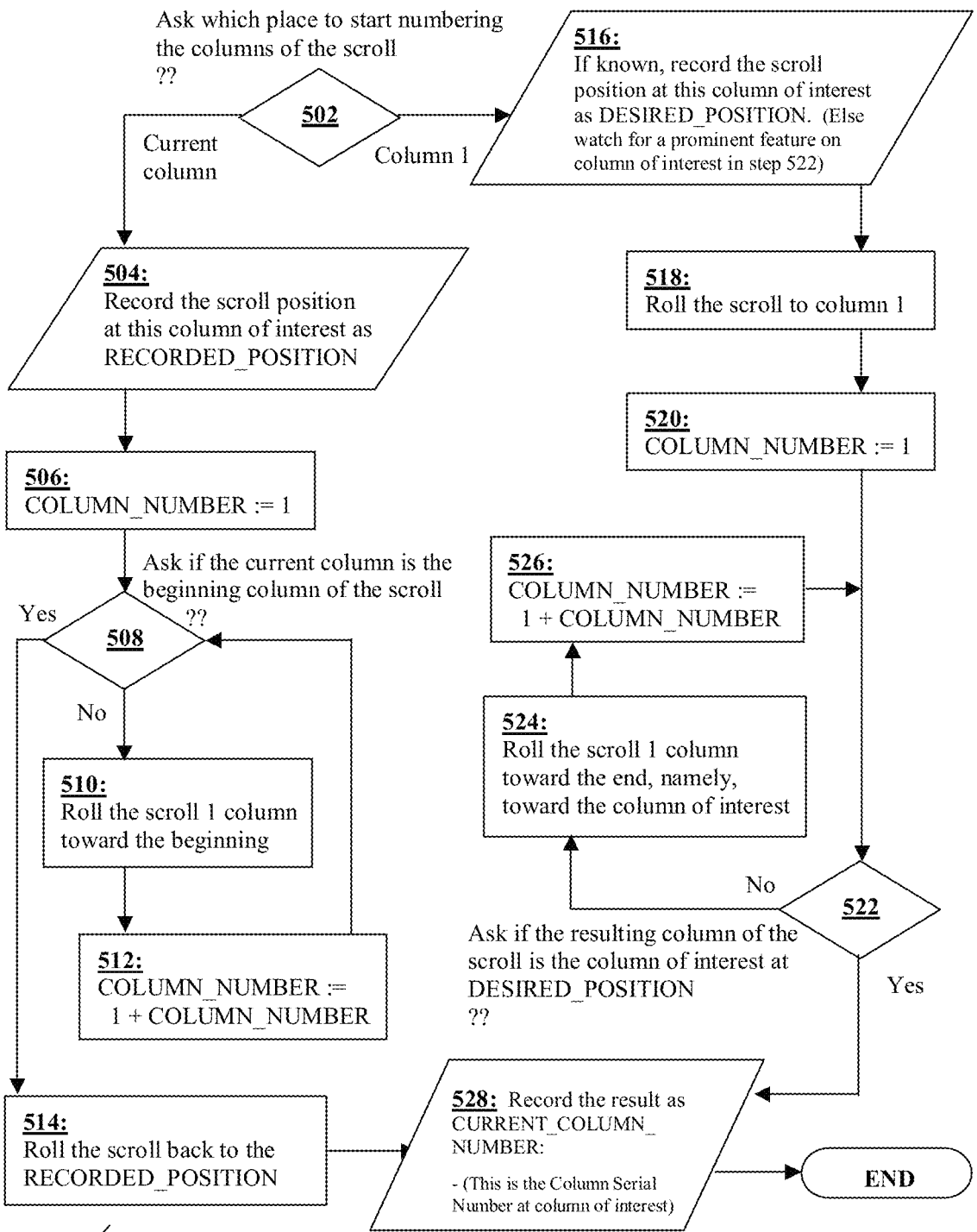
FIG. 5 depicts a flow chart illustrating a process for identifying a column serial number within a scroll that is part of one embodiment of a feature index number.
Figure 6:
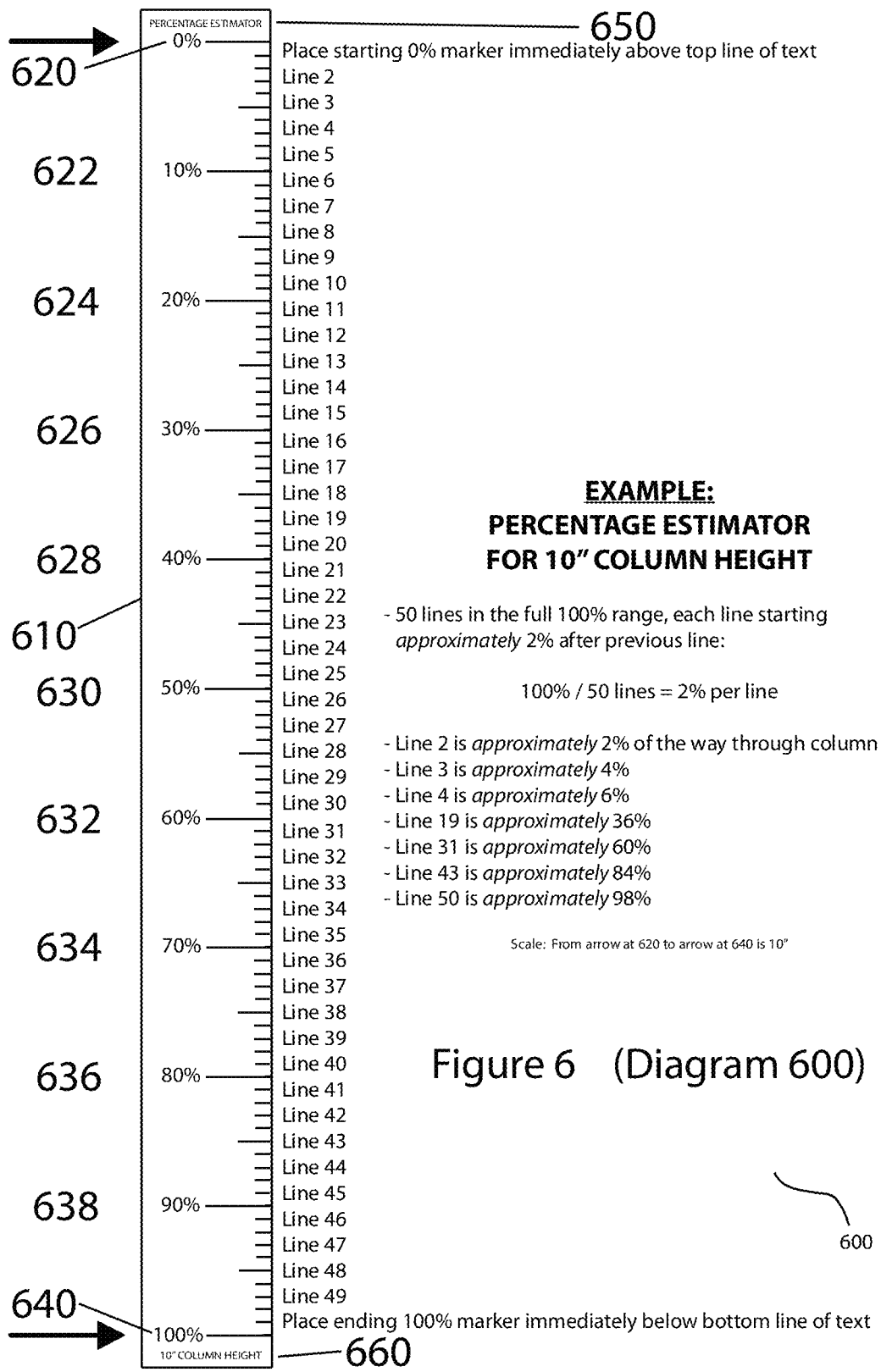
FIG. 6 depicts a diagram illustrating a measuring device that measures a column heuristic number, namely an approximate value, for an indicium in a column of text when measurement of indicia uses "standard" mode indexing.

The flow chart of FIG. 5 and the diagram of FIG. 6 show how to build up the components of a standard mode feature index number for an indicium. FIG. 5 may also be used as part of the method to build up a precise mode feature index number for the same indicium. Referring to FIG. 5, a flow chart (500) is provided illustrating a process for identifying a column serial number within a scroll that is part of one embodiment of a feature index number. It is used to independently determine the column number of any column in the scroll. It is functionally equivalent to the process shown and described in FIG. 1, and returns a column number only. The process starts by determining which place to start numbering columns of the scroll (502). If the response to the determination is the current column, the scroll position at the current column is recorded (504), followed by assigning the column number to the integer one (506). It is then determined if the current column is the beginning column of the scroll (508). A negative response to the determination at step (508) is followed by rolling the scroll by one column toward the beginning of the scroll (510), incrementing an integer representing the column number by a value of one (512), and returning to step (508). However, a positive response to the determination at step (508) is following by rolling the scroll back to the recorded position (514) as recorded in step (504), and recording the result as the current column number (528). The recorded result is the column serial number at the column of interest. If at step (502) it is determined that the column numbering should start at the first column, the position of the scroll at the column of interest is recorded as the desired position (516). The scroll is then rolled to the first column (518) and the column number is assigned to the integer one (520). It is then determined if the resulting column of the scroll is the column of interest at the desired position (522). A positive response to the determination at step (522) is followed by proceeding to step (528). However, a negative response to the determination at step (522) is followed by rolling the scroll by one column toward the column of interest (524), incrementing a column number variable by an integer of one (526) and returning to step (522). Accordingly, as shown herein the column number for any column in the scroll is determined and recorded.

Referring to FIG. 6, a diagram (600) is provided illustrating a measuring device that measures a column heuristic number, namely an approximate value, for an indicium in a column of text when measurement of indicia uses "standard" mode indexing. This is an approximation of "precise" mode indexing with two submodes that may be employed, "absolute" numbering and the revised form of "compressed" numbering. As will be shown, "standard" and "precise" are intrinsically related so this measurement device has value in both modes, where the measured result is directly used in standard mode indexing and is thereby an approximation of what the corresponding result should be in precise mode indexing. This device is also referred to herein as a ruler. It may be implemented in conjunction with the scroll index, and specifically with the column heuristic. As shown, the measuring device is elongated and includes a percentage estimator (610), also known as a percentage estimation ruler. A plurality of markings is provided on the measuring device, including in one embodiment a minimum of eleven such markings (620), (622), (624), (626), (628), (630), (632), (634), (636), (638), and (640). In one embodiment, the markings are placed on a surface of the body of the ruler, also referred to herein as the top surface of the body. The ruler includes an oppositely disposed surface, also referred to herein as a bottom surface, to be placed in communication with the scroll. These markings are bounded by column height for a particular writing format of indicia for the scroll. In one embodiment, the measuring device may have additional markings in between those shown herein, with the additional markings to provide enhanced accuracy. As shown in this example, each of these marks has a plurality of additional intermediate markings, which in one embodiment, provides for a total of 101 markings, including a mark at 0% (620) and a mark at each percent value after that up until and including 100% (640). Each of the markings is placed and configured to represent an approximate position of indicia with the column. This approximation implies use of standard mode indexing as the method of measurement. The first marking (620) is configured to be placed adjacent to a select column in the scroll and immediately above a top line of the indicia within the column. In one embodiment, an annotation is also provided at one end of the measuring device describing its function for measuring the fractional height of the column (650). The last marking (640) is configured to be placed adjacent to that same select column in the scroll and immediately below a bottom line of indicia within the scroll. In one embodiment, another annotation is also provided at the other end of the measuring device describing the distance between the beginning (620) and ending (640) marks (660). In the example of usage shown herein, an embodiment of this percentage estimation ruler shows a device to measure a column that is ten inches in length, although this length should not be considered limiting. In one embodiment, the column may have 50 lines of text, any, all, or none of which may contain indicia, and the measuring device represents the range of lines, with each line starting two percent after a previous line. For example, line two is two percent of the distance from the beginning of the column, line three is four percent of the distance from the beginning of the column, line four is six percent of the distance from the beginning of the column, etc. Accordingly, the measuring device correlates the standard mode indexing's column heuristic in the index to a position in the scroll.

The measuring device (600) may be fully or partially opaque or, in one embodiment, transparent. The device is configured to be placed in immediate physical communication with the scroll. The markings on the device correlate an indicium on a column of the scroll to an integer percentage with the distance from the beginning margin to the end margin of the column of the scroll. This distance, although inherently approximate, is accurate enough for most purposes where a column heuristic is needed in the formation of a feature index number. In combination with the result recording step (528) from FIG. 5, this information may be used in FIG. 11 to form a complete feature index number.

Underlying the measuring process embodied in FIG. 6 is the mathematics describing the geometry of any particular embodiment thereof. A refined approach to the percentage numbers eliminates the heuristic aspect of estimation of a percentage from the beginning margin of the column of text. This refined approach provides precision because it assigns specific percentage numbers to the first word of text on each line in the column. Numbers not so assigned from one line to the next are also available but are inherently inexact and correspond more closely to the heuristic approach to describing distance from the beginning margin of the scroll. This method is referred to as a "precise mode indexing."

Figure 7:
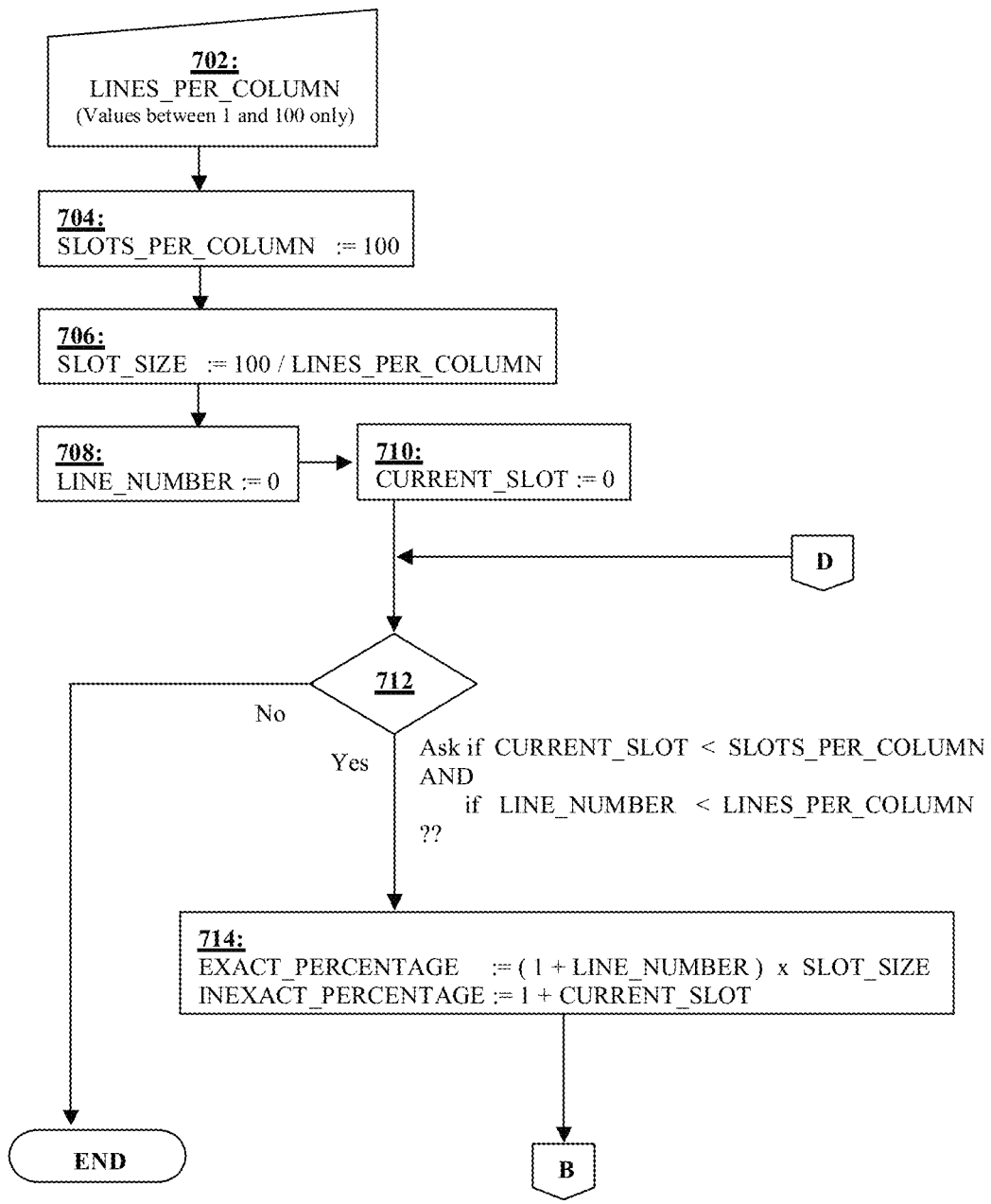
FIG. 7 depicts a flow chart illustrating a process for creating a table of precise values for numbering indicia in a column of text using "precise" mode indexing, of which one such number may be substituted for the approximate number identified with the measuring device of FIG. 6 using "standard" mode indexing.
Figure 7:
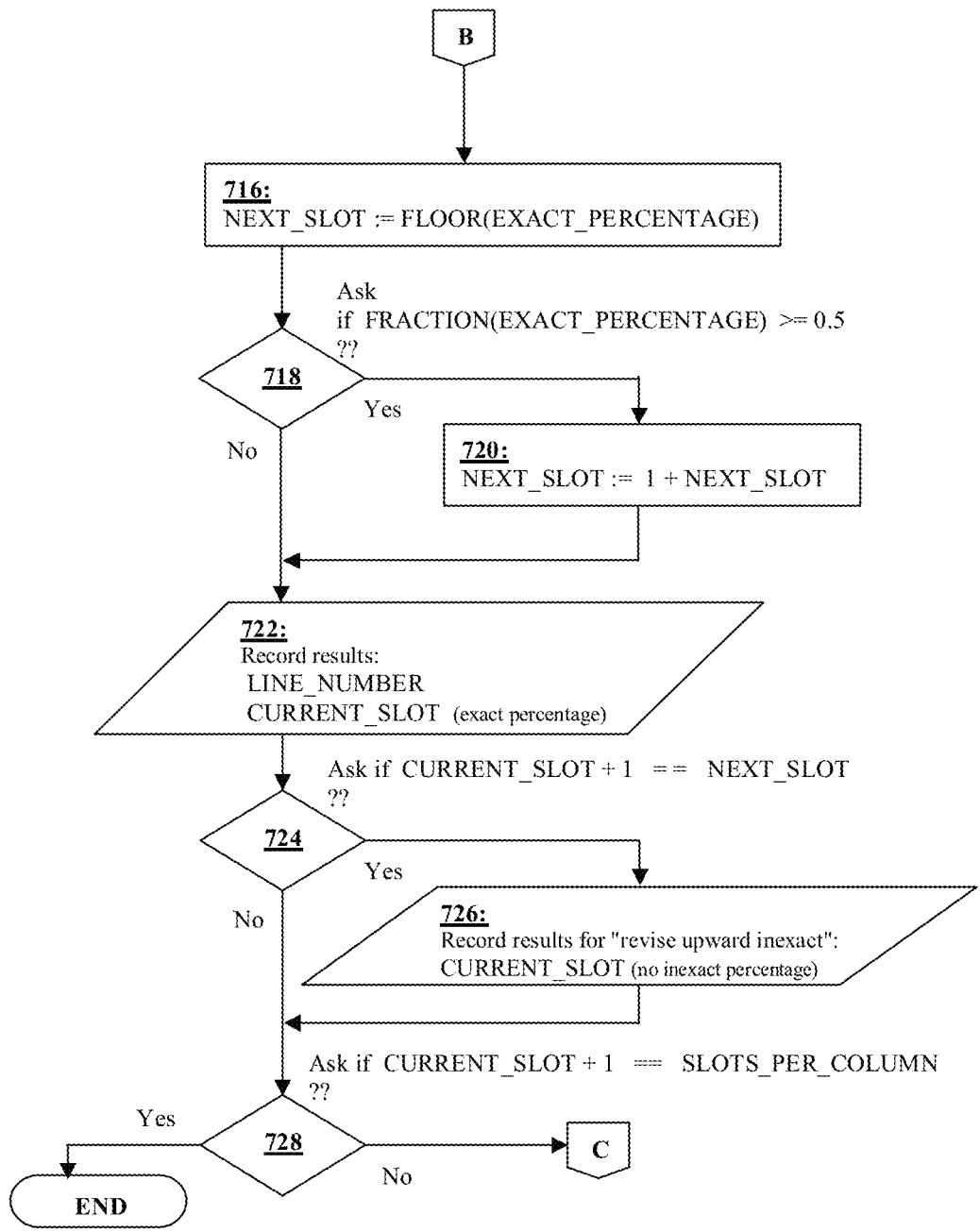
Figure 7:
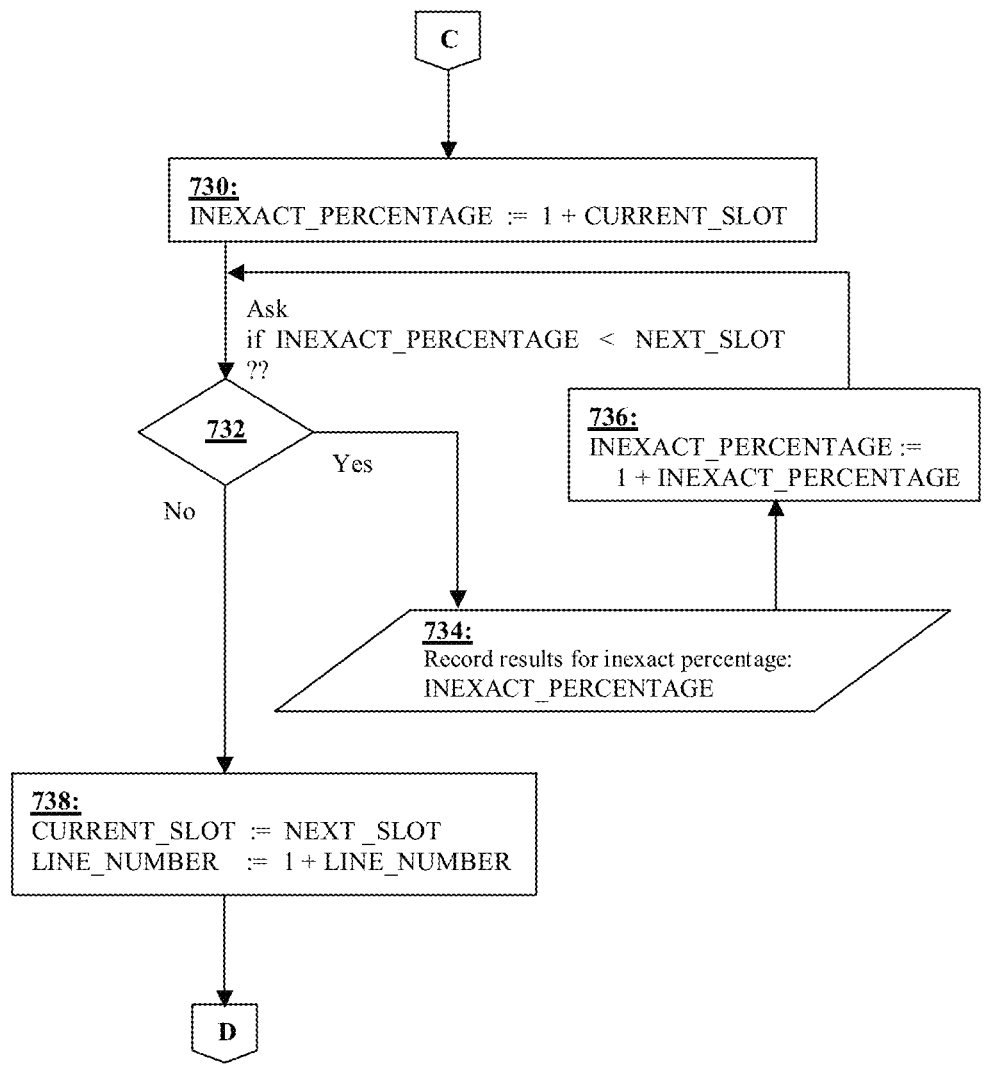

The flow chart of FIG. 7 and the two embodiments of FIG. 8 and FIG. 9 explain the construction and behavior of precise mode feature index numbers. Referring to FIG. 7, a flow chart (700) is provided illustrating a process for creating a table of precise values for numbering indicia in a column of text, of which one such number may be substituted for the approximate heuristic number identified with the measuring device of FIG. 6. In this case, the measurement of indicia uses either "absolute" numbering or the revised form of "compressed" numbering. It is used to assign these percentage numbers with greater precision than is typically possible with the standard indexing method employing a column heuristic value. As explained above, the scroll text is organized in columns. The number of lines per column of the scroll is the input to the process (702). Thereafter, several variables are initialized. The slots per column variable is initialized at one hundred (704). The slot size is initialized as one hundred divided by the number of lines per column (706) and is measured as a percentage of the total height of the column. The line number is initialized at zero (708), and the current slot is also initialized at zero (710). Following these several initialization steps, an iterative process based on certain arithmetic comparisons is started. It is determined (712) if the current slot for the word being indexed is less than the slots per column and if the line number is less than the lines per column. A negative response to the determination at step (712) concludes the process. However, a positive response to the determination at step (712) is followed by calculating an exact percentage value (of the first word on this line number) and an inexact percentage value (714), related to other words on this line number. More specifically, the exact percentage at step (714) is assessed as the quantity of the sum of one plus the line number as a by-product of a slot size variable. Accordingly, at this place, the inexact percentage is assessed as the sum of the integer one plus the current slot variable.

Following the calculation at step (714), the next slot is calculated (716). The calculation at step (716) entails calculating the next whole integer, which may or may not increase beyond its present value. Thereafter, it is determined if a fraction associated with the exact percentage integer meets or exceeds 0.5 at step (718). A positive response to the determination at step (718) is followed by incrementing the value of a next slot variable by an integer of one (720). Following a negative response to the determination at step (718) or following step (720), the results of the calculation are recorded (722). This calculation includes the line number and the exact percentage of the current slot. It is then determined if an increment of the current slot variable by an integer of one is equal to the value of the next slot variable (724). A positive response to the determination at step (724) is followed by recording the results but without any inexact percentage condition, that is, as a revise upward inexact condition using the current slot variable and marking it with the "revise upward inexact" modifier (726). Following a negative response to the determination at step (724) or the recordation at step (726), it is determined if the current slot variable incremented by the integer value of one is equal to the value of the slots per column variable (728). A positive response to the determination at step (728) concludes the process.

If the response to the determination at step (728) is negative, the inexact percentage is calculated at step (730). It is then determined if the value of the calculated inexact percentage is less than the value of the next slot variable (732). A positive response to the determination at step (732) is followed by recording the results of the inexact percentage variable (734), incrementing the inexact percentage variable (736), and a return to step (732). However, a negative response to the determination at step (732) is following by assigning the current slot to the value of the next slot variable and incrementing the line number variable by an integer of one (738). At step (738) all of the inexact percentages have been gathered. Accordingly, a new line of text in the column will be examined, starting with a new exact percentage and potentially including some inexact percentages and, depending on the particular value of the lines per column variable, also some current slot revised upward inexact cases. This is then followed by a return to the top of the iterative process at step (712) and testing of another iteration through the process should be performed. This process continues until a negative response is determined at step (712), at which time the process concludes.

Various embodiments of the FIG. 7 calculator behave differently depending on the number of lines per column. Some have inexact percentages, some have revised upward inexact percentages, and some have more than one inexact percentage value. As demonstrated, the behavior depends strictly on the number of lines per column that must have the percentages calculated for each line. FIG. 8 and FIG. 9 may be compared in this light to show the different behavior due to the differing number of lines per column.

FIG. 8 depicts an example embodiment of the process illustrated in FIG. 7 as a tabular representation of the precise values for numbering indicia in a column of text when measurement of indicia uses either "absolute" numbering or the revised form of "compressed" numbering. This example shows a table without any "revise upward inexact modifier" designations, which occurs on all configurations of 50 or fewer lines of indicia per column. This example shows 50 or fewer lines of indicia per column. This "revise upward inexact modifier" designation is distinct and separate from the similar mechanism "revise upward absolute modifier" and its mechanism used in absolute feature index numbers in FIG. 11. It is also distinct and separate from the similar mechanism "revise upward modifier" and its mechanism used in compressible feature index numbers in FIG. 12.

Referring to FIG. 8, an example of a precise indicia calculator (800) is shown. It is an expression of the method defined in FIG. 7. In the embodiment shown herein, the calculations are based on 50 lines of indicia per column (802). This is the lines per column variable input into FIG. 7 at step (702). This number means that the slot size is two percent per line (804), namely, 100% of the column divided by 50 lines per column equals 2% of the column per line of indicia. Each line of results (820) is shown related to an exact percentage position (822) and an inexact percentage position (824). For example, for the slot size associated with line 1 at (820), the exact position is zero at (822) and the inexact position is one at (824). At the slot size associated with line 20 at (830), the exact percentage position (832) is 38, and the inexact position (834) is 39. Accordingly, the calculator shown herein provides a precise indicia column percentage based on fifty lines per column with the exact and inexact percentages based on the position of the first word and the second word up to and including the last word of each line all the way through the column of text.

Referring to FIG. 9, a diagram is provided depicting in tabular form another example embodiment of the process illustrated in FIG. 7. It shows a table with "revise upward inexact modifier" designations, which occurs inherently on all configurations of 51 or more lines of indicia per column. This example shows the results of the process shown and described in FIG. 7 as used by the table in FIG. 8 showing calculations for 50 lines of indicia per column. In the embodiment shown in FIG. 9, the set of calculations is based on 51 lines of indicia per column (902). This "revise upward inexact modifier" designation is distinct and separate from the similar mechanism "revise upward absolute modifier" and its mechanism used in absolute feature index numbers in FIG. 11. It is also distinct and separate from the similar mechanism "revise upward modifier" and its mechanism used in compressible feature index numbers in FIG. 12.

This means that the slot size is approximately 1.96 percent of the length of the column per line (904), namely, 100% of the column divided by 51 lines per column equals 1.96% of the column per line of indicia. Each line of results (920) is shown related to an exact percentage position (922) and an inexact position (924), as shown in FIG. 8. The differences with FIG. 8 are shown at line 13 (930), which has an exact percentage of 24 but does not have an inexact percentage available for that line. This is because line 14 has an exact percentage of 25. Therefore, instead of using an inexact percentage of 25, the current slot revised upward inexact condition of step (726) prevails and there is a plus sign (+) mark, or in one embodiment an alternative identifier, on the otherwise inexact percentage of 24 (934). This results in an embodiment of the concept being "24+" to indicate there is an exact percentage of 24 but any inexact percentages must use 24 with a "revise upward inexact" modifier since no inexact percentages are actually available on this line. The situation is similarly shown at line 39 (940) where there is an exact percentage of 75 (942) and a revised upward inexact percentage of "75+".

Figure 10:
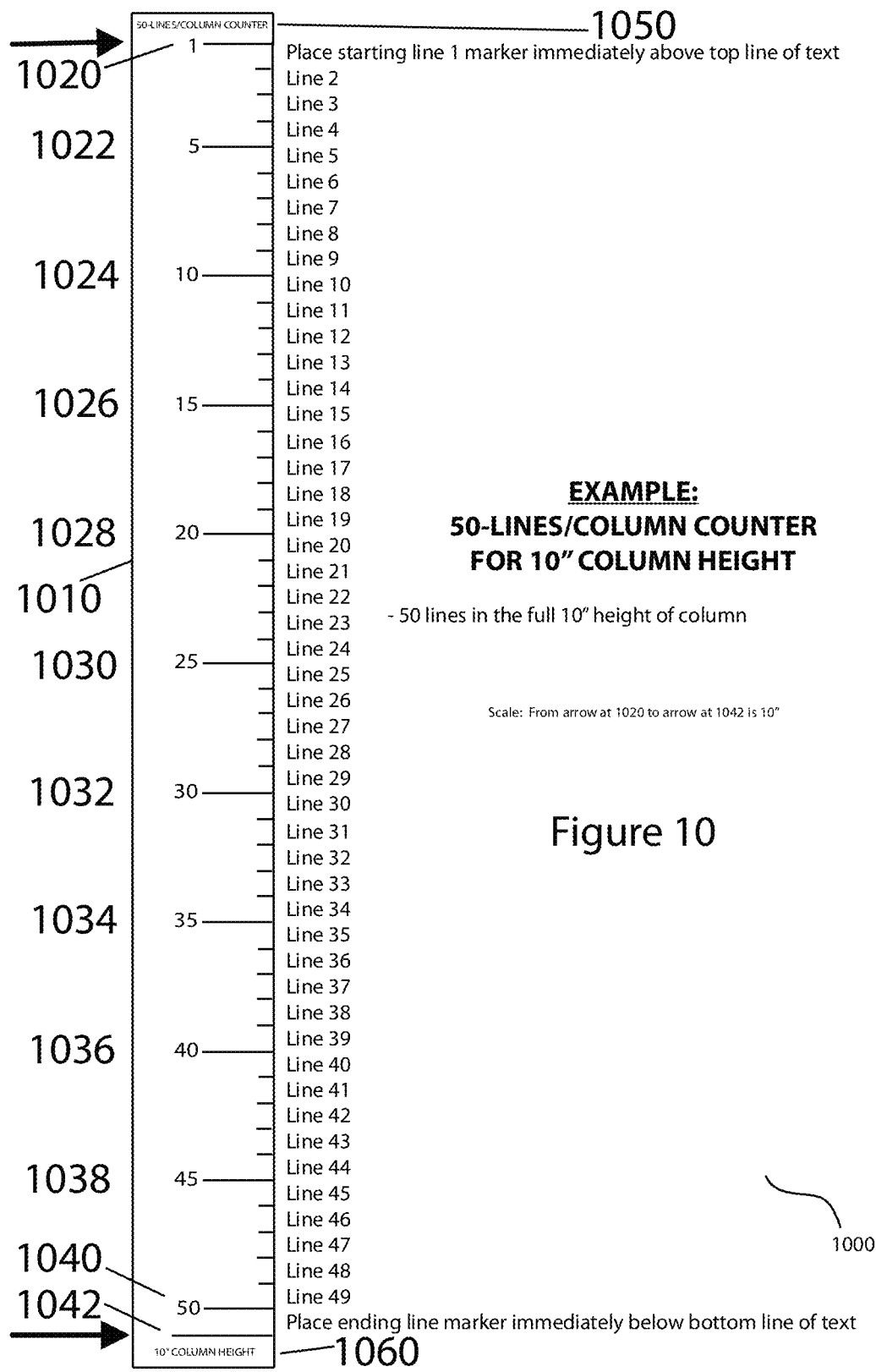
FIG. 10 depicts a diagram illustrating a measuring device that measures line numbers in a column of text of a certain number of lines per column and of a certain height of the scroll for an indicium in a column of text when measurement of indicia uses either "absolute" numbering or the revised form of "compressed" numbering.
Figure 11:
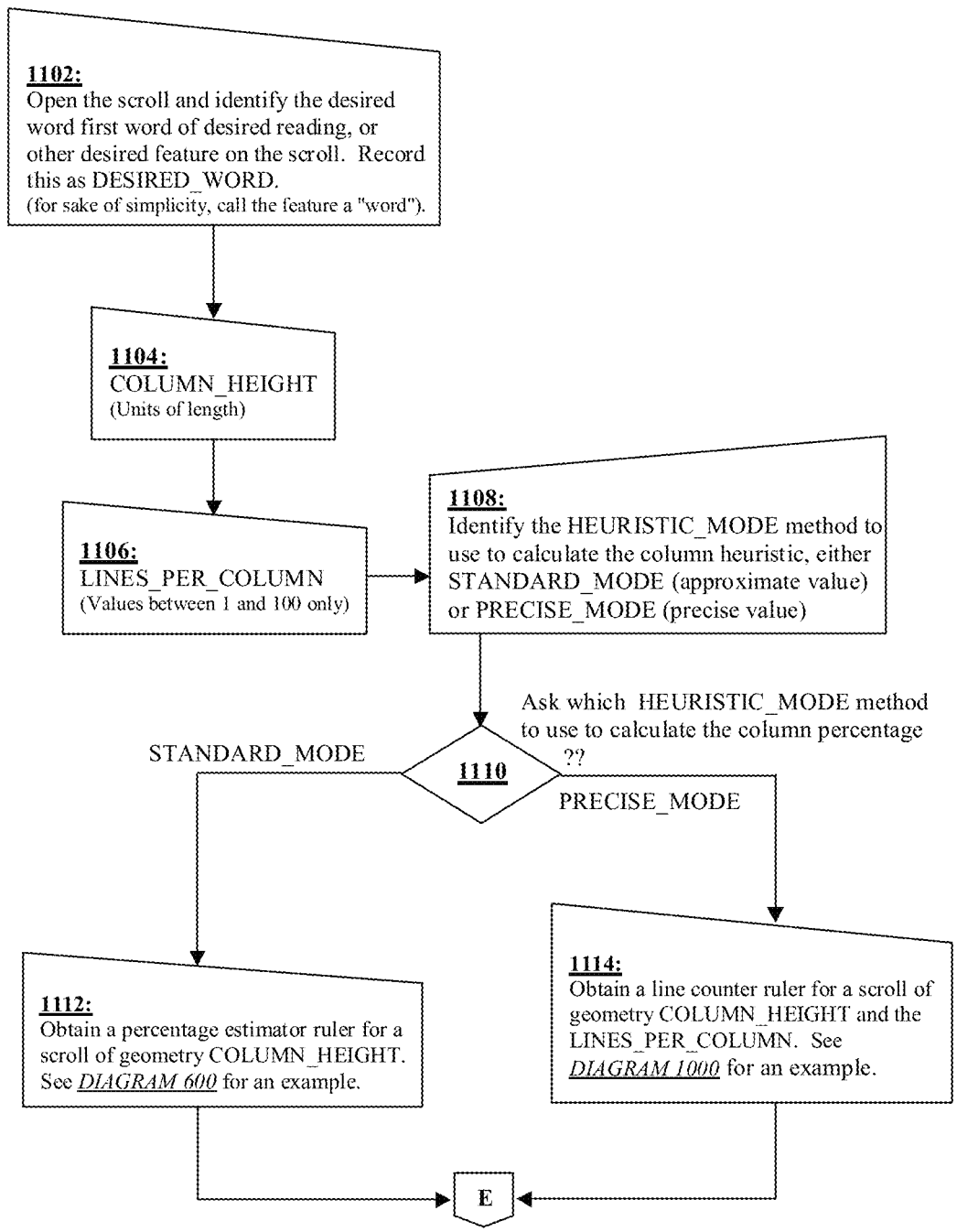
FIG. 11 depicts a flow chart illustrating a process for combining the column serial number from FIG. 5 with either the column heuristic number or the related "precise" number to form a representation of one form of a complete feature index number.
Figure 11:
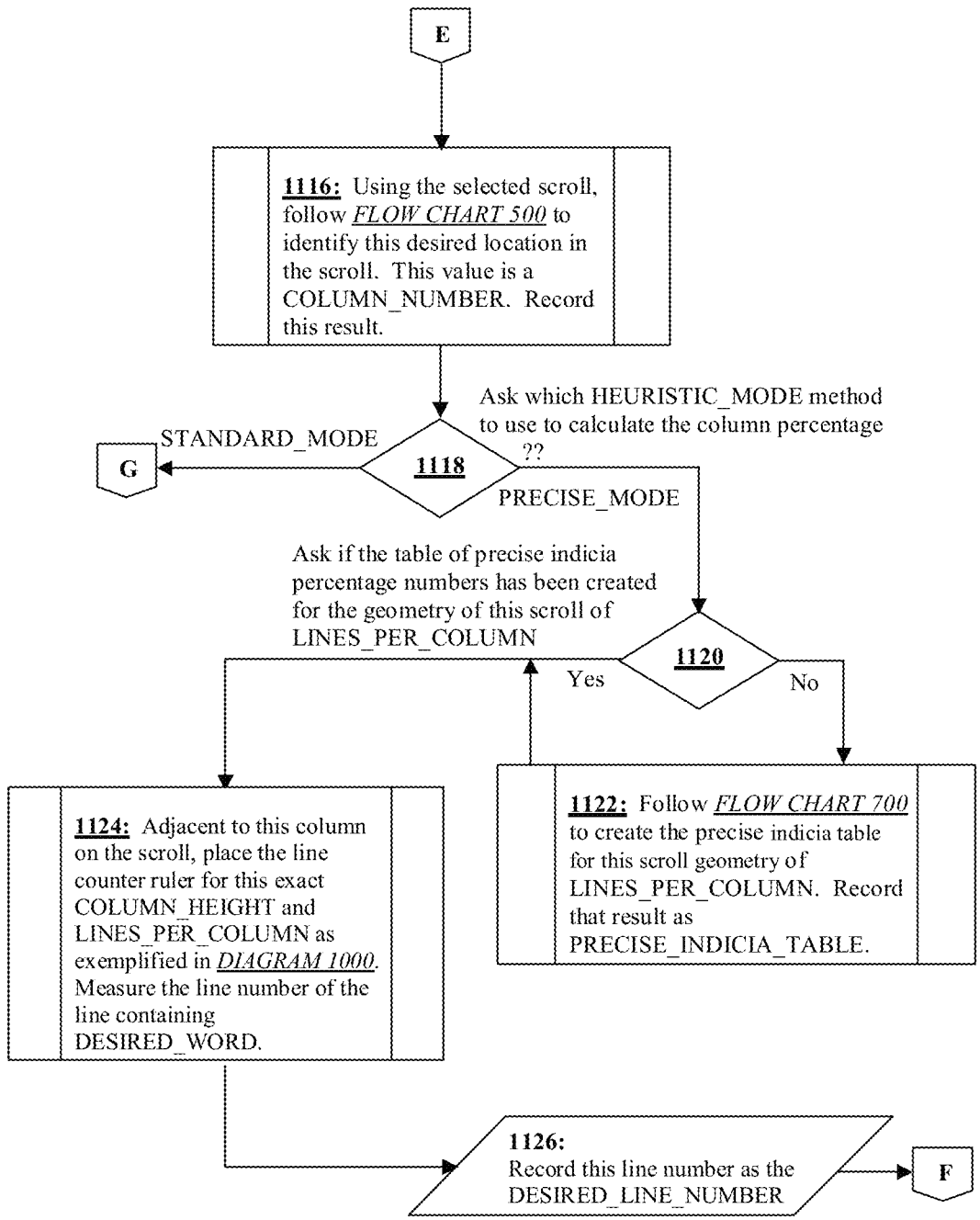
Figure 11:
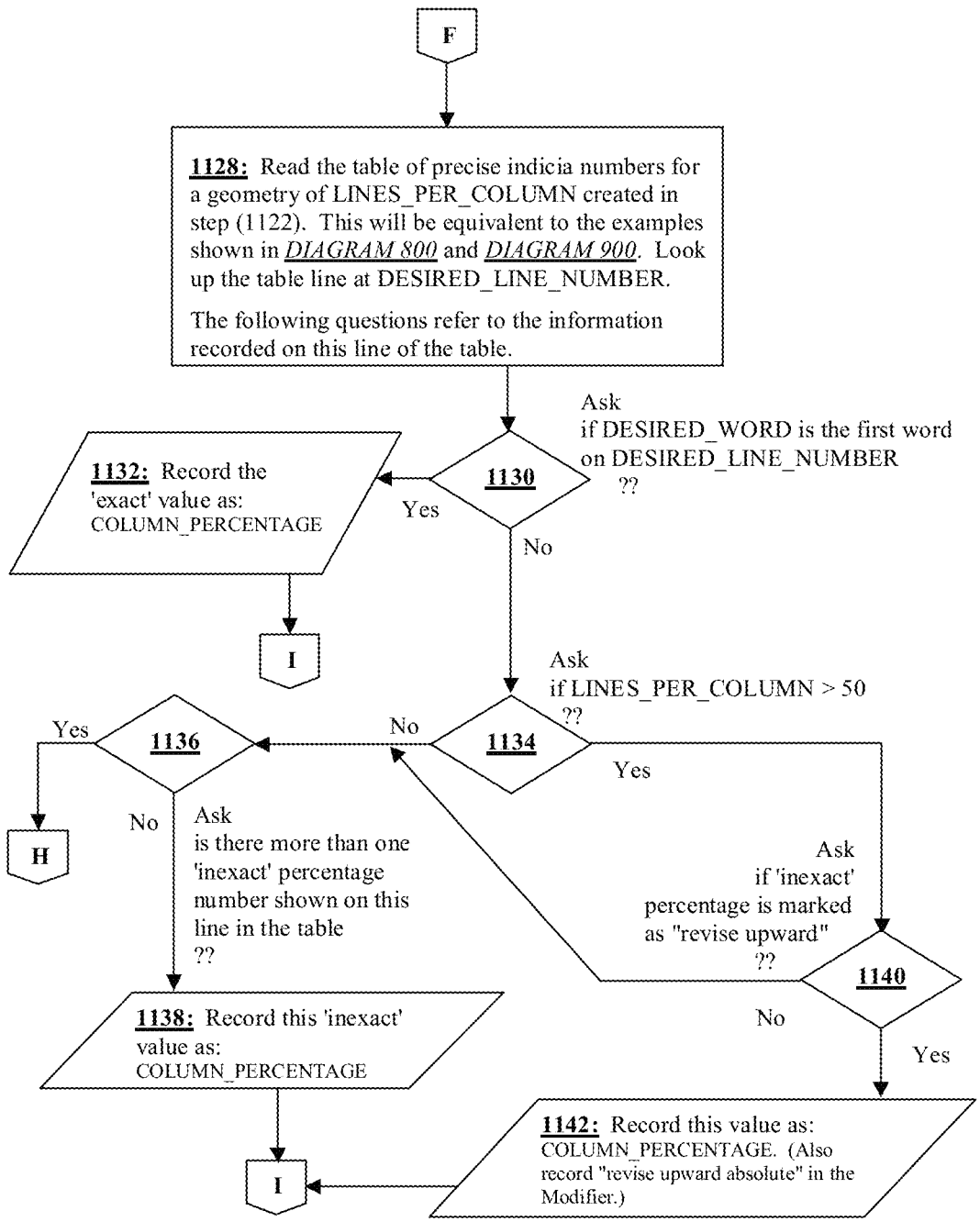
Figure 11:
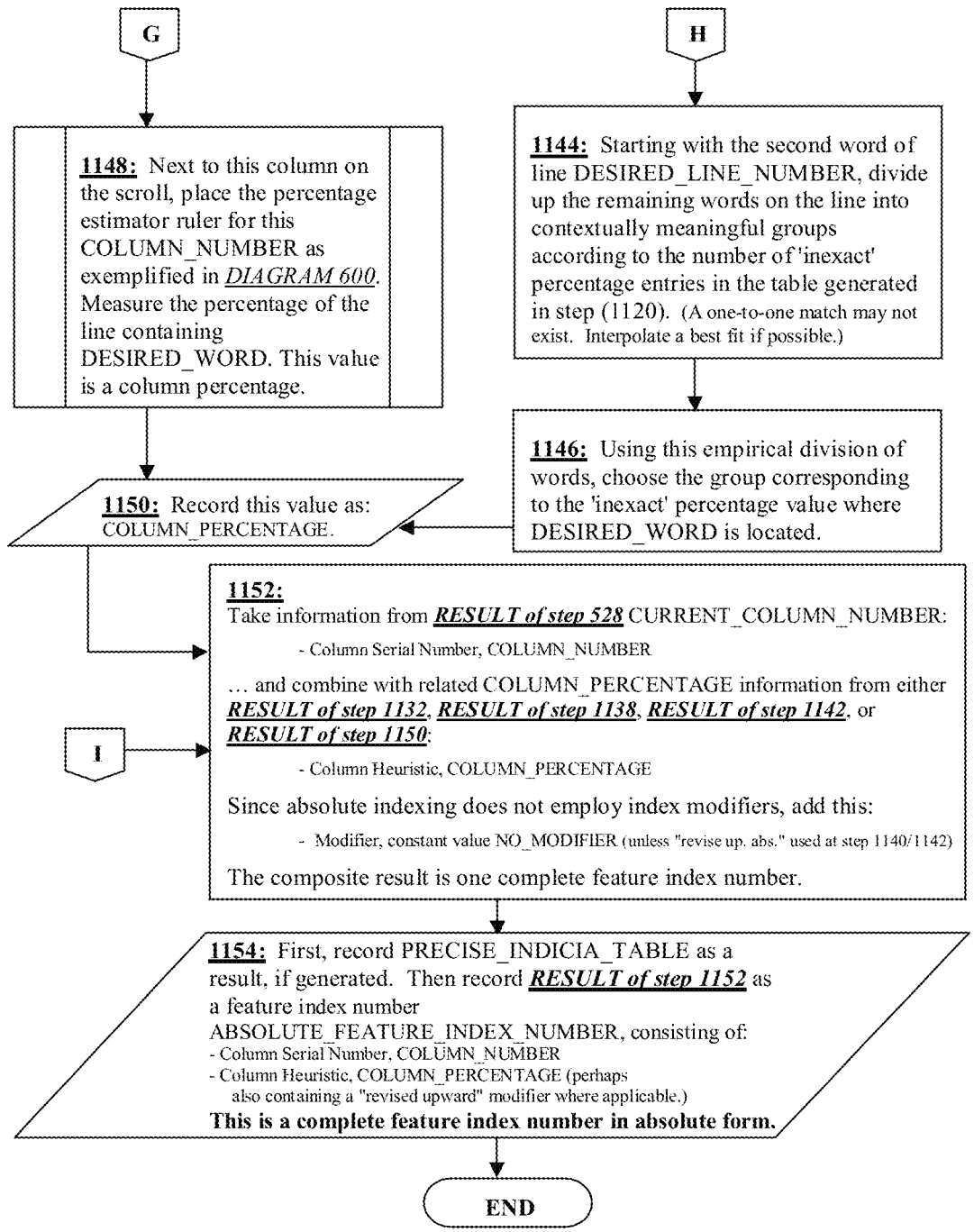

The diagram of FIG. 10 and the flow chart of FIG. 11 show how to build up the components of a precise mode index number using absolute numbering. Referring to FIG. 10, a diagram (1000) is provided illustrating a measuring device (1010) that measures line numbers in a column of indicia of a certain number of lines of indicia per column and of a certain height of the scroll for an indicium in a column of text when measurement of indicia uses either "absolute" numbering or the revised form of "compressed" numbering. In one embodiment, an annotation is provided at one end of the measuring device describing its function for counting the number of lines of text in the column (1050). In one embodiment, an annotation is also provided at the other end of the measuring device describing the distance between the beginning (1020) and ending (1040) marks (1060). In one embodiment, the markings are placed on a surface of the body of the ruler, also referred to herein as the top surface of the body. The ruler includes an oppositely disposed surface, also referred to herein as a bottom surface, to be placed in communication with the scroll. These markings are bounded by column height for a particular writing format of indicia for the scroll. The example ruler shown herein is for a 50-line column having a 10-inch height. As shown, the ruler is extended from just above the first line of text in the column (1020) to just below the last line of text in the column (1042). Numbers are provided on the ruler counting by increments of five lines. As shown, the ruler numbers start with the first line in the column (1020), and then proceed to mark further numbers at every five lines (1022), (1024), (1026), (1028), (1030), (1032), (1034), (1036), (1038), and (1040), through just beyond the last line of the column (1042). In one embodiment, each column in the scroll may vary and some columns will not have indicia on each column line. The ruler (1010) is employed as a tool to discover the line numbering for each column since the column of the scroll itself does not contain any line numbers. This measuring device implies use of precise mode indexing as the method of measurement. The measuring device shown herein may be employed for certain measurements shown and described in FIG. 11, and for certain measurements shown and described in FIG. 15.

Referring to FIG. 11, a flow chart (1100) is provided illustrating a process for combining the column serial number from FIG. 5 with either the column heuristic number or the related precise number to form a representation of one form of a complete feature index number. The result will be an absolute form of a feature index number. It generates an absolute feature index number from a desired word or other location on the scroll. One of the two measuring devices shown in FIG. 6 and FIG. 10 is employed with the building of this absolute feature index number. The user decides whether to use the standard mode, as described above, to obtain a feature index number or to use the precise mode. The percent estimator ruler of FIG. 6 is used in standard mode while the line counter ruler is used in precise mode. Both of modes render an absolute feature index number but without considering the perturbations in compressible indexing of the few column heuristic percentage numbers at the extreme top and bottom of the column when accounting for the beginning of the first word of the first and last sentence/verse, respectively, on that column. As shown, the scroll is opened to the desired word or first word of the desired reading or other desired feature, and this word is recorded as the desired word (1102). The column height (1104) and the lines per column (1106) are ascertained. Thereafter the heuristic mode method used to calculate the column heuristic is identified (1108). In one embodiment, there are two modes, including a standard mode yielding an approximate value and a precise mode yielding a precise value.

Following the identification of the heuristic mode method at step (1108), the mode selection is determined (1110). If the standard mode was selected, a percentage estimator ruler for a scroll is obtained (1112), an example of which is shown in FIG. 6. In one embodiment, this percentage estimator ruler is based on the column height for the scroll. Similarly, if the precise mode was selected, a line counter ruler for the scroll is obtained (1114), an example of which is shown in FIG. 10. In one embodiment, the line counter rule is based on the column height and lines per column for the scroll. Using the selected scroll, the process for determining the column number of any column in the scroll as shown and described in FIG. 5 is employed to identify the column number of the desired location in the scroll (1116). Once the column number has been ascertained, the heuristic mode method for calculating the column percentage is determined (1118). If the method is the precise mode, it is determined if there is a table of precise indicia percentage values for the scroll (1120), i.e., based on the geometry of the scroll. If the response to the determination at step (1120) indicates that the table has not been created, the process returns to FIG. 7 to create the table (1122) and then continues. Following step (1122) or a positive response to the determination at step (1120), the line counter ruler is placed adjacent to the identified column, and the line number of the line containing the desired word is measured (1124) and recorded (1126). However, if at step (1118) it is determined that the method used for calculating the column percentage is the standard mode, the percentage estimator ruler shown in FIG. 6 for this column number is placed on the scroll and the percentage of the line containing the desired word is measured (1148) and recorded (1150).

Following step (1126), the table of precise indicia numbers created at step (1122) is read for the associated scroll geometry (1128). It is then determined if the desired word is the first word on the desired line number (1130). A positive response to the determination at step (1130) is followed by recording the exact value is the column percentage. However, a negative response to the determination at step (1130) is followed by determining if the lines per column exceed fifty (1134). A positive response to the determination at step (1134) is following by determining if the inexact percentage is marked as revise upward with the "revise upward absolute" modifier (1140). A positive response to the determination at step (1140) is followed by recording the value as the column percentage variable, including recording a modifier value of "revise upward absolute" (1142). However, a negative response to the determination at steps (1140) or (1134) is followed by determining if there is more than one inexact percentage value for the specified line in the table (1136). A negative response to the determination at step (1136) is followed by recording the inexact value as the column percentage (1138).

If the response to the determination at step (1136) indicates that there is more than one value, then starting with the second word of the desired line number, the remaining words on the line are divided into contextually meaning groups (1144) according to the number of inexact percentage entries in the table generated at step (1120). A one-to-one match may not exist, and in one embodiment an interpolation for a best fit is conducted. With this empirical division of words, the group corresponding to the inexact percentage value where the desired word is located is selected (1146) and recorded (1150). Following any of steps (1132), (1138), (1142), or (1150), the current column number is combined with the related column percentage information, including explicitly "no modifier" unless "revise upward absolute" is needed in step (1140) due to a lines per column large enough to warrant the revise upward absolute modifier (1134) as the only exception (1152). Accordingly, the results are recorded as an absolute feature index number, including the column number and the column percentage (1154).

Figure 12:
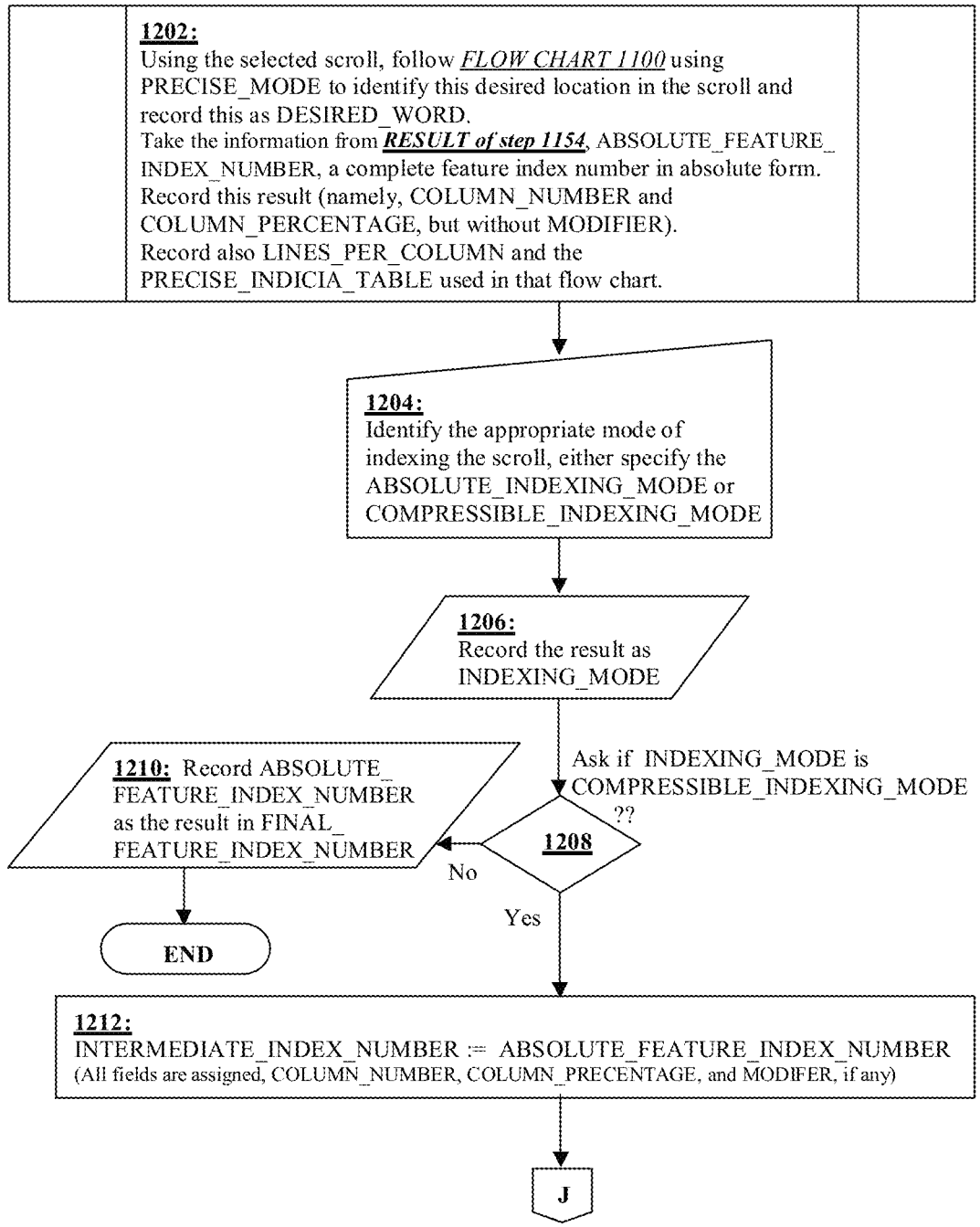
FIG. 12 depicts a flow chart for the assessment of whether to use either absolute or compressible mode index numbering and with the latter, the assignment of compression regions and conversion of feature index numbers from absolute to compressed form, including a localization heuristic that can make fine-grained last-minute adjustments to special cases.
Figure 12:
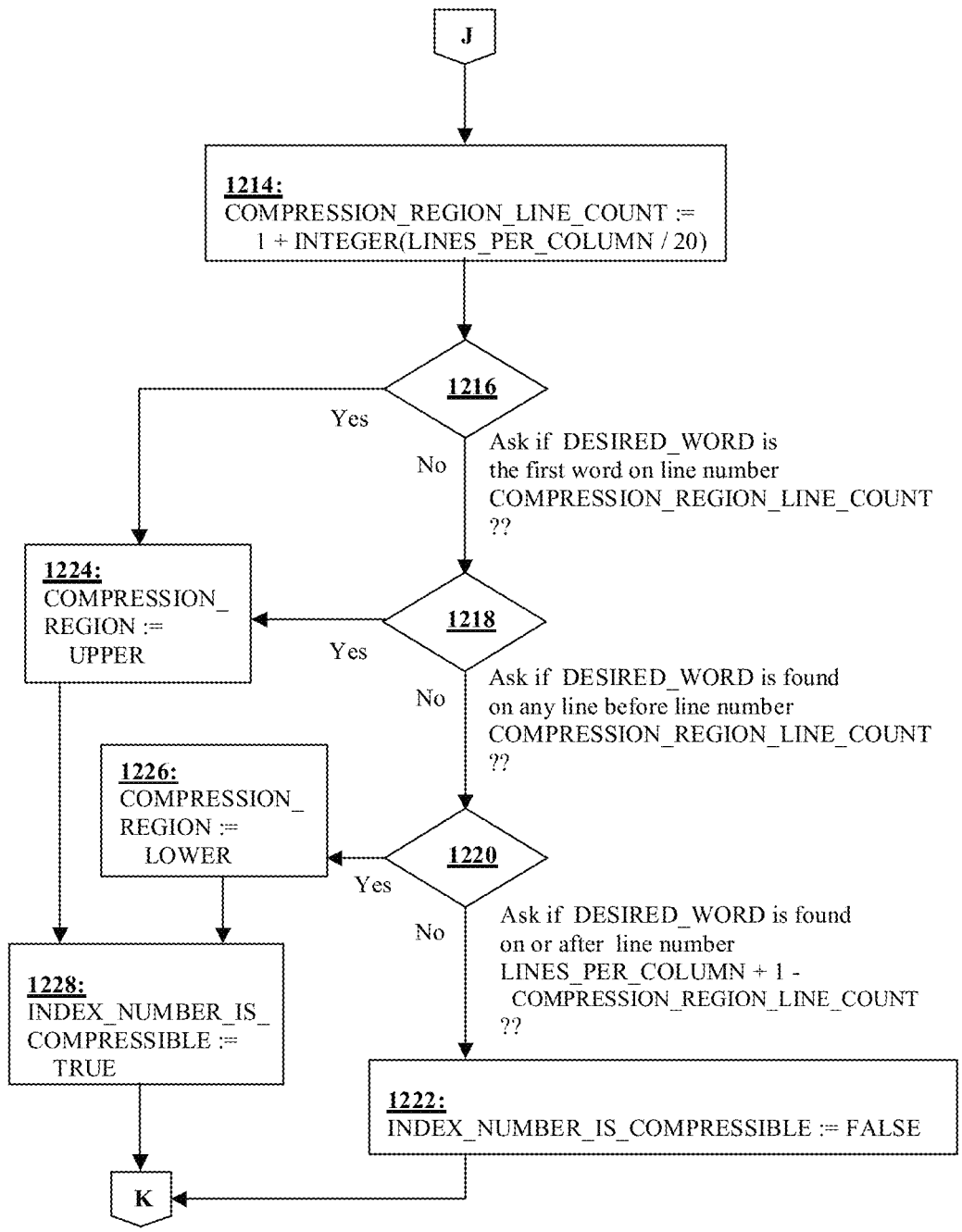
Figure 12:
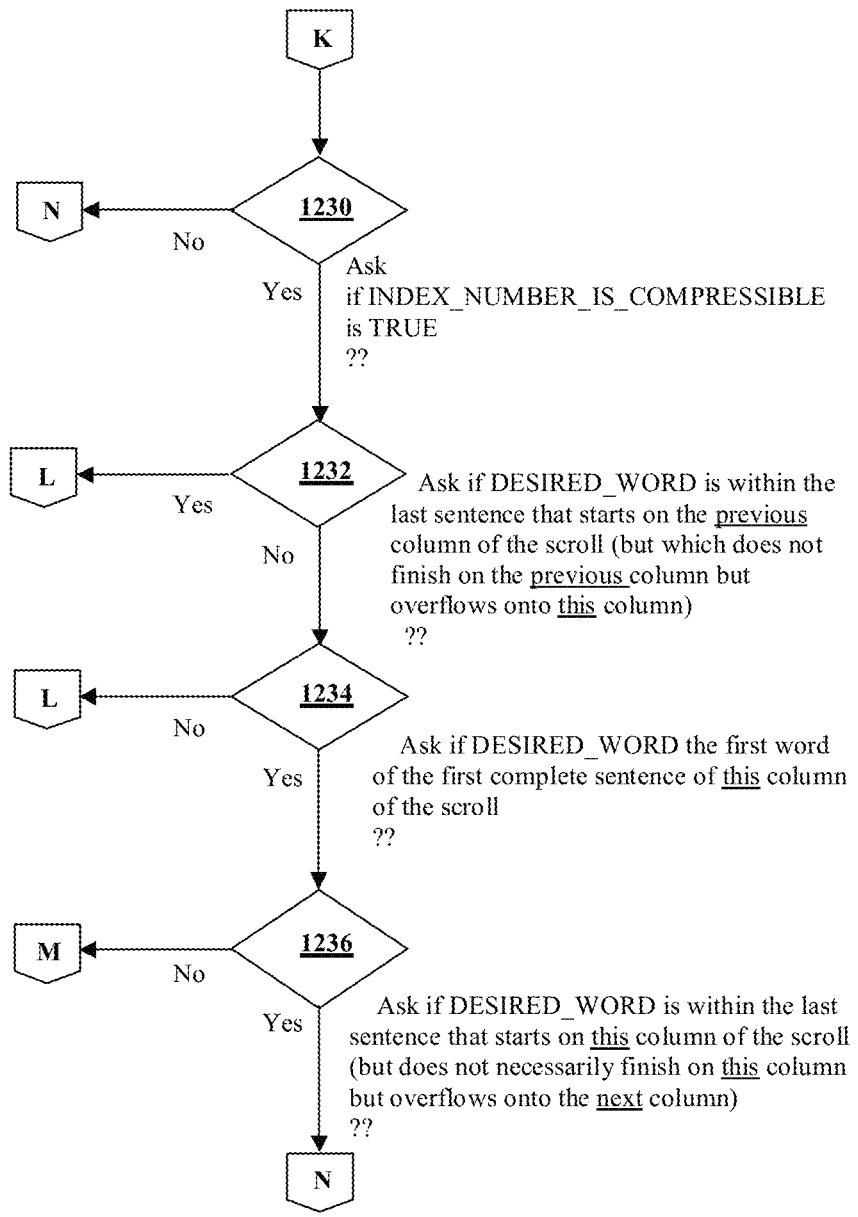
Figure 12:
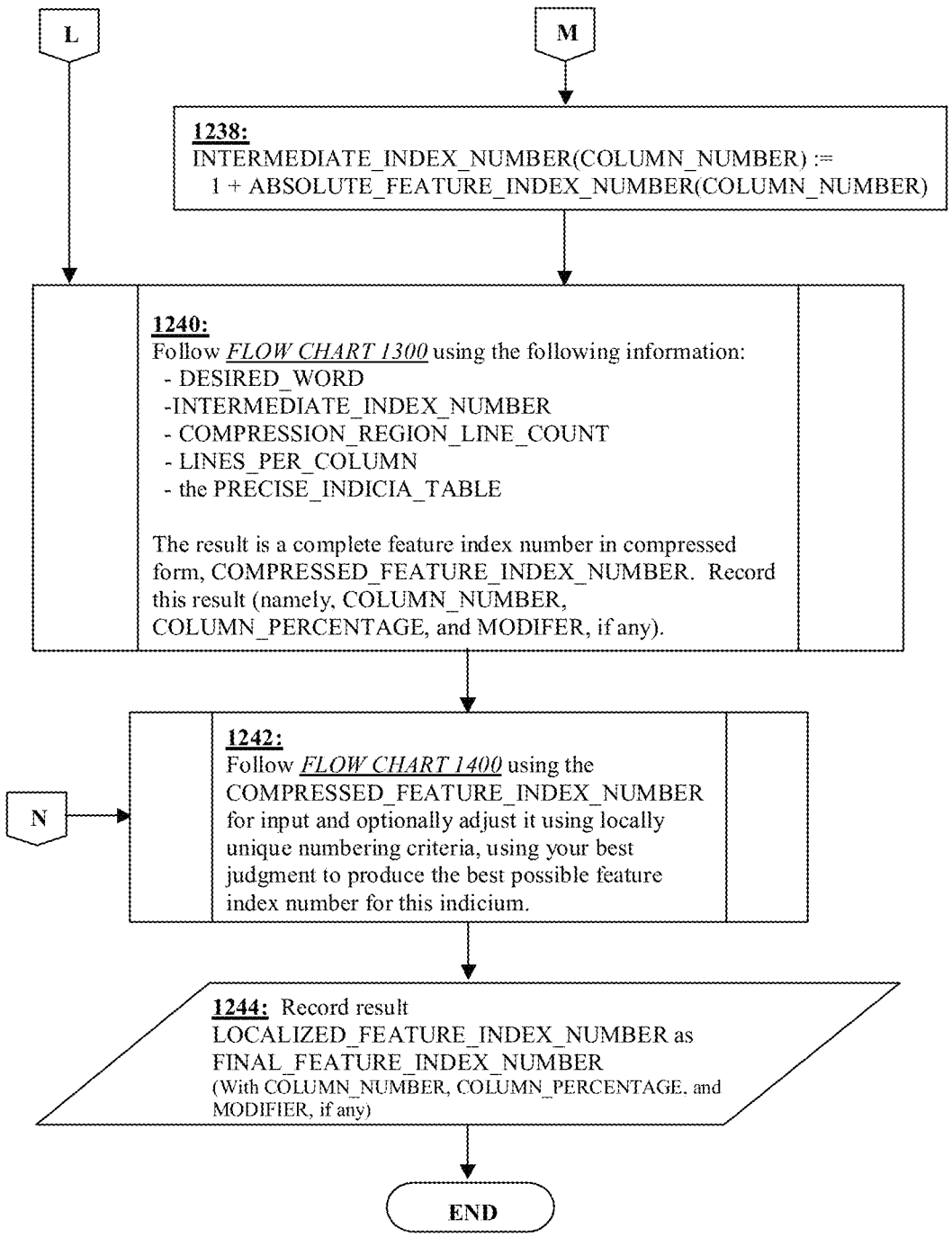
Figure 13:
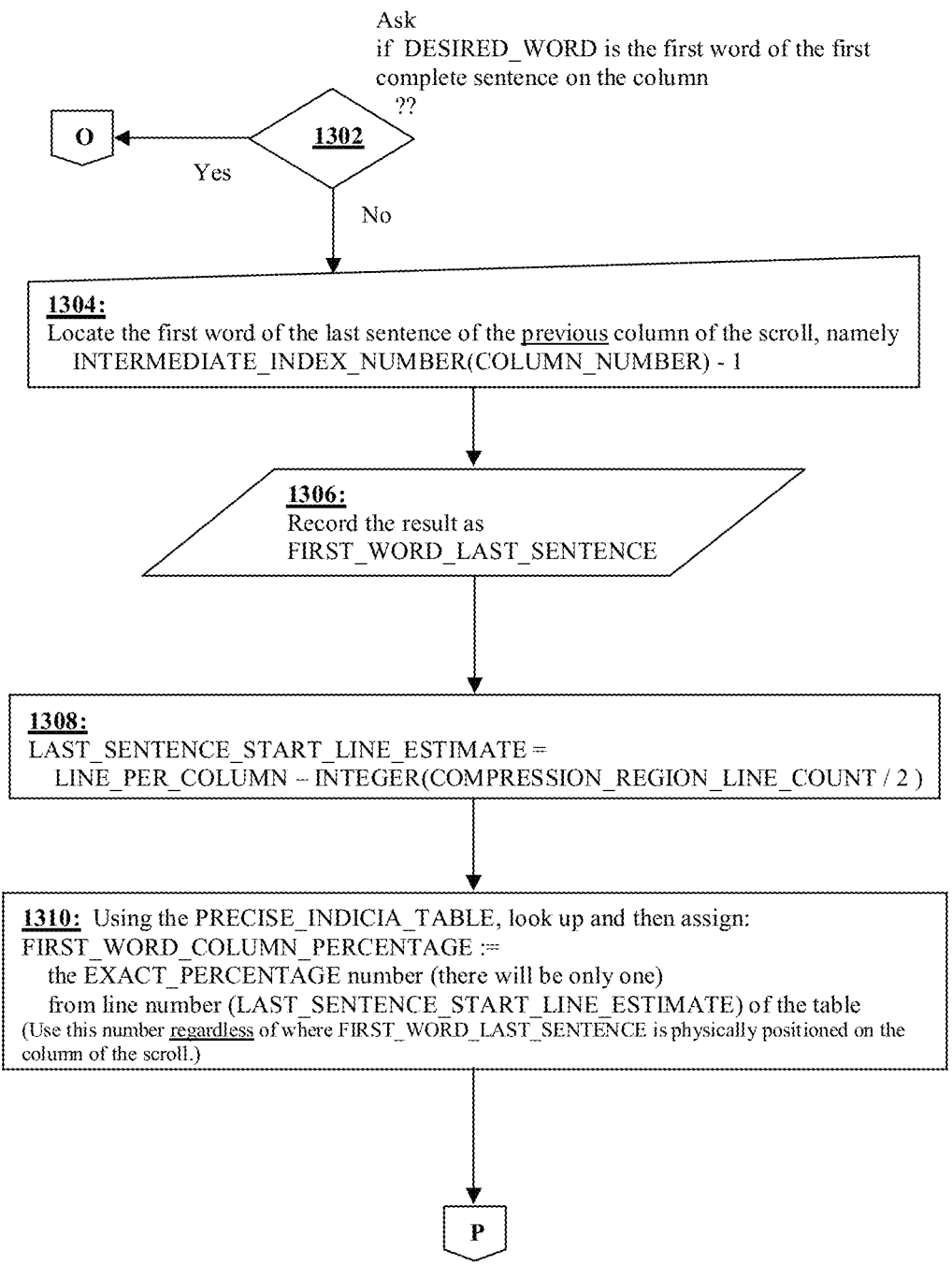
FIG. 13 depicts a flow chart for the interpolation of feature index numbers from FIG. 11 in the compression regions for scrolls using compressible numbering and the optional creation of an index modifier for certain conditions.
Figure 13:
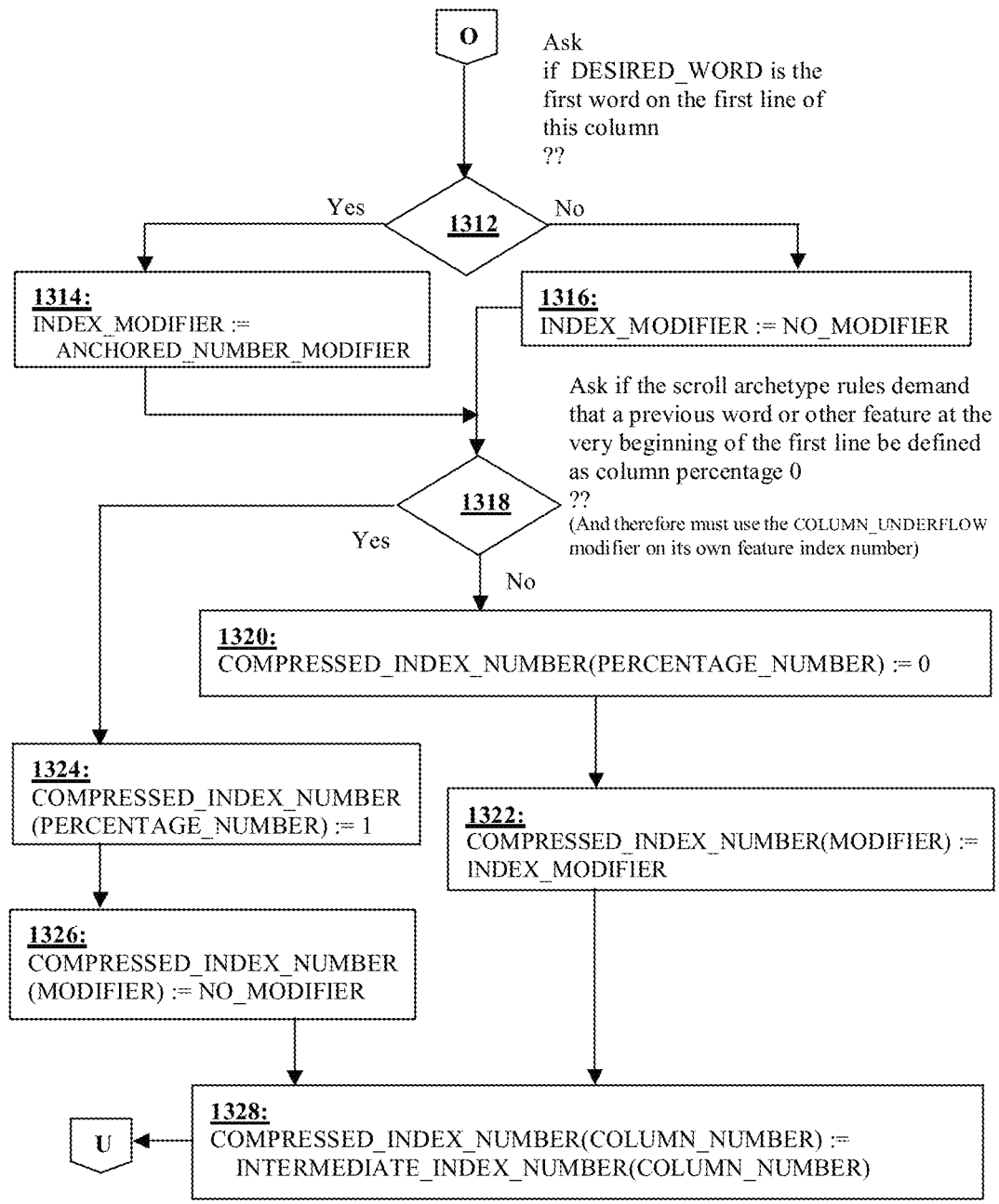
Figure 13:
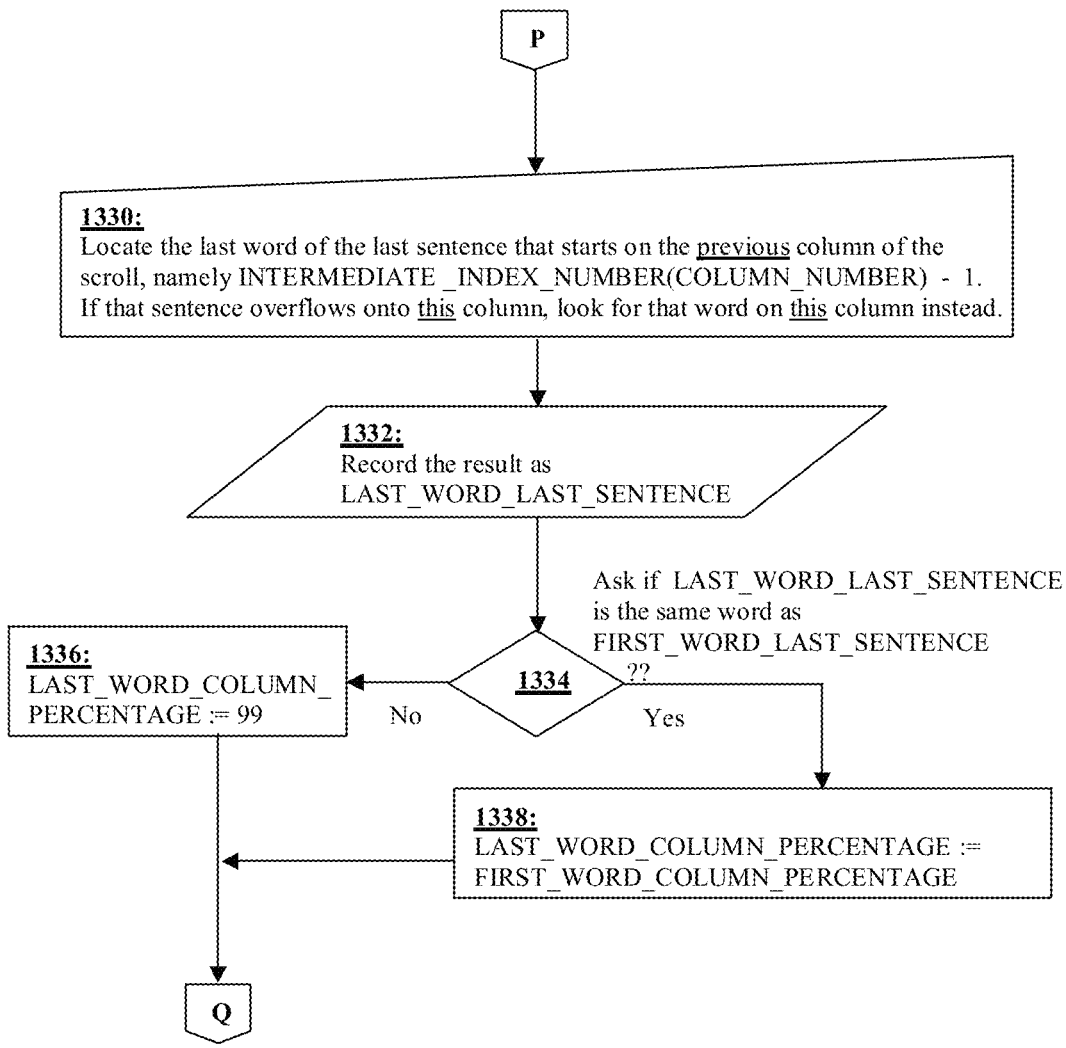
Figure 13:
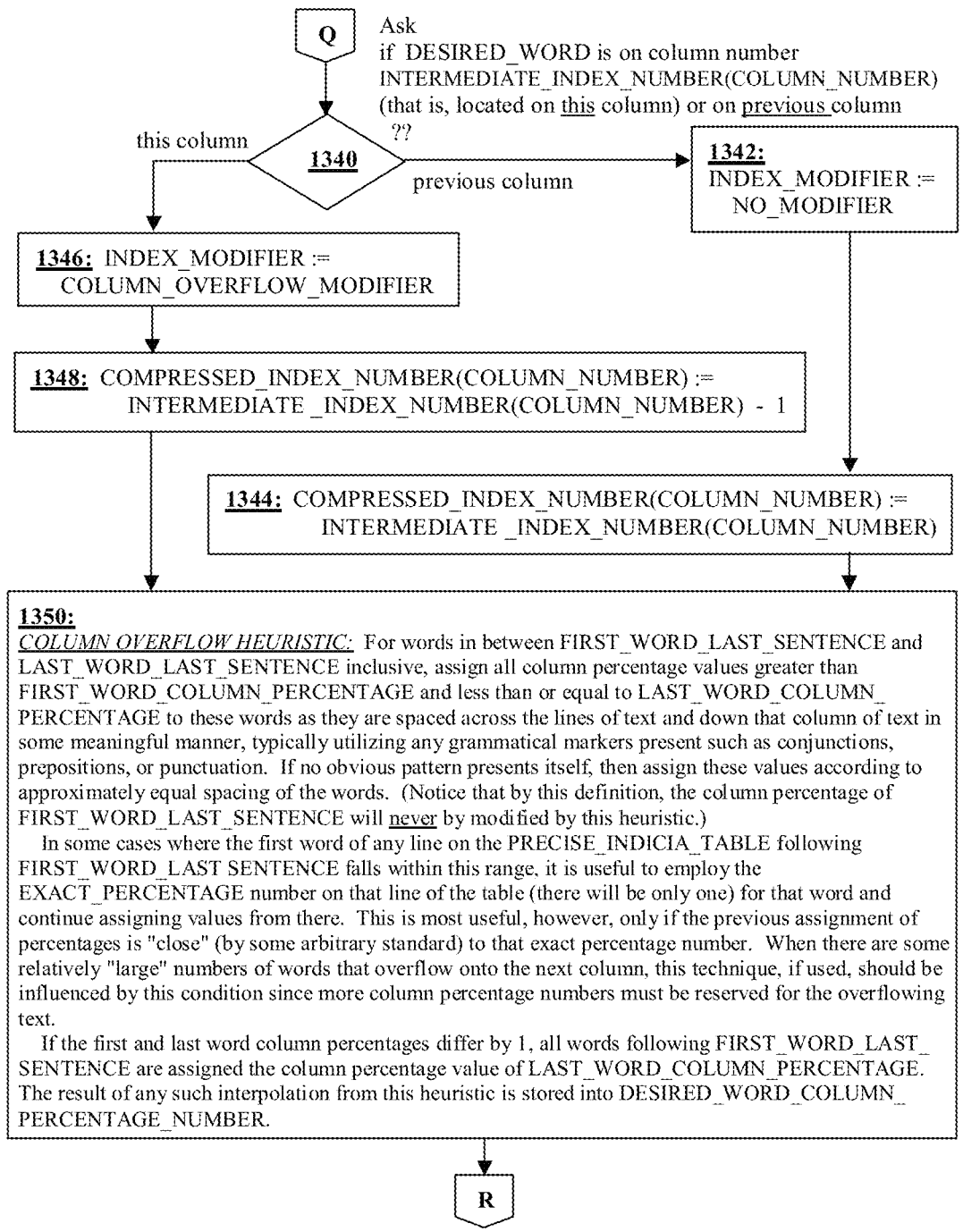
Figure 13:
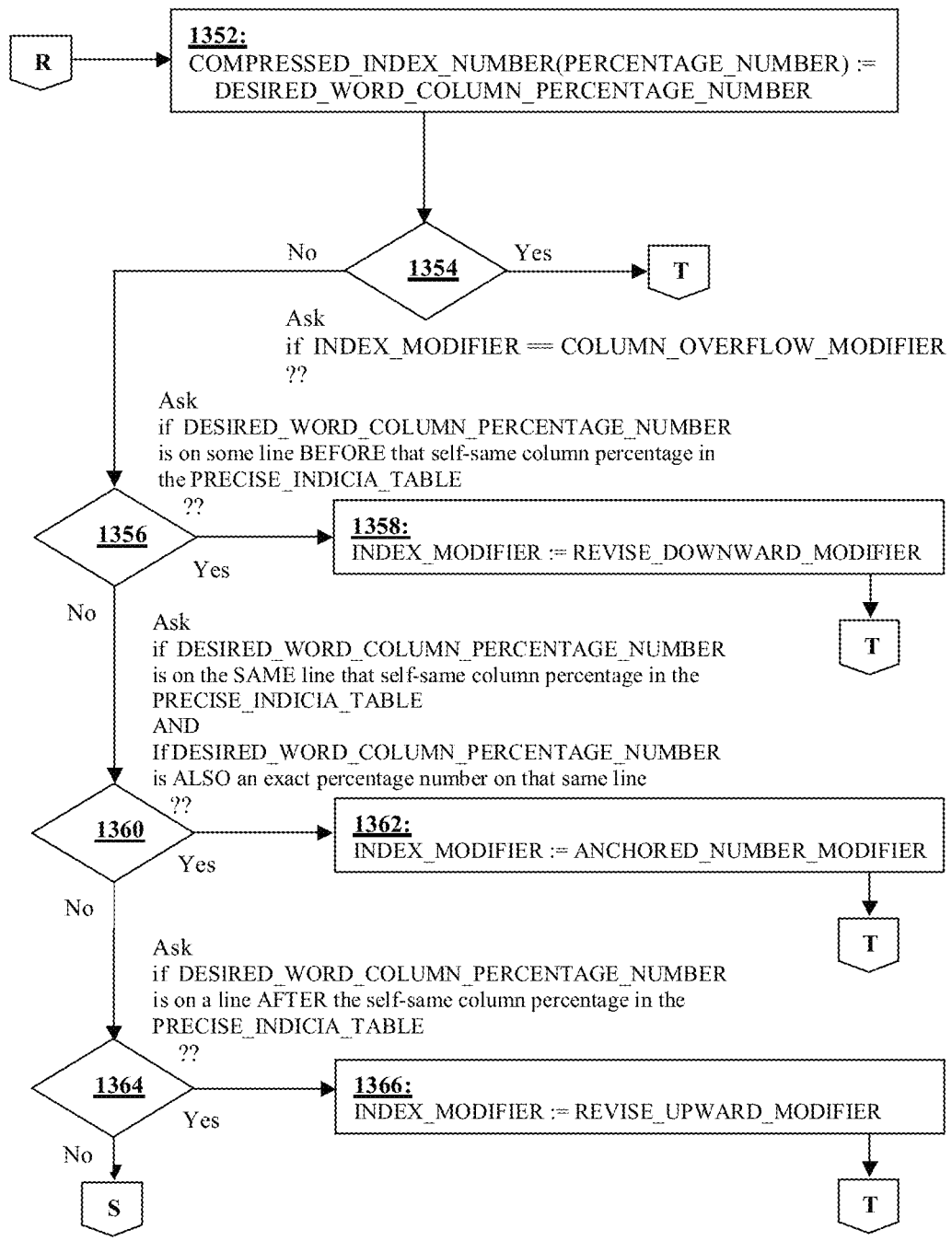
Figure 13:
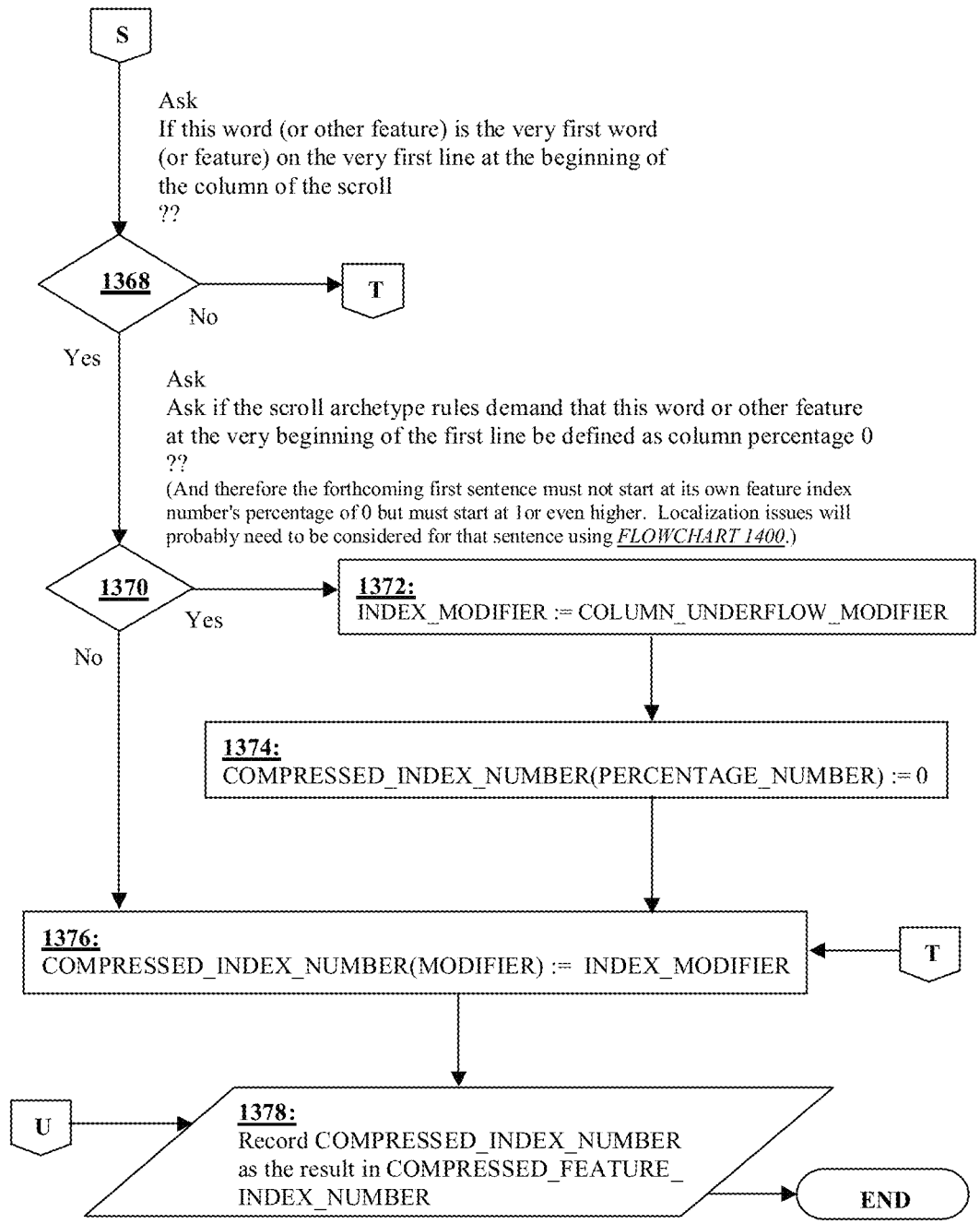
Figure 14:
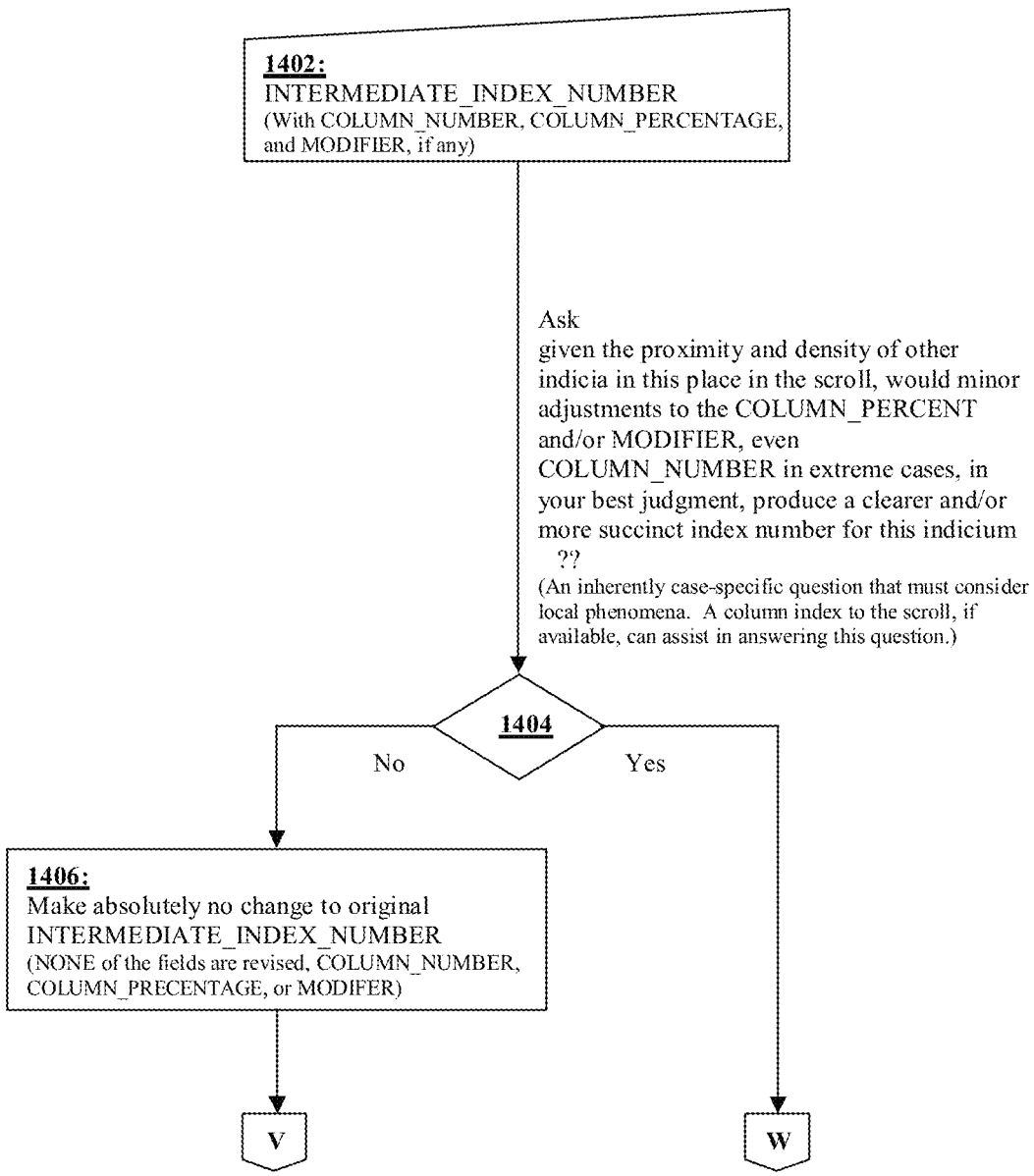
FIG. 14 depicts a flow chart for minor adjustments that consider indicia proximity and density of localized special cases using a judgment localization heuristic.
Figure 14:
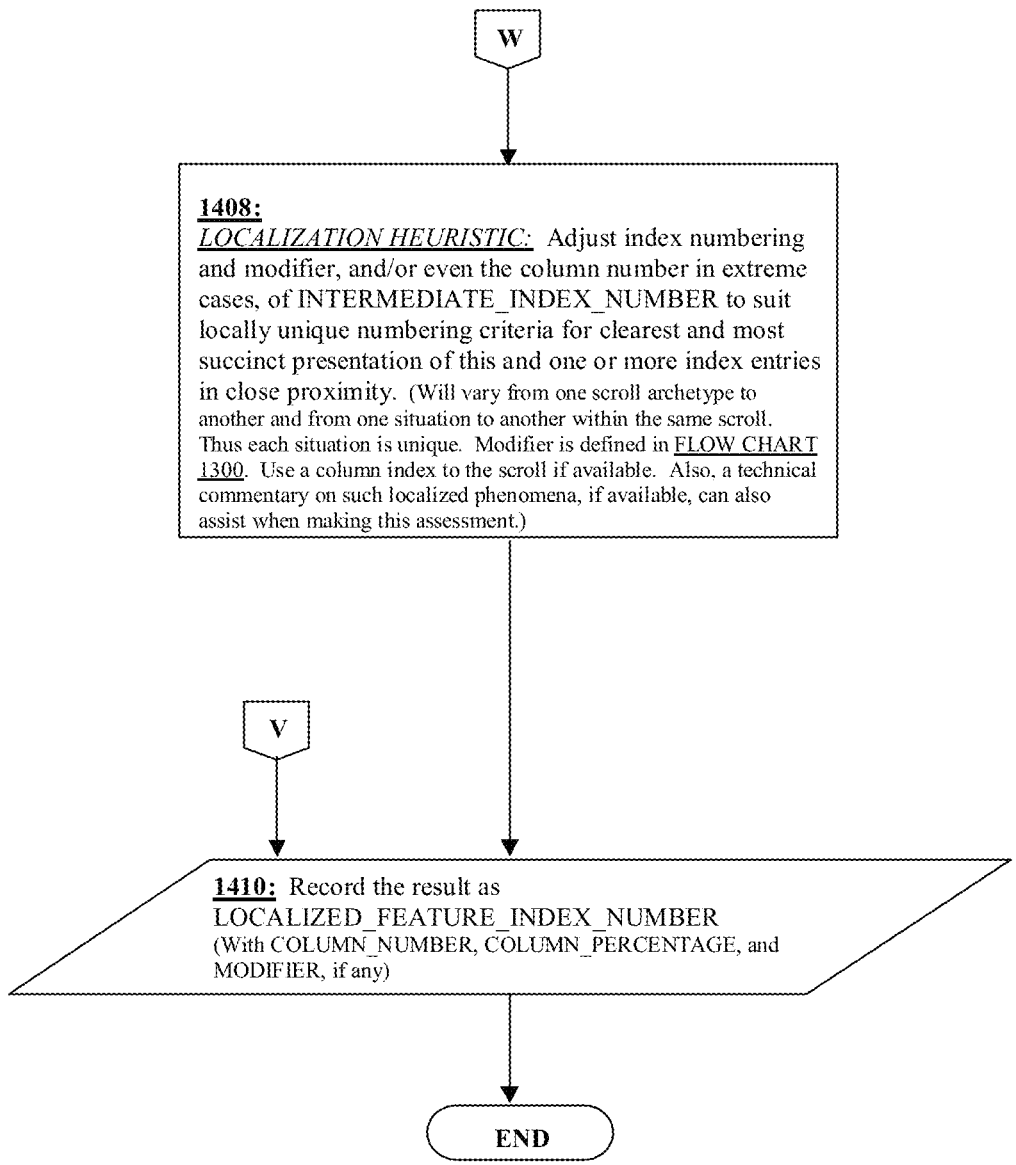

FIG. 12, FIG. 13, and FIG. 14 explain how to build up a precise mode feature index number using compressible numbering, as shown in FIG. 12, including potential use of an index modifier, as shown in FIG. 13, and a localized adjustment technique, as shown in FIG. 14. Referring to FIG. 12, a flow chart (1200) is provided illustrating a process for assessing whether to use either absolute or compressible index numbering and with the latter, the assignment of compression regions and conversion of feature index numbers from absolute to compressed form, including a localization heuristic that can make fine-grained last-minute adjustments to special cases. It is used for generating an absolute feature index number for a feature in the scroll and optionally converting it into a compressed index number. Using the selected scroll and the process shown and described in FIG. 11, the absolute index number, the lines per column, and the precise indicia table are recorded (1202). The appropriate mode of indexing the scroll is identified (1204). In one embodiment, the modes of indexing include an absolute indexing mode and a compressible indexing mode. Following step (1204), the mode is recorded at the indexing mode (1206). It is then determined if the indexing mode is the compressible mode (1208). In any one embodiment, the mode may be either absolute or compressible. If the recorded indexing mode is absolute, the absolute index number is recorded as the result in the final feature index number (1210) and the process ends. However, if the recorded indexing mode is compressible, then the intermediate index number variable is assigned the value of the absolute index number (1212) identified in step (1202). In one embodiment, all fields are assigned to the column number, the column percentage, and the modifier, if any. Following step (1212), the compression region line count is assigned to the combination of the integer one plus the integer of the quotient of the lines per column and the value twenty (1214). It is then determined if the desired word is the first word in the line number for the compression region line count (1216). A positive response to the determination at step (1216) is followed by assigning the compression region to a value "upper" (1224). However, a negative response to the determination at step (1216) is followed by determining if the desired word is present on any line before the line number compression region line count (1218). A positive response to the determination at step (1218) is followed by assigning the compression region to a value "lower" (1226). However, a negative response to the determination at step (1218) is followed by assigning the index number being compressible to the value false (1222). Following step (1224) or (1226), the index number compressibility is set to true (1228). Accordingly, the index number compressibility variable is set.

Following the compressibility variable being set at step (1222) or step (1228), it is determined if its value is true (1230). If the response to the determination at step (1230) is negative, the process proceeds to FIG. 14 using the compressed index number for input and optionally adjusting it using locally unique numbering criteria (1242) and returns at step (1244). However, if the response to the determination at step (1230) is positive, it is then determined if the desired word is within the last sentence that starts on the previous column of the scroll, but does not finish on the previous column (1232). A negative response to the determination step (1232) is followed by determining if the desired word is the first word of the first complete sentence of this column of this scroll (1234). Finally, a positive response to the determination at step (1234) is followed by determining if the desired word is within the last sentence that starts on this column of the scroll but does not necessarily end on this column, i.e., overflows to the next column, (1236). A positive response to the determination at step (1232) or a negative response to the determination at step (1234) is followed by proceeding to the process illustrated in FIG. 13 generating a complete feature index number in compressed form (1240) and returning to step (1242). Similarly, a negative response to the determination at step (1236) is following by assigning the intermediate index number's column number to the value of the absolute index number's column number incremented by an integer of one (1238) and continuing with step (1240). A positive response to the determination at step (1236) is followed by proceeding to the process shown and described in FIG. 14 using the compressed feature index number for input (1242) and recording the localized feature index number as a final feature index number (1244).

Referring to FIG. 13, a flow chart (1300) is provided illustrating a process for the interpolation of feature index numbers from FIG. 11 in the compression regions for scrolls using compressible numbering and the optional creation of an index modifier for certain conditions. This means that it is employed to adjust a compressed index number by applying a modifier, if one is needed. In one embodiment, it is intended for use with the compression regions but may also be applied to various other cases. As shown, it is determined if the desired word is the first word of the first complete sentence on the column (1302). A negative response to the determination at step (1302) is followed by locating the first word of the last sentence of the previous column of the scroll (1304) and recording the result as the first word of the last sentence (1306). Thereafter, the start line estimate of the last sentence is assigned the value of the quantity of (lines per column minus the next lower integer value of (compression region line count/2)) at step (1308). Using the precise indicia table, the first word column percentage is assigned the value of the exact percentage number of the line number of the start line estimate of this last sentence (of the previous column) at step (1310).

A positive response to the determination at step (1302) is followed by determining if the desired word is the first word on the first line of this column (1312). A positive response to the determination at step (1312) is followed by assigning the index modifier to the value of "anchored number modifier" (1314), and a negative response is followed by assigning the index modifier to the value of "no modifier" (1316). Following the assignments at either steps (1314) or (1316), it is determined if the scroll archetype rules demand that a previous word or other feature at the beginning of the first line be defined as column percentage value of zero (1318). A negative response to the determination at step (1318) is following by assigning the compressed index number's percentage number to zero (1320) and assigning the compressed index number's modifier to the index modifier value (1322). Conversely, a positive response to the determination at step (1318) is followed by assigning the compressed index number's percentage number to the integer value of one (1324) and the compressed index number's modifier to the value of "no modifier" (1326). Following steps (1322) or (1326), the compressed index number's column number is assigned the value of the intermediate index number's column number (1328).

Following the exact percentage number assignment at step (1310), the last word of the last sentence that starts on the previous column of the scroll is located (1330) and recorded (1332). It is then determined if the last word of the last sentence is the same as the first word of the last sentence (1334). A positive response to the determination at step (1334) is followed by assigning the first word column percentage variable to the last word column percentage (1338). However, a negative response to the determination at step (1334) is followed by assigning the number 99 to the last word column percentage variable (1336). Following the assignment at either step (1336) or step (1338), it is determined if the desired word is located on the same column as the intermediate index number's column number or on the previous column (1340). If the desired word is determined to be located on the previous column, then the value of the index modifier is assigned to have a value of "no modifier" (1342) and the compressed index number's column number is assigned to the column number of the intermediate index number (1344). However, if at step (1340), the desired word is determined to be the current column, then the index modifier is assigned the value of "column overflow modifier" (1346) and the compressed index number's column number is assigned to the value of the intermediate index number's column number less one (1348).

Following either steps (1344) or (1348), a column overflow heuristic is initiated for words in between the first word of the last sentence and the last word of the last sentence (1350). The heuristic functions as follows: for words in between the first word of the last sentence variable and the last word of the last sentence variable inclusive, assign all column percentage values greater than the first word column percentage variable and less than or equal to the last word column percentage variable to these words as they are spaced across the lines of text and down that column of text in some meaningful manner, typically utilizing any grammatical markers present such as conjunctions, prepositions, or punctuation. If no obvious pattern presents itself, then assign these values according to approximately equal spacing of the words. In some cases where the first word of any line on the precise indicia table following the first word of the first sentence variable falls within this range, it is useful to employ the exact percentage value on that line of the table (there will be only one) for that word and continue assigning values from there. If the first and last word column percentages differ by 1, all words following the first word of the last sentence variable are assigned the column percentage value of the last word column percentage value. The result of any such interpolation from this heuristic is stored into a desired word column percentage number variable.

Following completion of the column overflow heuristic (1350), the compressed index number's percentage number is assigned the value of the desired word column percentage number variable (1352). It is then determined if the index modifier variable contains the value of "column overflow modifier" (1354). If the response to the determination at step (1354) is negative, it is then determined if the desired word column percentage number is on a line before that self-same column percentage in the precise indicia table (1356). A positive response to the determination at step (1356) is following by assigning the value of "revise downward modifier" to the index modifier variable (1358). However, a negative response is followed by determining if the desired word column percentage number is on the same line as the self-same column percentage in the precise indicia table and also if the desired word column percentage number is also an exact percentage number on that same line (1360). A positive response to the determination at step (1360) is following by assigning the value of "anchored number modifier" to the index modifier variable (1362). However, a negative response to the determination at step (1360) is following by determining if the desired word column percentage number is on a line after the same-same column percentage in the precise indicia table (1364). A positive response is following by assigning the value of "revised upward modifier" to the index modifier variable (1366). However, a negative response to the determination at step (1364) is followed by determining if this word, or in one embodiment some other feature, is the first word or feature on the first line at the beginning of the column of the scroll (1368). A negative response to the determination at step (1368), a positive response to step (1354), or following any one of steps (1358), (1362), or (1366), is followed by assigning the value of the index modifier to the compressed index number's modifier variable (1376).

If the response to the determination at step (1368) is positive, then it is determined if the scroll archetype rules demand that this word or feature at the beginning of the first line be defined as a column percentage value of zero (1370). A positive response to the determination at step (1370) is followed by assigning the column underflow modifier value to the index modifier variable (1372), and assigning the value of zero to the compressed index number's percentage number (1374). Following a negative response to the determination at step (1370) or following step (1374), the process returns to the functionality of step (1376) as described above. Thereafter or following step (1328), the compressed index number is recorded as the result in the compressed feature index number (1378). Accordingly, the process shown herein demonstrates calculation of the modifier value.

Referring to FIG. 14, a flow chart (1400) is provided illustrating a process for making minute adjustments that consider indicia proximity and density of localized special cases using a localization heuristic. Adjustments may be made to all three parts of the feature index number to provide a clear and succinct roster of indicia in localized areas of the scroll. In one embodiment, the process shown herein is referred to as a localization heuristic. An intermediate index number with the column number, column percentage, and modifier, if any, are received or presented as input (1402). It is then determined if minor adjustments to the column percentage and/or modifier would produce a more succinct index number given the proximity and density of other indicia in this location in the scroll (1404). A negative response to the determination at step (1404) is indicative that no change to the original intermediate index number is required or suggested (1406), at which point this original intermediate index number is recorded as the result (1410) and the process ends. However, a positive response to the determination at step (1404) initiates the localization heuristic (1408), and the results of the heuristic are then recorded (1410).

The localization heuristic of step (1408) is an empirical step based solely on the user's judgment. When there are a large number of indicia in a small region of the scroll, the bland index numbering mechanism (i.e., without a modifier or perhaps a revised column percentage or even a revised column number) will produce an identical column percentage for many of them. However, sometimes but not always there may be a few unused column percentages nearby that could be co-opted and pressed into service to express this indicium with a unique column percentage value instead of using the same column percentage value of a nearby indicium. On the other hand, adding a "revise upward modifier" or a "revise downward modifier" may make a better distinction to a feature index number than currently is expressed with the bland feature index number and a normal "no modifier" condition. Feature index numbers that already have a modifier attached may not use this approach but must revise the column percentage instead. In certain extreme cases where there are conflicting requirements between the scribal tradition and the feature index mechanism, it may become necessary to revise not only the column percentage but also the modifier and even the column number itself to resolve that conflict, even if it means getting that feature index number out of order with the normally monotonic increase of the column number and the column percentage of the sequence of index numbers in the overall index. Any such conflict must be fully explained in the index as to why this exception was permitted. In one embodiment, conditions of this nature do arise and are handled in this empirical fashion, including occasional out-of-order index entries.

Word Index Part

Figure 15:
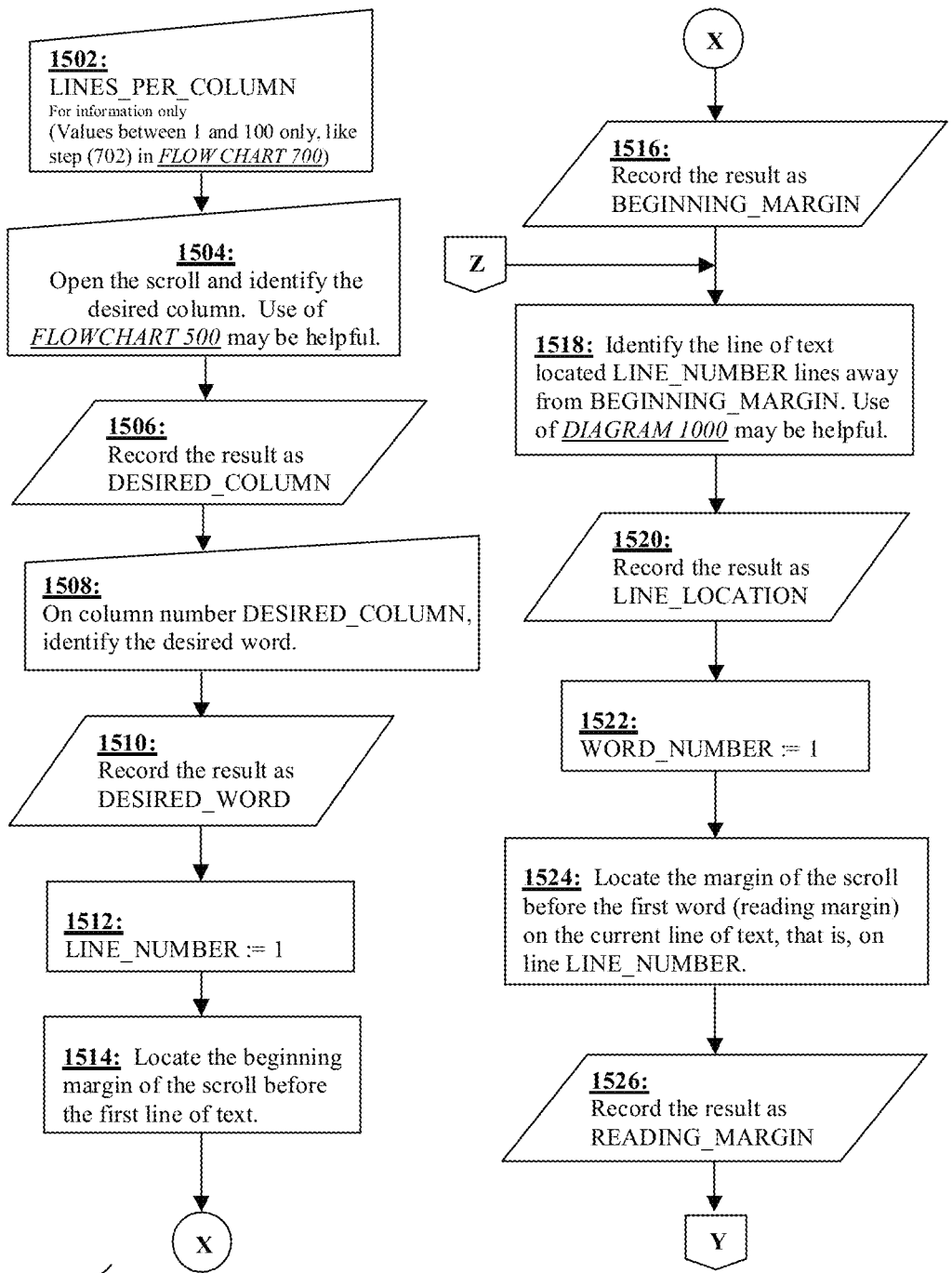
FIG. 15 depicts a flow chart illustrating a process for identifying an index of one specific word or feature on a scroll when measurement of indicia uses either the raw form of "absolute" numbering or the revised form of "compressible" numbering.
Figure 15:
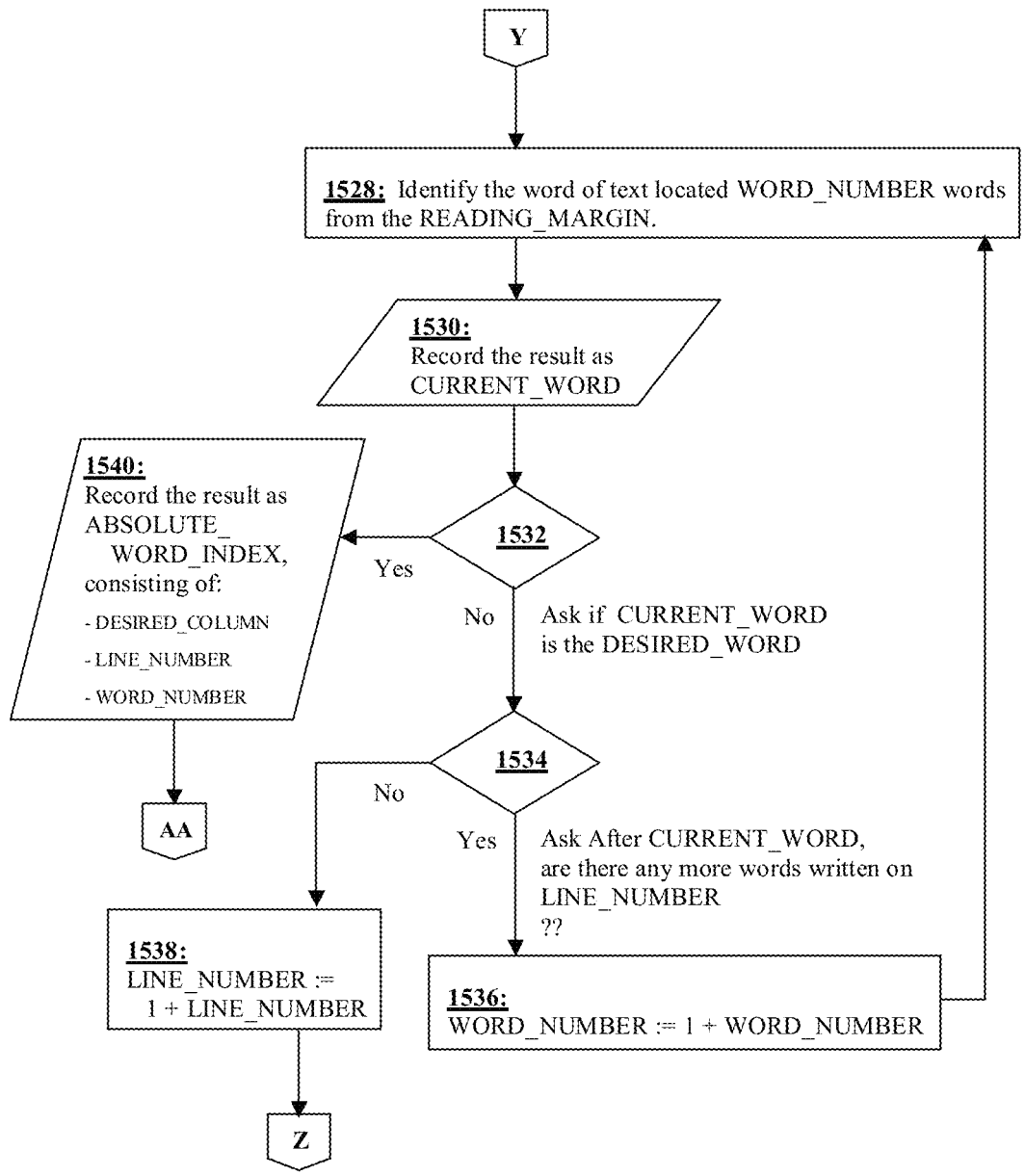
Figure 15:
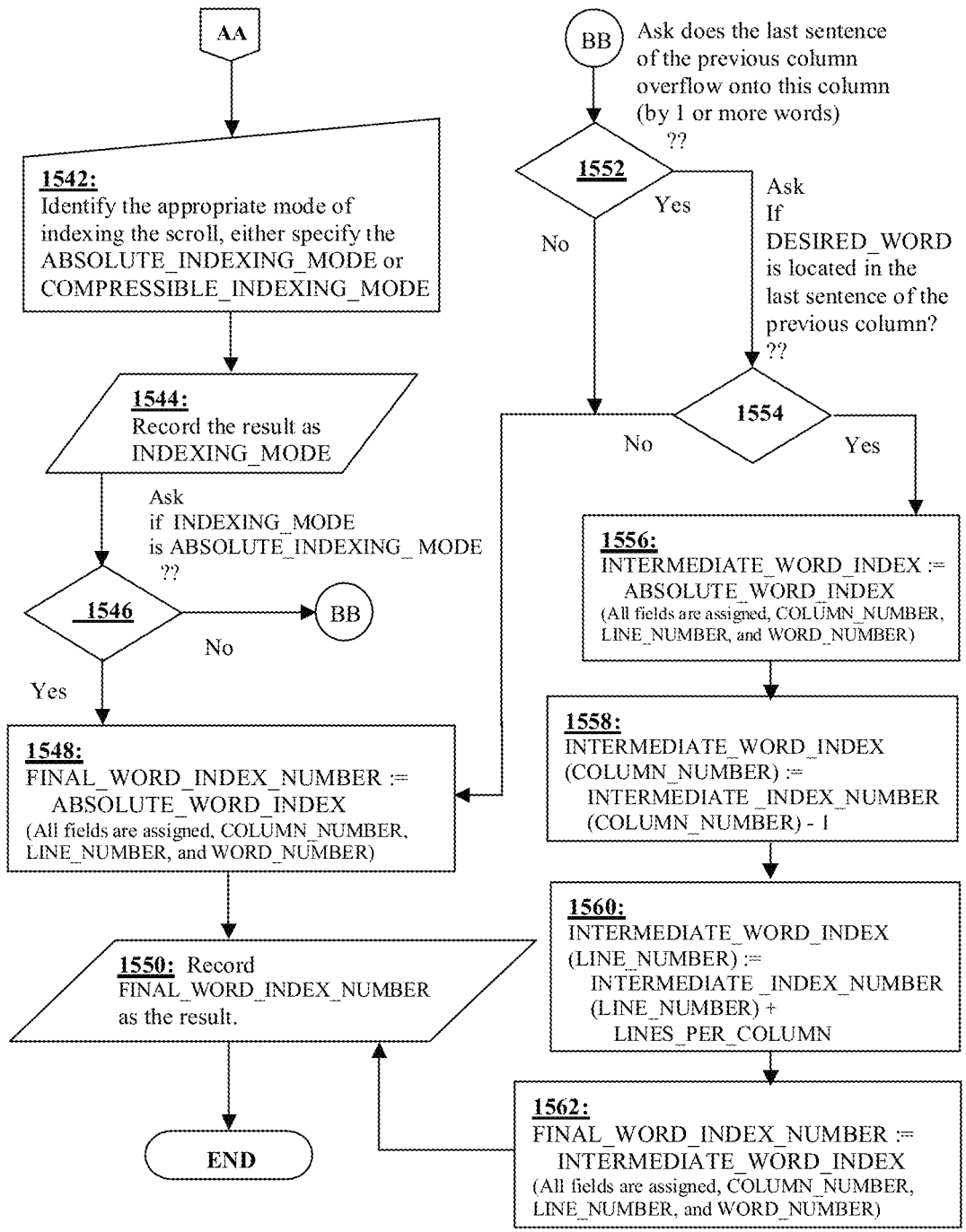
Figure 16:
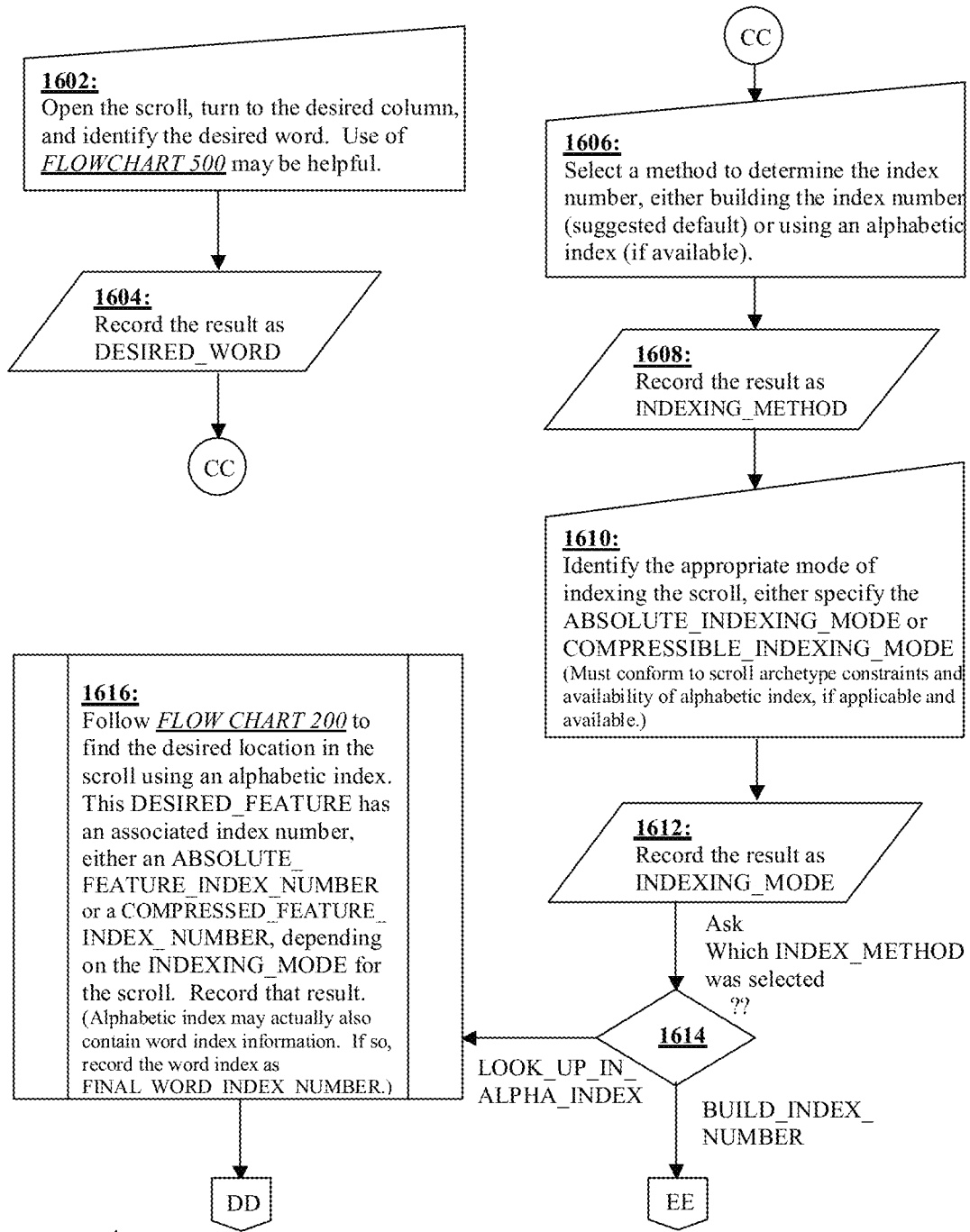
FIG. 16 depicts a flow chart illustrating a process for combining two types of index numbers that occur on a single word.
Figure 16:
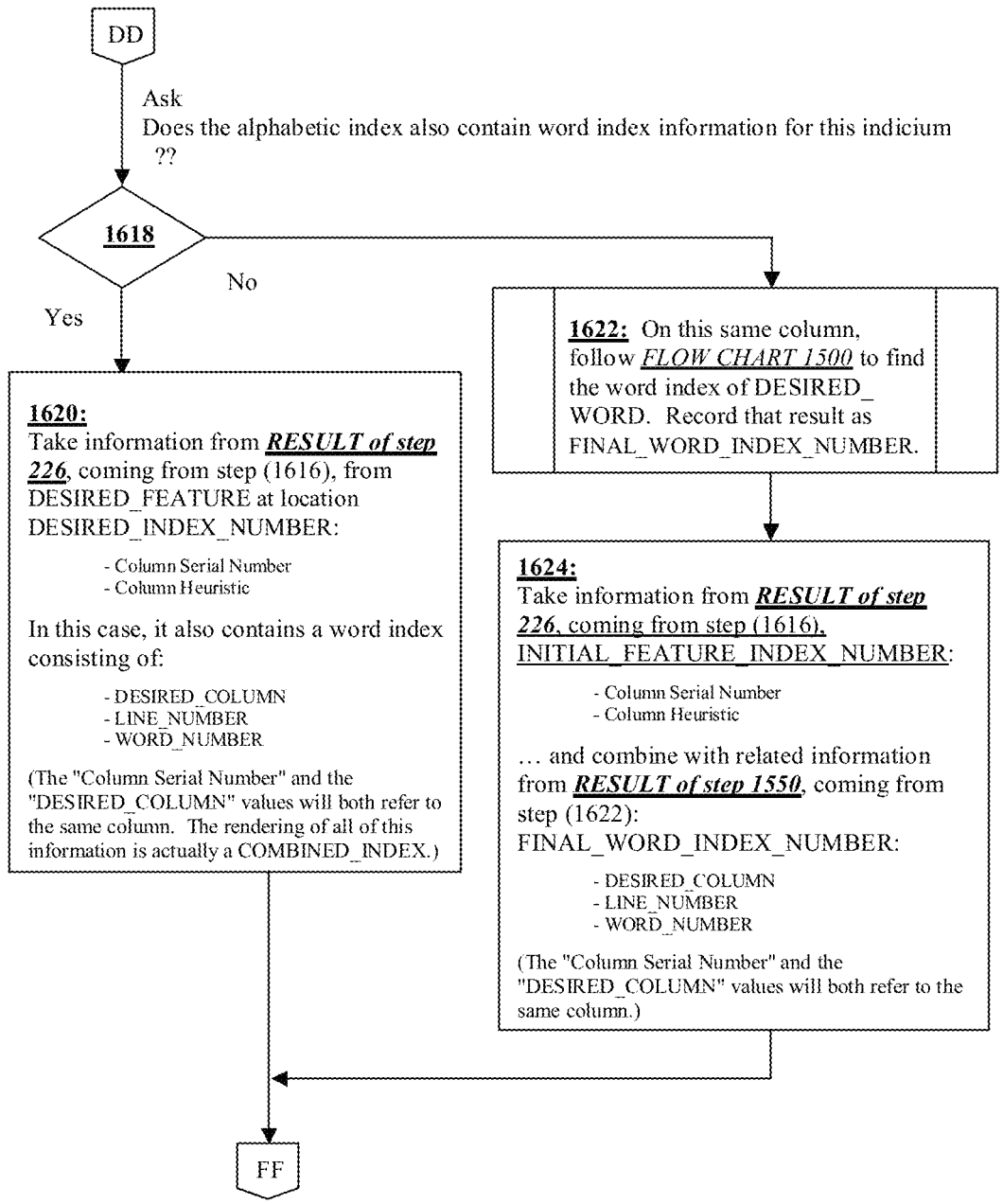
Figure 16:
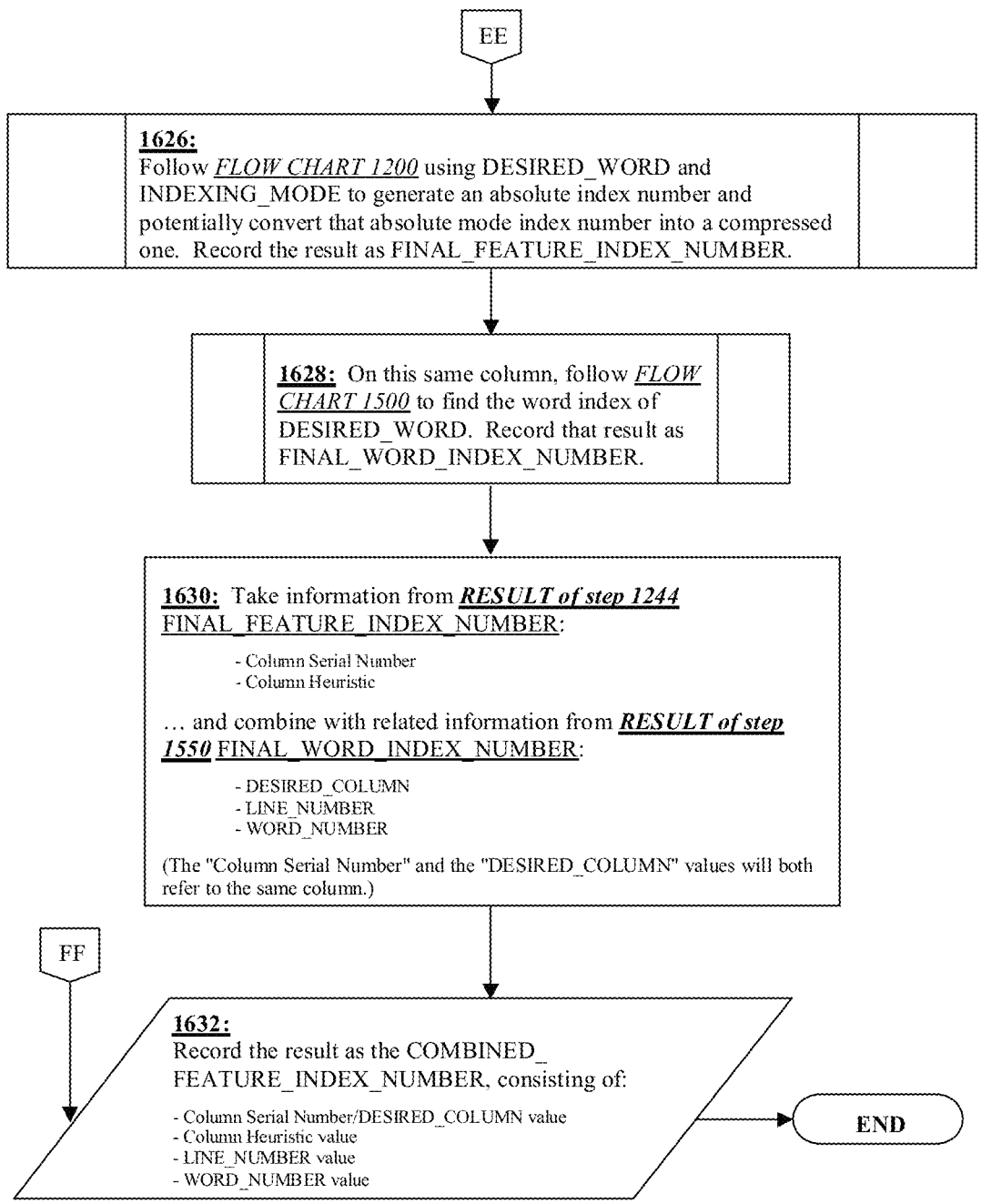

The flow charts of FIG. 15 and FIG. 16 show how to build up a word index for an indicium, see FIG. 15, and combine it with a standard mode feature index number or a precise mode feature index number with either absolute or compressible numbering to product a composite form, see FIG. 16, showing all elements of both the word index and the feature index number. Referring to FIG. 15, a flow chart (1500) is provided illustrating a process for identifying an index of one specific word or feature on a scroll when measurement of indicia uses either the raw form of "absolute" numbering or the revised form of "compressible" numbering. This index number is called a word index number. In one embodiment, it consists of a column number in the scroll, a line number on the column, and a word number on the line. The lines per column for the scroll are identified (1502) and the scroll is opened to the desired column (1504). In one embodiment, use of the process demonstrated in FIG. 5 may be utilized. This result is recorded as the desired column (1506). The desired word on the desired column is identified (1508), and the result is recorded as the desired word (1510). The line number variable is initialized to line one (1512), and the beginning margin of the scroll before the first line of text is located (1514) and recorded as the beginning margin (1516). The line of text is identified that is located at line number (of lines) away from the beginning margin as found in line number (1518) and recorded as the line location (1520). If the technique described in FIG. 10 or an equivalent procedure is followed, the line number will be set to the value measured in step (1518) and will shorten the number of steps required to complete the method because step (1534) will never be answered in the negative since the correct line number for the desired word is known from this point forward and step (1532) will be answered in the positive at some point on the current line of text. Therefore, step (1538) will never be used. In other words, use of the technique described in FIG. 10 has the effect as if step (1512) were to set to the line number variable not to a value of 1 but to a value as measured with the technique described in FIG. 10 or an equivalent procedure—skipping the iteration at step (1534), incrementing the line number variable (1538), and repeating from step (1518). The line number variable was set to the proper line the first time through the loop of step (1518) through step (1538).

Following step (1520), the word number is initialized to an integer value of one (1522), and the reading margin of the scroll before the first word on the current line of text is located (1524) and recorded as the reading margin (1526). Thereafter, the text located at the current word number is identified (1528) and recorded as the current word (1530). It is then determined if the current word is the desired word (1532). A positive response to the determination is followed by recording the result as the absolute word index number, which consists of the desired column, the line number, and the word number (1540). However, a negative response to the determination is followed by determining if there are any more words written on the line number (1534). A positive response is followed by incrementing the word number by an integer of one (1536) and a return to step (1528). However, a negative response is following by an increment of the line number by an integer value of one (1538) followed by a return to step (1518).

Following step (1540), the appropriate mode of indexing the scroll is identified (1542). In one embodiment, the modes include the "absolute indexing mode" and the "compressible indexing mode". The result of the identification is recorded as the indexing mode (1544). It is then determined if the result is the "absolute indexing mode" (1546). If the sub-mode is the absolute sub-mode, then the final word index number is assigned to the value of the absolute word index number (1548), including its column number, line number, and work number. Then the final word index number is recorded (1550) and the method is complete. However, if at step (1546) it is determined that the mode is not the absolute sub-mode, that is, the sub-mode is the compressible sub-mode, then it is determined if the last sentence of the previous column overflows onto this column by one or more words (1552). A negative response to the determination at step (1552) is followed by a return to step (1548). However, a positive response to the determination at step (1552) is followed by determining if the desired word is located in the last sentence of the previous column (1554). Similar to the determination at step (1552), a negative response is followed by a return to step (1548). However, a positive response to the determination at step (1554) is followed by assigning the intermediate word index the value of the absolute word index number (1556), decreasing the intermediate word index's column number by one (1558), and assigning the intermediate word index's line number variable to the summation of the intermediate index number's line number variable plus the lines per column variable (1560). The final word index number is assigned the value of the intermediate word index variable (1562), including all three fields, the column number, line number, and word number, followed by a return to step (1550) for recordation. Accordingly, a word index number may be constructed, consisting of a column number, a line number, and a word number.

This word index number may either constructed using an absolute indexing mode or a compressible indexing mode. Therefore, while the feature index number in standard mode provides an approximation of the feature within the scroll, the word index number is more closely related to the precise mode indexing of the feature index number as it provides a measurement based on a particular line number for each word. Furthermore, the word index number mechanism is even more accurate than the precise mode indexing because each word position is exact in the former where there are both exact and inexact numbers in the latter.

Combined Index Part

Referring to FIG. 16, a flow chart (1600) is provided illustrating a process for combining two types of index numbers that occur on a single word. It joins a feature index number for a word or other interesting feature on the scroll with the associated word index for the same feature on the same scroll to form a composite index number representing both categories of indexing. This index number is called a combined index number. The first type of index number is the feature index number as generated in either FIG. 1 or FIG. 12. The second type of index number is the word index number as generated in FIG. 15. The resulting conflation of these two values is a combined index number. As shown, the scroll is opened and positioned to the desired column, wherein the desired word is identified (1602). In one embodiment, use of the process demonstrated in FIG. 5 may be utilized. The result of the identification at step (1602) is recorded at step (1604). A method to determine the index number is selected (1606). The method either builds the index number from the position in the scroll itself or employs an existing alphabetic feature index to look up an existing feature index number. The selected method is recorded as the indexing method (1608). The appropriate mode of indexing the scroll is then identified (1610) and recorded (1612). The mode is selected from either the "absolute indexing mode" or the "compressible indexing mode". Following the selections, the selected indexing method is determined (1614), and more specifically, if the index look-up is the existing alphabetic feature index or to build the index number from the position in the scroll. If the look-up is the existing alphabetic feature index, then the process shown and described in FIG. 2 is followed to find the desired location in the scroll. This has an associated feature index number represented as either the absolute feature index number of the compressed feature index number depending on the indexing mode for the scroll. The result is recorded (1616).

Following the recordation at step (1616), it is then determined if the existing alphabetic feature index also contains word index information for this indicium (1618). A positive determination results in step (1620), which uses the result of step (226), when FIG. 2 is referenced in step (1616), containing the five components of a column serial number, column heuristic, desired column number, line number, and word number and puts them into step (1626). However, a negative determination is following by a return to the process shown and described in FIG. 15 on this same column to find the word index of the desired word and to record the result (1622). Thereafter, the information from the result at step (226), when FIG. 2 is referenced in step (1616), is combined with related information from step (1550), when FIG. 15 is referenced in step (1622). This combined result at step (1624), just like step (1620), contains the five components of a column serial number, column heuristic, desired column number, line number, and word number and puts them into step (1626). Continuing from both step (1620) and (1624), FIG. 12 is referenced at step (1626) using the desired word and indexing mode to generate an absolute index number and potentially convert that absolute index number into a compressed index number. Then on this same column, FIG. 15 is referenced at step (1628) to find the word index of the desired word. This result is recorded as the final word index number variable. The results of step (1626) and of step (1628) are combined at step (1630), which contains the five components of a column serial number, column heuristic, desired column number, line number, and word number and puts them into step (1632), where the combination is stored as the combined index number variable. Accordingly, a feature index number and a word index number are conflated into a combined index number.

Building Index Tables for Index Types: Feature, Word, Combined

Figure 17:
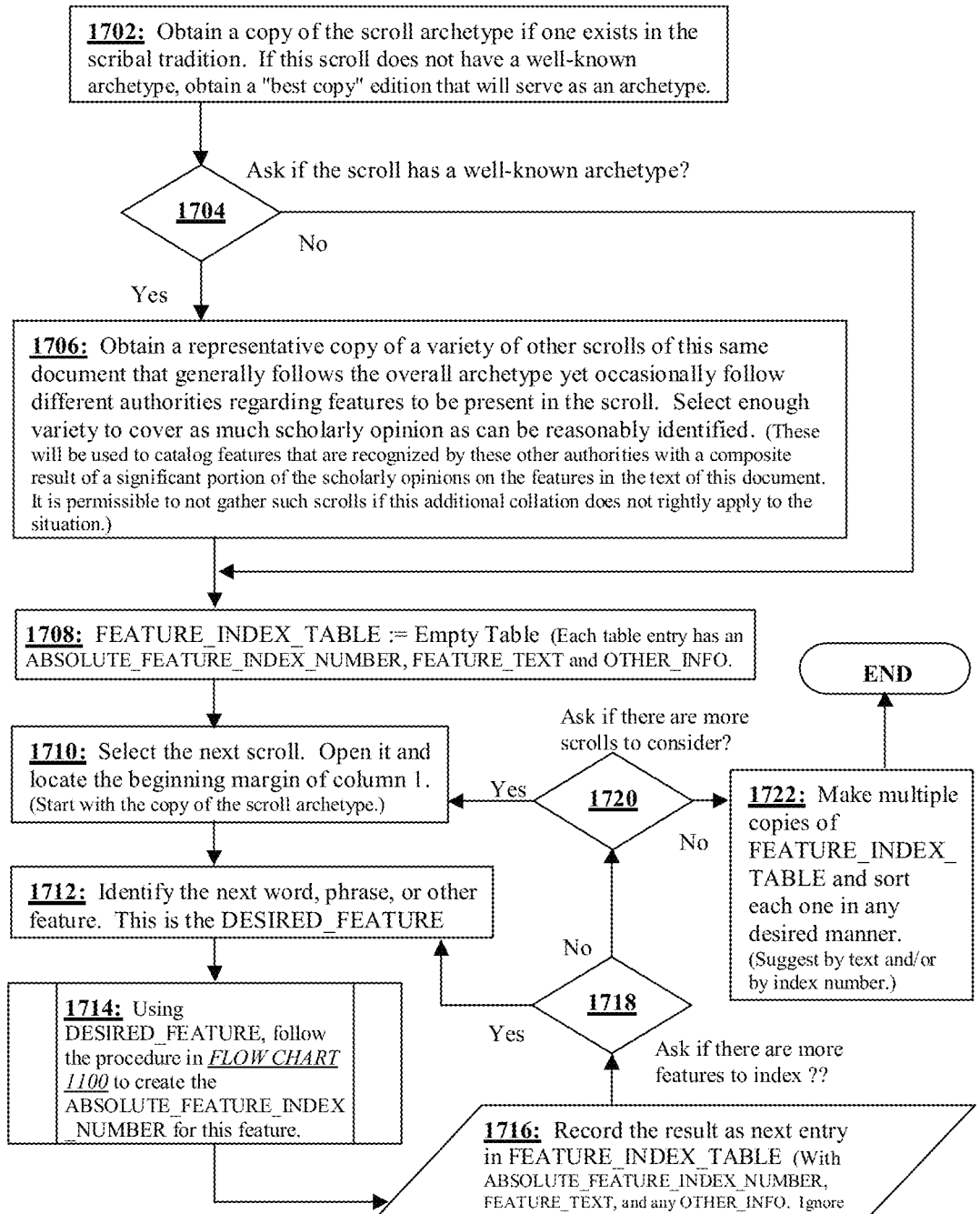
FIG. 17 depicts a flow chart illustrating for building up a feature index table of multiple absolute feature index entries.
Figure 18:
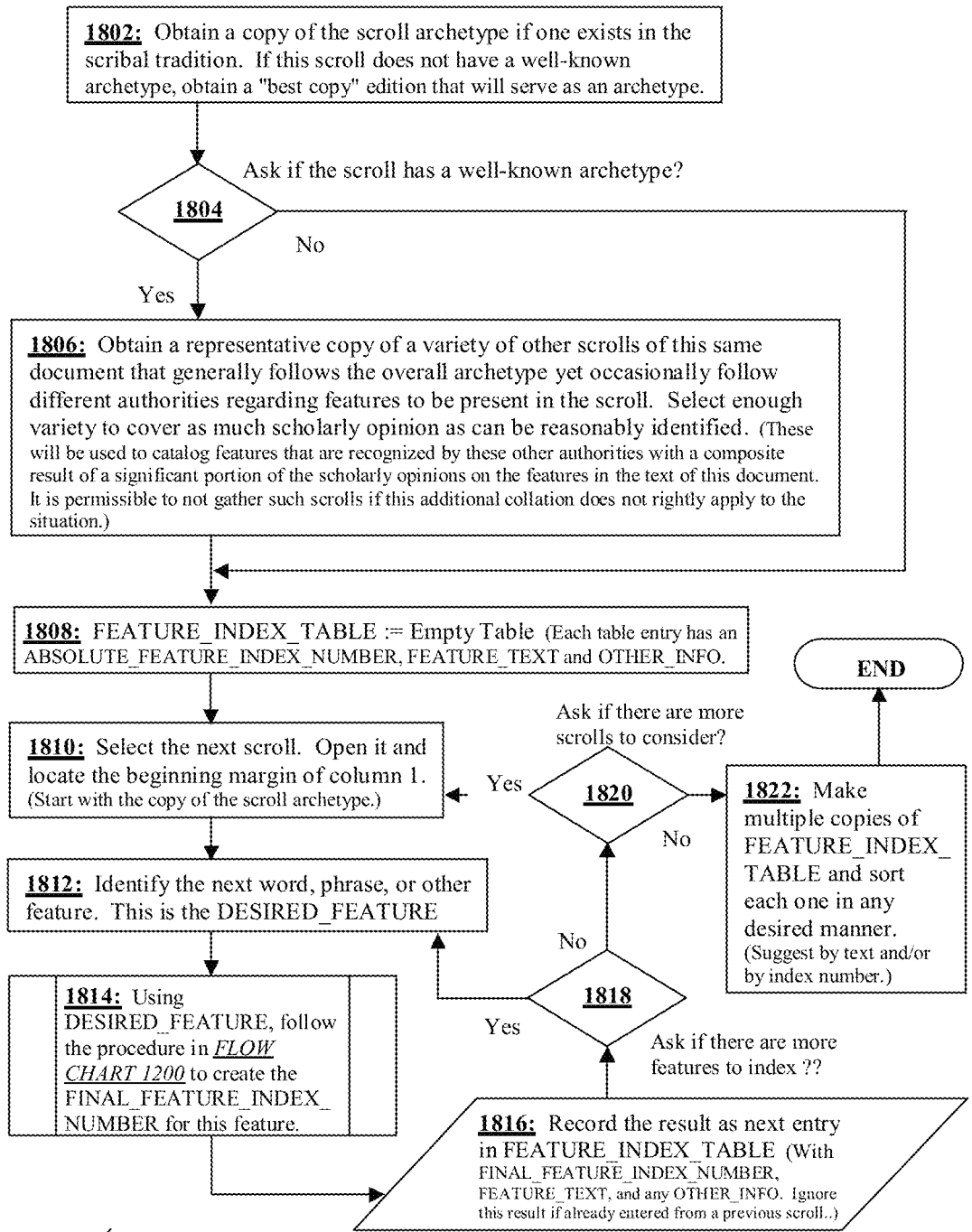
FIG. 18 depicts a flow chart illustrating a process for building up a feature index table of multiple compressed feature index entries.
Figure 19:
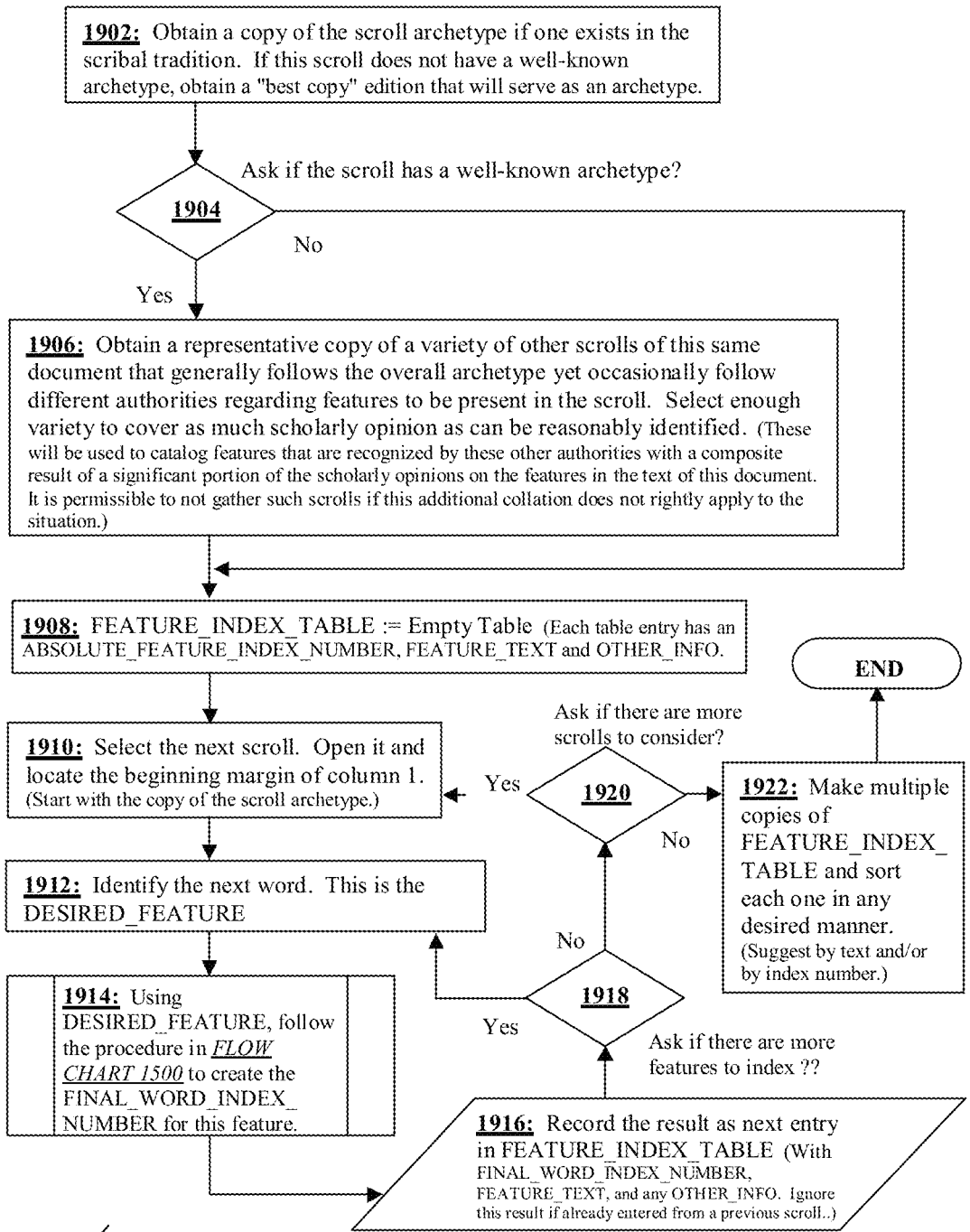
FIG. 19 depicts a flow chart illustrating a process for building up a word index table of multiple absolute or compressed word index entries.
Figure 20:
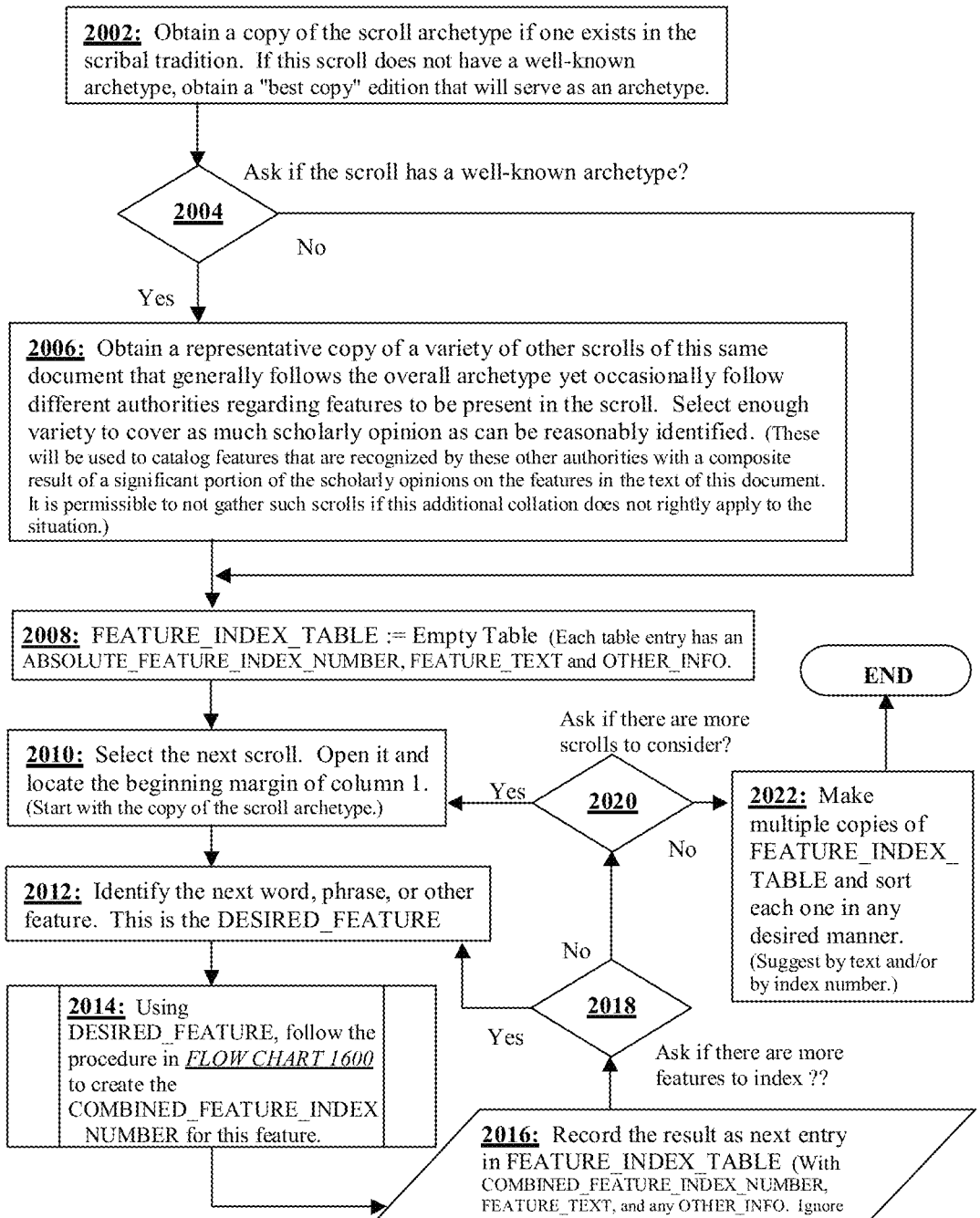
FIG. 20 depicts a flow chart illustrating a process for building up a combined index table of multiple absolute or compressed combined index entries.

FIG. 17, FIG. 18, FIG. 19, and FIG. 20 are flow charts illustrating processes for building up index tables of several categories of index numbers, respectively: FIG. 17, a standard mode absolute feature index table or a precise mode absolute feature index table; FIG. 18, a precise mode compressed feature index table; FIG. 19, an absolute word index table or a compressed word index table; FIG. 20, a precise mode absolute combined index table or a precise mode compressed combined index table. All such tables consist of multiple index entries of the types of index numbers shown respectively in FIG. 11, FIG. 12, FIG. 15, and FIG. 16. Referring to FIG. 17, a flow chart (1700) is provided illustrating a process for building up a feature index table of multiple absolute feature index entries. Each resulting entry is an entry in a feature index table, see step (1716). As shown, a copy of the scroll archetype is obtained, if it exists (1702). In one embodiment, the scroll may not be a well-known type so a "best copy" identification may serve as the archetype. In such case, the generated index table will effectively map directly and uniquely to the selected scroll and may differ significantly from other scrolls of the same document because of a lack of standardization in the scribal school(s) that created each of them. Following the identification at step (1702), it is determined if the identification of the scroll type is well known (1704). If the scroll type is well known, then a representative copy of a variety of other scrolls of this same scroll type are identified and gathered for examination (1706). Scrolls that are of the same variety generally follow an overall archetype, although in one embodiment, any particular scroll may occasionally follow one or more different authorities regarding the precise set of features present in the scroll. Once the inventory of scrolls is established, a feature index table is created and is assigned to be an empty table (1708). Starting with a copy of the scroll archetype or "best copy" of one without an archetype, the scroll is opened, the beginning margin of the first column is located (1710), and the first desired feature is identified (1712). Using the currently identified desired feature, the process outlined and described in FIG. 11 is employed to create an absolute feature index number for each desired feature (1714) and the result is recorded as a next entry in the feature index table (1716). Accordingly, the index table is populated with select features in the scroll.

Following entry in the feature index table at step (1716), it is determined if there are any additional features to be indexed in the current scroll (1718). A positive response to the determination at step (1718) is followed by a return to step (1712) for identification of the next desired word or phrase or other notable item in the scroll. However, a negative response to the determination at step (1718) is an indication that all items for the current scroll have been indexed. The feature index table at this point contains a single cumulative list of the features indexed from all scrolls considered so far. When all scrolls have been considered, the table is complete. It is then determined if there are any more scrolls to be considered for such entries in the feature index table (1720). A positive response to the determination at step (1720) is followed by a return to step (1710) for selection of the next scroll. Conversely, a negative response to the determination at step (1720) is followed by creation of as many copies of the feature index table as desired and sorting them in any useful manner. In a preferred embodiment, the feature index table is sorted by text alphabetically and/or by feature index number of each entry.

Referring to FIG. 18, a flow chart (1800) is provided illustrating a process for building up a feature index table of multiple compressed feature index entries. Each resulting entry is a final feature index number, see step (1816). Similar to FIG. 17, a copy of the scroll archetype is obtained, if it exists (1802). In one embodiment, the scroll may not be a well-known type so a "best copy" identification may serve as the archetype. In such case, the generated index table will effectively map directly and uniquely to the selected scroll and may differ significantly from other scrolls of the same document because of a lack of standardization in the scribal school(s) that created each of them. Following the identification at step (1802), it is determined if the identification of the scroll type is well known (1804). If the scroll type is well known, then a representative copy of a variety of other scrolls of this same scroll type are identified and gathered for examination (1806). Scrolls that are of the same variety generally follow an overall archetype, although in one embodiment, any particular scroll may occasionally follow one or more different authorities regarding the precise set of features present in the scroll. Once the inventory of scrolls is established, a feature index table is created and is assigned to be an empty table (1808). Starting with a copy of the scroll archetype or "best copy" of one without an archetype, the scroll is opened, the beginning margin of the first column is located (1810), and the first desired feature is identified (1812). Using the currently identified desired feature, the process outlined and described in FIG. 12 is employed to create a compress feature index number for each desired feature (1814) and the result is recorded as a next entry in the feature index table (1816). Accordingly, the index table is populated with select features in the scroll.

Following entry in the feature index table at step (1816), it is determined if there are any additional features to be indexed in the current scroll (1818). A positive response to the determination at step (1818) is followed by a return to step (1812) for identification of the next desired word or phrase or other notable item in the scroll. However, a negative response to the determination at step (1818) is an indication that all items for the current scroll have been indexed. The feature index table at this point contains a single cumulative list of the desired items indexed from all scrolls considered so far. When all scrolls have been considered, the table is complete. It is then determined if there are any more scrolls to be considered for such entries in the feature index table (1820). A positive response to the determination at step (1820) is followed by a return to step (1810) for selection of the next scroll. Conversely, a negative response to the determination at step (1820) is followed by creating as many copies of the feature index table as desired and sorting them in any useful manner. In a preferred embodiment, the feature index table is sorted by text alphabetically and/or by feature index number for each entry.

Referring to FIG. 19, a flow chart (1900) is provided illustrating a process for building up a word index table of multiple absolute or compressed word index entries, creating either an absolute word index table or a compressed word index table, respectively. The result is a final word index number, see step (1916). Similar to FIG. 17 and FIG. 18, a copy of the scroll archetype is obtained, if it exists (1902). In one embodiment, the scroll may not be a well-known type so a "best copy" identification may serve as the archetype. In such case, the generated index table will effectively map directly and uniquely to the selected scroll and may differ significantly from other scrolls of the same document because of a lack of standardization in the scribal school(s) that created each of them. Following the identification at step (1902), it is determined if the identification of the scroll type well known (1904). If the scroll type is well known, then a representative copy of a variety of other scrolls of this same scroll type are identified and gathered for examination (1906). Scrolls that are of the same variety generally follow an overall archetype, although in one embodiment, any particular scroll may occasionally follow one or more different authorities regarding the precise set of features present in the scroll. Once the inventory of scrolls is established, a feature index table is created and is assigned to be an empty table (1908). Starting with a copy of the scroll archetype or "best copy" of one without an archetype, the scroll is opened, the beginning margin of the first column is located (1910), and the first desired feature is identified (1912). Using the currently identified desired feature, the process outlined and described in FIG. 15 is employed to create an absolute or compressed word index number for each desired feature (1914), and the result is recorded as a next entry in the word index table (1916). Whether each word index number is absolute mode or compressible mode depends on the indexing mode of the scroll as determined in step (1544). All word index entries in the table will use the same indexing mode. Accordingly, the index table is populated with select words of the scroll.

Following entry in the word index table at step (1916), it is determined if there are any additional features to be indexed in the current scroll (1918). A positive response to the determination at step (1918) is followed by a return to step (1912) for identification of the next desired word in the scroll. However, a negative response to the determination at step (1918) is an indication that all items for the current scroll have been indexed. The word index table at this point contains a single cumulative list of the desired words indexed from all scrolls considered so far. When all scrolls have been considered, the table is complete. It is then determined if there are any more scrolls to be considered for creating a word index table (1920). A positive response to the determination at step (1920) is followed by a return to step (1910) for selection of the next scroll. Conversely, a negative response to the determination at step (1920) is followed by creating as many copies of the word index table as desired and sorting them in any useful manner. In a preferred embodiment, the word index table is sorted by the roster of desired words (primary sort key) followed by the index number for all entries of each word (secondary sort key).

Referring to FIG. 20, a flow chart (2000) is provided illustrating a process for building up a combined index table of multiple absolute or compressed combined index entries, creating either an absolute combined index table or a compressed combined index table, respectively. It is used to create a combined index table containing both the feature index and word index of selected indexed items. This table may employ either absolute indexing mode or compressible index mode, depending on the mode employed by the particular scroll. This mode is selected in step (1206) and in step (1544) and must be the same selection in both places. These steps are part of the method of FIG. 12 and FIG. 15, respectively. Similar to FIG. 17, FIG. 18, and FIG. 19, a copy of the scroll archetype is obtained, if it exists (2002). In one embodiment, the scroll may not be a well-known type so a "best copy" identification may serve as the archetype. In such case, the generated index table will effectively map directly and uniquely to the selected scroll and may differ significantly from other scrolls of the same document because of a lack of standardization in the scribal school(s) that created each of them. Following the identification at step (2002), it is determined if the identification of the scroll type is well known (2004). If the scroll type is well known, then a representative copy of a variety of other scrolls of this same scroll type are identified and gathered for examination (2006). Scrolls that are of the same variety generally follow an overall archetype, although in one embodiment, any particular scroll may occasionally follow one or more different authorities regarding the precise set of features present in the scroll. Once the inventory of scrolls is established, a feature index table is created and is assigned to be an empty table (2008). Starting with a copy of the scroll archetype or "best copy" of one without an archetype, the scroll is opened, the beginning margin of the first column is located (2010), and the first desired feature is identified (2012). Using the currently identified desired feature, the process outlined and described in FIG. 16 is employed to create a combined index number for each desired feature (2014), and the result is recorded as a next entry in the feature index table (2016). Accordingly, the index table is populated with the combined index entry of select features of the scroll.

Following entry in the feature index table at step (2016), it is determined if there are any additional features to be indexed in the current scroll (2018). A positive response to the determination at step (2018) is followed by a return to step (2012) for identification of the next desired word or phrase or other notable item in the scroll. However, a negative response to the determination at step (2018) is an indication that all items for the current scroll have been indexed. The feature index table at this point contains a single cumulative list of the desired items indexed from all scrolls considered so far. When all scrolls have been considered, the table is complete. It is then determined if there are any more scrolls to be considered for such entries in the feature index table (2020). A positive response to the determination at step (2020) is followed by a return to step (2010) for selection of the next scroll. Conversely, a negative response to the determination at step (2020) is followed by creating as many copies of the feature index table as desired and sorting them in any useful manner. In a preferred embodiment, the feature index table is sorted by text alphabetically and/or by combined index number for each entry.

Section Index Part

Figure 21:
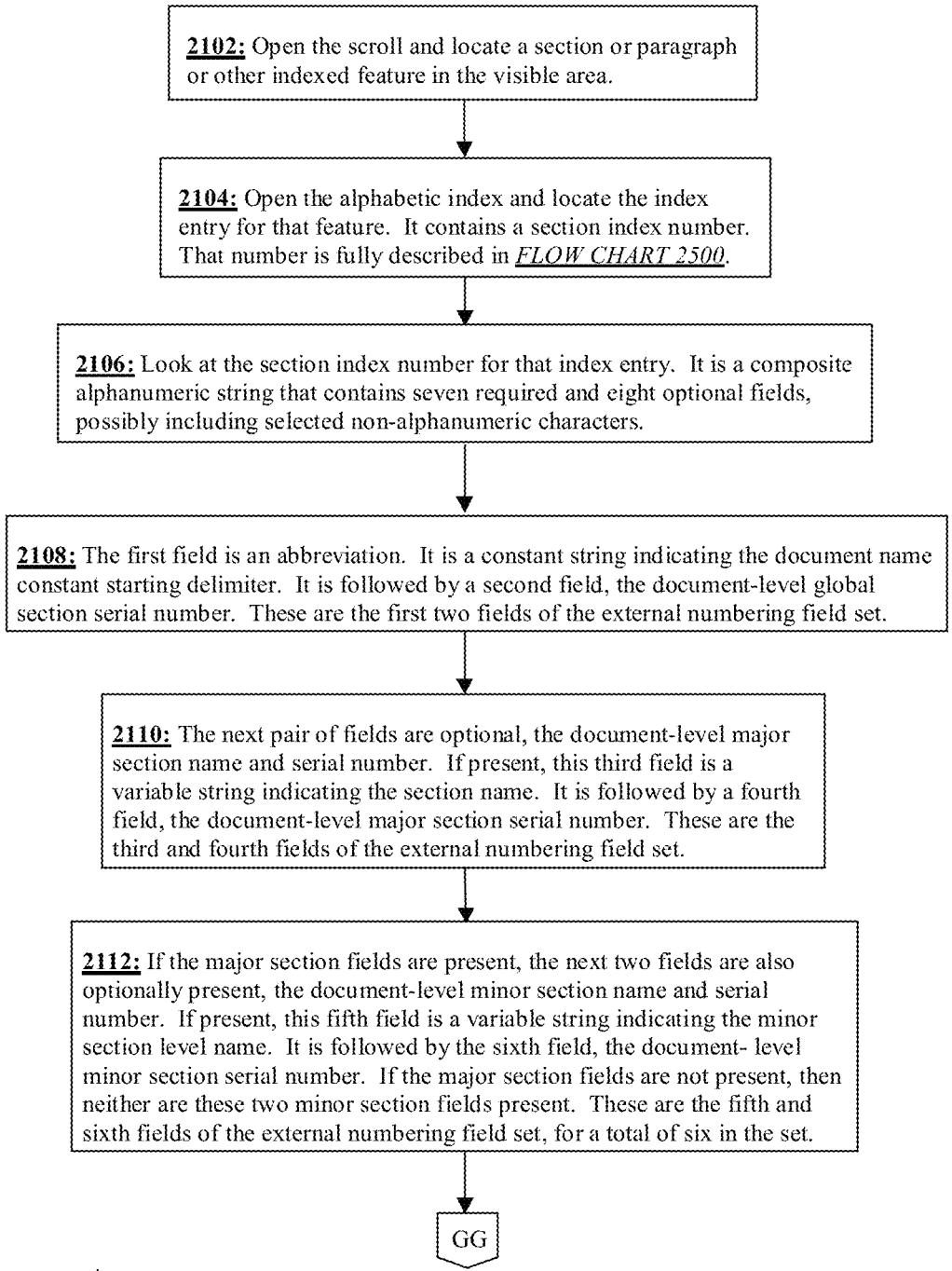
FIG. 21 depicts a flow chart illustrating a process for ascertaining a current or initial position of a section break within the scroll using alphabetic features of the text at section breaks.

The flow charts of FIG. 21, FIG. 22, FIG. 23, and FIG. 24 describe a method for indexing the paragraphs and sections of text of a scroll. Referring to FIG. 21, a flow chart (2100) is provided illustrating a process for ascertaining a current or initial position of a section break within the scroll using alphabetic features of the text at section breaks. It is structurally similar to FIG. 1, which does the same thing for more general features such as words and phrases. As shown in FIG. 21, this number is related to the feature index number and the word index number in that it uses the column number of the scroll. However, its purpose is not to identify generic features or individual words but to specifically identify section breaks such as paragraphs, internal subject matter changes, breaks between columns of text, etc. As such, the purpose of a section index is closely related to the other index number types but has its unique place and contribution toward indexing a scroll. The section index number of the current location in the scroll is identified or perhaps instead that of a location close by if the current section is lengthy. Its rationale is similar to that of identifying a feature index number at the current location in the scroll after the same manner of FIG. 1, but using an existing alphabetic feature index, which contains section index numbers as cross-index items, or an existing alphabetic section index.

As shown, the scroll is opened and a section, paragraph, or other indexed feature is located in a visible area of the opened scroll (2102). In addition, the alphabetic section index associated with the scroll is opened and the section index entry for the located feature is ascertained (2104). That index entry includes a section index number, which is described and discussed in detail in FIG. 25. The section index number for that index entry is reviewed (2106). The section index number is a composite alphanumeric character string that contains a plurality of fields. In one embodiment, there are seven required fields and eight optional fields, and a maximum of fifteen fields, although the quantity or relative ordering of fields should not be considered limiting. In one embodiment, the first seven fields of the section index number are collectively known as an external numbering field set. In one embodiment, the first field is an abbreviation. It is a constant character string containing or representing the document name and acting as a starting delimiter for the whole index number expression. In one embodiment, the second field is the document-level global section serial number (2108). Accordingly, the first and second fields are also referred to herein as a first pair, and pertain to identification of the document.

The second pair of fields pertains to the document-level major section name and serial number (2110). If present, this second pair contains two fields, the first of which is a variable character string indicating the section name and it is followed by a fourth field referred to as a document-level major section serial number. Based on the presence of the fields in step (2110), a third pair of fields may be present, containing the fifth and sixth fields (2112). The fifth field is a variable character string indicating the minor section level name and is followed by a sixth field pertaining to the document-level minor section serial number. These are the six fields of the external numbering field set of one embodiment. Accordingly, the feature index number for each indexed entry includes a set of required fields and several optional fields.

In one embodiment, the remaining nine fields in the feature index number are collectively known as the internal numbering field set. Of these nine, the first four are optional (2114). In one embodiment, a first field contains a constant character string that is a divider between the last employed field of the external numbering field set and the first employed field of the internal numbering field set, which in one embodiment is either a section break type (if used, the second field), a non-conforming scroll column-level section sub-serial number (if used, the fourth field), or a column-level section serial number and its delimiter (otherwise, the sixth and fifth fields, respectively, noting that the fifth field, while mandatory, may in one embodiment actually consist of an empty or null string and thus appear to be missing). A second field is optional and contains a variable character string indicating a section break type.

In one embodiment, depending on the scroll archetype, a non-conforming scroll column-level section sub-serial number field, a fourth field of the internal numbering field set, may be employed (2114). If employed, it may also employ an optional non-conforming scroll column-level section sub-serial number delimiter, a third field, as a divider between the second and fourth fields if readability and distinction between these fields is improved. This is typically required if two otherwise adjacent fields contain numeric representation in the same style (such as Arabic numerals, 1/2/3; Roman numerals, I/II/III, i/ii/iii; alphabetics, A/B/C, a/b/c; or the like). By this delimiter, characters in these two fields are divided and not conflated together.

In one embodiment, from this point to the end of the internal numbering field set of the section index number expression, all fields are considered mandatory. A fifth field contains a variable character string indicating a column-level section serial number delimiter (2116), a divider between any previous field and a sixth field. While mandatory, this field may in one embodiment actually consist of an empty or null string and thus appear to be missing. A sixth field contains a column-level section serial number (2116). If that number is zero (0), then the indicated location is not actually a section break but a continuation of the final section of the previous column of the scroll. The first actual section break will be then numbered as one (1). A seventh field is a constant non-alphanumeric character string defining a document-level column serial number delimiter (2118), a divider between the sixth field and the eighth field. This character string field variable is always a constant non-alphanumeric character string except when the first word of the section is also the first word of the column, at which time it uses an "anchored number modifier", see FIG. 13, but in one embodiment not necessarily utilizing the exact same character string to express that idea. The eighth field is the column number in the scroll, also referred to as the document-level column serial number field (2118). This column number is determined by the method described in FIG. 5. The ninth and final field in the internal numbering field set is a constant character string called an expression type constant ending delimiter indicating that the entire foregoing expression is an internal field numbering set of a scroll section index number (2120). These are the nine fields of an internal numbering field set. In one embodiment, the relative locations of the column-level section serial number and the non-conforming scroll column-level section sub-serial number may be transposed, along with their respective delimiters, for ease of expression of normative requirements and traditional representation of a particular scroll archetype. In one embodiment, fields from both of the external and internal field sets may be similarly rearranged for purposes of ease of expression for any particular purpose. Details of the generating of all fifteen fields of both field sets are shown and described in FIG. 25. Following step (2120), a composite of the fields is recorded as the initial document section index number (2122). The composite includes the following fields: document name constant starting delimiter, document-level global section serial number, document-level major section name (if present in the scroll archetype), document-level major section serial number (if present in the scroll archetype), document-level minor section name (if present in the scroll archetype), document-level minor section serial number (if present in the scroll archetype), field set delimiter (optional), section break type (optional), non-conforming scroll column-level section sub-serial number delimiter (optional), non-conforming scroll column-level section sub-serial number (optional), column-level section serial number delimiter, column-level section serial number, document-level column serial number delimiter, document-level column serial number, and expression type constant ending delimiter.

Figure 22:
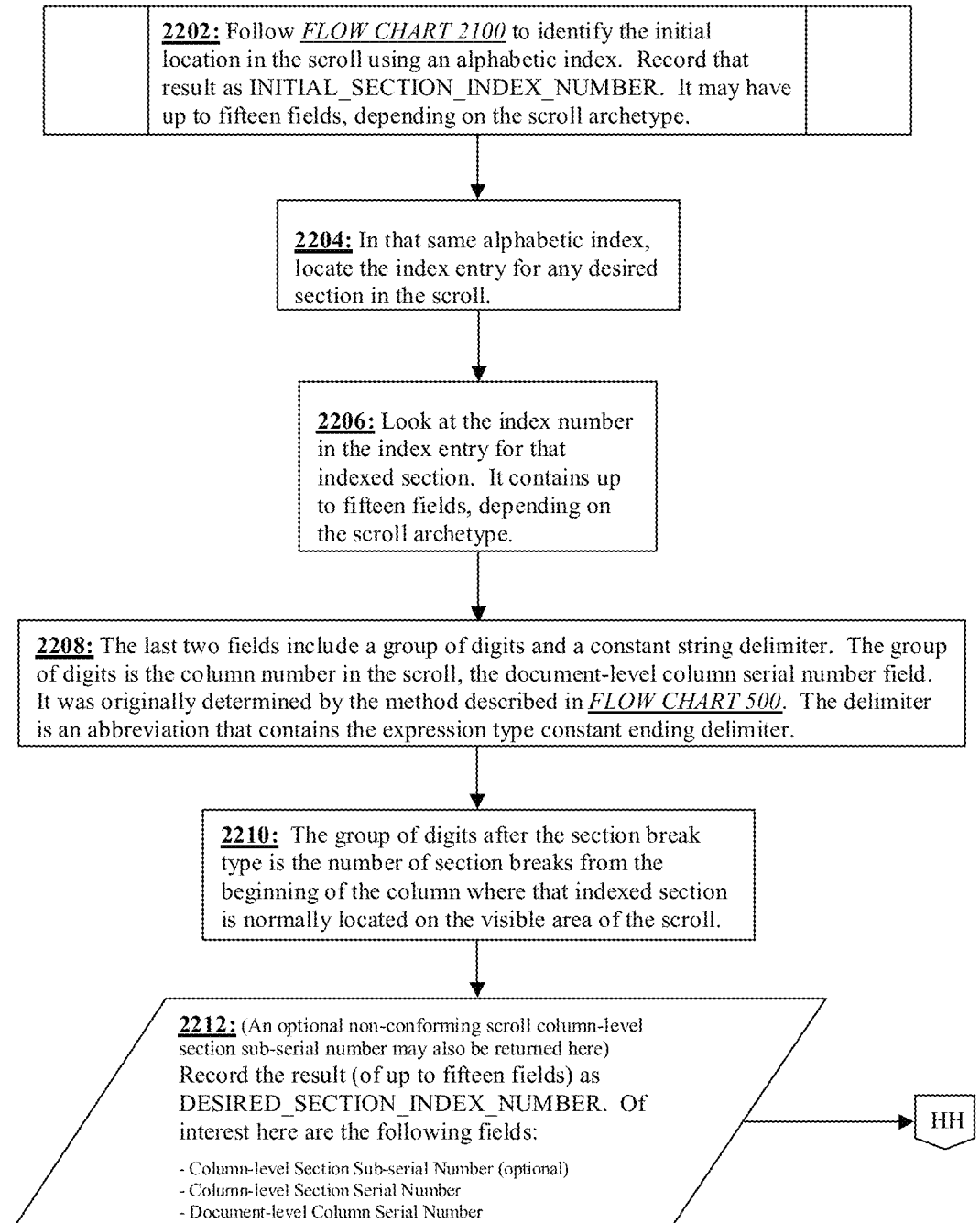
FIG. 22 depicts a flow chart illustrating a process for locating any desired scroll section break from any current section break position using alphabetic features of the text at section breaks.
Figure 22:
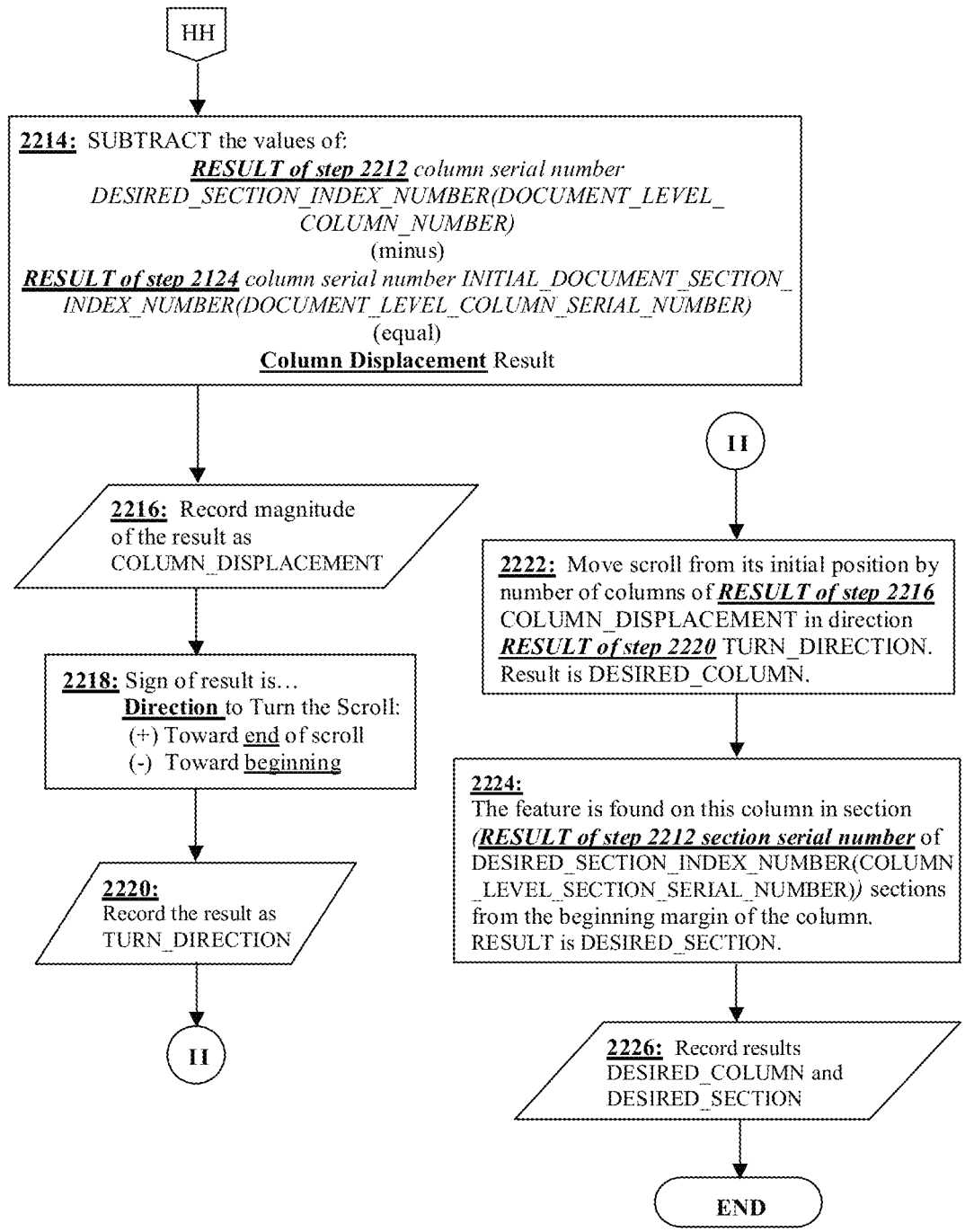

Referring to FIG. 22, a flow chart (2200) is provided illustrating a process for locating any desired scroll section break from any current section break position using alphabetic features of the text at section breaks. It uses the section index number of the indexed section break at the current location in a scroll to navigate to any other section break in that scroll using an alphabetic index of text at section breaks. It is structurally similar to FIG. 2, which does the same thing for more general features such as words of phrases. As shown for FIG. 22, this process is used to identify the section index number of the current location in the scroll (or one close by if the current section is lengthy), and to navigate to an indexed section break at any other location in the scroll. Its rationale is similar to that of using a feature index number at the current location in the scroll and navigating the scroll to any other feature index number as shown in FIG. 2, but using either an existing alphabetic section index or an alphabetic feature index which contains section index numbers as cross-index items.

As shown, the initial location in the scroll is identified using an existing alphabetic section index or an existing alphabetic feature index containing section index numbers as cross-reference items (2202). See the process shown in FIG. 21. The results of the location at step (2202) are recorded as the initial section index number. In one embodiment, the results may have up to fifteen fields, depending on the scroll archetype. In the same alphabetic index, the index entry for any desired location in the scroll is located (2204). Looking at the index entry, there are up to fifteen fields (2206). In one embodiment, there may be a different number of fields depending on the scroll archetype. The last three fields include a group of digits and two constant character string delimiters (2208). The first delimiter is a constant character string separating the numeric field from an earlier numeric field. The group of digits is the column number in the scroll, also referred to herein as the document-level column serial number field. This field was originally determined by the method shown and described in FIG. 5. The second delimiter is an abbreviation that contains the expression type constant ending delimiter. The earlier group of digits before these three fields follows the section break type field. These digits are known as the column-level section serial number and are used to count the number of section breaks from the beginning of the column where that indexed section is normally located on the visible area of the scroll (2210). The result of the fields is recorded as the desired section index number (2212). In one embodiment, the fields that are of interest include the column-level section sub-serial number (optional), column-level section serial number, and the document-level column serial number.

Following the recordation at step (2212), the value of the difference of the document-level column number of the desired section index number and the document-level column serial number of the initial document section index number is assessed (2214), and this assessment is referred to as the column displacement result. The magnitude of the column displacement is recorded (2216). A positive value of the displacement indicates turning the scroll in a first direction, and a negative value indicates turning the scroll in a direction opposite to the first direction (2118), also referred to as a second direction. In one embodiment, the values and the associated directions may be inverted. Following step (2218), the scroll is turned in the direction indicated in the assessment (2220), and the scroll is moved from its initial position (2222) by the number of columns assessed at step (2216) and in the direction determined at step (2220). The feature being sought is found on this column (2224) at the column-level section serial number of the desired section index number. The results are recorded as the desired column and desired section (2226). Accordingly, the assessment and associated value provided a displacement and a direction to find the results.

Figure 23:
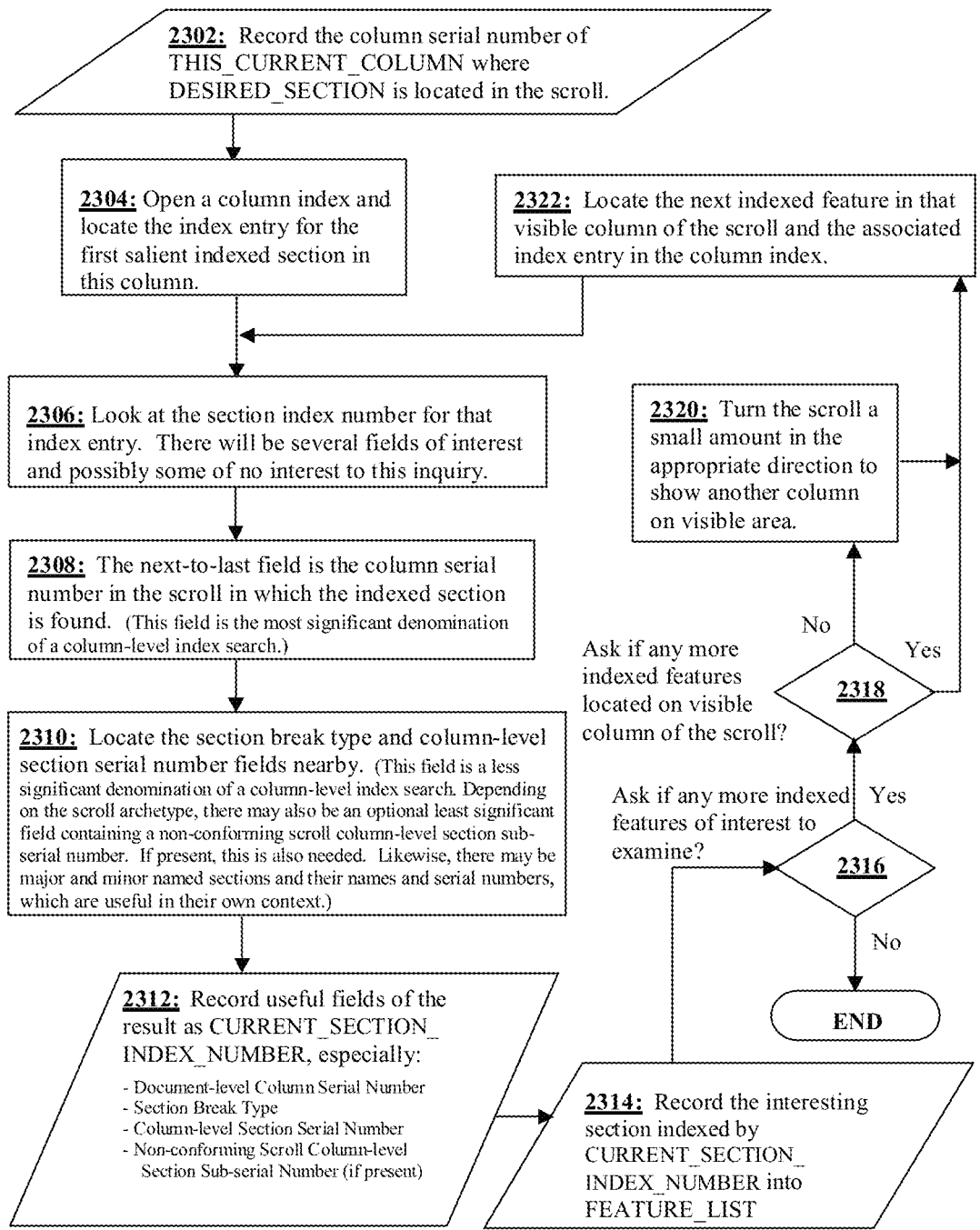
FIG. 23 depicts a flow chart illustrating a process for examining section breaks on a scroll using section index numbers of indexed section breaks in the scroll.

Referring to FIG. 23, a flow chart (2300) is provided illustrating a process for examining section breaks on a scroll using section index numbers of indexed section breaks in the scroll. It uses the section index number of any indexed desired section on this current column of the scroll as a starting point to discover index entries in an existing column feature index or an existing column section index and to iterate through that existing index to discover additional indexed features of interest. It is structurally similar to FIG. 3, which does the same thing for more general features such as words and phrases. As shown, FIG. 23 uses any identified desired section and its section index number from an existing column feature index as a starting point to locate the other entries in that column feature index and on the scroll and proceeds to locate as many other nearby sequentially located sections as desired. Its rationale is similar to that of using a feature index number at the current location in the scroll and discovering any other indexed features located sequentially nearby in both the column feature index and in the scroll in the same manner shown in FIG. 3, but using an existing column feature index, which contains section index numbers as cross-index items, or an existing column section index.

As shown, the column serial number of the current column wherein the desired section is located in the scroll is recorded (2302). An existing column section index or an existing column feature index is opened containing section index numbers as cross-reference items, and the index entry for the indexed desired section in this column is located (2304). In addition, the section index number for that index entry is determined (2306). The next to last field is the column serial number in the scroll in which the indexed section is found (2308). The section break type, column-level section serial number, and possible column-level section sub-serial number are located (2310). The useful fields are recorded as the current section index number (2312). In one embodiment, the useful fields include the document-level column serial number, section break type, column-level section serial number, and the non-conforming scroll column-level section sub-serial number (if present). Thereafter, the section of interest described by this section index number is recorded into the feature list (2314). It is then determined if there are any more indexed features of interest to be examined (2316). A negative response to the determination at step (2316) concludes the examination of indexed features. However, a position response to the determination at step (2316) is followed by determining if there are more indexed features located on the visible column of the scroll (2318). A negative response to the determination at step (2318) is followed by turning the scroll in the appropriate direction so that another column becomes visible (2320). Following the turning at step (2320) or a positive response to the determination at step (2318), the next indexed feature in the visible column of the scroll is located (2322), followed by a return to step (2306). Accordingly, the process shown herein demonstrates recordation of indexed features.

Figure 24:
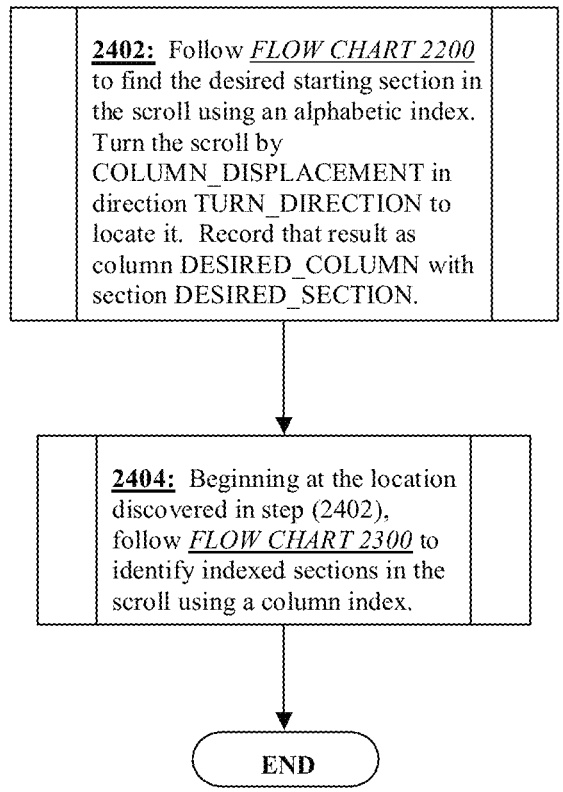
FIG. 24 depicts a flow chart illustrating a process for locating indexed sections at any desired scroll location while starting from any current location in the scroll using a combination of alphabetic features and section index numbers of indexed section breaks.

The processes shown and described in FIGS. 22 and 23 may be combined. Referring to FIG. 24, a flow chart (2400) is provided illustrating a process for locating indexed sections at any desired scroll location while starting from any current location in the scroll using a combination of alphabetic features and section index numbers of indexed section breaks. Specifically, it employs an existing alphabetic index in conjunction with an existing column index. Either of these indexes may be either a section index or a feature index with section index numbers as cross-index items. It is structurally similar to FIG. 4, which does the same thing for more general features such as words and phrases. As shown for FIG. 24, the current position of the scroll is unknown, and the desired position is a range of positions starting at a different location. The process shown in FIG. 22 is followed to find the desired starting location in the scroll using the existing alphabetic feature index, containing section index numbers as cross-index items, or an existing alphabetic section index (2402). The net result from step (2226) is to identify the desired column. Once identified, step (2404) is followed using the process shown in FIG. 23 to identify indexed features in the scroll using either an existing column feature index with section index number cross-index items or using an existing column section index. Accordingly, the processes shown and described in FIG. 22 and FIG. 23 may be combined.

Generating Section Index Numbers

Figure 29:
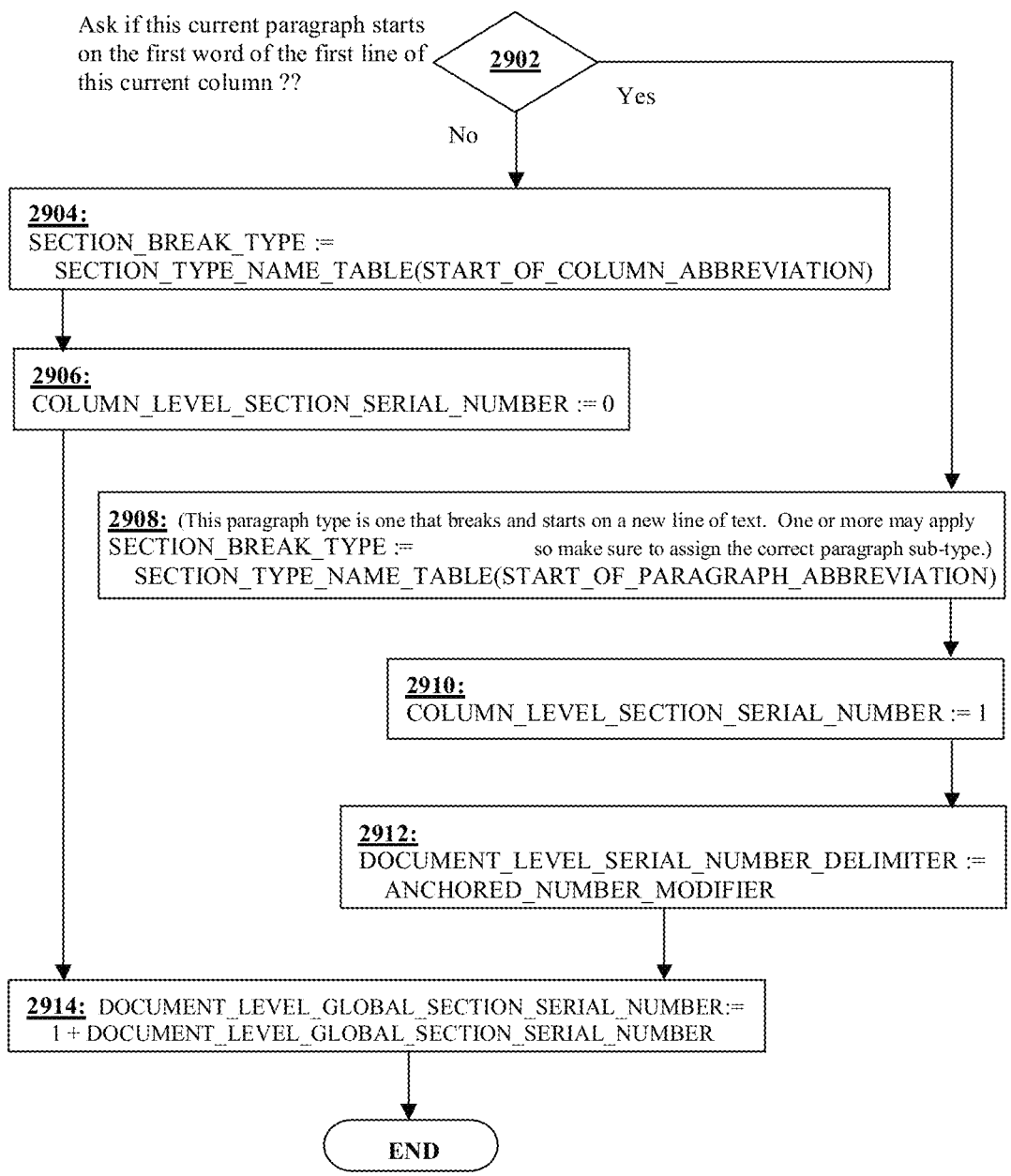
FIG. 29 depicts a flow chart illustrating a process for constructing a start of column section index number
Figure 30:
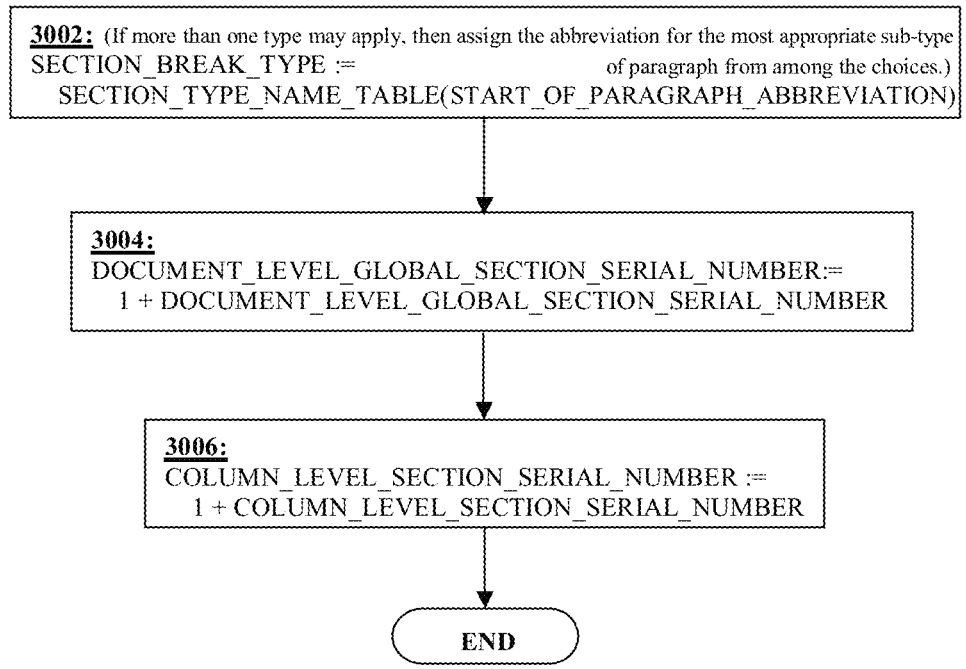
FIG. 30 depicts a flow chart illustrating a process for constructing a start of paragraph section index number where the column-level section serial number of the section index number is revised and the paragraph sub-serial number is not used.
Figure 31:
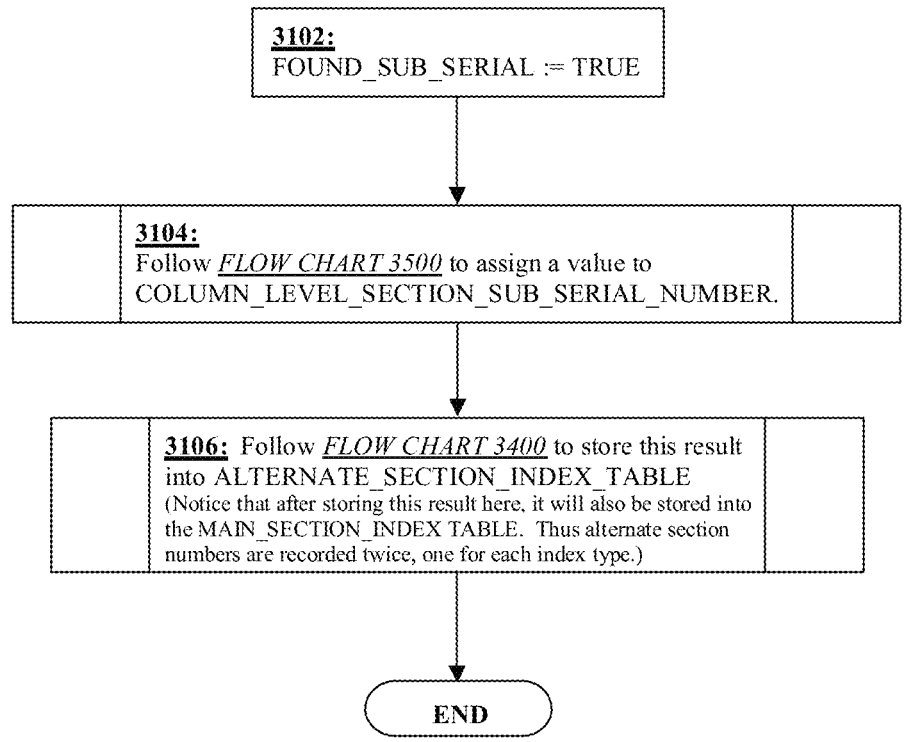
FIG. 31 depicts a flow chart illustrating a process for constructing a start of paragraph section index number where the column-level section serial number is unchanged but the column-level section sub-serial number of the section index number is revised instead.

The flow charts of FIG. 25 through FIG. 35 show a method for generating section index numbers for any particular document type and consequentially construct two related and complete section index tables of these numbers. See FIG. 25, for creating and assigning section index numbers with all of their internal components for a particular document type using an archetype scroll and possibly scrolls laid out with differing formats. A main section index table and an alternate section index table are simultaneously created by this process. See FIG. 26 for the initialization of this whole process for a particular set of scrolls. In one embodiment, five section break types are possible, one of which may have two variant forms, plus an additional generic section type for anything not covered by the other categories. The section break types are described in subsequent figures. See FIG. 27 to process a start of document section break type. See FIG. 28 for performing certain updates to major and minor section numbers for all other section break types. See FIG. 29 to process a start of column section break. Referring to the start of paragraph section breaks, see FIG. 30 to process one with a new column-level section serial number for the archetype scroll but instead see FIG. 31 to process one with a section sub-serial number for a non-conforming scroll, which is discovered against an existing column-level serial number for a paragraph section break in the archetype scroll. While all section index entries are recorded in the main section index, items discovered in FIG. 31 are recorded only in the alternate section index. See FIG. 32 to process an end of document section break type. See FIG. 33 to process any other section break types not otherwise processed in the previous figures. Certain of these figures may also reference FIG. 34, which stores a section index number under construction into a selected index table as a result of the overall process described in FIG. 25. See also FIG. 35 to assign a column-level section sub-serial number in appropriate places in the process. Accordingly, FIG. 25 describes the overall process of creating section index numbers for a particular type while FIG. 26 describes the setup and initialization of that process. FIG. 27 through FIG. 33 describe processing of the several section break types that populate that index while FIG. 34 and FIG. 35 describe smaller actions that are referenced by the processing of these several section break types. Accordingly, the whole set of figures therefore works together as one complete unit for generating the section index entries of the two section index tables.

Figure 25:
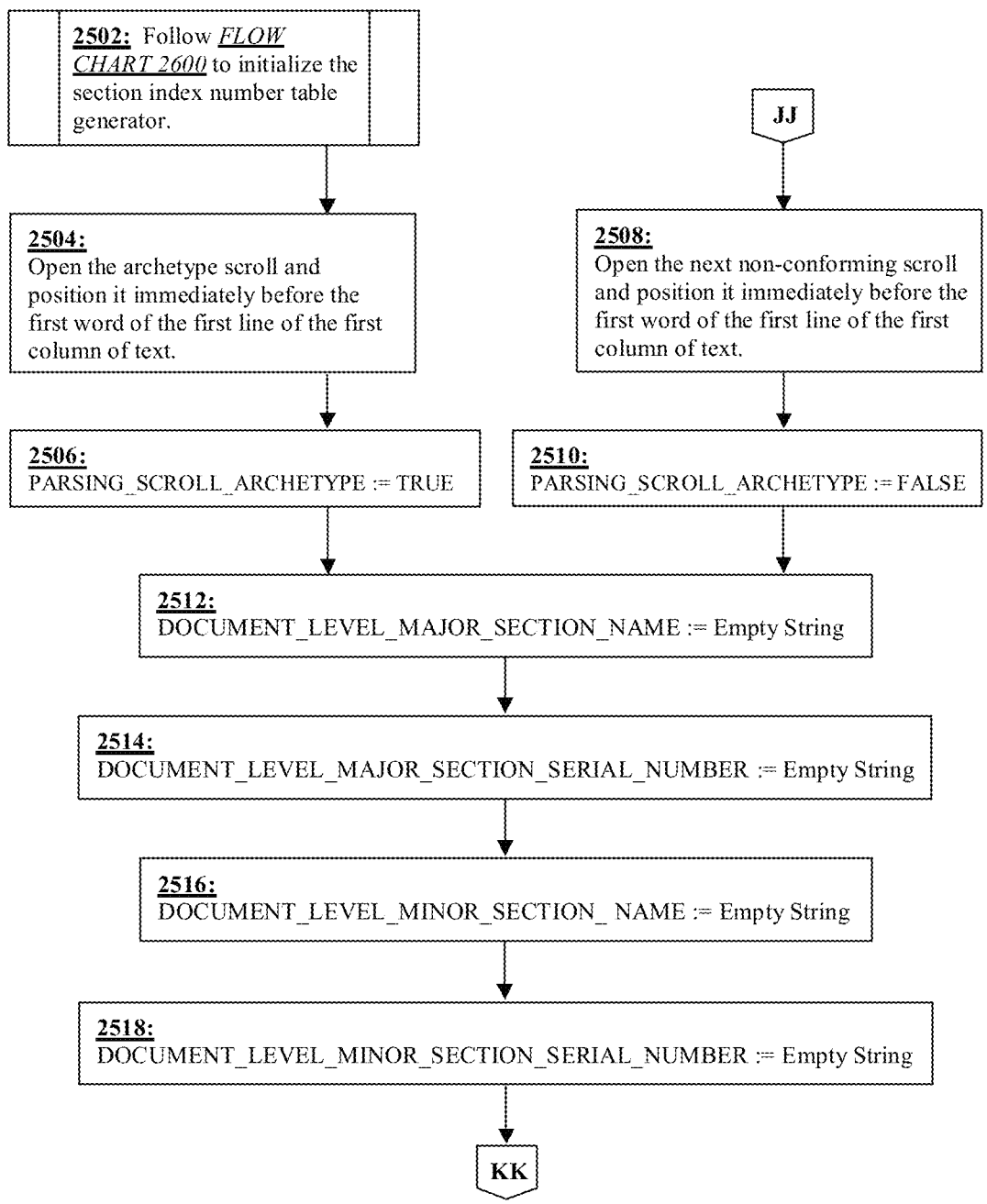
FIG. 25 depicts a flow chart for the assessment and creation of an index of well-defined sections in a scroll. The resulting index contains entries that contain an index number called a section index number.
Figure 25:
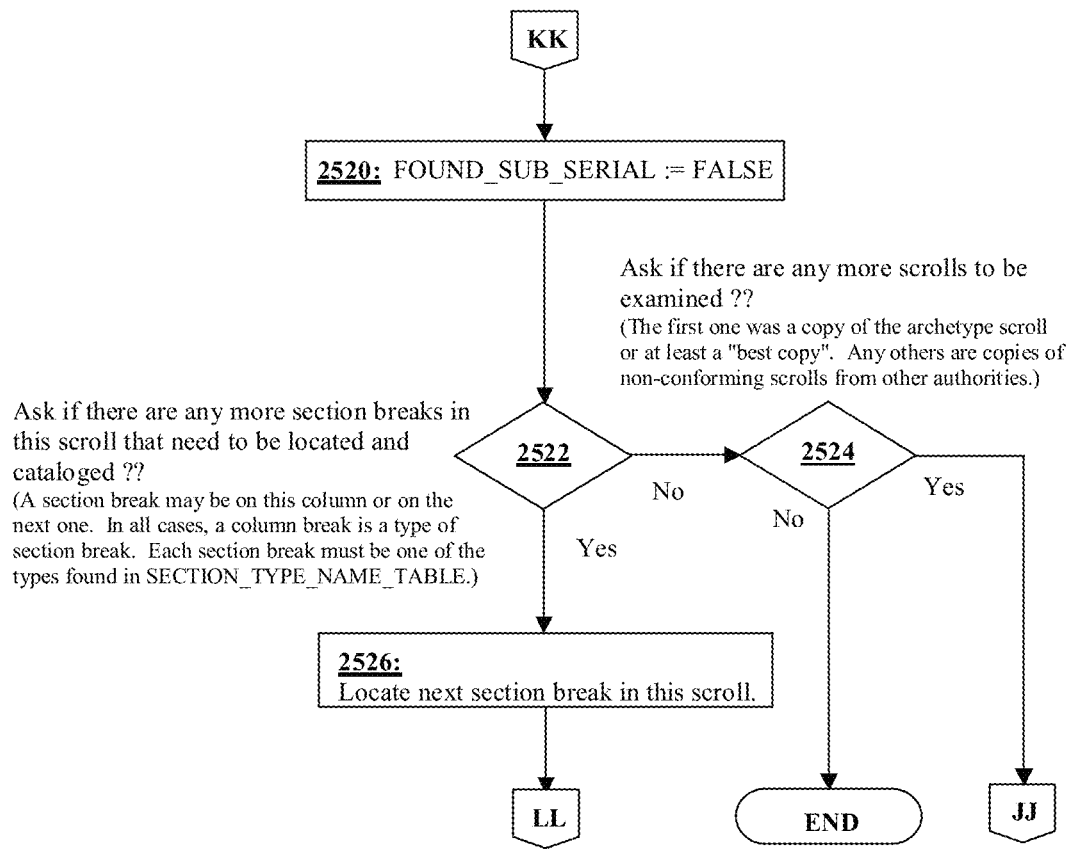
Figure 25:
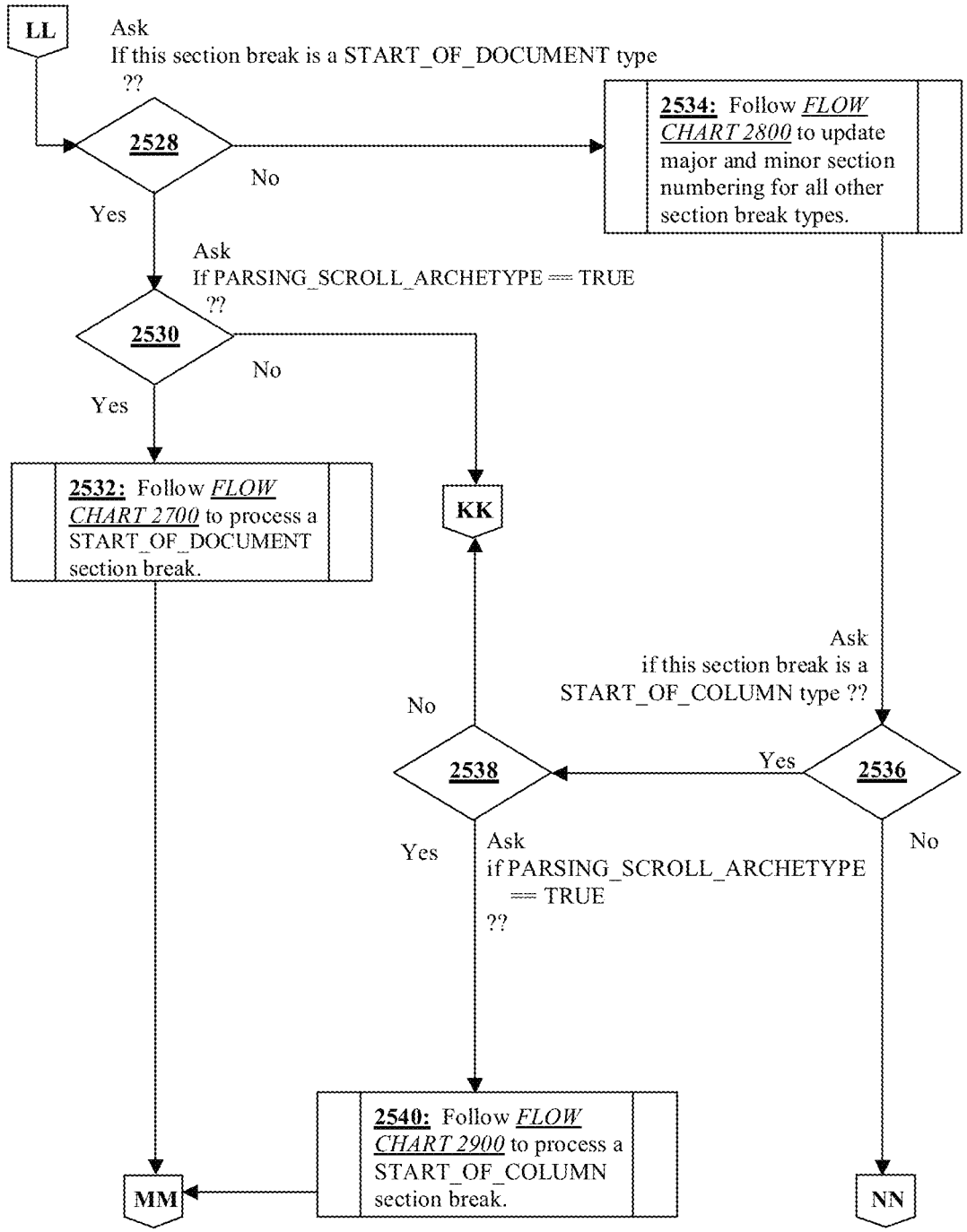
Figure 25:
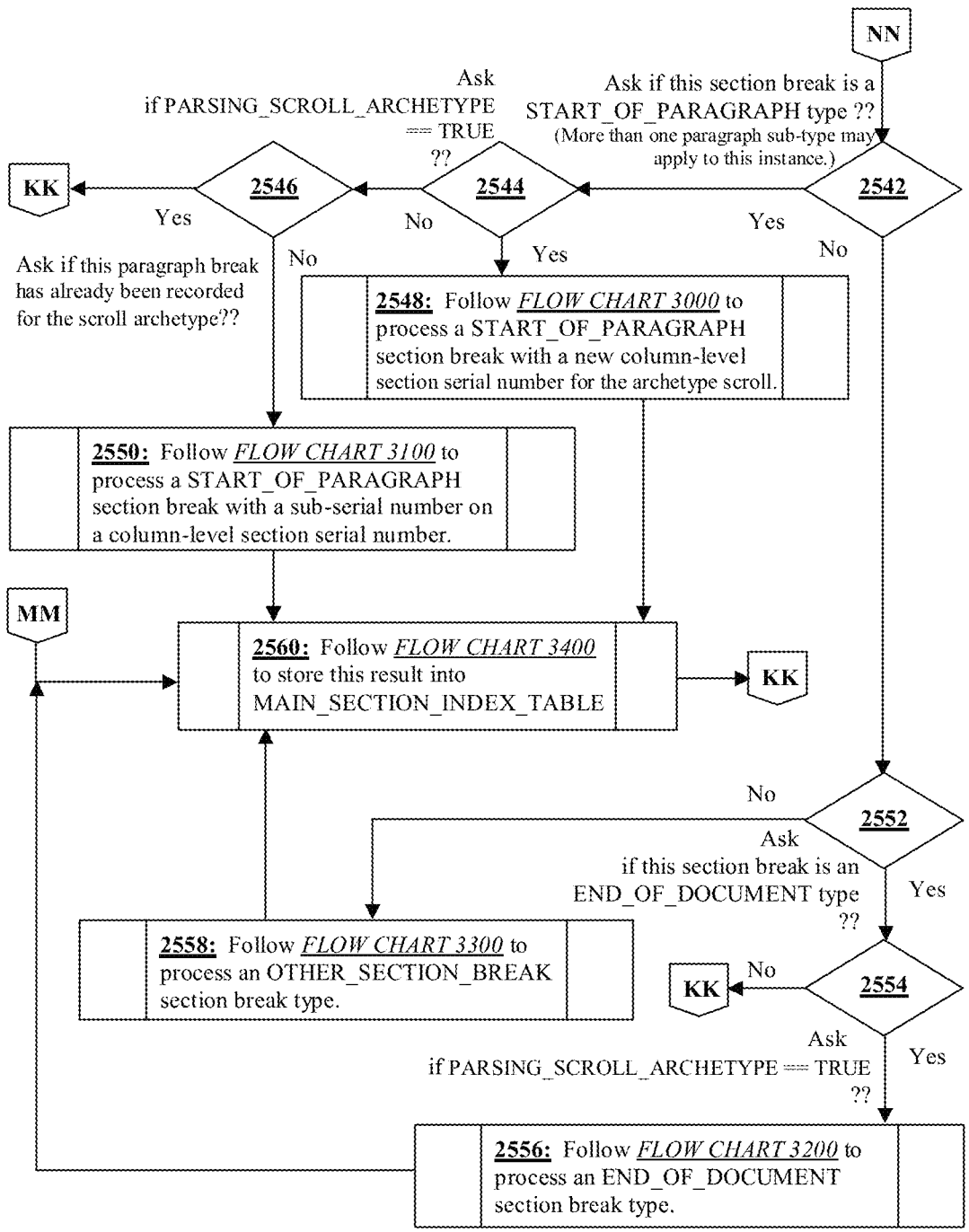

Referring to FIG. 25, a flow chart (2500) is provided illustrating a process for the assessment and creation of an index well-defined section in a scroll. The resulting index contains entries that contain an index number called a section index number. A section index number table generator is initialized (2502). Details of these steps are shown and described in FIG. 26. The archetype scroll is opened and positioned before the first word of the first line of the first column of text or other indicia (2504). The parsing scroll archetype variable is set to true (2506). Following step (2506), the document-level major section name is initialized (2512), the document-level major section serial number is initialized (2514), the document-level minor section name is initialized (2516), and the document-level minor section serial number is initialized (2518). Each of these initialization steps sets their respective variables to an empty string. In one embodiment, the initializations shown herein may proceed in a different order. Regardless of the order, once the initializations are complete, the use of section sub-serial numbering is set to false (2520), and it is then determined if there are any more section breaks in this scroll that need to be located and cataloged (2522). A negative response to the determination at step (2522) is followed by determining if there are any more scrolls to be examined (2524). A negative response to the determination at step (2524) concludes the section index number generation for the identified scroll(s). If there is a total of more than one scroll to be examined, each of the subsequent scrolls is called a non-conforming scroll, namely, not conforming to the archetype scroll, which must be the first one examined, beginning in step (2504). In this light, a positive response to the determination at step (2524) is followed by a return to step (2508) to open the next non-conforming scroll, and to position this scroll immediately before the first word of the first line of the first column of text or other indicia. Thereafter, the parsing scroll archetype variable is set to false (2510), following by proceeding to step (2512) for the initialization. Accordingly, the process continues at step (2512) for this and all subsequent non-conforming scrolls, if any, until all have been processed at step (2524).

If it is determined that there are more section breaks in this scroll at step (2522), then the next section break in this scroll is located (2526). It is then determined if this section break is the start of document type of section break (2528). A negative response indicates that the break is not the start of document type, and certain updates are made to major and minor section numbering for all other section break types (2534). See FIG. 28 for details of this update process. Thereafter, it is determined if this section break is the start of a column type (2536). A positive response to this determination is followed by determining if the parsing scroll archetype variable is set to true (2538). A negative response to this determination is followed by a return to step (2520). Similarly, positive response to the determination at step (2528) is followed by determining if the parsing scroll archetype identifier is set to true (2530), and a negative response to this determination is followed by a return to step (2520). From a positive response to the determination at step (2530), the process proceeds to FIG. 27 to process a start of document section break (2532). Similarly, a positive response to the determination at step (2538) is followed by processing a start of column section break (2540), as shown and described in FIG. 29. Following the completion of steps (2532) or (2540), the process proceeds to step (2560) for storing the results in the main section index table, as shown and described in detail in FIG. 34. Accordingly, the start of document section break type is processed and major and possibly minor section numbering is updated as appropriate for all remaining section break types, followed by processing of the start of column section break type.

A negative response to the determination at step (2536) is followed by determining if this section break is a start of a paragraph type (2542). In one embodiment, more than one paragraph style may apply in this structure, not to be confused with the two types of paragraphs themselves. These two types include firstly, the column-level section serial number for an entry changes and secondly, the column-level section sub-serial number changes for an entry. However, both of them never change at the same time from one entry to the next except to reset and eliminate the sub-serial number sequence when a new serial number event occurs.

If it is determined that this section break is not a start of a paragraph type, then it is determined if the break is an end of document type (2552). If the section break is not the end of document type, then the procedure processes all section break types other than those explicitly enumerated (2558), details of which are shown and described in FIG. 33. However, if at step (2552), it is determined that the section break is an end of document type, then it is determined if the parsing scroll archetype variable is set to true (2554). A negative response to the determination is an indication that cataloging of the scroll is not complete, and the process returns to step (2520). However, a positive response at step (2554) is followed by processing an end of document section break type (2556), as shown and described in FIG. 32. Following steps (2532), (2540), or (2556), the results are all stored as a new entry in the main section index table (2560), as shown and described in FIG. 34. Following the storage at step (2560), the process returns to step (2520) for further processing of the scroll. Accordingly, both types of start of paragraph section breaks are processed along with the end of document section break type and all other section break types.

As shown at step (2542), it may also be ascertained that this section break is the start of a paragraph type. If it is determined that this section break is a start of paragraph type, then the parsing scroll archetype variable is examined to ascertain its setting (2544). If the variable is determined to be set to true, then one of two paragraph types has been located. This is not to be confused with different styles of paragraphs, which will vary from one document type to another and from one scribal school to another within the same document type. At this time, the first paragraph type is processed, a start of paragraph section break with a new column-level section serial number for the archetype scroll (2548), as shown in FIG. 30. This is followed by a return to step (2560). However, if it is determined at step (2544) that the parsing scroll archetype variable is not true, then it is determined if this paragraph break has already been recorded for the scroll archetype (2546). A positive response is followed by a return to step (2520). However, if the paragraph break has not been recorded, then the second paragraph type is processed, a start of paragraph section break with a sub-serial number using the current column-level section serial number (2550), as shown in FIG. 31. This is followed by a return to step (2560).

Figure 32:
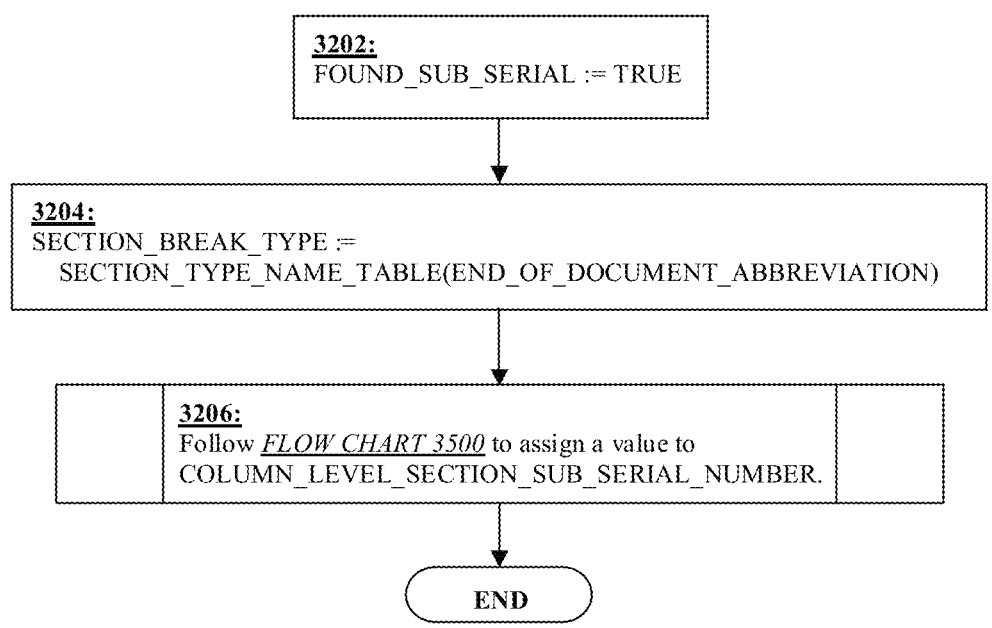
FIG. 32 depicts a flow chart for the process for constructing an end of document section serial number.
Figure 33:
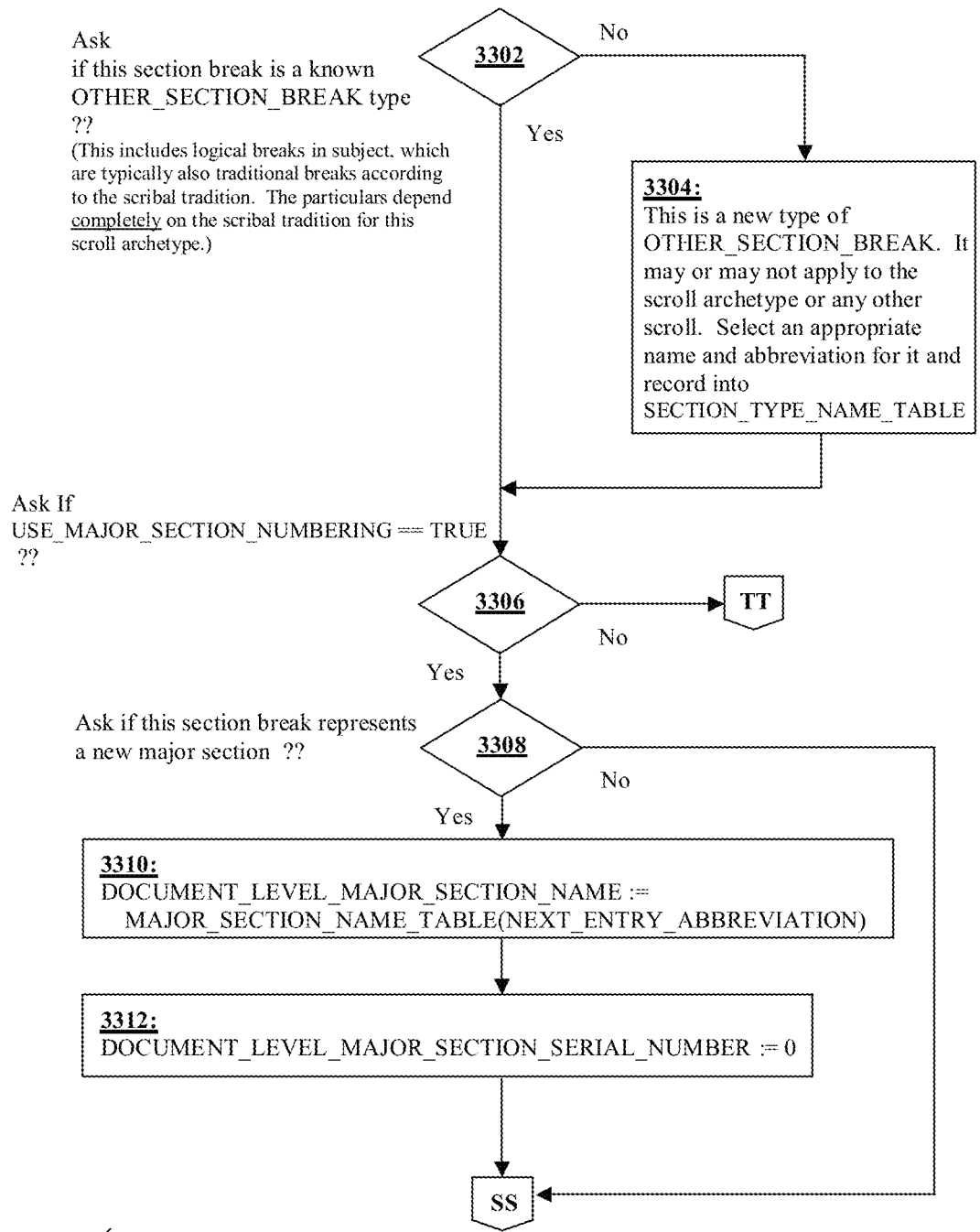
FIG. 33 depicts a flow chart for the process for constructing a section serial number of any other section break type that may be found in the selected scroll(s) but not heretofore illustrated.
Figure 33:
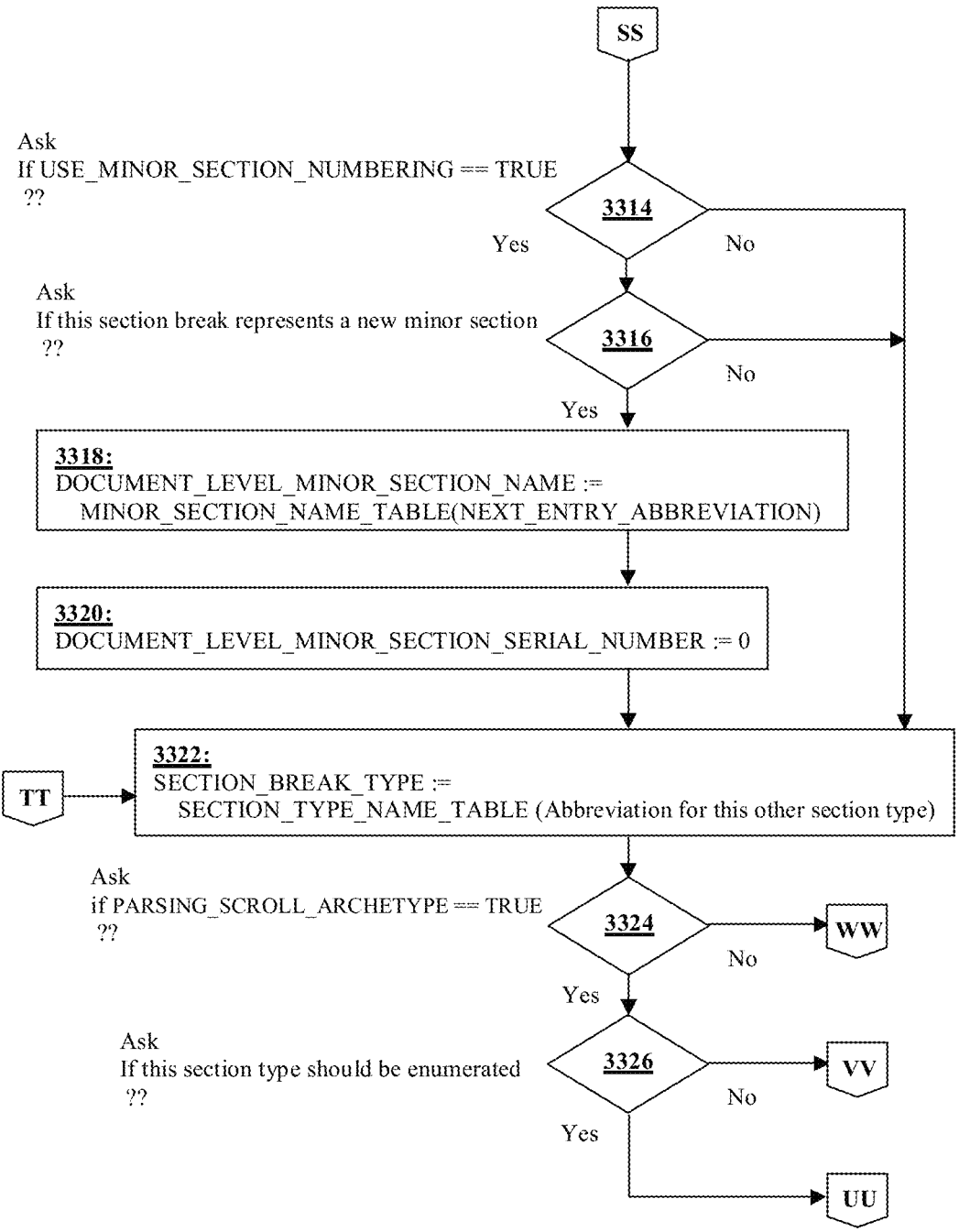
Figure 33:
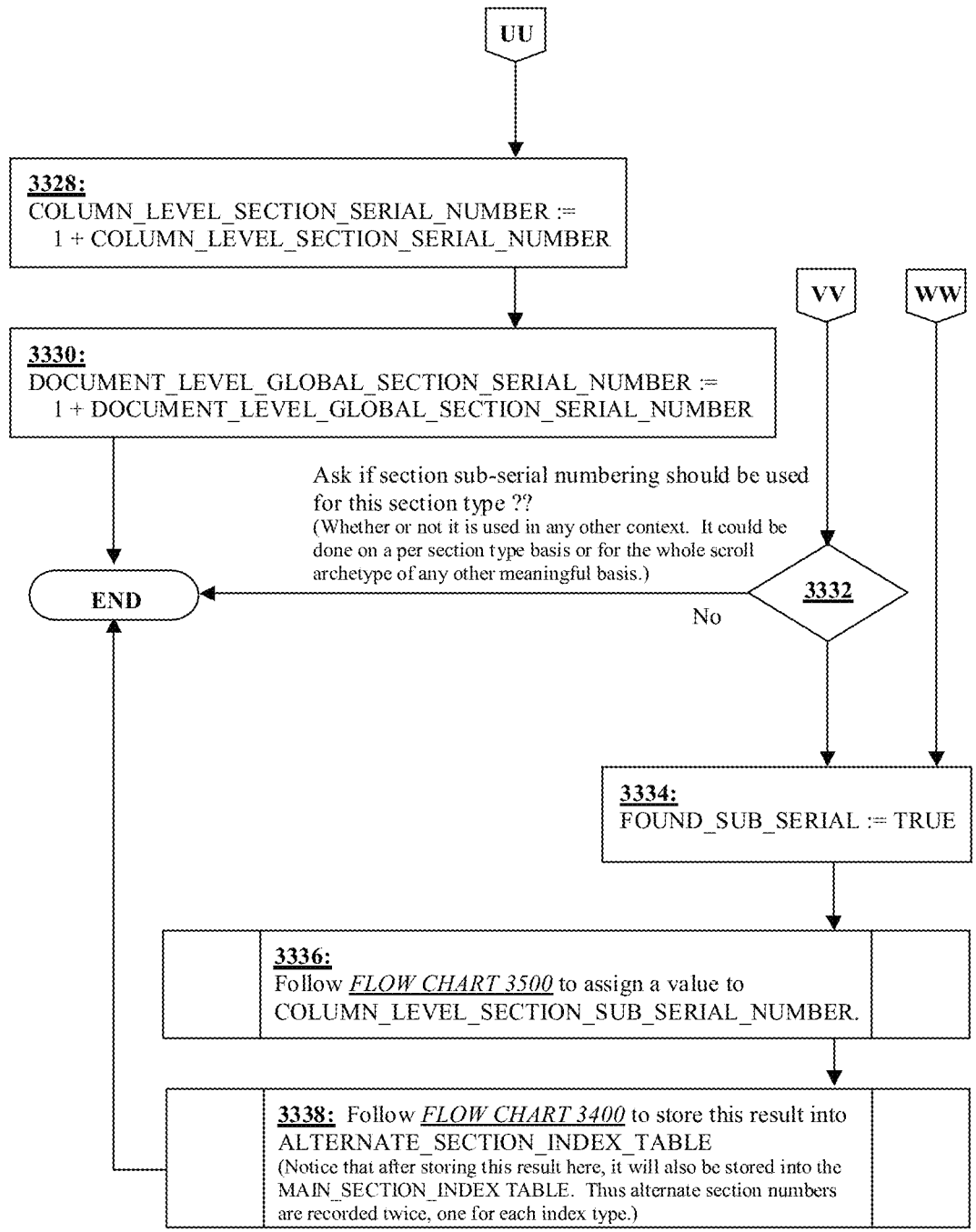

Accordingly, six categories of section breaks are evaluated while exactly one of them is processed for each unique section break identified across all examined scrolls, including: start of document (step 2532, details in FIG. 27), start of column (step 2540, details in FIG. 29), start of paragraph with a new column-level section serial number (step 2548, defaults in FIG. 30), start of paragraph on an existing column-level serial number but with a new sub-serial number instead (step 2550, defaults in FIG. 31), end of document (step 2556, details in FIG. 32), and any other type of section break (step 2558, details in FIG. 33). Furthermore, for all section break types except for start of document (2532), step (2534) performs certain updates to the major and minor section number, which may or may not apply to any particular scroll archetype (details in FIG. 28). By examining the archetype scroll first, all further scrolls, if any, have their section breaks examined against those of the archetype and duplicates skipped while new, unique section breaks are recorded, creating a composite result of section breaks of the archetype scroll plus those of all the non-conforming scrolls.

Carefully chosen non-conforming scrolls will thus create, when combined with the archetype scroll, an index of a very wide body of scholarly opinion on the construction and layout of this document type as embodied in all of the scrolls examined hereby. Accordingly, FIG. 25 references each of FIG. 26, FIG. 27, FIG. 28, FIG. 29, FIG. 30, FIG. 31, FIG. 32, FIG. 33, FIG. 34, and FIG. 35 to construct a complete index table of almost all types of section breaks found within a certain document type.

Figure 26:
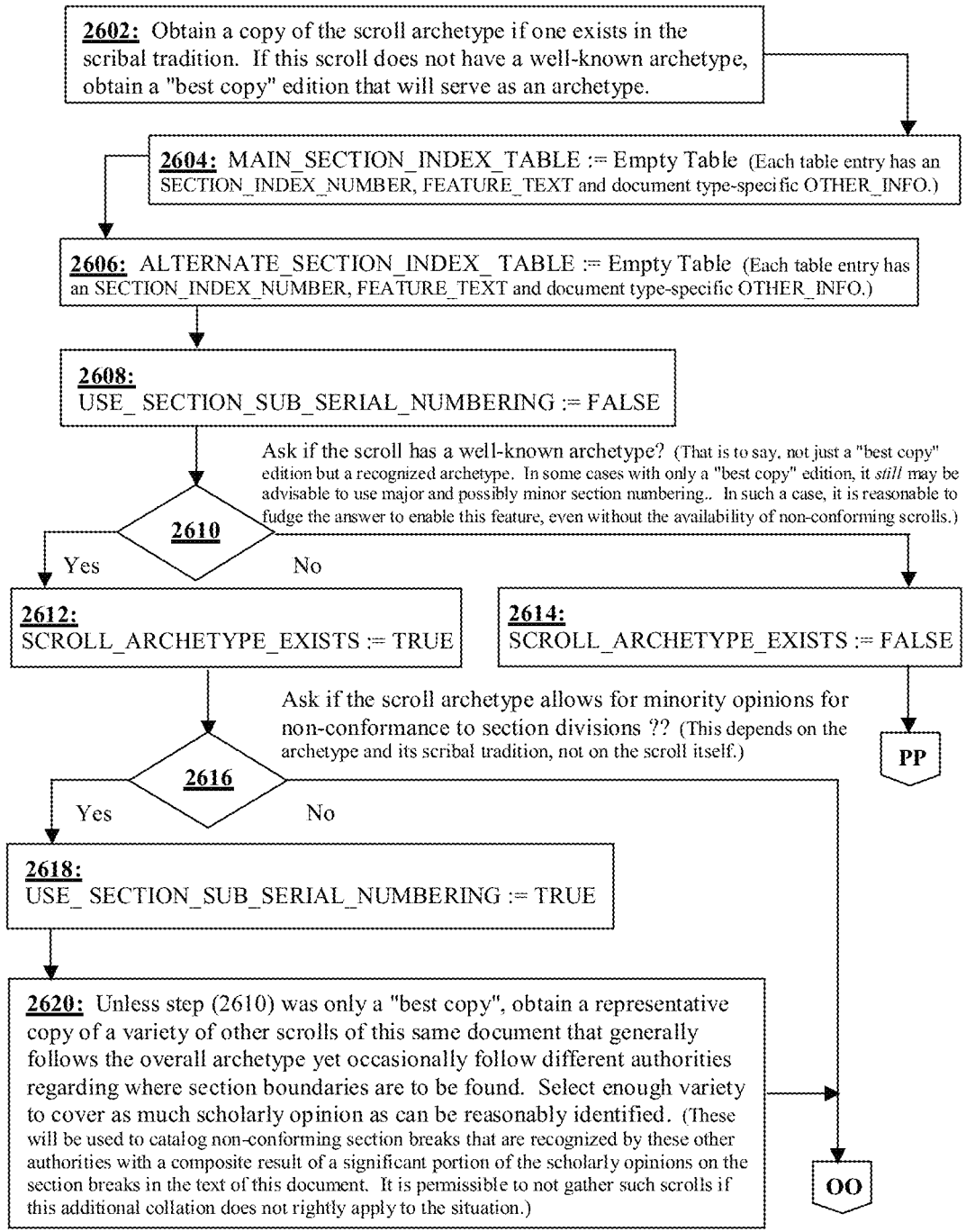
FIG. 26 depicts a flow chart illustrating a process for the initialization of the process depicted in FIG. 25.
Figure 26:
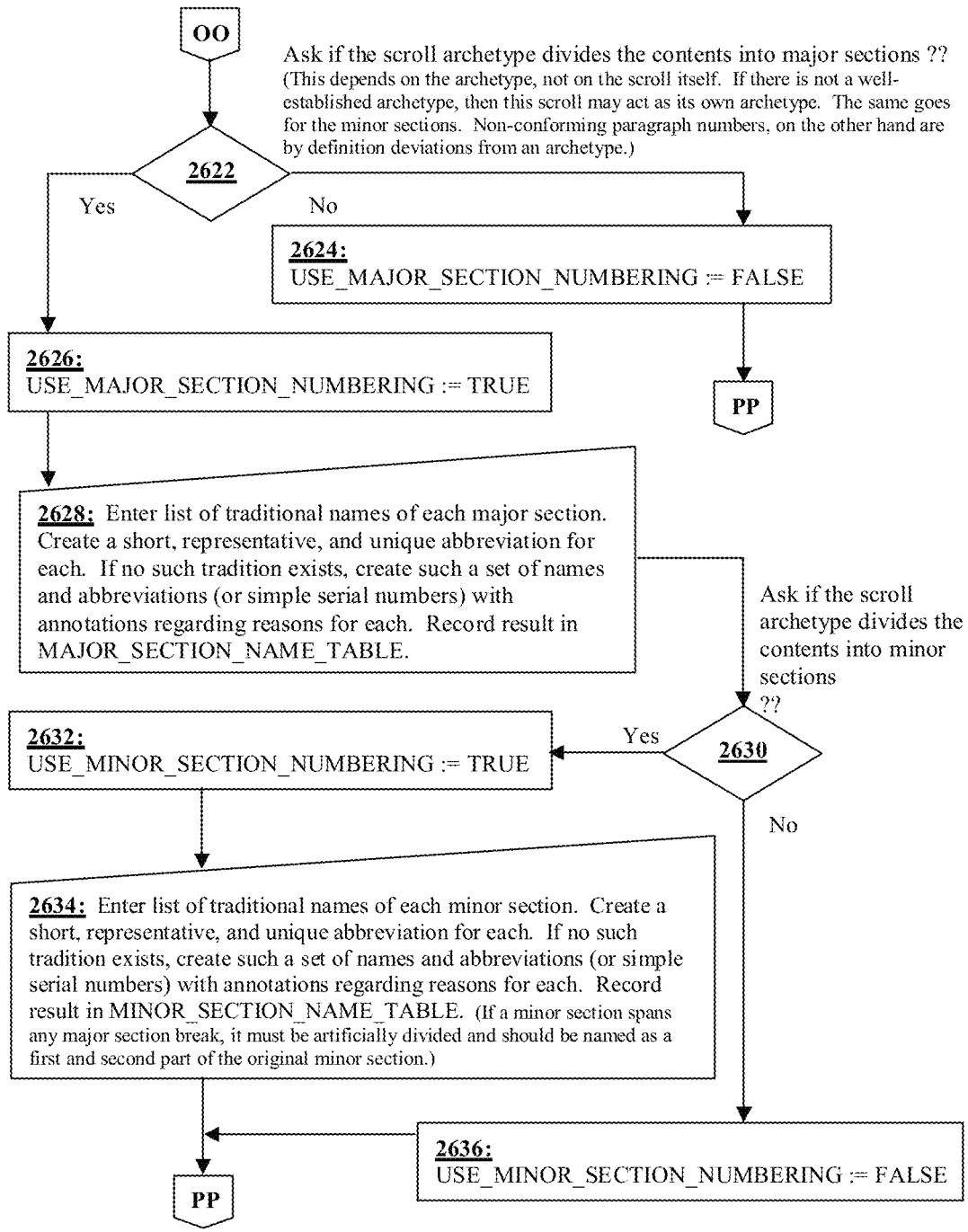
Figure 26:
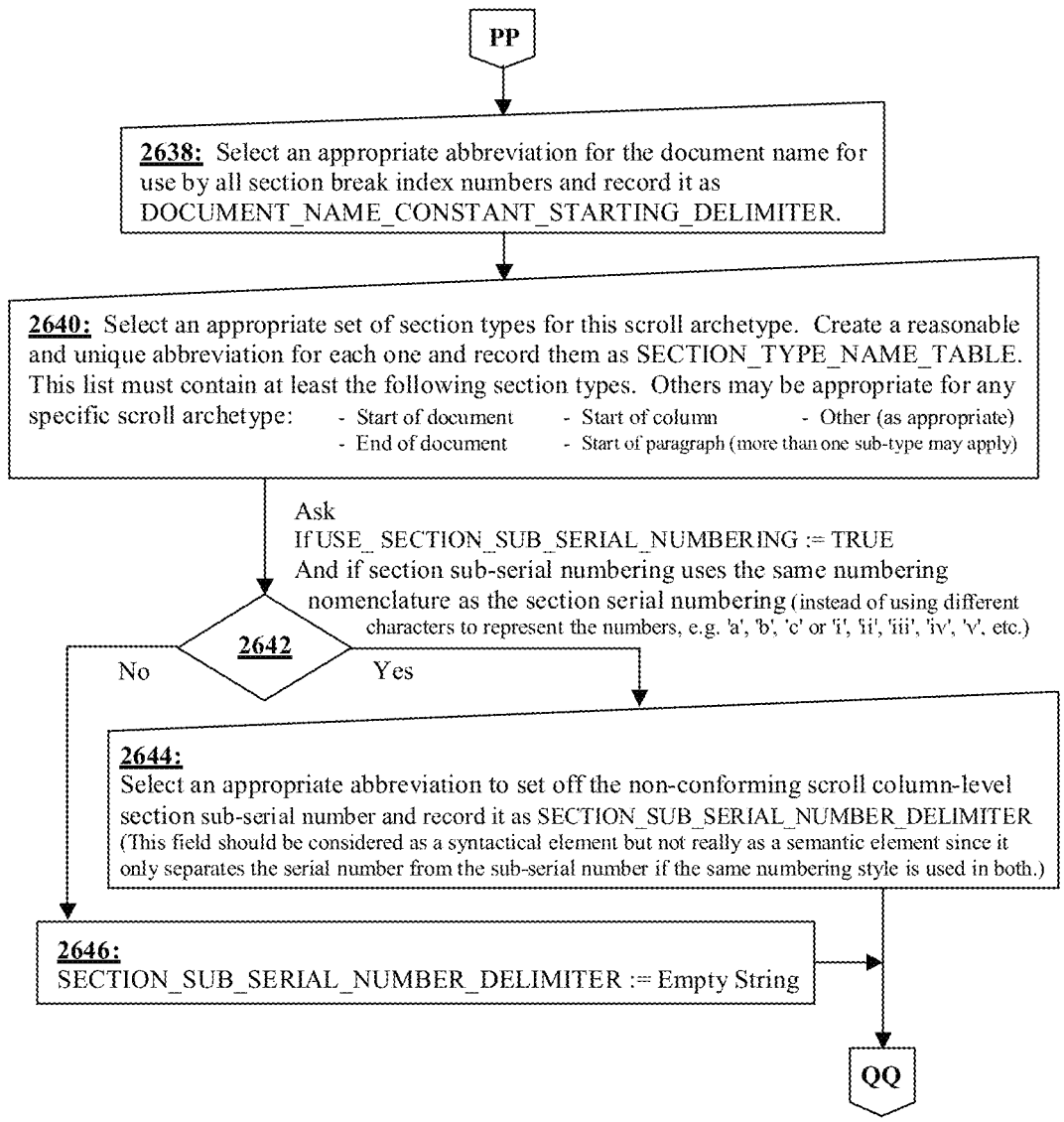
Figure 26:
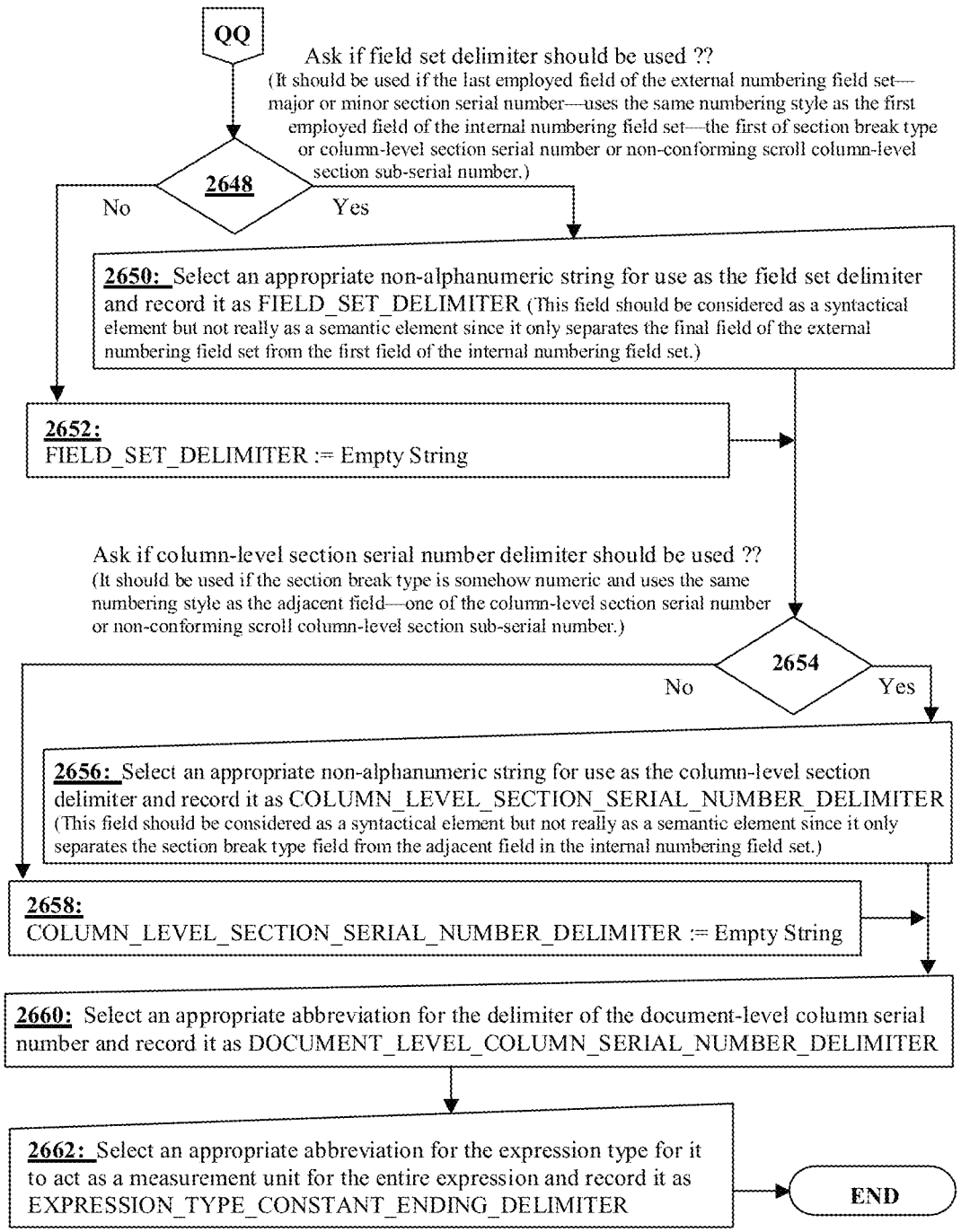

Referring to FIG. 26, a flow chart (2600) is provided illustrating a process for the initialization of the process depicted in FIG. 25. As shown, a copy of the scroll archetype, if one exists, is obtained (2602). If this scroll does not have a known or recognized archetype, a "best copy" edition is obtained and serves as the archetype. Thereafter, a main section index table is assigned a value of empty (2604), and similarly, an alternate section index table is assigned an empty value (2606). The use section sub-serial number variable is assigned a value of false (2608). In one embodiment, the ordering of these four initialization steps (2602) through (2608) may differ, with the change in ordering yielding the same result. Following the variable assignments at steps (2604), (2606), and (2608), it is determined if the scroll has a recognized archetype (2610), a copy of which was obtained at step (2602). Although a scroll without a recognized archetype should typically answer step (2610) in the negative, if it is strongly recommended to utilize major and possibly minor section numbering for some compelling reason, the answer may be modified to enable employment of this feature. Such a recommendation may come from creating an index in a complete iteration of FIG. 25 and deciding that, for whatever reason, use of major and possibly minor section numbering is advisable, instigating a second attempt to create a more refined embodiment of a section index for this document type. Normally, however, only a set of scrolls with a recognized archetype would answer in the positive at step (2610). However concluded there, a positive response to the determination at step (2610) is followed by assigning the value of true to the scroll archetype exists variable (2612). Similarly, a negative response to the determination is followed by assigning the value of false to the scroll archetype exists variable (2614). Accordingly, this first part of the initialization of the section number table generator ascertains the recognition of the scroll archetype and the potential for use of an archetype scroll with possible non-conforming variants versus a mere "best copy" edition of a document type.

Once it is determined that the scroll archetype is well established, it is determined if the scroll archetype allows for minority opinions for non-conformance to section divisions (2616). In one embodiment the section division conformity depends on the archetype and its scribal tradition, and not on the scroll itself. A positive response to the determination at step (2616) is followed by setting the use section sub-serial numbering variable to a value of true (2618), followed by obtaining a representative copy of a variety of other scrolls of this same document that generally follow the overall archetype unless step (2610) indicated only a "best copy" document instead of an actual archetype (2620). In one embodiment, the representative copy of other scrolls may occasionally follow different authorities regarding where section boundaries are to be found. At step (2620), the set selected includes a sufficient quantity to cover as many different scholarly opinions as can be reasonably identified, giving wide latitude for as many viewpoints as feasible and useful. Following completion of step (2620) or a negative response to the determination at step (2616), it is determined if the scroll archetype divides the content into major sections (2622). In one embodiment, the qualification associated with step (2622) is dependent on the archetype and not the specific scroll. For example, if there is not a well-established or known archetype, then this scroll may acts as its own archetype. For another example, if this scroll truly is just a "best copy" edition but major and possibly minor section numbering is suggested or recommended, then a possible positive response to step (2622) may be indicated. A negative response to the determination at step (2622) is followed by assigning the use major section numbering to a false setting (2624), and a positive response is followed by assigning the use major section numbering to true (2626). Accordingly, this second part of the initialization of the section number table generator ascertains a potential for major and possibly minor section numbering.

Following step (2626), a list of traditional names of each major section is entered and a short and representative abbreviation for each name is created (2628). These names are all entered in a major section name table. If no such tradition exists, a reasonable set of such names and abbreviations is created. In either case, it is then determined if the scroll archetype divides the contents into minor sections (2630). A positive response to the determination at step (2630) is followed by setting the use minor section numbering to true (2632), and entering a list of traditional names of each minor section in a minor section table or the creation of a reasonable set of such names and abbreviations where no such tradition exists (2634). In one embodiment, a representative abbreviation is created for each entry in the list. A negative response to the determination at step (2630) is followed by setting the use minor section numbering variable to false (2636). Following one of steps (2614), (2624), (2634), or (2636), an appropriate abbreviation is selected for the document name (2638). This selection is intended for use by all section break index numbers, and as such is recorded as a document name constant starting delimiter. Therefore, this mechanism may be uniquely applied to any and all document types in an arbitrary collection and may immediately and uniquely identify every section break in every document with a unique identifier. In addition to selecting a document name abbreviation in step (2638), an appropriate set of section types for this scroll archetype are selected (2640). The selection at step (2640) includes creating an abbreviation for each section type and recording them as a section type name table. In one embodiment, the list at step (2640) contains at least the following section types: start of document, end of document, start of column, and start of paragraph, the latter may possibly also have more than one sub-type, typically indicating a style of paragraph break representation in the applicable scribal tradition. Accordingly, the third part of the initialization of the section number table generator sets up major and minor section numbering when applicable and sets up the document name constant starting delimiter.

Following step (2640), it is determined if the use section sub-serial numbering is set to true and, if the section sub-serial numbering uses the same numbering nomenclature as the section serial numbering instead of using different characters to represent such section serial numbers (2642). In one embodiment, these section sub-serial numbers may be represented as letters 'a', 'b', 'c' et al. In another, they may be represented as Roman numerals 'i', 'ii', 'iii', et al. In yet another, they may be represented as Arabic numerals '1', '2', '3', et al. These examples do not exhaust the range of representational styles for the section sub-serial numbers. Regardless of the numbering style used for the sub-section serial numbers, if the numbering style differs from the style of the section serial numbering, then the result of this part of step (2642) is positive. A positive response to both parts of the determination at step (2642) is followed by selecting a unique abbreviation to set off any non-conforming scroll column-level section sub-serial number and recording it as the section sub-serial number delimiter (2644). In one embodiment, this delimiter separates the serial number from the sub-serial number if the same numbering style is employed. A negative response to the determination at step (2642) is following by assigning an empty string to the section sub-serial number delimiter (2646).

Following the selection at step (2644) or the assignment at step (2646), it is determined if the field set delimiter should be used (2648). In one embodiment, the field set delimiter should be use if the last employed field of the external numbering field set, global, major, or minor section serial number, uses the same numbering style as the first employed field of the internal numbering field set, the first of section break type or column-level section serial number or non-conforming scroll column-level section sub-serial number. An affirmative response to the determination at step (2648) is followed by selection and recordation of an appropriate non-alphanumeric string for use as the field set delimiter (2650). The recorded field separates the final field of the external numbering field set from the first field of the internal numbering field set. In contrast, a non-affirmative response to the determination at step (2648) is followed by assigning an empty string to the field set delimiter (2652). Following the completion of either steps (2650) or (2652), it is determined if the column-level section serial number delimiter should be used (2654). In one embodiment, the column-level section serial number delimiter should be used if the section break type is numeric and uses the same numbering style as the adjacent field, such as one of the column-level section serial number or non-conforming scroll column-level sub-serial number. An affirmative response to the determination at step (2654) is followed by selection and recordation of an appropriate non-alphanumeric string for use as the column-level section serial number delimiter (2656). In one embodiment, this field should be considered as a syntactical element but not as a semantic element since it only separate the section break type field from the adjacent field in the internal numbering field set. A non-affirmative response to the determination at step (2654) is followed by assigning an empty string to the column level section serial number delimiter (2658). Following either of steps (2656) or (2658), an abbreviation is selected for the delimiter of the document-level column serial number and the abbreviation is recorded as its document-level column serial number delimiter (2660). Thereafter, an abbreviation is selected for the entire expression type for it to act as a measurement unit for the expression, which is recorded as the expression type constant ending delimiter (2662). Accordingly, as shown and demonstrated herein, the fourth and final part of this initialization sets up the remaining components for the section number generation process. All one-time initialization activities shown in this figure are hereby performed in support of the overall section number generation process shown and described in detail by FIG. 25.

Figure 27:
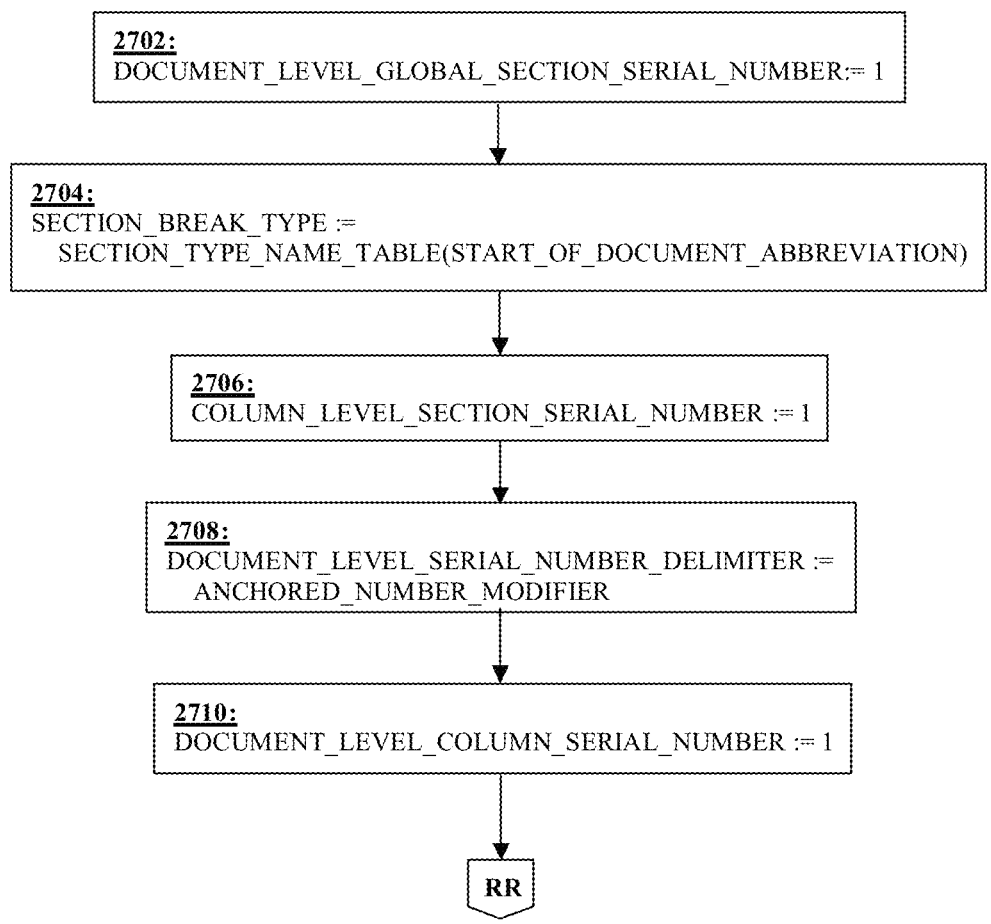
FIG. 27 depicts a flow chart illustrating a process for constructing a start of document section index number.
Figure 27:
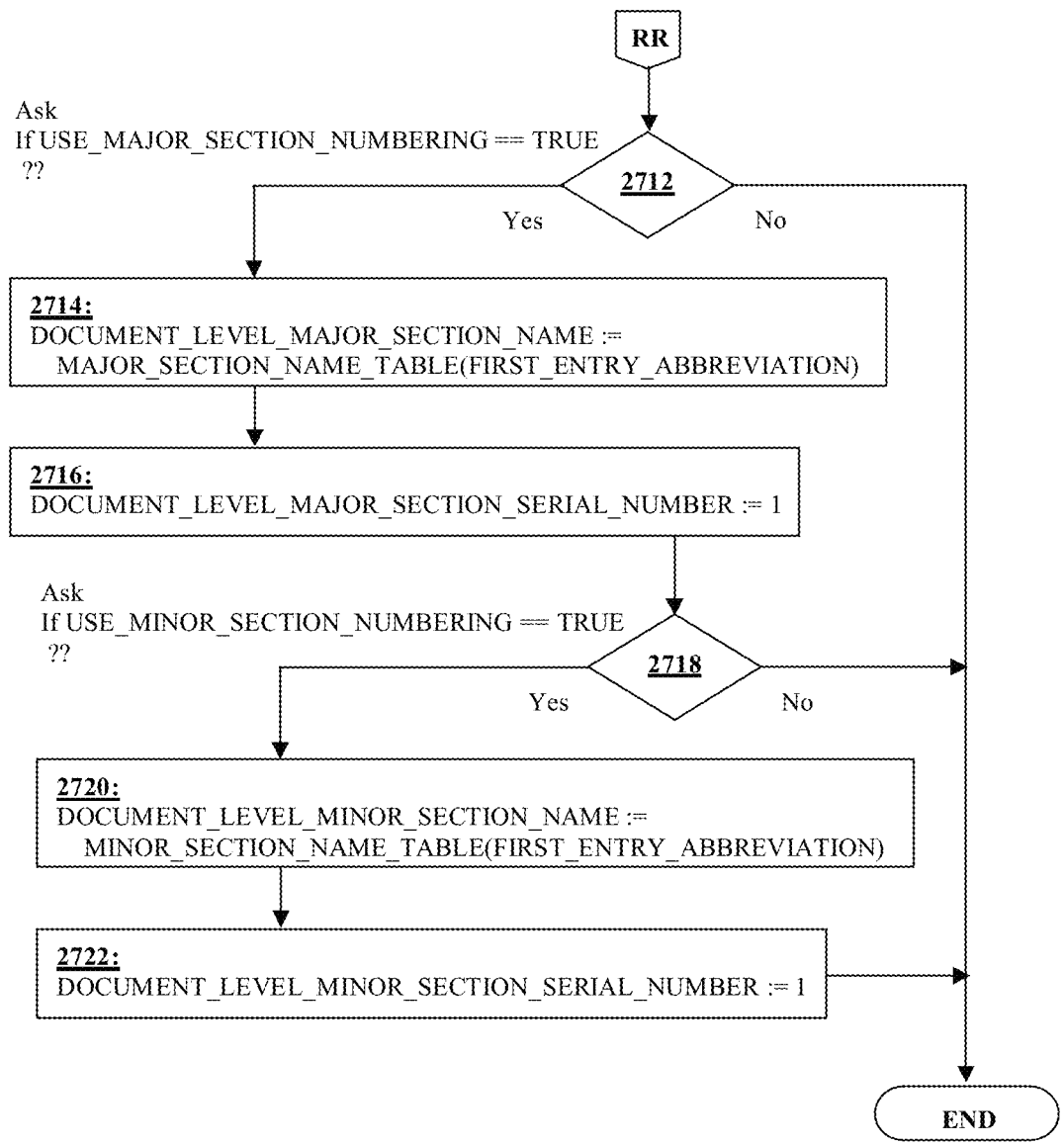

Referring to FIG. 27, a flow chart (2700) is provided illustrating a process for constructing a start of document section index number. It assembles a section index number describing the start of the document from its composition of parts so that this number may be entered into a section index table once this process concludes and FIG. 25 continues following step (2532). As shown, a set of initialization steps is performed. The document-level global section serial number is initialized (2702), the section break type is assigned a value of the start of the document abbreviation found in the section type name table (2704) as initialized in step (2640), the column-level section serial number is initialized to a value of one (2706), the document-level serial number delimiter is assigned the value of "anchored number modifier" (2708), and the document-level column serial number is initialized to a value of one (2710). In one embodiment, each of these initialization steps shown may proceed in a different order. Following the initialization in step (2702) through step (2710), it is determined if the use major section numbering variable is set to true (2712). If the response at step (2712) is positive, then the document-level major section name is set to the first entry abbreviation of the major section name table (2714), and the document-level major section serial number is set to a value of one (2716). It is then determined if the use minor section numbering variable is set to true (2718). A positive response to the determination at step (2718) is followed by setting the document-level minor section name to the first entry abbreviation of the minor section name table (2720) and setting the document-level minor section serial number to a value of one (2722).

Following step (2722) or a negative response to the determination at either step (2712) or step (2718) the process for assembling the section index numbers concludes. Accordingly, the process shown herein sets the components of a section index number that fully describes a start of a document section break.

Figure 28:
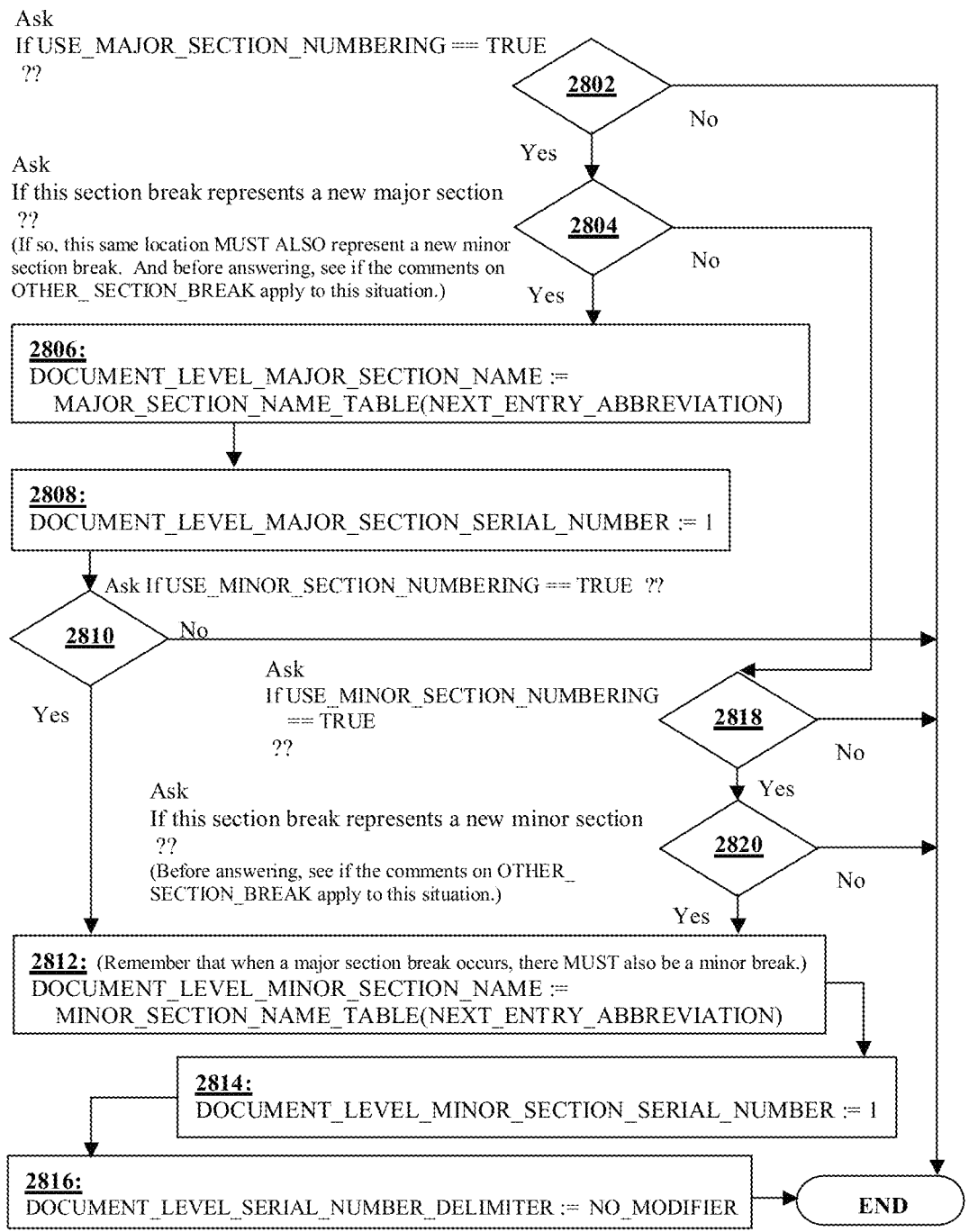
FIG. 28 depicts a flow chart illustrating a process for performing certain updates on major and minor section numbering for all section types except a start of document section type.

Referring to FIG. 28, a flow chart (2800) is provided showing a process for performing certain updates on major and minor section numbering for all section types except a start of document section type. It determines certain changes to the document-level major section name, document-level major section serial number, document-level minor section name, document-level minor section serial number, and document-level serial number delimiter fields of a complete section index number. In particular, certain revisions are made when a section break represents either a new major section break or a new minor section break. It is initially determined if the use major section numbering variable is set to true (2802). If the response to the determination at step (2802) is set to true, then it is determined if this section break represents a new major section (2804). If the response to the determination at step (2804) is positive, this same location must also represent a new minor section break. Following a positive response to step (2804) the document-level major section name is set to the next entry abbreviation in the major section name table (2806) and the document-level major section serial number is set to a value of one (2808). In one embodiment, these two assignments may proceed in the reverse order. Thereafter, it is determined if the use minor section numbering variable is set to the value true (2810). When a major section break occurs, there must also be a minor break. A positive response to the determination at step (2810) is followed by setting the document-level minor section name to the next entry abbreviation in the minor section name table (2812), setting the value of the document level minor section serial number to a value of one (2814), and setting the value of the document-level serial number delimiter variable to a value of "no modifier" (2816). A negative response to the determination at step (2804), where it is determined that the section break does not represent a major section, is followed by determining if the use minor section numbering variable is set to true (2818). A positive response to the determination at step (2818) is followed by determining if this section break represents a new minor section (2820), which, if positive, proceeds to step (2812). If the response to the determinations at steps (2802), (2810), (2818) or (2820) are negative, or following step (2816), the process concludes. Accordingly, the process shown herein revises certain components of a section index number only if a section break represents either a major or a minor section break, and only then when certain values permit such a change. These changes affect all subsequent section break types except the start of document section break type, the single instance of which was previously discovered in FIG. 25.

Referring to FIG. 29, a flow chart (2900) is provided illustrating a process for constructing a start of column section index number. As shown, it is determined if the current paragraph begins on the first word of the first line of this current column (2902). A negative response to the determination at step (2902) is followed by setting the section break type to the start of the column abbreviation in the section type name table (2904), setting the column-level section serial number to zero (2906), and setting the document-level global section serial number variable incremented by a value of one (2914). However, a positive response to the determination at step (2902) indicates that this paragraph type is one that breaks and starts on a new line or similar section of text. The section break type is set to the start of paragraph abbreviation of the section type name table (2908), including the assignment of the correct paragraph sub-type, if applicable to this document type. Then the column-level section serial number is set to a value of one (2910), the document-level serial number delimiter is set to the anchored number modifier (2912), followed by step (2914). Accordingly, the process shown herein sets the components of a section index number that fully describes a start of column section break.

Referring to FIG. 30, a flow chart (3000) is provided illustrating a process for constructing a start of paragraph section type where the column-level section serial number of the section index number is revised and the paragraph sub-serial number is not used. Either FIG. 30 will be employed or FIG. 31 but not both. FIG. 30 will be used when examining the archetype scroll while FIG. 31 will be used while examining non-conforming scrolls. As shown for FIG. 30, the section break type is set to the start of paragraph abbreviation in the section type name table (3002). In one embodiment, more than one sub-type of the paragraph section break type may apply, being a style of paragraph, in which case the abbreviation for the most appropriate sub-type of paragraph is assigned from among the choices appropriate to that document type. Following step (3002), the document-level global section serial number is incremented by a value of one (3004), and the column-level section serial number is incremented by a value of one (3006). Accordingly, the process shown herein sets the components of a section index number that fully describes a start of paragraph section break where the section serial number is revised and the section sub-serial number is not used.

Referring to FIG. 31, a flow chart (3100) is provided illustrating a process for constructing a start of paragraph section type where the column-level section serial number is unchanged but the column-level section sub-serial number of the section index number is revised instead. Either FIG. 30 will be employed or FIG. 31 but not both, as described above. As shown for FIG. 31, the found sub-serial variable is assigned to the value true (3102). Thereafter, a value is assigned to the column-level section sub-serial number variable (3104), as shown and described in FIG. 35. Thereafter, the result is stored in the alternate section index table (3106), as shown and described in FIG. 34. In one embodiment, after storing the result as shown at step (3106), the result will also be stored in the main section index table. Accordingly, the process shown herein sets the components of a section index number that fully describes a start of paragraph section break where the serial number is unchanged but the sub-serial number changes. Furthermore, alternate section index numbers are recorded twice, once for the alternate section index table, as shown in step (3106) and once in the main section index table when this process returns to FIG. 25 at step (2560).

Referring to FIG. 32, a flow chart (3200) is provided illustrating a process for constructing an end of document section serial number. As shown, the found sub-serial variable is assigned to the value true (3202). Thereafter, the section break type is assigned to an end of document abbreviation in the section type name table (3204). In addition, a value is assigned to the column-level section sub-serial number variable (3206), as shown and described in FIG. 35. Accordingly, the process shown herein sets the components of a section index number that fully describes the end of document section break.

Referring to FIG. 33, a flow chart (3300) is provided illustrating a process for constructing a section serial number of any other section break type that may be found in the selected scroll(s) but not heretofore illustrated. As shown, it is determined if this section break is a known other section break type (3302). In one embodiment, this determination includes logical breaks, which, in one embodiment, are traditional breaks according to a scribal tradition. The particulars depend completely on the scribal tradition for the scroll archetype. A negative response to the determination at step (3302) is an indication that this is a new type of other section break (3304). The section break type may or may not apply to the scroll archetype or any other scroll. An appropriate name and abbreviation is selected and recorded in the section type name table. Following step (3304) or a positive response to the determination at step (3302), it is determined if the use major section numbering variable is set to true (3306). A positive response to the determination at step (3306) is followed by determining if this section break represents a new major section (3308). If the response to the determination at step (3308) is positive, then the document-level major section name is set to the next entry abbreviation in the major section name table (3310), and the document-level major section serial number is set to a value of zero (3312). Accordingly, the first part of the other section type processing assesses whether or not a new section type has been discovered and correlates the break to major section numbering, if applicable.

Following the completion of the value setting at step (3312) or following a negative response to the determination at step (3308), it is determined if the use minor section numbering is set to true (3314), and if the value is set to true, if this section break represents a new minor section (3316). A positive response to the determination at step (3316) is followed by setting the document-level minor section number to the next entry abbreviation in the minor section name table (3318) and setting the document-level minor section serial number to a value of zero (3320). Following a negative response to the determinations at step (3306), (3314), or (3316) or following step (3320), the section break type is assigned to the appropriate abbreviation from the section type name table (3322) in one embodiment. It is then determined if the parsing scroll archetype variable is set to true (3324), and if the response is positive, it is determined if this section type should be enumerated (3326). If the section type should be enumerated, the column-level section serial number is incremented by a value of one (3328), the document-level global section serial number is incremented by a value of one (3330), and the process shown herein concludes. Accordingly the second part of the other section type processing correlates the break to minor section numbering, if applicable, assigns an appropriate abbreviation for the section type, and calculates the column-level section serial number and the document-level global section serial number.

However, if at step (3326) it is determined that this section type should not be enumerated, it is determined if the section sub-serial numbering should be used for this section type (3332). In one embodiment, the determination at step (3332) includes ascertaining whether the section sub-serial numbering is used in any other context. For example, it could be done on a per section type basis or for the whole scroll archetype or any other meaningful basis. A negative response to the determination at step (3332) concludes the process shown herein. However, a positive response to the determination at step (3332) or a negative response to the determination at step (3324) is following by assigning the found sub-serial variable to true (3334), assigning a value to the column-level section serial number variable (3336) as shown and described in FIG. 35, and recording the result of the assigning at step (3336) into an alternate section index table (3338), as shown and described in FIG. 34. After storing the results in the alternate section index table, it will also be stored into the main section index table. Accordingly, the alternate section numbers are recorded twice, one for each index type. Following the recordation(s) at step (3336) and (3338), the process shown herein concludes.

Figure 34:
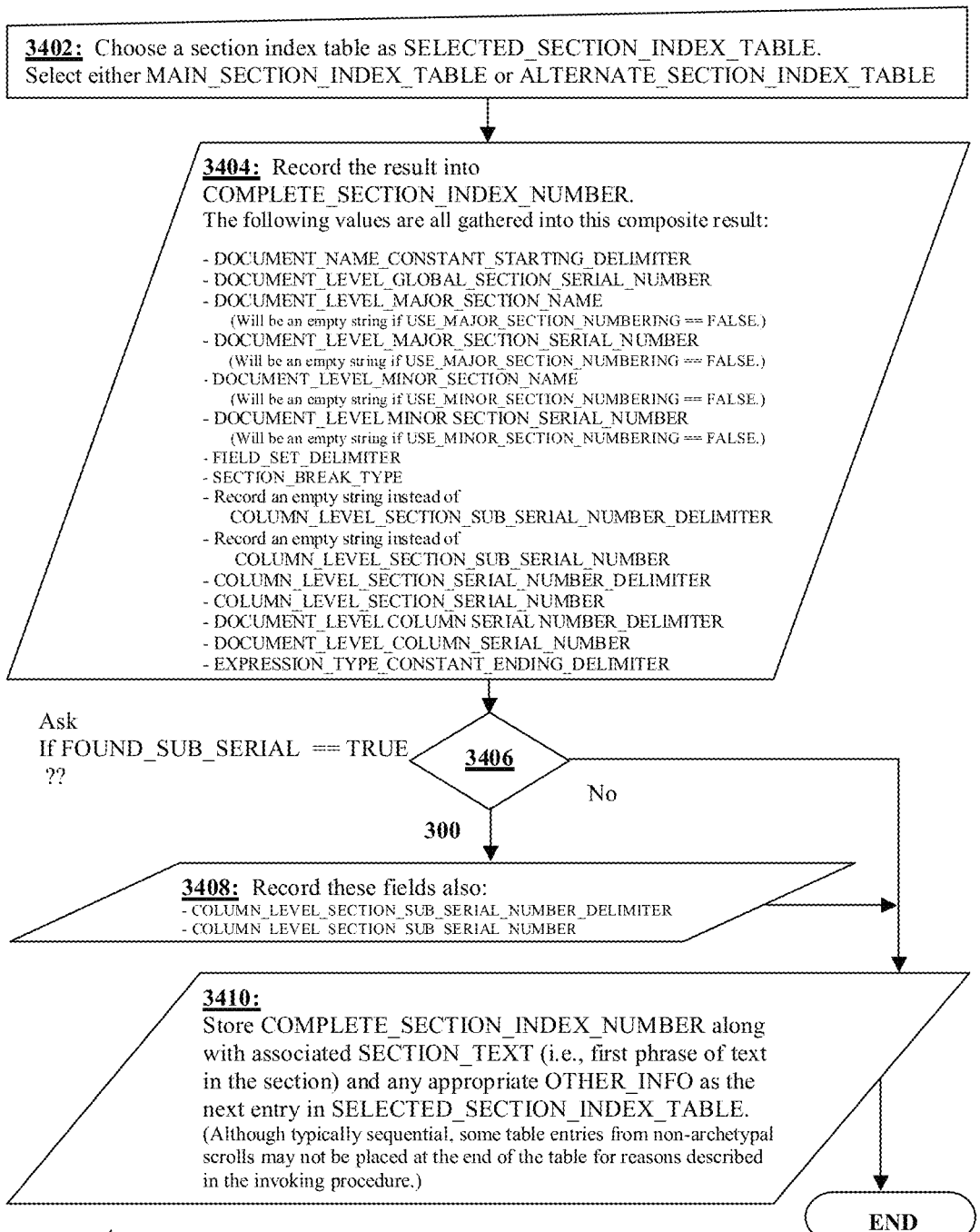
FIG. 34 depicts a flow chart for the assembly of an entire section index number from its composition of parts and entering that result into a selected section index table.

Referring to FIG. 34, a flow chart (3400) is provided illustrating a process for the assembly of an entire section index number from its composition of parts and entering that result into a selected section index table. As shown, a section index table is selected as either the main section index table or an alternate section index table (3402). Following the selection at step (3402), the results are recorded into a composite referred to herein as a complete section index number (3404). The following variables are a part of the composite comprising a complete section index number: document name constant starting delimiter, document-level global section serial number, document-level major section name, document-level major section serial number, document-level minor section name, document-level minor section serial number, field set delimiter, section break type, recordation of an empty string in place of a column-level section sub-serial number delimiter, recordation of an empty string in place of a column-level section sub-serial number, column-level column serial number delimiter, column level section serial number, document-level column serial number delimiter, document-level column serial number, and expression type constant ending delimiter. Following the recordation(s) at step (3404), it is determined if the found sub-serial variable is set to true (3406). A positive response to the determination includes recording additional fields into the index number, including the column-level section sub-serial number delimiter and the column-level section sub-serial number (3408). Thereafter, a complete section index number is stored, or in one embodiment, recorded, along with the section text and any other appropriate information as the next entry in the selected section index table (3410). In one embodiment, the section text in step (3410) is the first phrase of text in this section. Similarly, although table entries are typically sequential, some table entries may not be recorded at the end of the table. Accordingly, the process shown herein demonstrates and describes the process for recording section index entries.

Figure 35:
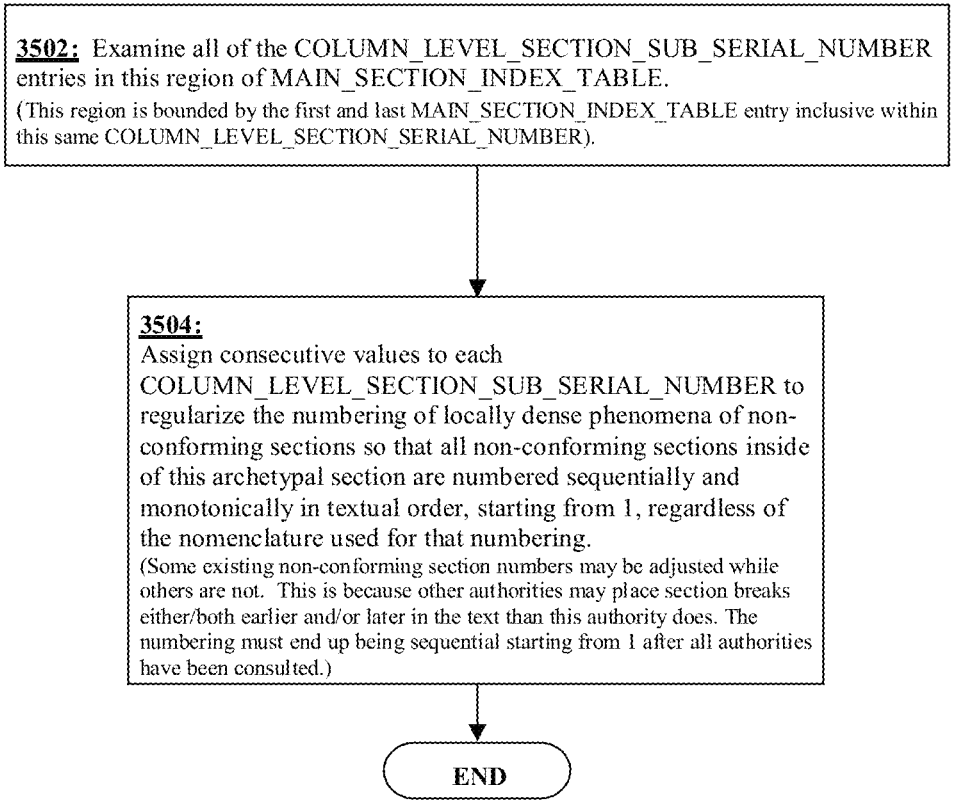
FIG. 35 depicts a flow chart for the adjustment of column-level section sub-serial numbers in the main section index table that must be manually reassigned in a sequential and monotonic manner in the final edition of both the main and alternate index tables.

Referring to FIG. 35, a flow chart (3500) is provided illustrating a process for the adjustment of column-level section sub-serial numbers in the main section index table that must be manually reassigned in a sequential and monotonic manner in the final edition of both the main and alternate index tables in order to regularize the numbering of locally dense phenomena of non-conforming section breaks. This process shows the adjustment of column-level section sub-serial numbers in an alternate section index table and must be manually reassigned in a sequential and monotonic manner in the final edition of that index table. As shown, a region of the main section index table within a particular column-level section serial number is reviewed (3502). This region is bounded by the first and last entries in this table having the same column-level section serial number. All entries containing column-level section sub-serial numbers are identified. After these are identified in step (3502), a consecutive value is assigned to the column-level section sub-serial number in each index entry to regularize the numbering of locally dense phenomena of non-conforming section (3504). Throughout the history of referencing this figure from the enclosing processes in FIG. 31, FIG. 32, and FIG. 33, iteration of this process this may entail multiple passes through the collection of index entries identifying new section sub-serial numbers affiliated with any particular section serial number. This is especially true when there are multiple non-conforming scrolls that have multiple section breaks in near proximity to each other but not always agreeing as to where all are positioned. Ultimately, the grand union of all section breaks must be assigned sequential, monotonically increasing section sub-serial numbers starting from the integer one. Accordingly, this is a manual, ad hoc process that may need to be invoked several times during the construction of the main section index and the alternate section index. On the other hand, it could theoretically be invoked exactly once when the entire index has been fully constructed and the sequential values assigned all in one pass. This decision is strictly up to the user as to whether or not it is better to perform this task along the way every time such a section sub-serial number is encountered or if a single pass is better after all index entries are fully constructed and cataloged. Different embodiments may choose one or the other of these approaches.

Equivalence Index Part

A suite of indexes is also supplied to map a scroll of a different archetype or a non-standard scroll of some type into the methods above for creating and utilizing both feature indexes and section indexes. FIG. 36 maps feature index numbers from a standard scroll archetype to one of a different archetype or a non-standard scroll while FIG. 37 performs the opposite mapping. FIG. 38 maps section index numbers from a standard scroll to one of a different archetype or a non-standard scroll while FIG. 39 performs the opposite mapping. Because these methods take a standard index number to generate an equivalent one for some non-standard scroll (and vice versa), these two pairs of methods are called equivalence indexes. FIG. 36 and FIG. 37 relate to feature equivalence index numbers; FIG. 38 and FIG. 39 relate to a section equivalence number.

Referring to FIG. 36, a flow chart (3600) is provided illustrating a process for converting a feature index number from the format of a standard scroll archetype to an equivalent feature index number for a scroll of another archetype or any non-standard scroll. It is called a feature equivalence index number. FIG. 37 performs the inverse task. The process shown in FIG. 36 is similar to the process shown in FIG. 38 but is more accurate because it has the column percentage available, which is not present as a factor in the process shown and described in FIG. 38.

As shown in FIG. 36, the scroll conforming to the archetype is opened and a desired feature is identified (3602). This feature is recorded as the current feature variable (3604). Considering this feature, the process returns to the flow chart of FIG. 11 to find the index number of the current feature based on the location of the current feature (3606). In one embodiment, absolute sub-mode indexing must be used. Also, the feature equivalence index number does not apply at step (3606) to scrolls with the same number of columns as the archetype layout because the mapping is one-to-one. Following step (3606), it is determined if this scroll conforms to the layout of the scroll archetype in terms of the number of columns (3608). In one embodiment, the determination at step (3608) includes any final partial column as an estimated fraction value. In one embodiment, the columns per scroll is a derived measurement and is therefore completely dependent on the number of lines per column and the size of each written letter. A positive response to the determination at step (3608) concludes the conversion process because there is nothing to convert. The feature equivalence index number is exactly identical to the feature index number of the scroll archetype. However, a negative response to the determination at step (3608) is followed by identifying the columns per scroll in the archetype scroll (3609), identifying the columns per scroll in this non-conforming scroll (3610), identifying the lines per column in this non-conforming scroll (3612), which in one embodiment is a value between 1 and 100, and defining the slot size variable as the quotient of 100 and the identified number of lines per column variable (3614). Thereafter, the feature index number is converted into an equivalent number called a feature equivalence index number (3616). The two components of the feature index number and the feature equivalence index number include the column serial number and the column heuristic, and no modifier. No modifier is possible since this method must use absolute indexing. In one embodiment, the conversion at step (3616) is performed with the following equation. The result comprises the two elements of the column number and the column percentage, the latter containing two significant decimal digits:

FEATURE_EQUIVALENCE_INDEX_NUMBER
(COLUMN_NUMBER,COLUMN_PERCENTAGE):=((FEATURE_INDEX_NUMBER(COLUMN_SERIAL_NUMBER,
COLUMN_HEURISTIC)−1.00)×
(COLUMNS_PER_SCROLL/
ARCHETYPE_COLUMNS_PER_SCROLL))+
1.00

The result of this conversion should be within the slot size percent of where the current feature is located in the non-conforming scroll (3618). Accordingly, the steps shown herein demonstrate converting a feature index number from the format of a standard scroll archetype to an equivalent feature index number for a scroll of another archetype or any non-standard scroll or any non-conforming scroll.

Referring to FIG. 37, a flow chart (3700) is provided illustrating a process for converting a feature equivalence index number of any scroll from a different archetype or any non-standard scroll into an analogous feature index number for a standard archetype scroll. FIG. 36 performs the inverse task. In the process shown in FIG. 37, this non-conforming scroll is opened and the desired feature is located (3702) and recorded. More specifically, the location of the desired feature is assigned to the current feature variable (3704). It is then determined if this scroll conforms to the layout of the scroll archetype in terms of number of columns (3706). In one embodiment, the determination at step (3706) includes any final partial column as an estimated fraction value. A positive response to the determination at step (3706) is followed by identifying the desired feature to consider and returning to FIG. 11 to find the feature index number of the location of this feature (3708). In one embodiment, absolute indexing must be used. Also, the feature equivalence index number does not apply at step (3708) to scrolls with the same number of columns as the archetype layout because the mapping is one-to-one. At this point, the conversion process shown herein concludes because there is nothing to convert. The feature index number is exactly identical to the feature index number of the scroll archetype.

However, if the response to the determination at step (3706) is negative, the columns per scroll for the archetype scroll is identified and assigned to the archetype columns per scroll variable (3710). Next, the archetype slot size is assigned to the value obtained from the quotient of 100 and the lines per column variable (3714). It is then determined if the number of columns in this scroll is a known quantity (3716). If the number of columns is unknown, then the scroll is turned to the last column and the process returns to FIG. 5 to find the number of columns in the scroll, which is recorded and assigned to the columns per scroll variable, after which the scroll is again turned to the column where the current feature value is located (3718). However, if the response to the determination at step (3716) is positive, the value is recorded and assigned to the columns per scroll variable (3720).

Following the recordation and assignment at step (3720) or following step (3718), it is then determined if the column percentage value will be entered manually or through use of a percentage estimator ruler (3722). Manual estimation may be used here when a percentage estimator of appropriate dimensions is not available. A manual entry includes estimating the percentage down the column where the current feature is located and recording this value as the column percentage variable (3724). By contrast, choosing to use a percentage estimator ruler at step (3722) is followed by obtaining a percentage estimator ruler (3726), placing the ruler adjacent to the column on the scroll, and measuring the percentage down the column of the scroll of the line containing the current feature (3728). In one embodiment, this value is a column percentage. Following completion the ruler-facilitated process, the returned value is recorded and assigned to the column percentage variable (3730). Thereafter, it is determined if the column number is known where the current feature is located in this non-conforming scroll (3732). A negative response to the determination is following by a return to FIG. 5 to find the column number wherein the current feature is located in this non-conforming scroll, and to record and assign the result to the column number variable (3734). Conversely, a positive response to the determination at step (3732) is followed by recording this value as the column number variable (3736). Following the recordation at either step (3734) or step (3736), the column number variable and the column percentage variable are combined to create the feature equivalence index number variable (3738). In one embodiment, the feature equivalence index number is similar to the feature index number. More specifically, it includes the column serial number, the column heuristic, and no modifier. Similar to a feature index number with no modifier, this number will look like a fixed-point decimal number with an integer and a fraction. Following the creation at step (3738), the feature equivalence index number is converted into an equivalent feature index number variable (3740). The components of each include the column serial number, the column heuristic, and no modifier. In one embodiment, the conversion at step (3740) is performed with the following equation:

FEATURE_INDEX_NUMBER(COLUMN_
  SERIAL_NUMBER,COLUMN_HEURISTIC):=
  ((FEATURE_EQUIVALENCE_INDEX_NUM-
  BER(COLUMN_NUMBER,COLUMN_PER-
  CENTAGE)−1.00)×
  (ARCHETYPE_COLUMNS_PER_SCROLL/
  COLUMNS_PER_SCROLL))+1.00

The result of the conversion should be within plus or minus the archetype slot size value percent of where the current feature is located in an archetype scroll (3742). In one embodiment, if a manual estimate is chosen at step (3722), then any actual error built into that estimate of column percentage at step (3724) will necessarily be reflected in the accuracy of the above equation.

Referring to FIG. 38, a flow chart (3800) is provided illustrating a process for converting a section index number from a format of a standard scroll archetype to an equivalent section index number for a scroll of another archetype or any non-standard scroll. This is to say to use only a part of the index number, namely the column number only with no column percentage, for the conversion process. It is called a section equivalence index number. FIG. 39 performs the inverse task. The process shown in FIG. 38 is similar to the process shown in FIG. 36 but is less accurate because it does not have the column percentage available where FIG. 36 does have it available. As shown in FIG. 38, the archetype scroll is opened and the desired feature in the form of a section break is identified and assigned to the desired feature variable (3802). If a section index number for this feature is known, then its document level global section serial number is known and is recorded into the desired column serial number variable. Otherwise, the process returns to FIG. 5 to find the column number of the desired feature and to record and assign that result to the desired column serial number variable (3804). The column serial number of the previous feature index number variable is assigned the value of the desired column serial number variable (3806), the column heuristic of the previous feature index number variable is assigned a value of zero (3808), the column serial number of the desired column serial number variable is assigned the value of one plus the desired column serial number variable (3810), and the column heuristic of the next feature index number variable is assigned a value of zero (3812). Following the assignments at step (3806) through step (3812), the process returns to FIG. 36 using the feature located at the feature index in the previous feature index number variable and stores the result as the previous section equivalence index number (3814). Then the process returns again to FIG. 36 using the feature located at the feature index in the next feature index number variable and stores the result as the next section equivalence index number (3816). Thereafter, the desired feature will be located in the non-conforming scroll somewhere between the previous and next section equivalence numbers (3818). Interpolation of the more exact positioning of this result is not reliable due to the intrinsic lack of precision. However, a section index of this scroll may help at this point to overcome this shortcoming. Also, due to this lower precision, this index equivalence method may be applied to an archetype scroll, even if doing so is not a useful exercise in that it simply lowers the precision of the resulting section equivalence index number. Accordingly, as shown herein a section equivalence index number for any non-standard or non-conforming scroll is provided as an analogous index number to the section index number of its archetype scroll.

Referring to FIG. 39, a flow chart (3900) is provided illustrating a process for converting a section equivalence index number of any scroll from a different archetype or any non-standard scroll or non-conforming scroll into a section index number for a standard archetype scroll. FIG. 38 performs the inverse task. The process shown in FIG. 39 is similar to the process shown in FIG. 37 but is less accurate because it does not have the column percentage available where FIG. 37 does have it available. As shown in FIG. 39, the non-conforming scroll is opened and the desired feature is identified (3902) and the result is recorded as the current feature variable (3904). Using the current feature value assigned at step (3904), the process returns to FIG. 37 to find the feature index number of the location of this feature (3906). It is then determined if a section column index of this scroll (i.e., numeric) is available (3908). An alphabetic section index of this scroll could be created but would typically be some subset of an alphabetic feature index, which is often created for a given archetype scroll. As such, this index style is not usually created for a section index. A positive response to the determination at step (3908) is followed by locating the current feature in the section column index using the column serial number of the feature index number variable (3910). However, a negative response to the determination at step (3908) is followed by a return to FIG. 37 to create or update the section column index of this scroll type (3916). In one embodiment, this non-conforming scroll is used for creating non-archetype data so that the current feature may be looked up in a resulting section column index. Following step (3910), it is determined if the value of the current feature variable was located in the current section column index (3912). A negative response is followed by a return to step (3916), also indicating and then meeting the need to update the existing section column index with this feature and possibly other features. A positive response is followed by recording the results and assigning it to the variable section index number (3914). In all cases when step (3916) concludes, it continues on to step (3914). Due to a lowering of precision, this inverse index equivalence method may be applied to an archetype scroll, even if doing so is not a useful exercise in that it simply lowers the precision of the resulting section index number. In any event, when step (3914) concludes, the process is finished. Accordingly, as shown herein, a section equivalence index number for any non-standard scroll or non-conforming scroll is converted to the section index number for its archetype scroll.

Computer Implementation

Figure 40:
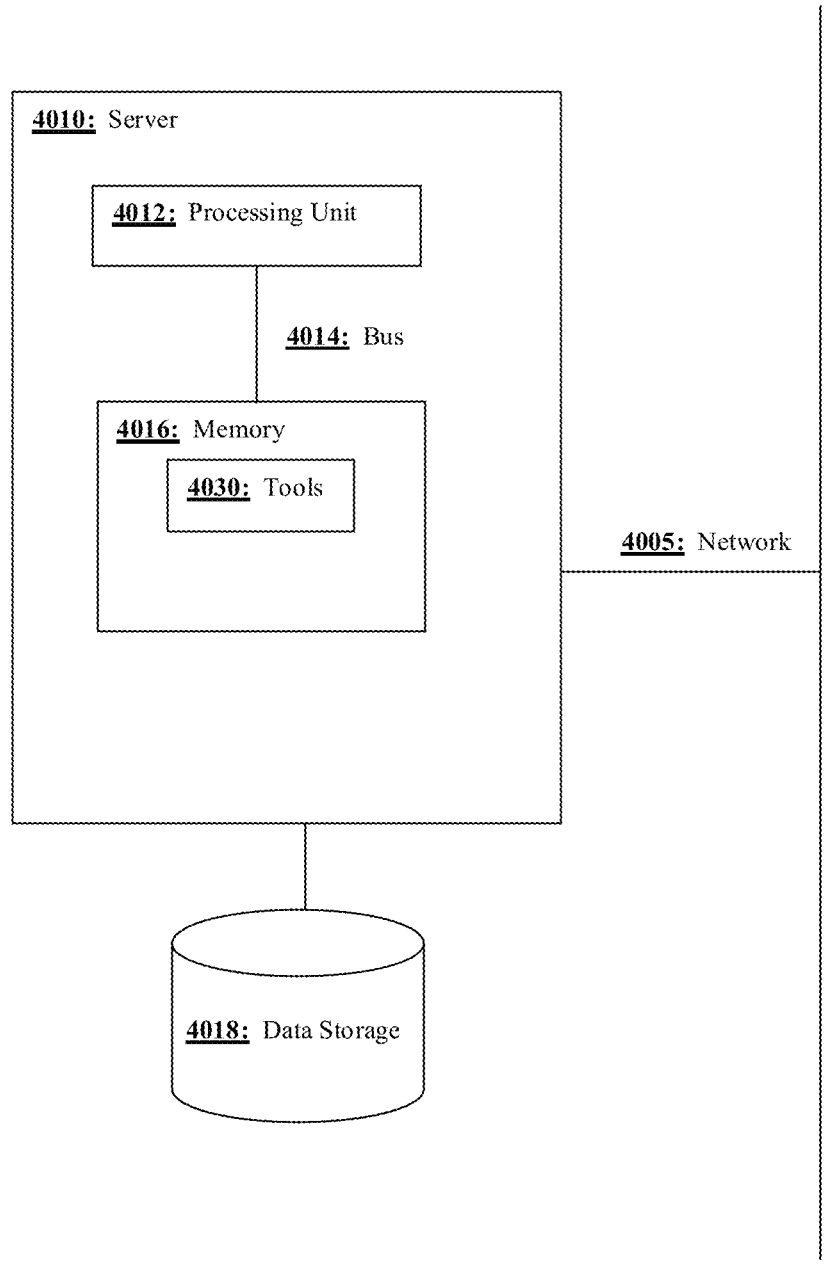
FIG. 40 is a block diagram illustrating one embodiment of the basic architecture of a computer system acting as a server to implement program code to create, generate, and make use of the indices described herein.

The processes shown and described above may be arranged in computer-implemented program code for execution on a computer system to create, generate, and make use of the indices described herein. Referring to FIG. 40, a block diagram is provided for processing the program code (4000), thereby improving how data associated with archetype scroll(s) is accessed and utilized. As shown, a server (4010) is provided with a processing unit (4012) in communication with memory (4016) across a bus (4014). Data storage (4018) is provided in communication with the server (4010). In addition, a network connection (4005) is provided to enable the server (4010) to communicate with other machines across the network. As shown herein, a set of tools (4030) are provided in communication with the processing unit (4012) to support execution of the processes described in the flow charts above. These tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions, which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Figure 41:
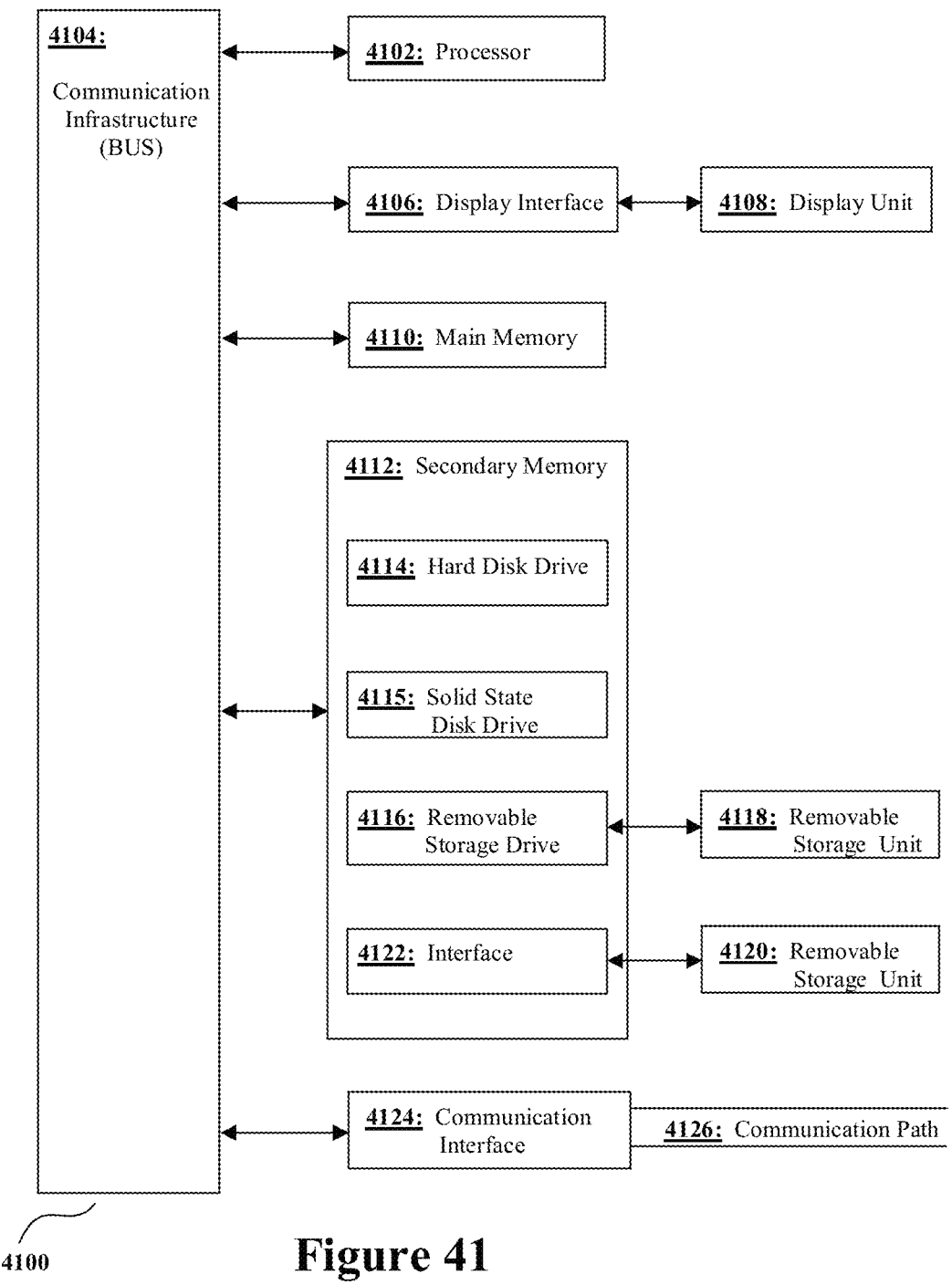
FIG. 41 is a block diagram illustrating additional details.

Referring now to the block diagram of FIG. 41, additional details are now described with respect to implementing an embodiment of the present invention. The computer system (4100) includes one or more processors, such as a processor (4102). The processor (4102) is connected to a communication infrastructure (4104), e.g., a communications bus, cross-over bar, or network.

The computer system can include a display interface (4106) that forwards graphics, text, and other data from the communication infrastructure (4104) (or from a frame buffer not shown) for display on a display unit (4108). The computer system also includes a main memory (4110), preferably random access memory (RAM), and may also include a secondary memory (4112). The secondary memory (4112) may include, for example, a hard disk drive (4114) and/or a solid-state disk (4115), and/or a removable storage drive (4116), representing, for example, a floppy disk drive, a magnetic tape drive, or an optical disk drive. The removable storage drive (4116) reads from and/or writes to a removable storage unit (4118) in a manner well known to those having ordinary skill in the art. Removable storage unit (4118) represents, for example, a floppy disk, a compact disc, a magnetic tape, or an optical disk, etc., which is read by and written to by removable storage drive (4116).

In alternative embodiments, the secondary memory (4112) may include other similar means for allowing computer programs or other instructions to be loaded into the computer system. Such means may include, for example, a removable storage unit (4120) and an interface (4122). Examples of such means may include a program package and package interface (such as that found in video game devices), a removable memory chip (such as an EPROM, PROM, or flash ROM) and associated socket, and other removable storage units (4120) and interfaces (4122) which allow software and data to be transferred from the removable storage unit (4120) to the computer system and/or vice versa.

The computer system may also include a communications interface (4124). Communications interface (4124) allows software and data to be transferred between the computer system and external devices. Examples of communications interface (4124) may include a modem, a network interface (such as an Ethernet card), a communications port, a PCMCIA slot and card, etc. Software and data transferred via communications interface (4124) is in the form of signals which may be, for example, electronic, electromagnetic, optical, or other signals capable of being received by communications interface (4124). These signals are provided to communications interface (4124) via a communications path, i.e., channel (4126). This communications path (4126) carries signals and may be implemented using wire or cable, fiber optics, a phone line, a cellular phone link, a radio frequency (RF) link, and/or other communication channels.

In this document, the terms "computer program medium," "computer usable medium," and "computer-readable medium" are used to generally refer to media such as main memory (4110) and secondary memory (4112). Media for secondary memory (4112) may include removable storage unit (4118 and/or 4120), a hard disk installed in hard disk drive (4114), the flash ROM of a solid state disk drive (4115) and/or the medium contained within a removable storage unit (4120).

Computer programs (also called computer control logic) are stored in main memory (4110) and/or secondary memory (4112). Computer programs may also be received via a communication interface (4124). Such computer programs, when run, enable the computer system to perform the features of the present invention as discussed herein. In particular, the computer programs, when run, enable the processor (4102) to perform the features of the computer system. Accordingly, such computer programs represent controllers of the computer system.

The present invention may be a system, a method, and/or a computer program product. The computer program product may include a computer-readable storage medium (or media) having computer-readable program instructions and/or data thereon for causing a processor to carry out aspects of the present invention.

The computer-readable storage medium can be a tangible device that can retain and store instructions and/or for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a solid-state disk (SSD), a memory stick, a floppy disk, a mechanically encoded device such as punch-cards or raised structures in a groove having instructions or data recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (i.e., light pulses passing through a fiber-optic cable), or electrical signals transmitted through a wire.

Computer-readable program instructions and data described herein can be downloaded to respective computing/processing devices from a computer-readable storage medium or to an external computer or external storage device via a network, for example, the Internet, a local area network, a wide area network and/or a wireless network. The network may comprise copper or other metallic transmission cables, optical transmission fibers, wireless transmission, routers, firewalls, switches, gateway computers and/or edge servers and/or similar types of cabling or equipment. A network adapter card or network interface in each computing/processing device receives computer-readable program instructions from the network and forwards the computer-readable program instructions for storage in a computer-readable storage medium within the respective computing/processing device. It can also transmit similar information in the opposite direction.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming or scripting languages, whether compiled or interpreted, such as Smalltalk, Java, Python, Ruby, C++ or the like, and conventional procedural programming languages and scripting languages, whether compiled or interpreted such as Perl, the C programming language or similar scripting and programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Process Overview

Figure 42:
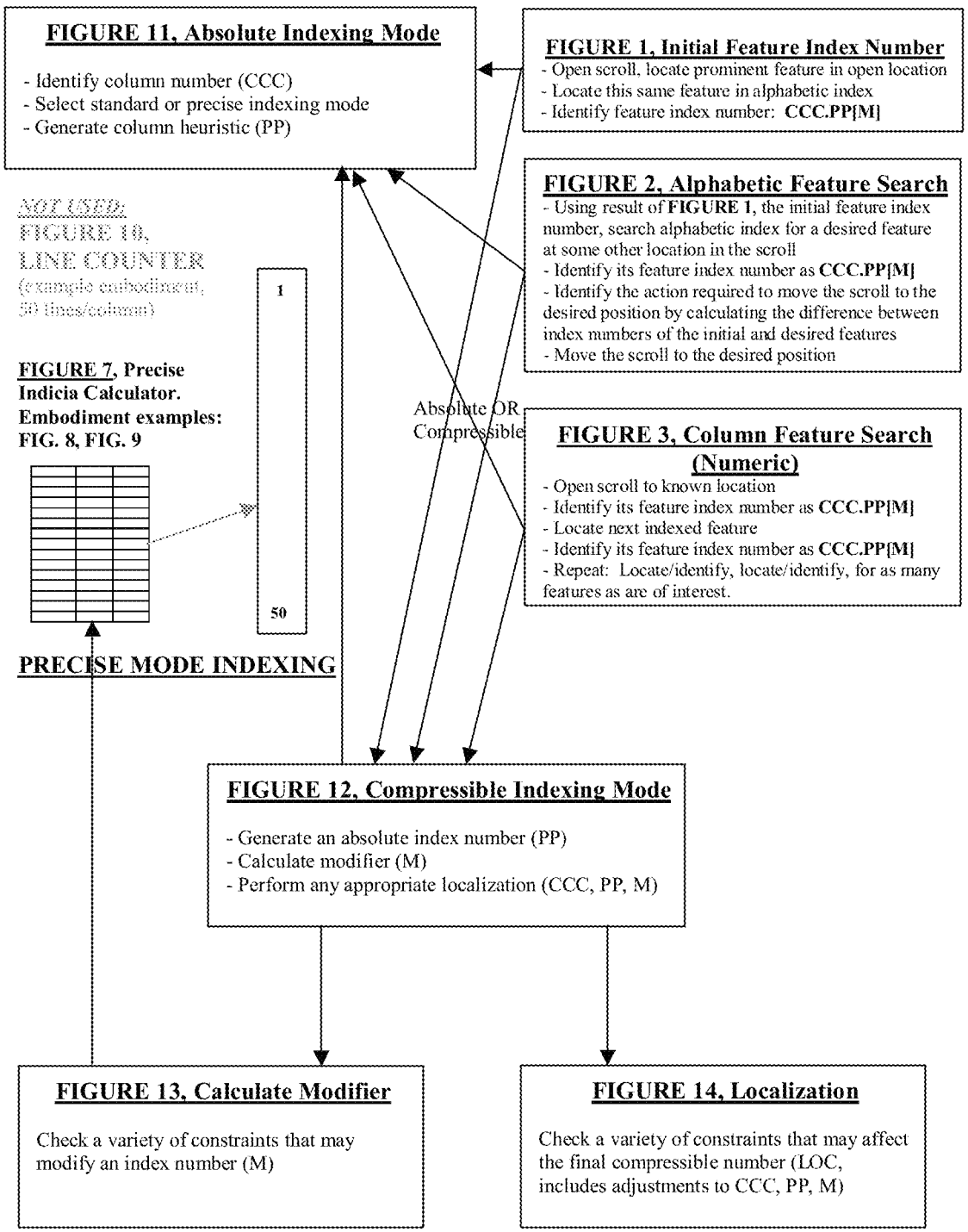
FIG. 42 is a flow diagram illustrating an overview of the index process demonstrating the interaction of FIG. 1 through FIG. 39 as a process.
Figure 42:
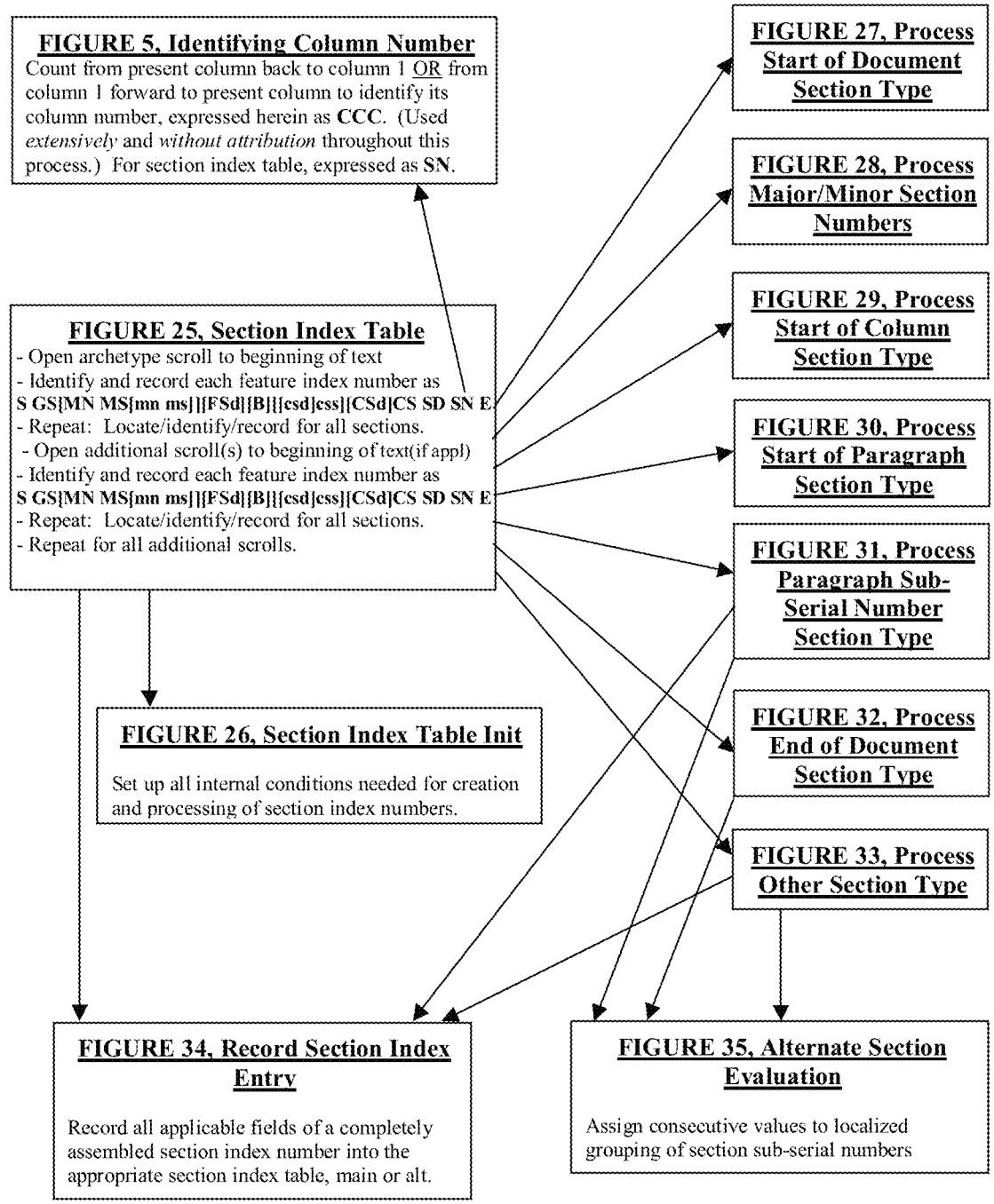
Figure 42:
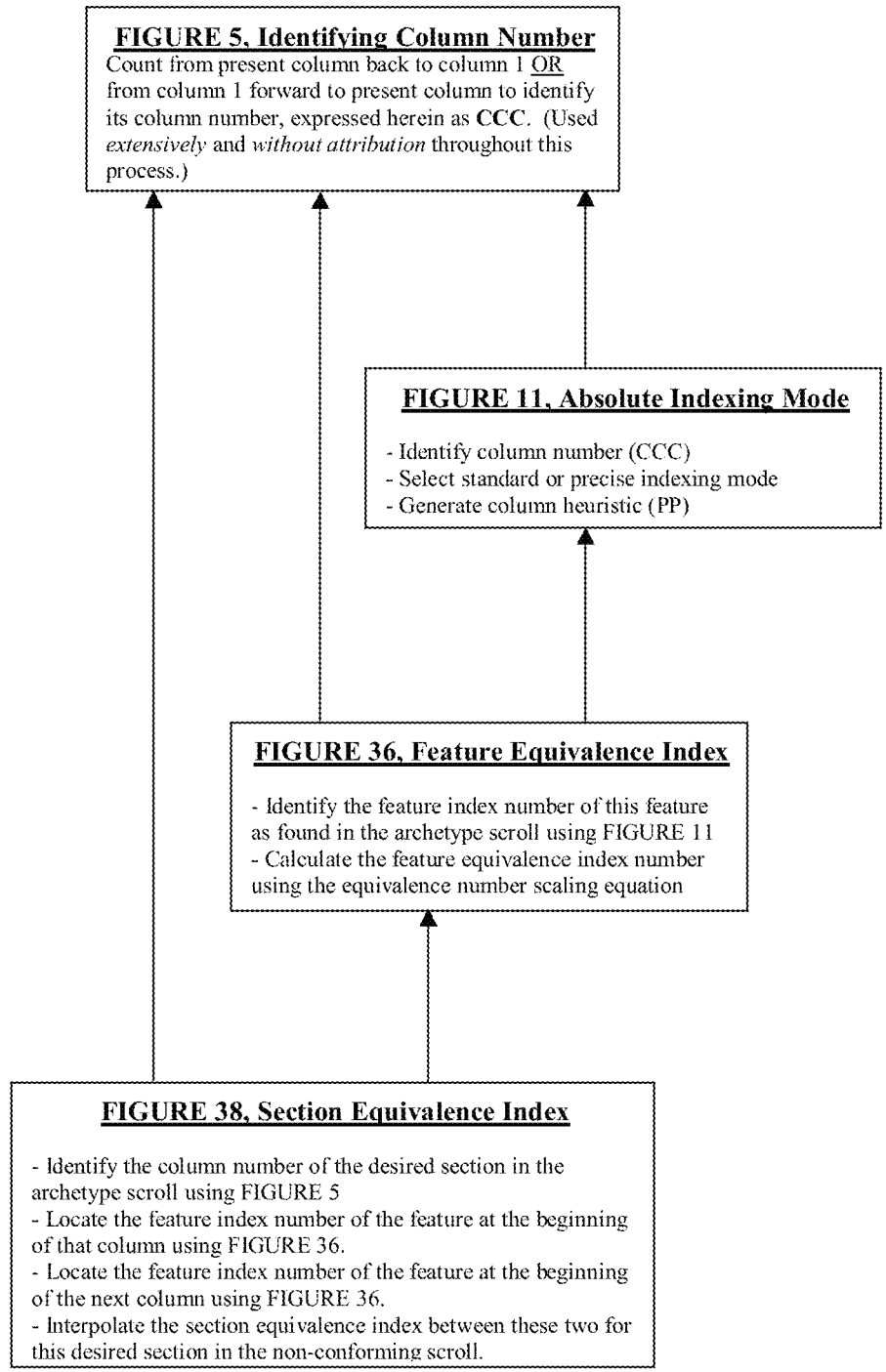

Referring to FIG. 42, an overview of the index process at the high level is provided illustrating the relationship of the processes shown and described in FIG. 1 through FIG. 39, and more specifically, the inter-relationship of the processes. FIG. 42 is separated into fourteen sections. The first section, Section A (§ A), shows a process of navigating a scroll with an alphabetic feature index, a numeric feature index, or both, and employing either standard mode indexing or precise mode indexing. The second section, Section B (§ B), shows a distinction between standard mode indexing and precise mode indexing. Regarding precise mode indexing, the third section, Section C (§ C), demonstrates how absolute mode indexing employs either standard mode indexing or precise mode indexing. The fourth section, Section D (§ D), shows how compressible mode indexing is structured and its relationship to absolute mode indexing. The fifth section, Section E (§ E), gathers the information about how standard mode indexing works with precise mode indexing in its two variants, absolute indexing and compressible indexing. The sixth section, Section F (§ F), demonstrates absolute word index numbering and compressible word index numbering and how they employ precise mode indexing. The seventh section, Section G (§ G), shows the combined index number and how it relates to the feature index using compressible indexing and to the word index using both absolute indexing and compressible indexing. The eighth section, Section H (§ H), shows how index tables for standard mode indexing, precise mode absolute indexing, precise mode compressible indexing, absolute word indexing, compressible word indexing, absolute combined indexing, and compressible combined indexing rely on construction of index numbers of the respective type. The ninth section, Section I (§ I), shows the basic process of navigating a scroll with alphabetic section index, a numeric section index, or both, and how those relate to how a section index table of section index numbers. The tenth section, Section J (§ J), shows how a section index table is constructed of section index numbers and the numerous categories of section breaks used in constructing those section index numbers. The eleventh section, Section K (§ K), shows how a feature equivalence number is constructed and how it depends on absolute feature indexing. The twelfth section, Section L (§ L), shows how a feature equivalence index number may be employed to discover its related feature index number, which is the inverse of the process shown in Section K (§ K). The thirteenth section, Section M (§ M), shows how a section equivalence number is constructed and how it depends on feature equivalence indexing and absolute indexing. The fourteenth section, Section N (§ N), shows how a section equivalence index number may be employed to discover its related section index number. Accordingly, the flow diagrams shown in Sections A-N demonstrate the indexing process in its entirety as a single holistic process.

Apparatus for Computer Implementation

Figure 43:
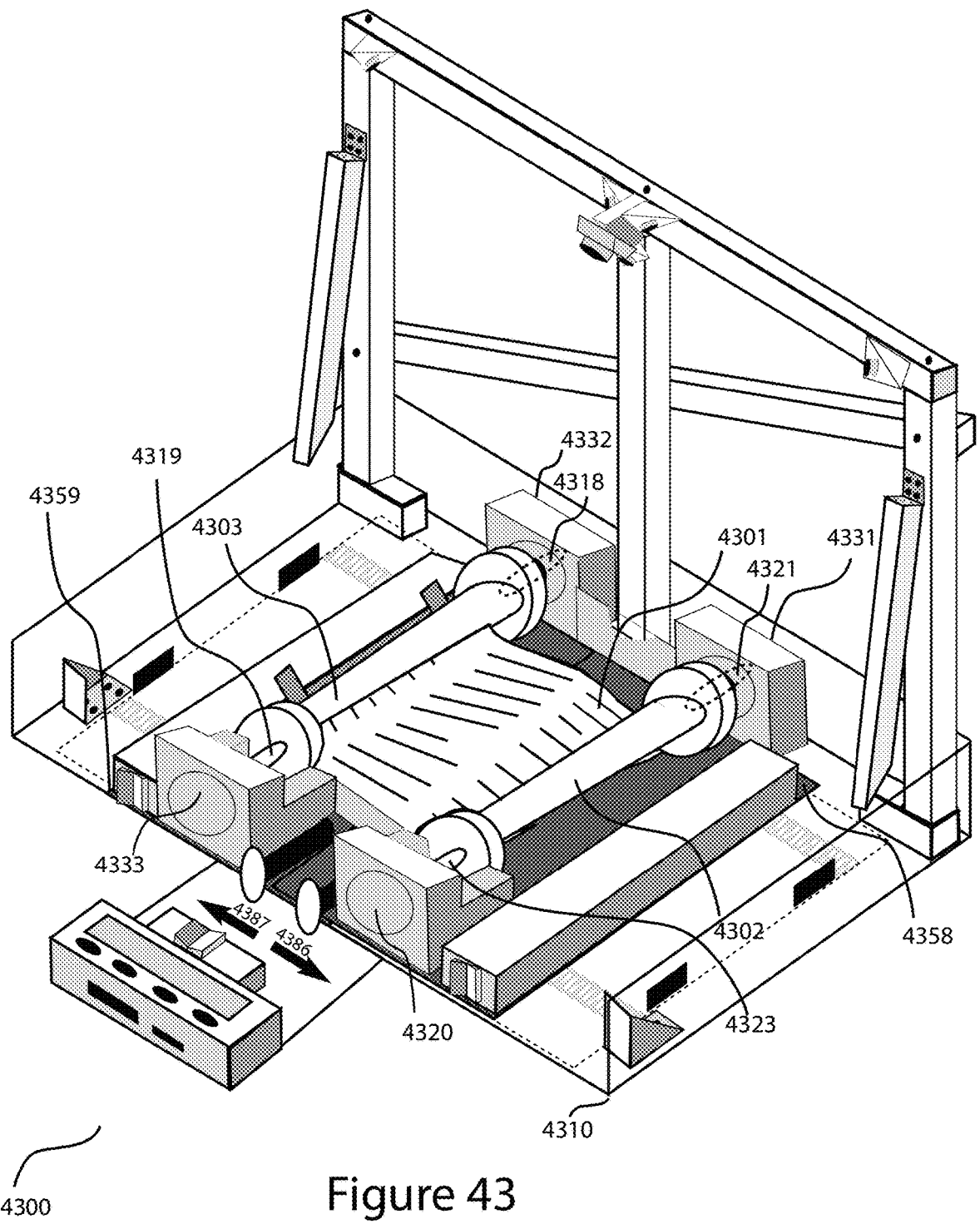
FIG. 43 is a diagram depicting an apparatus to read and position the scroll in conjunction with the computer implementation of the invention.

Referring to FIG. 43, a diagram (4300) is provided depicting an apparatus (4310) to read and position the scroll in conjunction with the computer implementation of the invention. A scroll with associated parchment (4301) is shown placed in the apparatus (4310). The scroll (4301) is shown with a first scroll roller (4303) and a second scroll roller (4302) in which the parchment of the scroll (4301) is wound around. Each of the first and second scroll rollers (4303) and (4302), respectively, has a handle extending from a proximal and a distal end of each scroll roller. As shown herein, the first scroll roller (4303) is shown with handles (4318) and (4319) and the second scroll roller (4302) is shown with handles (4321) and (4323). To insert the scroll (4301) into the apparatus (4310), the first scroll roller (4303) is placed into and received by a first scroll mover assembly (4359) and the second scroll roller (4302) is placed into and received by a second scroll mover assembly (4358). As shown, the distal handle (4318) of the first scroll roller (4303) is placed into and received by a first roller guide (4332) and the proximal handle (4319) of the first scroll roller (4303) is placed into and received by a first scroll rotator (4333) of the first scroll mover assembly (4359). The distal handle (4321) on the second scroll roller (4302) is placed into and received by a second roller guide (4331) and the proximal handle (4323) on the second scroll roller (4302) is placed into and received by a second scroll rotator (4320) of the second scroll mover assembly (4358). The first scroll roller (4303) is therefore loosely suspended between the first scroll roller guide (4332) and the first scroll rotator (4333) on the first scroll mover assembly (4359) while the second scroll roller (4302) is therefore loosely suspended between the second scroll roller guide (4331) and the second scroll rotator (4320) on the second scroll mover assembly (4358). Accordingly, the scroll is inserted into the apparatus (4310) and is ready to be locked into position.

In an exemplary embodiment, when the scroll (4301) is installed or subject to installation into the apparatus (4310), the first scroll mover assembly (4359) is positioned all the way in the second direction (4386), and the second scroll mover assembly (4358) is positioned all the way in the first direction (4387) to hold the corresponding scroll mover assemblies (4358) and (4359) in a closed and locked position. Similarly, in an exemplary embodiment, before any attempt is made to rotate the first and second scroll rollers (4333) and (4320), the corresponding first and second scroll mover assemblies (4359) and (4358), respectively, are set into a locked position. The effect of locking the scroll mover assemblies protects the parchment (4301) from being torn or wrinkled while being positioned in the apparatus (4310) due to one of the rollers being improperly fitted. The locked position is also a fixed location to enable the scroll sensors to produce meaningful results, as described below. Thus the apparatus (4310) is fully opened and as shown herein as being in receipt of the scroll (4301). Accordingly, as shown and described herein, the scroll is inserted and received by the apparatus (4310) and the corresponding scroll mover assemblies are subject to locking.

Figure 44:
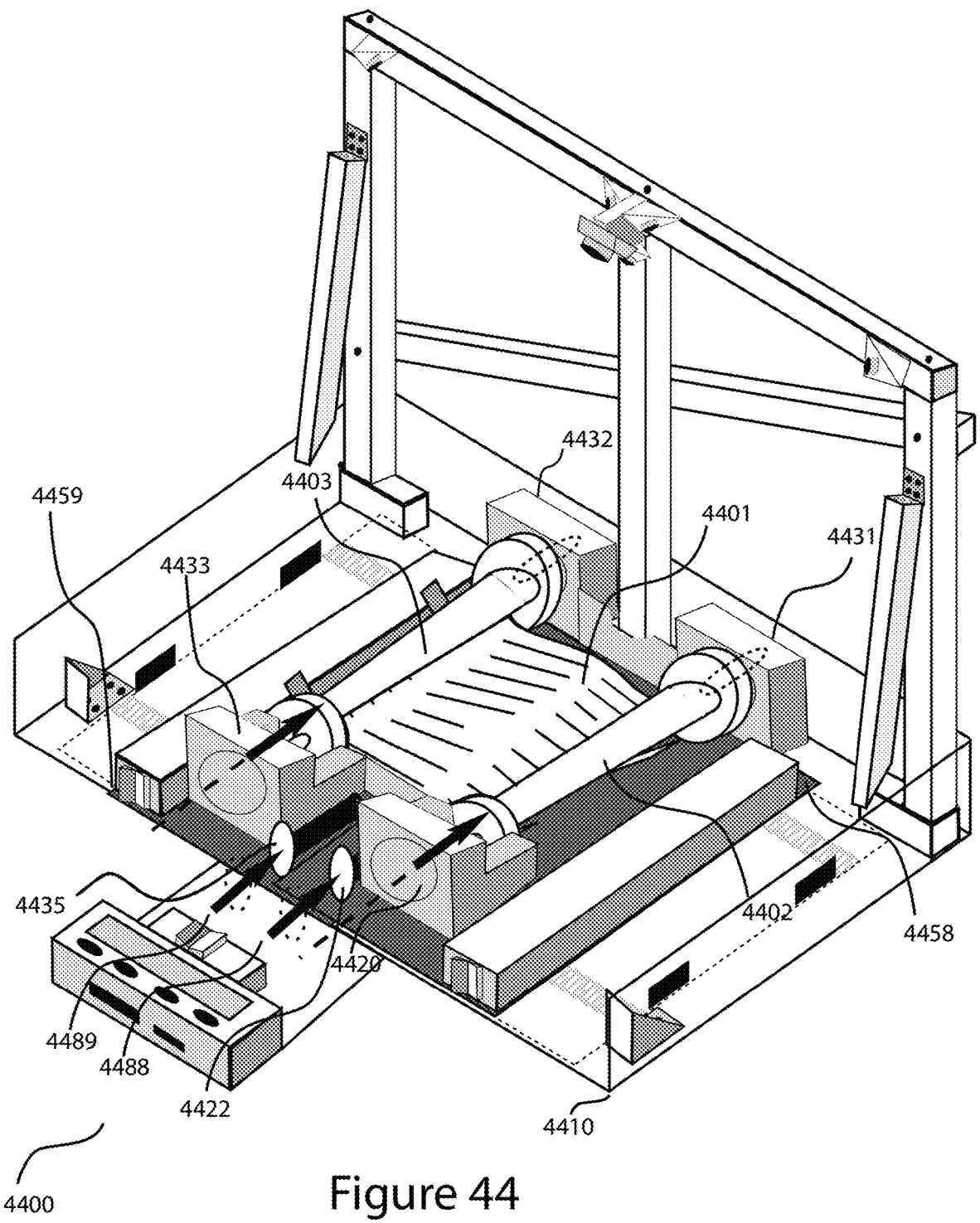
FIG. 44 is a diagram depicting locking the scroll in place in the apparatus of FIG. 43.

Referring to FIG. 44, a diagram (4400) is provided depicting locking the scroll (4401) in place in the apparatus (4410). Like parts are designated by like reference numerals in FIGS. 43 and 44, with the reference numerals of FIG. 44 changed from 4300 series of FIGS. 43 to 4400 series for FIG. 44. For example, the parts/components (4401), (4402), (4403), (4410), (4420), (4431), (4432), (4433), (4458), and (4459) of FIG. 44 have the same or similar properties and features of corresponding apparatus and components (4301), (4302), (4303), (4310), (4320), (4331), (4332), (4333), (4358), and (4359), respectively, of FIG. 43. Once the scroll is inserted into the apparatus (4410), the first and second scroll mover assemblies (4459) and (4458) are placed into an unlocked position during the same action where the scroll rotators are placed in a locked position, also shown herein as a scroll rotator operating position. In an embodiment, the action of locking the scroll rotators at the same time as unlocking the scroll mover assemblies is enabled by pressing or actuating (4489) and (4488) the first and second engagement levers (4435) and (4422), respectively, which has the effect of moving the scroll rotators up against the scroll rollers, which in turn are moved up against the scroll roller guides. A spring action in the engagement levers (4435) and (4422) sets the scroll rotator locks, then backs off the compaction of the scroll rotators (4333) and (4320), the scroll rollers (4303) and (4302), and the scroll roller guides (4332) and (4331) by an amount sufficient to permit free rotation of both scroll rollers (4303) and (4302). This back off action has the localized effect of locking the scroll rotators onto the scroll mover assemblies so they may rotate but cannot move in either a distal or proximal direction. The effect of the back off action at the distal end of actions (4489) and (4488) releases the scroll mover assemblies (4459) and (4458) to travel in a manner for opening and closing the scroll. The release action loosens the scroll (4401) from a stationary position and makes it available for examination. The examining includes rotating either or both scroll rollers (4303) and (4302) by means of their respective scroll rotators (4333) and (4320).

Figure 45:
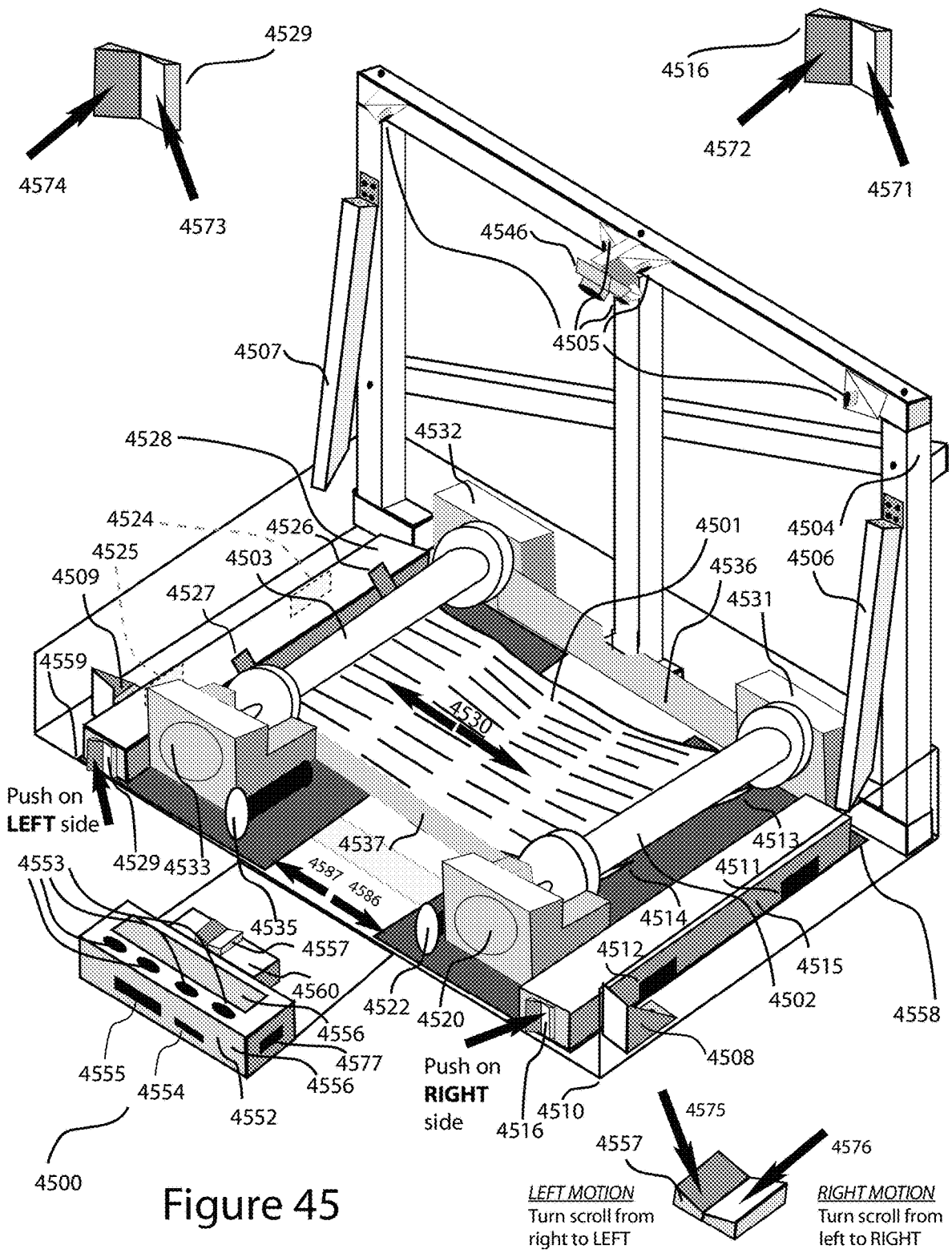
FIG. 45 is a diagram depicting the scroll installed and locked in place in the apparatus of FIG. 44 and ready for examination.

Referring to FIG. 45, a diagram (4500) is provided depicting the scroll (4501) installed and locked in place in the apparatus (4510) and ready for examination. Like parts are designated by like reference numerals in FIGS. 44 and 45, with the reference numerals of FIG. 45 changed from 4400 series of FIGS. 44 to 4500 series for FIG. 45. Once the scroll (4501) has been installed into the apparatus (4510) and locked in by the first and second engagement levers (4535) and (4522) then the first and second scroll mover assemblies (4559) and (4558) will have received their corresponding scroll rollers (4503) and (4502) into their roller guides (4532) and (4531) and scroll rotators (4533) and (4520), and be in a state to examine the visible portion (4530) of the scroll (4501). Namely, the scroll rotators have been locked and the scroll movers unlocked by the action of the engagement levers and the scroll is ready for examination under the direction of the controller (4552). The visible portion (4530) is the portion of the scroll parchment that is positioned between the first and second scroll rollers. The visible portion (4530) may be adjusted using the first side scroll mover switch (4529) and second side scroll mover switch (4516). In an exemplary embodiment, switches (4529) and (4516) are rocker switches of momentary, single pole, double throw, center open configuration. Each of the first and second switches (4529) and (4516) may be operated individually, near-simultaneously, or simultaneously depending on a particular situation. If at any time the controller detects abnormally high tension on the parchment, these switches will be overridden and both scroll movers (4528) and (4515) disengaged through the controller (4552) at which time the switches must both be returned to the center open position to attempt a retry of that operation. In an embodiment, the switches are manually actuated for reaching the returned center open position. If at any time the controller detects abnormally low tension on the parchment, these switches will be overridden and both scroll movers (4528) and (4515) disengaged through the controller (4552) at which time the switches must both be manually returned to the center open position to attempt a retry of that operation.

To open the scroll (4501), one or both of the first and second switches (4529) and/or (4516) is activated. In an example embodiment, second side scroll mover switch (4516) is activated by pressing one of the sides of the switch, with the sides shown herein as (4571) and (4572). The momentary switch activation of (4571) causes actuation of the second scroll mover (4515) and the second scroll rotator (4520), which may cause movement of the entire second scroll mover assembly (4558) in a corresponding direction to the rocking action, which is shown herein as unwinding and opening the second side of the scroll (4501). By use of momentary switch action (4571) on second side rocker switch (4516), scroll roller (4502) thereby unwinds the parchment. It may rotate freely until switch (4516) is released or until the second scroll mover assembly (4558) contacts one or more second side travel limit sensors (4511) and (4512), at which time switch (4516) is overridden by controller (4552) and second side scroll mover (4515) disengaged by controller (4552). By use of momentary switch action (4572) instead, scroll roller (4502) does not rotate freely but winds up the parchment under tension from rotary action of second scroll rotator (4520) during which time the second scroll mover (4515) is moving the second scroll mover assembly (4558) in the first direction (4587) at a rate to keep nominal tension on the parchment due to the rotation of second scroll rotator (4520).

While the second side scroll mover assembly (4558) is subject to movement, the parchment of the scroll (4501) pushes against second side scroll radius sensors (4513) and (4514). The sensors (4513) and (4514) measure the radius of the parchment from the axis of the second roller (4502) and communicate the measurement to the controller (4552). In an embodiment, the sensors (4513) and (4514) are comprised of levers that operate with a spring action to push the lever up against the parchment while opposed by the downward motion of the parchment against the lever. The measurement indicates how much parchment is wound around the second scroll roller (4502). Due to the non-uniform nature of the parchment associated with scroll (4501), the simultaneous measurements on any and/or all of the first side scroll radius sensors (4526) and (4527) and/or second side scroll radius sensors (4513) and (4514) may differ significantly. Their meanings must be properly interpreted by the controller (4552) for proper corrective action, if any, by means of movement of the scroll movers (4528) and (4515), scroll rotators (4533) and (4520), and/or disengagement of scroll mover switches (4529) and (4516).

Similar to the second scroll mover assembly (4558), the first scroll mover assembly (4559) is similarly subject to movement by actuation of a corresponding first scroll switch (4529) on its first half with momentary switch action (4574). This action activates the first scroll mover (4528) and the first scroll rotator (4533), causing movement of the first scroll mover assembly (4559) to the first side (4587), unwinding scroll roller (4503) and opening the first side of the scroll (4501).

In an example embodiment, first side scroll mover switch (4529) is activated by pressing either side (4573) or (4574) of the switch (4529). The momentary switch activation of (4574) causes actuation of the first scroll mover (4528) and the first scroll rotator (4533), which may cause movement of the first scroll mover assembly (4559) in a corresponding direction to the rocking action, which is shown herein as unwinding and opening the first side of the scroll (4501). By use of momentary switch action (4574) on first side rocker switch (4529), scroll roller (4503) thereby unwinds the parchment. It may rotate freely until switch (4529) is released or until the first scroll mover assembly (4559) contacts one or more corresponding first side travel limit sensors (4524) and (4525), at which time switch (4529) is overridden by controller (4552) and first side scroll mover (4528) disengaged by controller (4552). By use of momentary action (4573) instead, scroll roller (4503) does not rotate freely but winds up its parchment under tension from rotary action of first scroll rotator (4533) during which time the first scroll mover (4528) is moving the first scroll mover assembly (4559) in the second direction (4586) at a rate to keep nominal tension on the parchment due to the rotation of first scroll rotator (4533).

The scroll (4501) is shown herein positioned between telescoping parchment guides (4536) and (4537). These parchment guides act to keep the parchment of the scroll (4501) in place as the first and second scroll mover assemblies (4559) and (4558) are moved into their desired positions. Inversely, the scroll (4501) may be removed by reversing the all of the above actions used to insert and lock the scroll (4501) into the apparatus (4510).

A video support frame (4504) is shown with one or more video sensors (4505) mounted thereon. In an embodiment, the apparatus (4510) includes one or more illuminators, shown herein as a video projector (4546), illuminates features in the scroll (4501). A first diagonal support (4507) and a second diagonal support (4506) are each shown in an open and raised position, also referred herein as a scroll access position. Support frame (4504) is shown with a first support bracket (4509) to receive the first diagonal support (4507) and a second support bracket (4508) to receive the second diagonal support (4506). Accordingly, as shown and described herein sensors are input devices while the illuminator is an output device. Data from sensors is used to help calculate scroll position while the illuminator at least partially discloses the scroll position.

Figure 46:
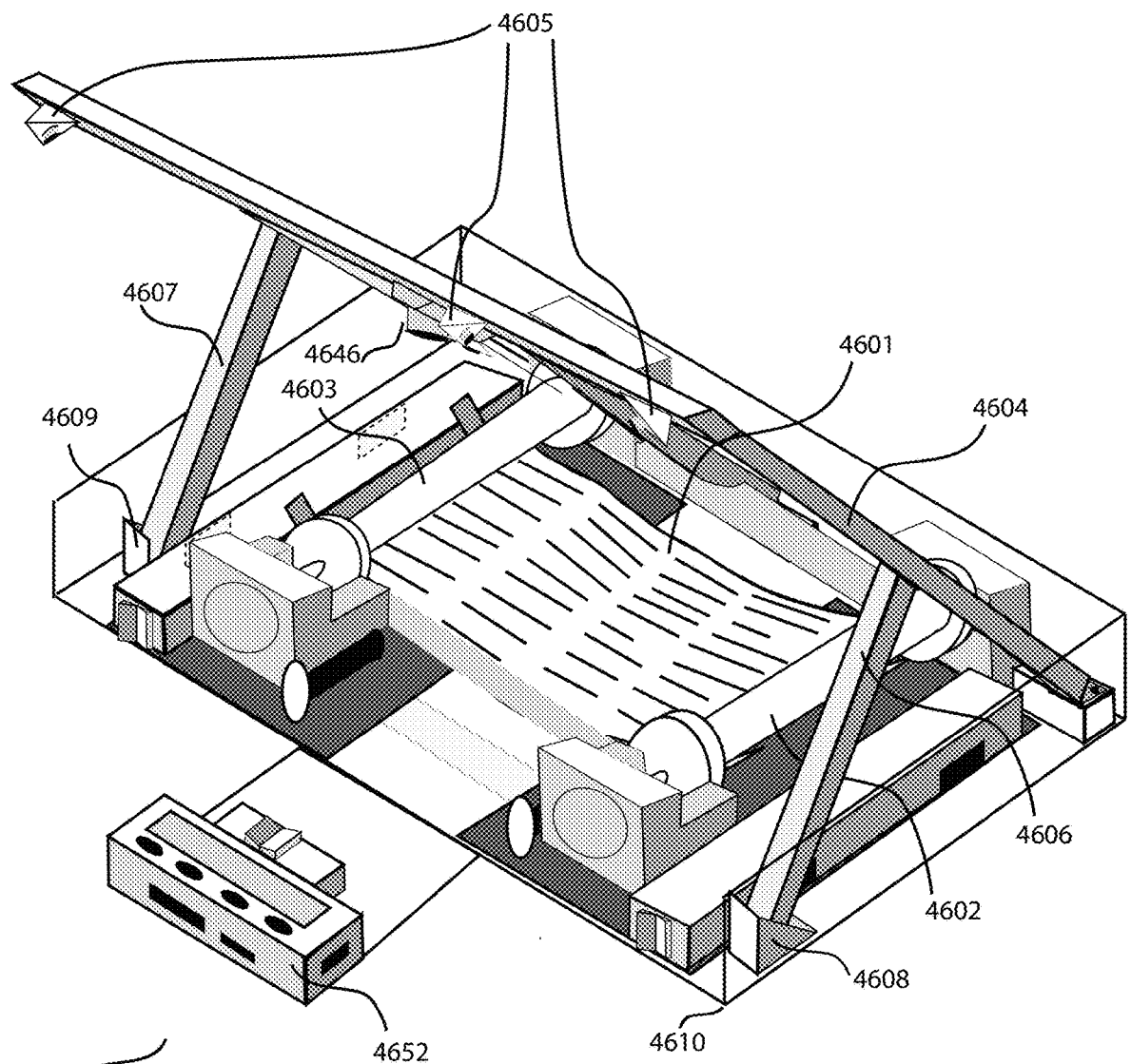
FIG. 46 is a diagram showing the apparatus of FIG. 45 in an operating position.

Referring to FIG. 46, a diagram (4600) is provided showing the apparatus (4610) in a lowered position, also referred herein as an operating position. Like parts are designated by like reference numerals in FIGS. 45 and 46, with the reference numerals of FIG. 46 changed from 4500 series of FIGS. 45 to 4600 series for FIG. 46. As shown, the first and second diagonal supports (4607) and (4606) are shown in an operating position and in this position, the supports (4607) and (4606) are in contact with the first and second support brackets (4609) and (4608), respectively. More specifically, in this operating position, the supports (4606) and (4607) hold the support frame (4604) with mounted video sensors (4605) and, in some embodiments, a video projector (4646) in a position to view and/or illuminate indicia present in the scroll (4601).

As further shown in FIG. 45, the scroll is fully mounted and stationary within the apparatus (4510) and as such, reading of the scroll (4501) and associated indicia contained on the parchment of the scroll and comparison of the scroll (4501) against a corresponding database may commence. All activities associated with the reading and comparison of the scroll (4501) and its indicia are managed by the controller (4552). As shown, the controller (4552) is provided with an external network connector (4577), an auxiliary output port (4555), an auxiliary input port (4554), a main input panel (4553), a peripheral input/output system (4560), a main output display (4556), and a scroll rotator switch (4557). In an embodiment, external network connector (4577) and auxiliary input and output ports (4555) and (4554), respectively, enable the controller to communicate with the computer system shown and described with reference to FIGS. 40 and 41. The peripheral input/output system (4560) receives video sensor input signals, scroll radius sensor input signals, scroll mover input signals, travel limit sensor input signals, scroll rotator input signals, and status input signals from the video projector (4546) from the apparatus. The controller (4552) also outputs scroll mover control signals, scroll rotator control signals, and video projector control signals to the apparatus (4510). The main input panel (4553) contains various command input options. Examples of such input actions include, but are not limited to, "Create Database", "Identify a Desired Location", "Feature Indexing Search", and "Section Indexing Search". These options are only provided as possible examples and should not be considered limiting.

The controller (4552) is operatively connected to the video sensors (4505), the first side scroll radius sensors (4526) and (4527), the second side scroll radius sensors (4513) and (4514), the sensors of the scroll movers (4515) and (4528), the first side travel limit sensors (4524) and (4525), the second side travel limit sensors (4511), and (4512), the sensors of the scroll rotators (4533) and (4520), and, if applicable, the status sensors of the video projector (4546), and as such is in communication with the sensor input signals. The operative connection through the peripheral input/output system (4560) enables the controller (4552) to receive input signals from the video sensors (4505), the scroll radius sensors (4513), (4514), (4526), and (4527), the sensors of the scroll movers (4515) and (4528), travel limit sensors (4511), (4512), (4524), and (4525), the sensors of the scroll rotators (4520) and (4533) and to send output signals to the scroll movers (4515) and (4528), the scroll rotators (4533) and (4520), and, if applicable, the video projector (4546). The controller (4552) converts sensor input signals into a software-usable rendering for further processing by optical input correction steps. The video sensors (4505) are configured to generate corresponding video data, which, when communications are received as input by the controller (4552) from the video sensors (4505), is processed in combination with scroll radius sensor (4513), (4514), (4526), and (4527) input signals, travel limit sensor (4511), (4512), (4524), and (4525) input signals, and scroll rotator sensor (4520) and (4533) input signals to create composite correction factors required by the apparatus (4510) to provide necessary input to control scroll rotation and to control video projector display patterns.

Input video data received from the video sensors (4505) is corrected by the controller (4552) for apparent optical depth, roll, pitch, and yaw to re-construct an image of unwrinkled, unfolded, uncurled parchment as if the parchment had never been subject to any imperfections. The employment of two or more video sensors examining one region of the scroll supports more accurate depth correction due to relative distance and orientation between them. This correction factor then supports higher accuracy of roll, pitch, and yaw correction factors. The corrected image is evaluated for optical character, graphic object, and textual column recognition. Textual column recognition result information is used to establish boundaries of text columns in their physical location in the scroll (4501) and to establish the serial number of each column relative to the first column at the beginning of the scroll (4501).

The optical character information and graphic object information from the video sensors (4605) is used to recognize character and/or graphic features in their physical locations in the scroll (4501) and the corresponding exposed parchment, including for purposes of word semantic analysis. Each character feature on the parchment in the scroll (4501) is assigned one or more semantically recognizable tokens in preparation to read a database. The arrangement of these tokens into words, phrases, and other features creates sequences suitable for database inquiries.

The optical character information and graphic object information is used to create a database of textual and graphical features of the scroll (4501). Since each scroll is prepared by hand, no two scrolls are completely identical and each individual scroll requires its own unique, specific database. In an embodiment, the created database can be for feature indexing as shown and described in FIGS. 11-20. In an embodiment, the created database can be for section indexing as shown and described in FIGS. 21 and 25-35. In an embodiment the database contains both the feature index and the section index of the scroll. The created database is stored in the memory (4016) and/or the data storage (4018) of the computer system and the scroll is now ready for examination.

Figure 47:
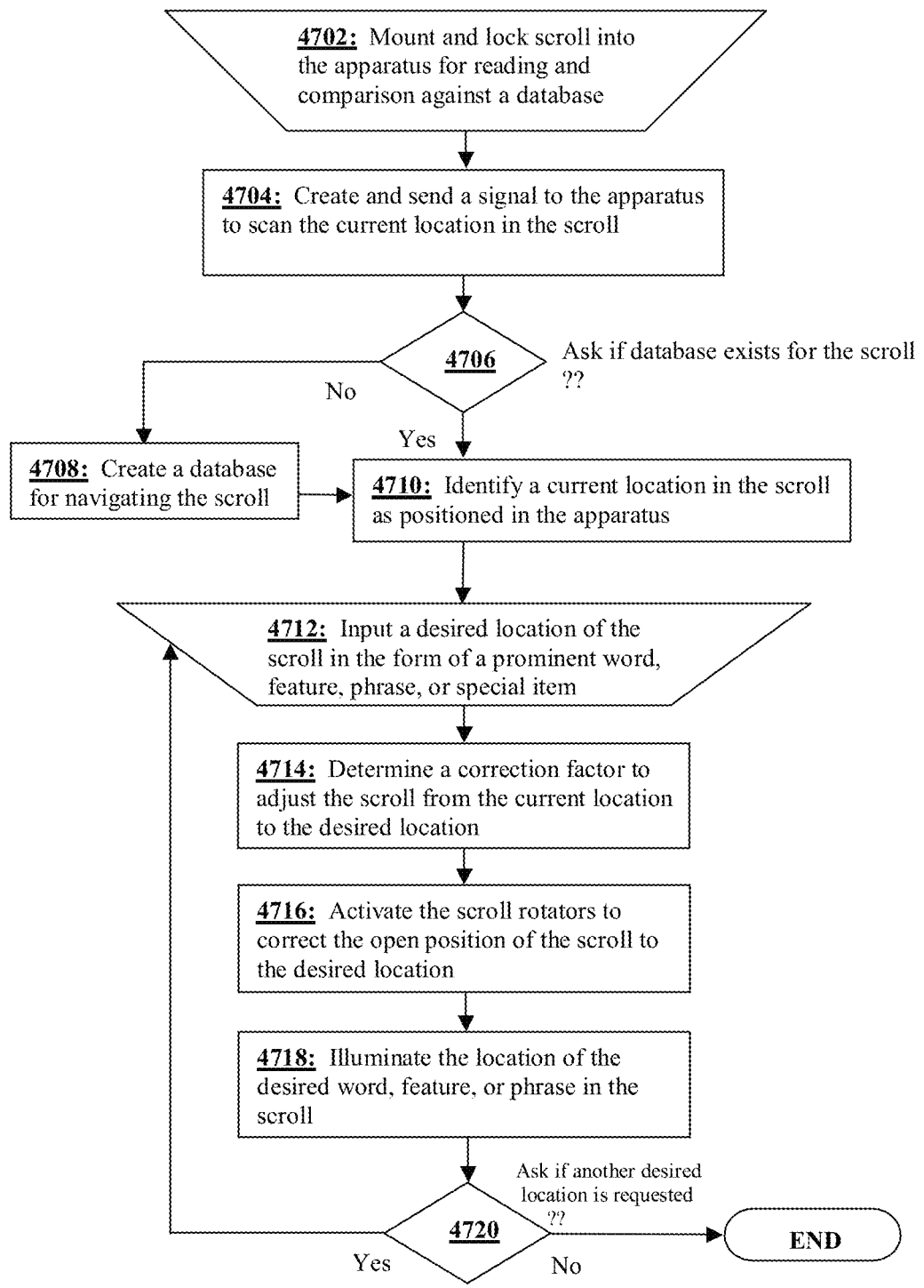
FIG. 47 is a flowchart illustrating a process for navigating the scroll in conjunction with the apparatus of FIG. 45.

Once the database and associated indexes have been created for the scroll, the scroll can be navigated by the apparatus by comparing the scroll against the created database. Referring to FIG. 47, a flowchart (4700) is provided illustrating a process for navigating the scroll in conjunction with the apparatus. As shown and described, a scroll is placed in an apparatus configured to read and compare the scroll against a database (4702). When mounted and locked into the apparatus, the controller creates and sends a control signal to the video sensors of the apparatus to scan the current location in the scroll (4704). Based on the scanned input of identified features in the scroll, the controller makes a determination whether a database for this specific scroll exists, i.e., has previously been created, (4706). Since each scroll is handwritten and therefore is not a completely exact copy of any other scroll, a unique, specific database is required for each individual scroll. Accordingly, a scroll is placed into an apparatus configured for reading scrolls, and a determination is made whether a database corresponding to the scroll has already been created.

A negative response to the determination at step (4706) indicates that a database for the scroll has not been created and the apparatus proceeds to create a database for the scroll (4708). The controller communicates with the video sensors, scroll radius sensors, scroll mover sensors, travel limit sensors, scroll rotator sensors, and, if applicable, video display projector sensor input and/or control output control signals to create video input of the scroll in which optical character information and graphic object information is used to recognize character and/or graphic features in their physical locations in the scroll parchment to create the scroll specific database. In an embodiment, the created database is the feature index of the scroll as described in FIGS. 11-20 and FIG. 5. In an embodiment, the created database is the section index of the scroll as described in FIGS. 21 and 25-35 and FIG. 5. In an embodiment, the database contains both the feature index and the section index of the scroll.

Following either step (4708) or a positive response to step (4706), the controller leverages the scroll database to identify the location in the scroll that is currently being displayed in the apparatus (4710). Following the identification of the current location in the scroll, a desired location in the scroll in the form of a prominent word, feature, phrase, or special item known to the database is input into the controller (4712). In an embodiment, the prominent word, feature, or phrase can be identified in an alphabetic feature index lookup process. In an embodiment, the special item can be identified in a special item index, typically an adaptation of an alphabetic feature index. In an embodiment, the prominent word, feature, or phrase can be identified in a numerical feature index lookup process. In an embodiment, the prominent word, feature, or phrase can be identified in an alphabetic section index lookup process. In an embodiment, the prominent word, feature, or phrase can be identified in a numerical section index lookup process. The index may be displayed on the main output display located on or operatively coupled to the controller. In an embodiment, the index is displayed on a visual computer monitor in communication with the controller. This desired location is converted into terms relative to the current location in the scroll by the controller in the form of a correction factor (4714). Once the correction factor is discovered, the controller activates the scroll rotators to correct the open position of the scroll from where it was opened to position it in the desired location (4716). In an embodiment, while the scroll is moving, the video sensors and video projector are in an active or activated posture and corresponding video sensor input signals and video projection output signals may optionally provide additional video data to the controller in a similar fashion as when evaluating the initial scroll position. In an embodiment, the controller can leverage the database to use a numerical feature index of scroll locations instead of an alphabetic index. In an embodiment, the controller can leverage the database to use a special feature index, i.e., an adapted alphabetic index of scroll locations instead of an alphabetic index. In an embodiment, the controller can leverage the database to use an alphabetic feature index of scroll locations instead of a feature index. In an embodiment, the controller can leverage the database to use a numerical section index of scroll locations instead of an alphabetic section index. In an embodiment, the controller can leverage the database to use some combination of these indexes. As the visible portion of the scroll travels from one position to the next, sequential numeric entries from a numerical feature index or a numerical section index or even a numerical special index may be used to identify indexed features in the scroll as the scroll is moved along by the apparatus described in both FIG. 3 (feature index) and in FIG. 23 (section index). Once the scroll is positioned at a desired location, no further correction is necessary. In an embodiment, a pointer or similar visual indicator is directed from the video projector to illuminate the desired location of the prominent word, feature, phrase, or special item in the scroll (4718). In an embodiment, the controller may prompt for input of another desired location after completing its navigation of the scroll to this desired location (4720). A positive response goes to step (4712) for another desired location while a negative response finishes out the method. Accordingly, the controller activates the scroll rotators to position the scroll to the desired location and illuminates the desired feature in the scroll.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, devices, components, subsystems, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the flow charts and the associated processes and apparatus organize aspects of scrolls to create databases and indices to facilitate traversal of such scrolls. Such databases and indices include, but are not limited to, alphabetic feature indices and numeric feature indices, topical subsets and regional subsets (direct in-order borrowings of some number of index entries) of an index, alphabetic section indices and numeric feature indices to provide an exact correspondence between identified sections such as paragraph breaks, column breaks, and other layouts and features, and topical and regional collections and arrangements of alphabetically and numerically oriented indices of special items not otherwise easily categorized.

It will be appreciated that, although specific embodiments of the invention have been described herein for purposes of illustration, various modifications may be made without departing from the spirit and scope of the invention. In particular, the processes, indices, and use thereof may be applied to a plurality of scroll types and associated format, including but not limited to ancient manuscripts in a variety of languages and locales around the world. Each of these will have its own unique, possible idiosyncratic, even peculiar format and embodiment of some or all of the index numbering methods. Furthermore, the percent estimation ruler of FIG. 6, the line counter rule of FIG. 10, and the precise indicia calculation method of FIG. 7 each fully embody aspects of the feature index numbering method. Derived from the method of FIG. 7 are the instances of this method for any specific scroll format and its number of lines per column as shown in FIG. 8 and FIG. 9 and scroll geometries that employ different column heights and numbers of lines to be embodied for those differences after the fashion of FIG. 6 and FIG. 10. The apparatus allows for a computer-implementation of the various processes and indices described within to a plurality of scroll types.

Furthermore, when there are a multiple of scroll archetypes for a particular scroll and/or where non-standard scroll-based renderings of a particular scroll exist, the equivalence index methods suggest additional embodiments of the invention. There also exists the possibility of web site format and other online content format for instances of indexing any of the manuscript traditions inferred herein. Accordingly, the scope of protection of this invention is limited only by the following claims and their equivalents.

I claim:

1. A computer-implemented method comprising:
placing a scroll having one or more columns of indicia without affixed position indicia in an apparatus, wherein the apparatus is configured for reading and comparing the scroll against a scroll database;
evaluating indicia on the scroll and constructing the scroll database, the scroll database comprising a feature index, the feature index including column numbers and column heuristics of the scroll;
identifying an initial open position of the scroll with respect to placement in the apparatus;
identifying a desired location in the scroll containing a desired feature from the feature index or a section index, the desired location correcting the initial opened position of the scroll to a location in the scroll displaying the desired feature;
identifying a feature column number for the desired feature, the feature column number being a column serial number;
measuring a fractional column distance where the desired feature is located, where the fractional column distance is a column heuristic, and combining the column serial number and the column heuristic and generating a standard mode feature index number for the desired feature;
combining the column serial number and the column heuristic into an absolute feature index number and generating a precise mode absolute feature index number for the desired feature,
the generating including:
creating a precise indicia table for a geometry of the scroll, the precise indicia table having three columns, a first column including a line number for each line of text, a second column including exact fractions of a distance between a start position of text of the column of the scroll and an end position of text in the column, and a third column including inexact fractions of the distance between the start position and the end position;
measuring a line number of a line containing a first word of the feature in the scroll; and
examining the created precise indicia table for the first word; and
assembling the identified column number and the column heuristic, the column heuristic from the examined precise indicia table, into a precise mode absolute feature index number;
ascertaining a correction factor to re-position the scroll from the current location to the desired feature, including leveraging the precise mode absolute feature index number to identify a designated column and calculate a column displacement;
the apparatus selectively re-positioning the scroll from the initial opened position to the desired feature based on the calculated column displacement; and
identifying the desired feature on the scroll with an illumination device operatively coupled to the apparatus.

2. The computer-implemented method of claim 1, wherein a column number combined with the column heuristic form the feature index number comprise the standard mode feature index number or the precise mode absolute feature index number.

3. The computer-implemented method of claim 1, wherein the precise mode absolute feature index number comprises a modifier annotating the column heuristic, the modifier referencing a characteristic of indicia identified by the precise mode absolute feature index number, wherein the characteristic is an unmodified attribute of the precise mode absolute feature index or a revise upward absolute modifier of the precise mode absolute feature index number.

4. The computer-implemented method of claim 3, further comprising refining the precise mode absolute feature index number of the desired feature, including converting the precise mode absolute feature index number to a precise mode compressed feature index number.

5. The computer-implemented method of claim 4, further comprising adjusting the column serial number and the column heuristic number of the precise mode compressed feature index number, and assigning a modifier where a word associated with the desired feature is a first word of a first complete sentence in the column.

6. The computer-implemented method of claim 4, further comprising adjusting the column serial number and the column heuristic of the precise mode compressed feature index number where a word associated with a feature is located within bounds of a sentence starting at the end of one column of the scroll and completing on an adjacent column.

7. The computer-implemented method of claim 6, further comprising adjusting the column heuristic of the precise mode compressed feature index number where a word associated with a feature is located within bounds of two columns, including employing a page overflow heuristic adjustment for assigning a revised column heuristic value.

8. The computer-implemented method of claim 4, wherein the column heuristic of the precise mode compressed feature index number further comprises a modifier annotating the column heuristic, the modifier referencing a characteristic of indicia identified by the feature index number, the characteristic selected from the group consisting of: unmodified, anchored, revise upward, revise downward, column overflow, and column underflow.

9. The computer-implemented method of claim 4, further comprising employing a localization heuristic for empirically adjusting the column serial number, the column heuristic, and the modifier of the precise mode compressed feature index number, the localization heuristic accounting for localized density of featured indicia.

10. A computer-implemented method comprising:
an apparatus configured to receive a scroll having one or more columns of indicia without affixed position indicia, wherein the apparatus is configured with one or more sensors and managing a position of the scroll;
the one or more apparatus sensors are configured to acquire data to evaluate indicia on the scroll, including identifying an initial open position of the scroll with respect to placement in the apparatus;
identifying a desired location in the scroll containing a desired feature, and a controller operatively coupled to the apparatus correcting the initial opened position of the scroll to a location in the scroll displaying the desired feature, including:
ascertaining the desired scroll location from a current location, leveraging a feature index number or a section index number to identify a designated column and calculate a column displacement;
the apparatus configured to selectively re-position the scroll from the initial opened position to the desired scroll location based on the calculated column displacement.

11. The computer-implemented method of claim 10, further comprising a video projector mounted on the apparatus to identify the desired feature on the scroll with a light illuminating the desired feature.

12. The computer-implemented method of claim 10, wherein a feature index includes column numbers and column heuristics of the scroll, wherein a column number combined with a column heuristic form the feature index number comprising a standard mode feature index number or a precise mode absolute feature index number.

13. The computer-implemented method of claim 12, further comprising combining the column number and the column heuristic into an absolute feature index number, and generating a precise mode absolute feature index number for the desired feature,
the generating including:
creating a precise indicia table for a geometry of the scroll, the precise indicia table having a first column including a line number for each line of text, a second column including exact fractions of a distance between a start position of text of the column of the scroll and an end position of text in the column, and a third column including inexact fractions of the distance between the start position and the end position;
measuring a line number of a line containing a first word of the feature in the scroll; and
examining the created precise indicia table for the first word; and assembling the identified column number and the column heuristic, the column heuristic from the examined precise indicia table, into a precise mode absolute feature index number.

14. The computer-implemented method of claim 13, wherein the precise mode absolute feature index number comprises a modifier annotating the column heuristic, the modifier referencing a characteristic of indicia identified by the precise mode absolute feature index number, and the characteristic is an unmodified attribute of the precise mode absolute feature index number or a revise upward absolute modifier of the precise mode absolute feature index number.

15. The computer-implemented method of claim 14, further comprising refining the precise mode absolute feature index number of the feature, including converting the precise mode absolute feature index number to a precise mode compressed feature index number.

16. The computer-implemented method of claim 15, further comprising adjusting the column serial number and the column heuristic of the precise mode compressed feature index number, and assigning a modifier where a word associated with the desired feature is a first word of a first complete sentence in the column.

* * * * *